US010656281B2

(12) United States Patent
Hamzeh et al.

(10) Patent No.: US 10,656,281 B2
(45) Date of Patent: May 19, 2020

(54) SYSTEMS AND METHODS FOR INTERFERENCE DETECTION IN SHARED SPECTRUM CHANNELS

(71) Applicant: CABLE TELEVISION LABORATORIES, INC, Louisville, CO (US)

(72) Inventors: Belal Hamzeh, Boulder, CO (US); Peter Paul Smyth, Newbourne (GB); Lin Cheng, Superior, CO (US); Jim O'Connor, Idaho Springs, CO (US); Eric Winkelman, Boulder, CO (US); Thomas H. Williams, Longmont, CO (US); Steve Arendt, Longmont, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/191,211

(22) Filed: Nov. 14, 2018

(65) Prior Publication Data

US 2019/0120969 A1    Apr. 25, 2019

Related U.S. Application Data

(63) Continuation-in-part of application No. 16/142,933, filed on Sep. 26, 2018, now Pat. No. 10,367,577,
(Continued)

(51) Int. Cl.
*G01S 19/21* (2010.01)
*H04W 16/14* (2009.01)
(Continued)

(52) U.S. Cl.
CPC .......... *G01S 19/21* (2013.01); *H04B 7/18517* (2013.01); *H04B 7/18519* (2013.01);
(Continued)

(58) Field of Classification Search
CPC . G01S 19/21; H04B 7/18517; H04B 7/18519; H04B 7/0617; H04W 16/14;
(Continued)

(56) References Cited

U.S. PATENT DOCUMENTS 6,433,685 B1    8/2002  Struble et al.
7,190,703 B1 *  3/2007  Heitmann ........... H04M 7/0066
                                                         370/508
(Continued)

FOREIGN PATENT DOCUMENTS

WO    2011016060 A1    2/2011

OTHER PUBLICATIONS

International Search Report and Written Opinion for related PCT Application No. PCT/US2018/052936, dated Jan. 3, 2019, 12 pages.

*Primary Examiner* — Dominic E Rego
(74) *Attorney, Agent, or Firm* — Armstrong Teasdale LLP

(57) ABSTRACT

A communication system, includes a satellite receiver in operable communication with a central server, a cellular node configured to operate within a proximity of the satellite receiver, and at least one mobile communication device configured to communicate (i) with the cellular node, (ii) within the proximity of the satellite receiver, and (iii) using a transmission signal capable of causing interference to the satellite receiver. The satellite receiver is configured to detect a repeating portion of the transmission signal and determine a potential for interference from the at least one mobile communication device based on the detected repeating portion.

14 Claims, 39 Drawing Sheets

Related U.S. Application Data which is a continuation-in-part of application No. 15/809,658, filed on Nov. 10, 2017, now Pat. No. 10,116,381.

(60) Provisional application No. 62/420,124, filed on Nov. 10, 2016, provisional application No. 62/585,644, filed on Nov. 14, 2017, provisional application No. 62/563,185, filed on Sep. 26, 2017, provisional application No. 62/564,115, filed on Sep. 27, 2017, provisional application No. 62/609,071, filed on Dec. 21, 2017, provisional application No. 62/617,882, filed on Jan. 16, 2018, provisional application No. 62/621,354, filed on Jan. 24, 2018, provisional application No. 62/621,673, filed on Jan. 25, 2018, provisional application No. 62/623,923, filed on Jan. 30, 2018, provisional application No. 62/682,306, filed on Jun. 8, 2018.

(51) Int. Cl.
*H04J 11/00* (2006.01)
*H04B 7/185* (2006.01)
*H04B 7/06* (2006.01)

(52) U.S. Cl.
CPC ....... *H04J 11/0023* (2013.01); *H04J 11/0066* (2013.01); *H04J 11/0073* (2013.01); *H04J 11/0076* (2013.01); *H04W 16/14* (2013.01); *H04B 7/0617* (2013.01)

(58) Field of Classification Search
CPC .............. H04J 11/0023; H04J 11/0066; H04J 11/0073; H04J 11/0076
See application file for complete search history.

(56) References Cited

U.S. PATENT DOCUMENTS

| | | | |
|---|---|---|---|
| 7,492,283 B1 | 2/2009 | Racunas, Jr. | |
| 7,792,070 B1 | 9/2010 | Burr | |
| 8,903,398 B2* | 12/2014 | Carter | H04W 76/40 455/436 |
| 9,332,002 B1 | 5/2016 | Bowen | |
| 9,445,270 B1 | 9/2016 | Bicket et al. | |
| 9,524,628 B1 | 12/2016 | Omer et al. | |
| 2003/0074441 A1* | 4/2003 | Penk | H04L 41/00 709/224 |
| 2003/0087606 A1 | 5/2003 | Dybdal et al. | |
| 2003/0185285 A1* | 10/2003 | Talwar | H04B 7/0842 375/148 |
| 2005/0083843 A1 | 4/2005 | Pinault | |
| 2005/0088687 A1 | 4/2005 | Atobe | |
| 2006/0053057 A1 | 3/2006 | Michael | |
| 2007/0159971 A1 | 7/2007 | Zhang et al. | |
| 2008/0234003 A1* | 9/2008 | Carvalho | H04W 72/085 455/561 |
| 2008/0298297 A1 | 12/2008 | Orakkan | |
| 2008/0298481 A1* | 12/2008 | Rofougaran | H04B 17/309 375/260 |
| 2008/0300006 A1* | 12/2008 | Rofougaran | H04B 1/406 455/552.1 |
| 2008/0316130 A1* | 12/2008 | Rofougaran | H01Q 1/521 343/756 |
| 2009/0322513 A1 | 12/2009 | Hwang et al. | |
| 2010/0045510 A1 | 2/2010 | Lopez et al. | |
| 2010/0278064 A1 | 11/2010 | Jeong | |
| 2010/0306394 A1 | 12/2010 | Brown et al. | |
| 2011/0053605 A1 | 3/2011 | Carpio et al. | |
| 2012/0135758 A1 | 5/2012 | Cho | |
| 2012/0192075 A1 | 7/2012 | Ebtekar et al. | |
| 2012/0220307 A1 | 8/2012 | Wohlert et al. | |
| 2013/0125225 A1 | 5/2013 | Candelore | |
| 2013/0172010 A1 | 7/2013 | Kang et al. | |
| 2013/0178232 A1 | 7/2013 | Claussen et al. | |
| 2014/0025809 A1 | 1/2014 | Steuperaert | |
| 2014/0044035 A1 | 2/2014 | Hwang et al. | |
| 2015/0065166 A1 | 3/2015 | Ward et al. | |
| 2015/0112581 A1* | 4/2015 | Hakim | G01C 21/3461 701/400 |
| 2015/0245374 A1 | 8/2015 | Mitola, III et al. | |
| 2015/0326463 A1 | 11/2015 | Solondz | |
| 2016/0142971 A1 | 5/2016 | Ji et al. | |
| 2016/0169955 A1 | 6/2016 | Tsai et al. | |
| 2016/0269137 A1 | 9/2016 | Lindoff et al. | |
| 2017/0105094 A1 | 4/2017 | Kwak et al. | |
| 2017/0215176 A1 | 7/2017 | Chan | |

\* cited by examiner

| Azimuth angle (°) | Antenna gain 5° elevation angle (dB) | Total Attenuation required (dB) | | |
|---|---|---|---|---|
| | | Co-channel | LNB blocking | 1st adjacent OOBE | 2nd adjacent OOBE |
| 0 | 14.5 | 180.5 | 121.5 | 140.5 | 128.5 |
| 5 | -5.9 | 160.1 | 101.1 | 120.1 | 108.1 |
| 10 | -10.0 | 156.0 | 97.0 | 116.0 | 104.0 |
| 15 | -10.0 | 156.0 | 97.0 | 116.0 | 104.0 |

| | Separation Distance with single Tx and 5° earth station antenna elevation angle (m) | | | | | | | | | | | |
|---|---|---|---|---|---|---|---|---|---|---|---|---|
| | Co-channel | | | LNB blocking | | | 1st adjacent OOBE | | | 2nd adjacent OOBE | | |
| Azimuth angle (°) | FSL | 231 Hata | 231 WI | FSL | 231 Hata | 231 WI | FSL | 231 Hata | 231 WI | FSL | 231 Hata | 231 WI |
| 0 | 6940000 | 3413 | 7370 | 7787 | 124 | 206 | 69400 | 360 | 653 | 17400 | 183 | 315 |
| 5 | 662800 | 1084 | 2140 | 744 | 39 | 60 | 6628 | 114 | 190 | 1660 | 58 | 92 |
| 10 | 413400 | 861 | 1670 | 464 | 31 | 47 | 4134 | 91 | 148 | 1040 | 46 | 71 |
| 15 | 413400 | 861 | 1670 | 464 | 31 | 47 | 4134 | 91 | 148 | 1040 | 46 | 71 |

3.7-4.2 GHz EARTH STATION LOCATIONS

4 & 6 GHz FIXED MICROWAVE TIME TRENDS

FIG. 11B

| dBm/10MHz | dBm/MHz | | Blocking: FCC defined -60dBr dBm | | | | | | | | |
|---|---|---|---|---|---|---|---|---|---|---|---|
| 47 | 37 | | | | | -60 | | | | | |
| 40 | 30 | | | | | dB | | | | | |
| 30 | 20 | | First Adjacent channel | | | 40 | | | | | |
| 23 | | | Second | | | 52 | | | | | |

| | | | Link Budget In Band Interference | | | 1st Adj Channel | 2nd Adj Channel | 1st Adj Channel | 2nd Adj Channel | 1st Adj Channel | 2nd Adj Channel |
|---|---|---|---|---|---|---|---|---|---|---|---|
| | | | 37 dBm/MHz | 30 dBm/MHz | 20 dBm/Mhz | 37 dBm/Mhz | 37 dBm/Mhz | 30 dBm/Mhz | 30 dBm/Mhz | 20 dBm/Mhz | 20 dBm/Mhz |
| Elevation Degrees | Gain | | dB | dB | dB | dB | dB | dB | dB | dB | dB |
| 5 | 14.53 | | 180.6 | 173.6 | 163.6 | 140.6 | 128.6 | 133.6 | 121.6 | 123.6 | 111.6 |
| 10 | 7.00 | | 173.1 | 166.1 | 156.1 | 133.1 | 121.1 | 126.1 | 114.1 | 116.1 | 104.1 |
| 15 | 2.60 | | 168.7 | 161.7 | 151.7 | 128.7 | 116.7 | 121.7 | 109.7 | 111.7 | 99.7 |
| 20 | -0.53 | | 165.5 | 158.5 | 148.5 | 125.5 | 113.5 | 118.5 | 106.5 | 108.5 | 96.5 |
| 25 | -2.95 | | 163.1 | 156.1 | 146.1 | 123.1 | 111.1 | 116.1 | 104.1 | 106.1 | 94.1 |
| 30 | 30 | 30 | 30 | 30 | 30 | 30 | 30 | 30 | 30 | 30 | 30 |
| 35 | -6.68 | | 159.5 | 152.5 | 142.5 | 119.5 | 107.5 | 112.5 | 100.5 | 102.5 | 90.5 |
| 40 | -8.05 | | 158.0 | 151.0 | 141.0 | 118.0 | 106.0 | 111.0 | 99.0 | 101.0 | 89.0 |
| 45 | -10.03 | | 156.0 | 149.0 | 139.0 | 116.0 | 104.0 | 109.0 | 97.0 | 99.0 | 87.0 |

| | | | Distance from FSS | | | | | | | | |
|---|---|---|---|---|---|---|---|---|---|---|---|
| | | | Link Budget In Band Interference | | | 1st Adj Channel | 2nd Adj Channel | 1st Adj Channel | 2nd Adj Channel | 1st Adj Channel | 2nd Adj Channel |
| | | | 37 dBm/MHz | 30 dBm/Mhz | 20 dBm/Mhz | 37 dBm/Mhz | 37 dBm/Mhz | 30 dBm/Mhz | 30 dBm/Mhz | 20 dBm/Mhz | 20 dBm/Mhz |
| Elevation degrees | Gain | | m | m | m | m | m | m | m | m | m |
| 5 | 14.53 | | 1338 | 1079 | 794 | 392 | 271 | 316 | 219 | 233 | 181 |
| 10 | 7.00 | | 1062 | 857 | 630 | 311 | 215 | 251 | 174 | 185 | 144 |
| 15 | 2.60 | | 928 | 748 | 550 | 272 | 188 | 219 | 152 | 161 | 75 |
| 20 | -0.53 | | 843 | 680 | 500 | 247 | 171 | 199 | 107 | 146 | 64 |
| 25 | -2.95 | | 782 | 631 | 464 | 229 | 159 | 185 | 95 | 105 | 57 |
| 30 | 30 | | 13 | 13 | 13 | 13 | 13 | 13 | 2 | 2 | 2 |
| 35 | -6.68 | | 699 | 564 | 415 | 205 | 142 | 165 | 78 | 87 | 47 |
| 40 | -8.05 | | 669 | 540 | 397 | 196 | 104 | 158 | 73 | 81 | 44 |
| 45 | -10.03 | | 630 | 508 | 374 | 184 | 94 | 149 | 66 | 73 | 39 |

| Elevation degrees | Antenna gain (dBi) | In-band Cat A | In-band Cat B NR | In-band Cat B R | Blocking Cat A | Blocking Cat B NR | Link budget (dB) 1st adj emission Cat A | 1st adj emission Cat B NR | 1st adj emission Cat B R | 2nd adj emission Cat A | 2nd adj emission Cat B NR | 2nd adj emission Cat B R |
|---|---|---|---|---|---|---|---|---|---|---|---|---|
| 5 | 14.53 | 163.03 | 173.03 | 180.03 | 107.04 | 117.04 | 124.04 | 123.03 | 133.03 | 140.03 | 111.03 | 121.03 | 128.03 |
| 10 | 7.00 | 155.50 | 165.50 | 172.50 | 99.51 | 109.51 | 116.51 | 115.50 | 125.50 | 132.50 | 103.50 | 113.50 | 120.50 |
| 15 | 2.60 | 151.10 | 161.10 | 168.10 | 95.11 | 105.11 | 112.11 | 111.10 | 121.10 | 128.10 | 99.10 | 109.10 | 116.10 |
| 20 | -0.53 | 147.97 | 157.97 | 164.97 | 91.98 | 101.98 | 108.98 | 107.97 | 117.97 | 124.97 | 95.97 | 105.97 | 112.97 |
| 25 | -2.95 | 145.55 | 155.55 | 162.55 | 89.56 | 99.56 | 106.56 | 105.55 | 115.55 | 122.55 | 93.55 | 103.55 | 110.55 |
| 30 | -4.93 | 143.57 | 153.57 | 160.57 | 87.58 | 97.58 | 104.58 | 103.57 | 113.57 | 120.57 | 91.57 | 101.57 | 108.57 |
| 35 | -6.60 | 141.90 | 151.90 | 158.90 | 85.91 | 95.91 | 102.91 | 101.90 | 111.90 | 118.90 | 89.90 | 99.90 | 106.90 |
| 40 | -8.05 | 140.45 | 150.45 | 157.45 | 84.46 | 94.46 | 101.46 | 100.45 | 110.45 | 117.45 | 88.45 | 98.45 | 105.45 |
| 48 | -10.03 | 138.47 | 148.47 | 155.47 | 82.48 | 92.48 | 99.48 | 98.47 | 108.47 | 115.47 | 86.47 | 96.47 | 103.47 |

| Elevation degrees | Antenna gain (dBi) | In-band Cat A | In-band Cat B NR | In-band Cat B R | Blocking Cat A | Blocking Cat B NR | Link budget (dB) 1st adj emission Cat A | 1st adj emission Cat B NR | 1st adj emission Cat B R | 2nd adj emission Cat A | 2nd adj emission Cat B NR | 2nd adj emission Cat B R |
|---|---|---|---|---|---|---|---|---|---|---|---|---|
| 5 | 14.53 | 192.06 | 202.06 | 209.06 | 136.07 | 146.07 | 153.07 | 152.06 | 162.06 | 169.06 | 140.06 | 150.06 | 157.06 |
| 10 | 7.00 | 184.53 | 194.53 | 201.53 | 128.54 | 138.54 | 145.54 | 144.53 | 154.53 | 161.53 | 132.53 | 142.53 | 149.53 |
| 15 | 2.60 | 180.13 | 190.13 | 197.13 | 124.14 | 134.14 | 141.14 | 140.13 | 150.13 | 157.13 | 128.13 | 138.13 | 145.13 |
| 20 | -0.53 | 177.01 | 187.01 | 194.01 | 121.02 | 131.02 | 138.02 | 137.01 | 147.01 | 154.01 | 125.01 | 135.01 | 142.01 |
| 25 | -2.95 | 174.58 | 184.58 | 191.58 | 118.59 | 128.59 | 135.59 | 134.58 | 144.58 | 151.58 | 122.58 | 132.58 | 139.58 |
| 30 | -4.93 | 172.60 | 182.60 | 189.60 | 116.61 | 126.61 | 133.61 | 132.60 | 142.60 | 149.60 | 120.60 | 130.60 | 137.60 |
| 35 | -6.60 | 170.93 | 180.93 | 187.93 | 114.94 | 124.94 | 131.94 | 130.93 | 140.93 | 147.93 | 118.93 | 128.93 | 135.93 |
| 40 | -8.05 | 169.48 | 179.48 | 186.48 | 113.49 | 123.49 | 130.49 | 129.48 | 139.48 | 146.48 | 117.48 | 127.48 | 134.48 |
| 48 | -10.03 | 167.50 | 177.50 | 184.50 | 111.51 | 121.51 | 128.51 | 127.50 | 137.50 | 144.50 | 115.50 | 125.50 | 132.50 |

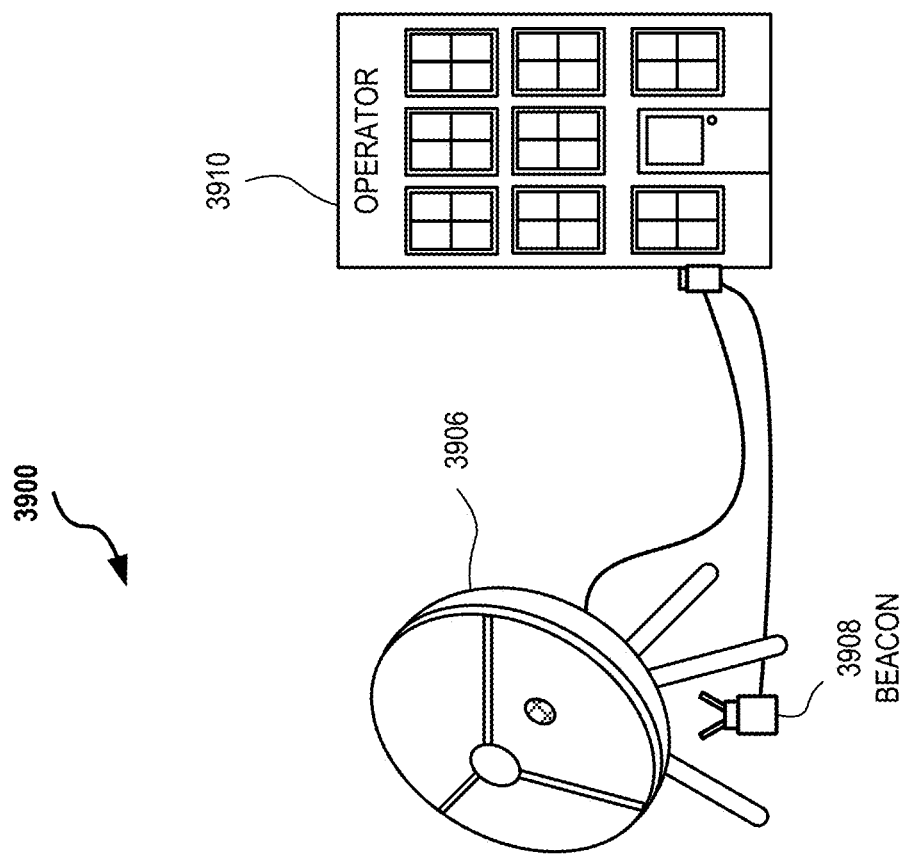
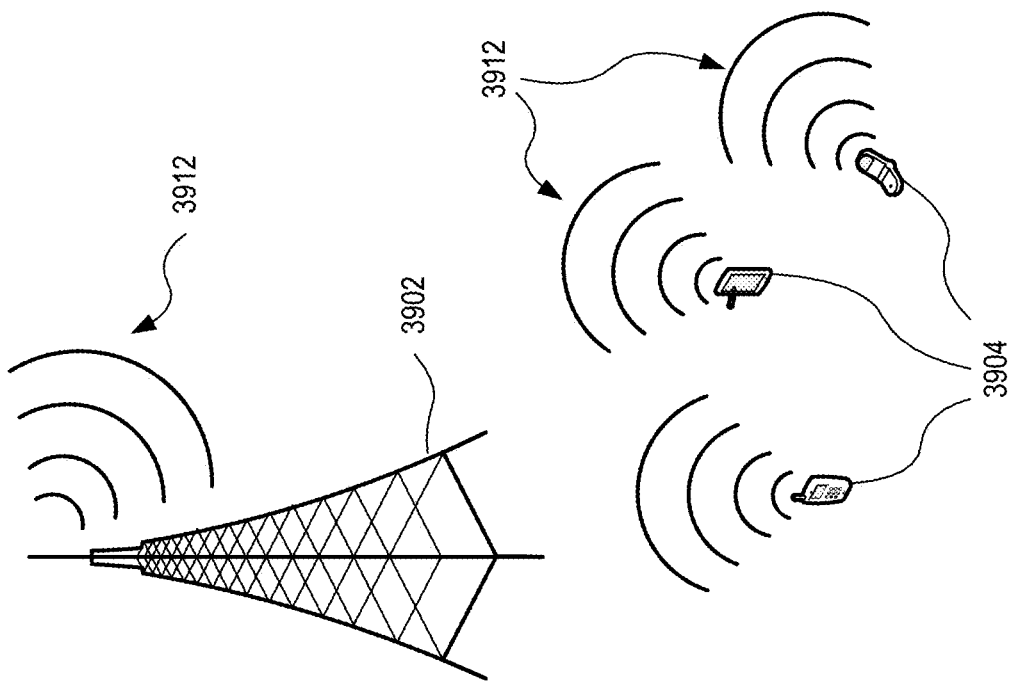
FIG. 39

SYSTEMS AND METHODS FOR INTERFERENCE DETECTION IN SHARED SPECTRUM CHANNELS

CROSS REFERENCE TO RELATED APPLICATIONS

This application is a continuation in part of U.S. application Ser. No. 16/142,933, filed Sep. 26, 2018, which prior application is a continuation in part of U.S. application Ser. No. 15/809,658, filed Nov. 10, 2017, now U.S. Pat. No. 10,116,381, which claims the benefit of and priority to U.S. Provisional Patent Application Ser. No. 62/420,124, filed Nov. 10, 2016. U.S. application Ser. No. 16/142,933 further claims the benefit of and priority to U.S. Provisional Patent Application Ser. No. 62/563,185, filed Sep. 26, 2017, U.S. Provisional Patent Application Ser. No. 62/564,115, filed Sep. 27, 2017, U.S. Provisional Patent Application Ser. No. 62/609,071, filed Dec. 21, 2017, U.S. Provisional Patent Application Ser. No. 62/617,882, filed Jan. 16, 2018, U.S. Provisional Patent Application Ser. No. 62/621,354, filed Jan. 24, 2018, U.S. Provisional Patent Application Ser. No. 62/621,673, filed Jan. 25, 2018, U.S. Provisional Patent Application Ser. No. 62/623,923, filed Jan. 30, 2018, and U.S. Provisional Patent Application Ser. No. 62/682,306, filed Jun. 8, 2018. The present application further claims the benefit of and priority to U.S. Provisional Patent Application Ser. No. 62/585,644, filed Nov. 14, 2017. The disclosures of all of these applications are incorporated herein by reference in their entireties.

BACKGROUND

The field of the disclosure relates generally to satellite service transmission systems, and particularly to management of fixed satellite service protection using real-time measurements.

Conventional fixed satellite service (FSS) earth stations, or sites, operate across a variety of spectrum bands for Geostationary Earth Orbit (GEO) satellites. The citizens band radio service (CBRS), defined by the FCC for fixed wireless and mobile communications operates in the 3550-3700 MHz (3.55-3.7 GHz) band and use of this spectrum is authorized and managed by a Spectrum Access System (SAS). The function of the SAS is to maintain a database of all transmitters that use the CBRS band, including the transmitter locations and transmitter powers. The SAS uses a propagation model to determine interference between each FSS site and radio access points (AP) to ensure globally across the totality of its management area that the interference is below an acceptable interference threshold at each location. The SAS uses frequency planning algorithms known in the field of cellular communications for Frequency Division Multiple Access (FDMA), such as GSM. Thus, the SAS is able to allocate to each AP or citizens broadband radio service device (CBSD), the frequency of operation, bandwidth, and transmitter power.

The C-band, which is designated by the IEEE and used for satellite communications, covers the 3-8 GHz band. The FSS incumbents in the 3.7-4.2 GHz of downlink C-band are identical in nature and technology to the FSS incumbents within the 3.55-3.7 GHz CBRS band, and these incumbents are provided co-channel and adjacent-channel protection (out of band) under the Part 96 rules of the United States Federal Communications Commission (FCC). FSS incumbents within the CBRS band use 3.665 to 3.7 GHz. Additionally, there is a requirement to limit the amount of aggregate interference across the entire downlink band to avoid gain compression at the Low Noise Amplifier (LNA) used for satellite signal reception. The CBRS band is considered fairly manageable at present due to the relatively small number of FSS sites (<100). In contrast, the 3.7-4.2 GHz band presently includes over 4700 registered FSS sites, and may include as many or more unregistered FSS sites.

There are approximately, at this time, 160 geostationary satellites utilizing the C-band for downlink in the 3.7-4.2 MHz spectrum. Each satellite typically employs 24 transponders, each with a 36 MHz signal bandwidth. Carrier spacing is 40 MHz, 2×500 MHz used on each satellite, and 12 carriers each for horizontal and vertical polarization. The carrier-to-noise (C/N) margins are typically 2-4 dB. The earth stations typically employ multiple satellite dishes and frequency agile receivers to decode specific video/data streams off individual transponders. The actual received bandwidth at the FSS sites varies. Multiple dish antennas are often used to obtain programming from multiple satellites. The United States C-band frequency chart is shown below (in GHz) in Table 1.

TABLE 1

| (Frequencies in GHz) | | | | |
|---|---|---|---|---|
| Horizontal Uplink | Horizontal Downlink | Channel | Vertical Downlink | Vertical Uplink |
| | 3.720 | 1 | | 5.945 |
| 5.965 | | 2 | 3.740 | |
| | 3.760 | 3 | | 5.985 |
| 6.005 | | 4 | 3.780 | |
| | 3.800 | 5 | | 6.025 |
| 6.045 | | 6 | 3.820 | |
| | 3.840 | 7 | | 6.065 |
| 6.085 | | 8 | 3.860 | |
| | 3.880 | 9 | | 6.105 |
| 6.125 | | 10 | 3.900 | |
| | 3.920 | 11 | | 6.145 |
| 6.165 | | 12 | 3.940 | |
| | 3.960 | 13 | | 6.185 |
| 6.205 | | 14 | 3.980 | |
| | 4.000 | 15 | | 6.225 |
| 6.245 | | 16 | 4.020 | |
| | 4.040 | 17 | | 6.265 |
| 6.285 | | 18 | 4.060 | |
| | 4.080 | 19 | | 6.305 |
| 6.325 | | 20 | 4.100 | |
| | 4.120 | 21 | | 6.345 |
| 6.365 | | 22 | 4.140 | |
| | 4.160 | 23 | | 6.385 |
| 6.405 | | 24 | 4.180 | |

The C-band downlink spectrum includes 500 MHz adjacent to the CBRS band, but sharing this adjacent spectrum with mobile and fixed wireless usage has been problematic for technological reasons, and according to the existing protection rules, which are highly conservative in nature. Satellite receivers, for example, are extremely sensitive, having an interference threshold of −129 dBm/MHz according to the requirement from FCC Part 96, and operate below the thermal noise level of the actual band itself, often working with effective thermal noise of 80K, with high gain antennas (satellite dishes) to amplify a weak satellite signal before detection. Relatively small power transmitters sharing the same band may cause interference over distances of tens of kilometers or greater.

There is no system currently in place to monitor and report operating parameters, such as the actual frequency channel usage or the direction and elevation of reception of the satellite dish with its dish size (which determines its gain for satellite reception) at each FSS site. Accordingly, the protection rules are conservative because existing SAS schemes have no capability to remedy FSS interference. Furthermore, no conventional propagation models accurately predict the transmission loss between the transmitter and the receiver, or to the FSS site from the point of interference, which further encourages over protection of FSS sites from wireless transmitters that occupy the same band. Additionally, building construction/demolition, as well atmospheric effects, including change from one season to another, can cause unpredictable propagation behavior, and FSS site operators may frequently change the FSS site operating parameters, which encourages the operators to register their respective FSS sites for full arc and full bandwidth protection when, in practice, the actual use may be much more restricted.

FIG. 1 is a schematic illustration of a conventional satellite service protection scheme 100 for an FSS site 102. FSS site 102 includes at least one earth satellite ground station 104, or earth station 104, which generally includes a dish and a frequency agile receiver (not separately numbered), for receiving and decoding video/data streams from satellite 106 (e.g., GEO C-band satellite). Protection scheme 100 further includes a CBSD 108, which may be a base station in the cellular context, such as an eNodeB for LTE, mounted on a vertical support or tower 110. CBSD 108 may be a radio access point (AP) used for fixed wireless access. Authorization and resource allocation of CBSD 108 is governed by an SAS 112, which is in operable communication with CBSD 108 over a data link 114 (e.g., wireless or wired Internet connection, etc.).

In operation of protection scheme 100, CBSD 108 requests authorization and resource allocation from SAS 112. SAS 112 has knowledge of the operating parameters of FSS site 102, which are communicated over a reporting link 115. Initially, the resource allocation to CBSD 108 can be provided using a propagation model to avoid interference. This interference modeling can model co-channel, adjacent channel, second adjacent channel, and aggregate band interference. In this example, SAS 112 may use a frequency planning algorithm that is similar to a model used for cellular networks to determine the allocation of both the channel frequency and power. However, this modeling technique is not aware of the actual loss between CBSD 108 and FSS site 102, which may influenced by obstructions 116 (buildings, elevated ground, seasonal effects, foliage, etc.) along an actual transmission path 118 therebetween. SAS 112 therefore implements protection scheme 100 according to an estimate model that utilizes a mapped distance 120 between CBSD 108 and FSS site 102 to predict a pass loss estimate.

However, because SAS 112 cannot measure the actual loss along the actual transmission path 118, the path loss estimate will be inaccurate, and typically based on the worst-case scenario. Such inaccuracies therefore generally encourage over protection of the FSS sites and results in limited CBRS spectrum utilization, as well as the C-band downlink spectrum overall. Accordingly, it would be desirable to develop an FSS protection scheme that can determine actual path loss considerations in real time to maximize use of available spectra, but without impairing the protection to the sensitive satellite receivers.

FIG. 2 is a schematic illustration of a conventional satellite service protection system 200 implementing protection scheme 100, FIG. 1, for earth station 104 receiving a video/data stream 202 from satellite 106. In this example, stream 202 has a total transmit spectrum of 500 MHz between 3700 MHz and 4200 MHz, that is, 500 MHz of the GEO C-band satellite downlink spectrum adjacent to the CBRS band. Under the current government rules, protection scheme 100 implements the FCC Part 96 protection scheme for 3600-3700 MHz earth stations. System 200 includes a low-noise block (LNB) 204 and a headend 206. LNB 204 includes, for example, a feed horn 208, a bandpass filter 210, and an LNA/downconverter 212. An FCC reference point (not shown), for interference calculations by the SAS, is generally taken between bandpass filter 210 and LNA 212. Headend 206 includes a plurality of channel receivers 214.

In operation of system 200, LNB 204 functions as the receiving device for the dish of earth station 104, collecting from the dish the amplified received radio waves as a block of frequency sub-blocks a through l (e.g., 12×40 MHz channels, see Table 1, above). LNB 204 amplifies and downconverts the collected block into a lower block of intermediate frequencies (IF) (e.g., 950-1450 MHz), which are then distributed as individual sub-blocks (c, f, b, i in this example) along a receiver signal distribution chain 216 to respective channel receivers 214, which are typically contained in a distribution rack in headend 206.

In this example, earth station 104 utilizes a 2-meter antenna, with protection of FSS LNB from gain compression of −60 dBm aggregate LNB input signal level from all terrestrial radio emissions within 40 km radius of the FSS across the 500 MHz band. Protection of FSS receiver noise floor is −129 dBm/MHz, as discussed above, from all co-channel terrestrial radio signals within 150 km radius of the FSS, based on maximum noise equal to −10 dB I/N, for 0.25 dB max noise rise at measurement point. It should be noted, that since many FSS sites use the 3.7-4.2 GHz band across the United States, such protection areas of 40 km and 150 km radius frequently overlap each other, and thus the protection criteria to address interference for each radio access point sharing this band must be satisfied at each FSS site within the vicinity.

FCC rules also specify the acceptable levels of adjacent channel interference in the first and second adjacent channels, e.g., which allow 40 and 52 dB higher signal strengths, respectively, for the first and second adjacent channels due to their increased frequency separation from the central channel, to that used for signal reception. Accordingly, the re-use of unused channels is optimally based initially upon the second adjacent channel before the first adjacent channel in an optimization strategy for optimum interference management. The FCC Rules also specify standard FSS dish gain profile (H and V planes) and also band pass filter attenuation. The antenna pattern (not shown) output from the dish is highly directional, the Half Power Beamwidth (HPBW) is approximately 1.3 degrees, and the antenna gain is 36.5 dBI for a 2 m diameter dish with an efficiency of 65%.

Conventionally, not all of the twelve 40 MHz channels (a through l) over one polarization (see Table 1, above) are actually demodulated along distribution chain 216 for a given FSS site (e.g., FSS site 102, FIG. 1, having 1-N earth stations 104). In the example illustrated in FIG. 2, only a third of the twelve polarization channels (that is, 24 channels in total, but only twelve for each of the two polarizations), are demodulated at headend 206, with protection scheme 100 requiring co-channel protection of an "unused" portion 218 of the transmit spectrum unavailable for use by other CBSDs 220 (or Radio Access Points (RAPs)) seeking authorization and resource allocation from SAS 112 for FSS site 102. That is, in this example, unused portion 218 represents 320 MHz of available terrestrial spectrum that is wasted and unusable under protection scheme 100. Additionally, in consideration of other FSS sites in the vicinity of a particular CBSD/RAP 220 that may utilize different satellite downlink channels, there will be further constraints on the spectrum availability. In areas of high FSS site density, the whole of the 500 MHz of spectrum will become unavailable to the particular RAP.

FIGS. 3A-3B illustrate data tables 300, 302 for loss and separation distances according to the conventional protection scheme 100, FIG. 1, and system 200, FIG. 2. Tables 300 and 302 are each illustrated with respect to co-channel, LNB blocking, first adjacent out-of-band emission (OOBE) and second adjacent OOBE for a single interfering transmitter. In consideration of the loss values taken from table 300, minimum separation distances to reduce interference below the various thresholds in table 302 are determined using a free space path loss (FSL) equation and two common propagations models used for cellular communications: Cost 231 Hata (231 Hata), Cost 231 Walfish-Ikegami (231 WI). These tables illustrate the significant variations in associated protection distances depending on the model choice. For example, for an Azimuth of 0 degrees, a satellite dish elevation of 5 degrees and a satellite gain of 14.5 dB, the predicted separation distance is 6940 km for FSL, 7.4 km for 231 WI and 3.4 km for 231 Hata.

Use of the most conservative model, FSL, will result in massive over protection of the FSS and under-utilization of the spectrum. In the example illustrated, the dish size is 2 m, antenna height of FSS is 4 m, and small cell height is 1.5 m for both 231 WI and 231 Hata. As can be seen from these examples, the FSL calculation is not able to take into account actual terrain/obstacle considerations; the FSL calculation does use assumptions on antenna height. Even the use of other models such as 231 Hata and 231 WL require the choice of parameters that reflect different terrains profiles and even these can produce significant variations within themselves based on that choice. Furthermore, because such empirical models only produce a prediction of the average loss between two points in space, in practice, the actual loss between these two points may significantly depend on many other factors including the terrain therebetween.

BRIEF SUMMARY

In an aspect, a system is provided for protecting a fixed satellite service site. The system includes at least one earth station, a first beacon detector disposed within close proximity to the at least one earth station, a central server in operable communication with the fixed satellite service site and the first beacon detector, an access point configured to request authorization from the central server for resource allocation, and a beacon transmitter disposed within close proximity to the access point. The beacon transmitter is configured to transmit a beacon signal to one or more of the central server and the first beacon detector, and the beacon signal uniquely identifies the access point.

In an aspect, a communication system includes an earth station configured to receive a downlink transmission from a satellite and transmit an uplink transmission to the satellite. The communication system further includes a server in operable communication with the earth station, a beacon detector in operable communication with the server, an access point configured to operate within a proximity of the earth station, and a beacon transmitter disposed within close proximity to the access point. The beacon transmitter is configured to transmit a beacon signal to one or more of the server and the beacon detector. The beacon signal uniquely identifies the access point. The server is configured to implement a measurement-based protection scheme with respect to at least one of the downlink transmission and the uplink transmission.

In an aspect, a communication system, includes a satellite receiver in operable communication with a central server, a cellular node configured to operate within a proximity of the satellite receiver, and at least one mobile communication device configured to communicate (i) with the cellular node, (ii) within the proximity of the satellite receiver, and (iii) using a transmission signal capable of causing interference to the satellite receiver. The satellite receiver is configured to detect a repeating portion of the transmission signal and determine a potential for interference from the at least one mobile communication device based on the detected repeating portion.

In an aspect, a method is provided for detecting interference to a satellite receiver from a mobile communications device in communication with a cellular node in proximity to the satellite receiver. The method includes steps of powering the cellular node, causing the cellular node to broadcast a primary synchronization signal (PSS) at a nominal power level, capturing the broadcast PSS, determining, from the captured PSS, an operation of the cellular node, and instructing the cellular node, based on the determined operation, to (i) operate at full power, (ii) operate at a lower power, or (iii) cease operation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 11B illustrates a data table for calculating respective parameters of area zones according to protection zone layering scheme depicted in FIG. 11A.

FIGS. 16A-16B illustrate data tables for satellite protection maximum path loss with respect to a single access point, and 800 access points, respectively, within the satellite beam width, according to an embodiment.

FIG. 39 illustrates an exemplary interference detection system, according to an embodiment.

Figure 1:
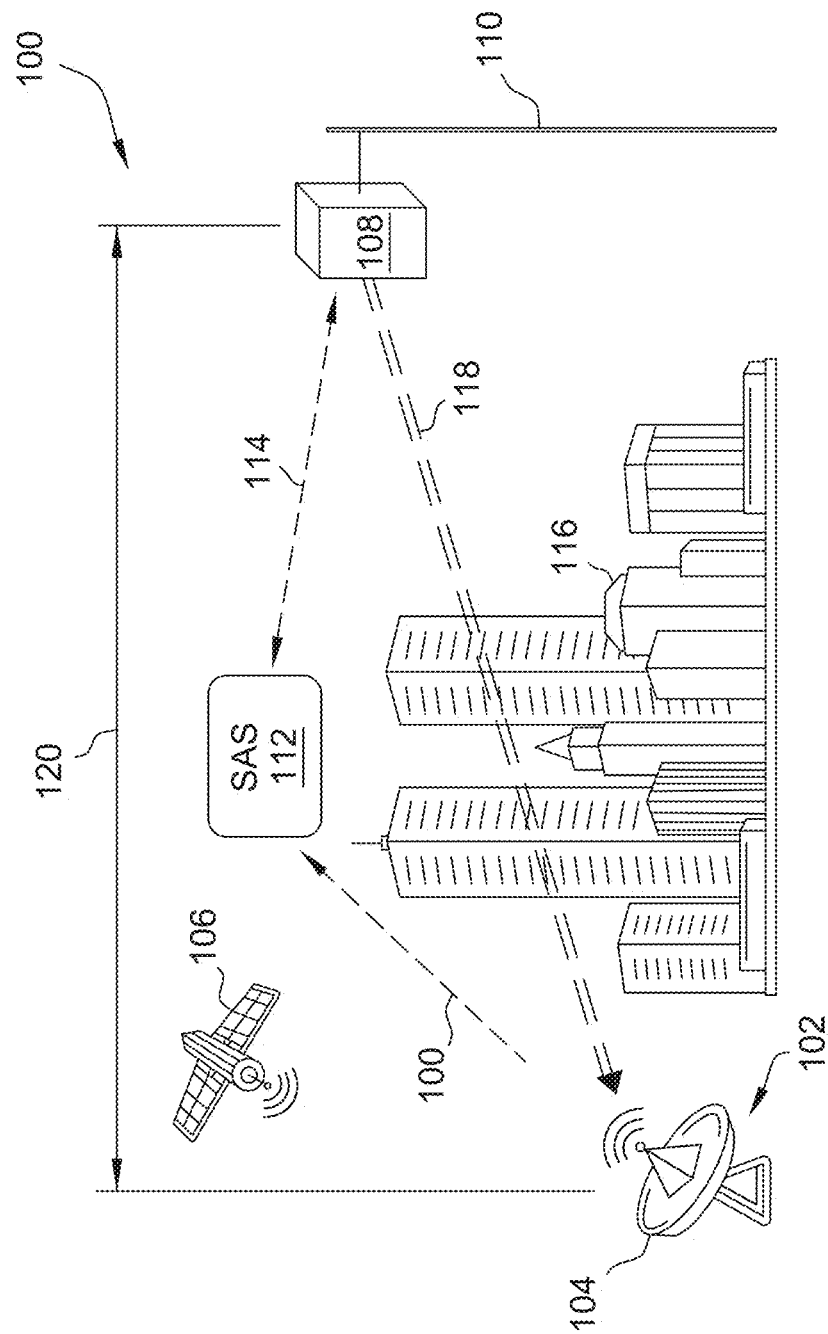
FIG. 1 is a schematic illustration of a conventional satellite service protection scheme according to an estimate model.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide systems and methods that introduce transmitter beacons and beacon detectors into an SAS or central server system to create a closed loop system that produces no significant interference to sensitive satellite receivers. The present embodiments implement actual real-time measurements, that is, a measurement-based protection (MBP) system, where each transmitter beacon is assigned its own unique identifier (ID) such that beacon detectors may be used to build an accurate and up-to-date propagation map or model. The MBP systems described herein further serve a dual purpose of allowing a central server to remedy the system in the event of a systematic change or actual interference experienced. In such cases, the MBP system utilizes the beacon transmitters and detectors to trace back to the source of the interference, and then affect system changes to protect particular FSS sites from the encountered interference.

In some embodiments, the techniques of the MBP system are extended to improve or calibrate to the propagation model that may be used to initially assign resources to a new access point (AP). The MBP system may, in such circumstances, implement the techniques such that the beacon transmitters transmit periodically to be received by one or more beacon detectors within the transmission proximity. Such a management system is thus a dynamically adaptable to changes in the environment of the transmission path. For example, the MBP system would know, in real-time, the effect on the path loss from a sufficiently tall building being built (or removed) between the beacon transmitter and detector, and use this real-time measurement to more accurately utilize the transmission spectrum then can be done under the conventional approach that only performs estimate calculations based on maps. Furthermore, the MBP system is capable of adapting to seasonal changes between spring and fall to take into account the differences in propagation through trees, which is a major limitation of conventional propagation tools.

More specifically, the present MBP system improves over conventional CBSD to CBSD protection, e.g., in the priority access license (PAL) and general authorized access license (GAA) sub-bands, by using the actual path loss measurements from the CBSD, instead of relying on propagation models, which are imprecise in the CBRS band 3.55-3.7 GHz, as well as other frequencies, generally due to clutter effects and building penetration loss as well as real time changes to the environment.

Because the MBP system of the present embodiments is implemented as a closed loop, and thus creates effectively zero interference (i.e., interference which has no meaningful effect on the satellite reception itself), the system is not limited to only CBSDs, but may also be applied with respect to APs and user equipment (UE/UEs) for mobile usage and small cell configurations. In an exemplary embodiment, individual beacon transmitters are configured to operate below the satellite noise floor, thereby allowing for significant link budget extension through a wide deployment of beacon transmitters and detectors.

Accordingly, the present systems and methods acknowledge the appropriate purpose of the incumbent protection requirements of Part 96, and propose an alternative solution that implements an MBP scheme that achieves the same protection goals for FSS sites, but without over-protecting the FSS sites. The present MBP schemes may assume that all of the 575-600 MHz C-band downlink (i.e., between 3.6-4.2 GHz) FSS bandwidth is co-channel to CBRS/RAP at every earth station site, or alternatively may, in an intelligent fashion, be further configured to consider co-channel, adjacent channel, second adjacent channel and aggregate interference limits to optimally use the spectrum. The conventional use of the conservative path loss predictions, while achieving the stated protection goals, unfortunately locks out CBRS/RAP usage by large geographic areas and results in inefficient use of the spectrum. In comparison, the present MBP schemes achieve the same protection goals, but also allow for control of spectrum reuse in a deterministic and non-interfering manner maximizing the spectrum utility. The present MBP systems and techniques further provide FSS receiver bandwidth usage reporting to a central server database (e.g., such as the SAS), which enables the central server to enforce FCC requirements without over-protecting (i.e., locking out usable spectrum). Additionally, the MBP embodiments presented herein have more general applications across other bands and systems, and will result in a dramatic improvement of spectrum efficiency throughout.

The present MBP system and methods herein thus implement an empirical measurement scheme that improves over conventional CBSD-to-CBSD, or RAP-to-RAP, protection schemes and resource assignment calculations, which results in increased spectral efficiency, while more effectively managing potential interference to the FSS site from individual mobile transmitters or radio access points and devices (e.g., UEs) associated with respective APs. Through these innovative and advantageous techniques, the central server is further able to remedy a situation where interference may be encountered, for example, by instructing an eNodeB or AP to change its frequency channel, and through these changes, associated connected devices as well, to avoid interference.

Additionally, if the noise floor of the FSS has increased and is approaching an unacceptable threshold, due to the effect of the aggregation of individual mobile transmitters or radio access points and devices, the central server is able to instruct the devices in the vicinity of the FSS to reduce their transmitter power by small increments to bring the FSS noise floor to that of the original acceptable limit. The improved model derived by the present MBP system thus advantageously achieves this solution in an accurate manner, and with a minimum reduction(s) to the respective transmitter powers, and without a significant reduction in the range and coverage. These remedying techniques may therefore be extended to microcells that share the same spectrum. According to the present system and methods, new RAPs may be introduced within the vicinity of sites that are considered to already include a significant number of RAPs within a 40 km radius of the FSS.

The present embodiments are further advantageously applicable to operation within other frequency bands, including extensions to 5G, where radio spectrum sharing could be controlled and/or managed by a central server using various sharing strategies to allow multiple radio transceivers to coexist with each other and other non-controlled services (FSS in this example) that receive noise floor protection and front end blocking protection. These techniques are described more specifically below with respect to the following drawings.

Figure 4:
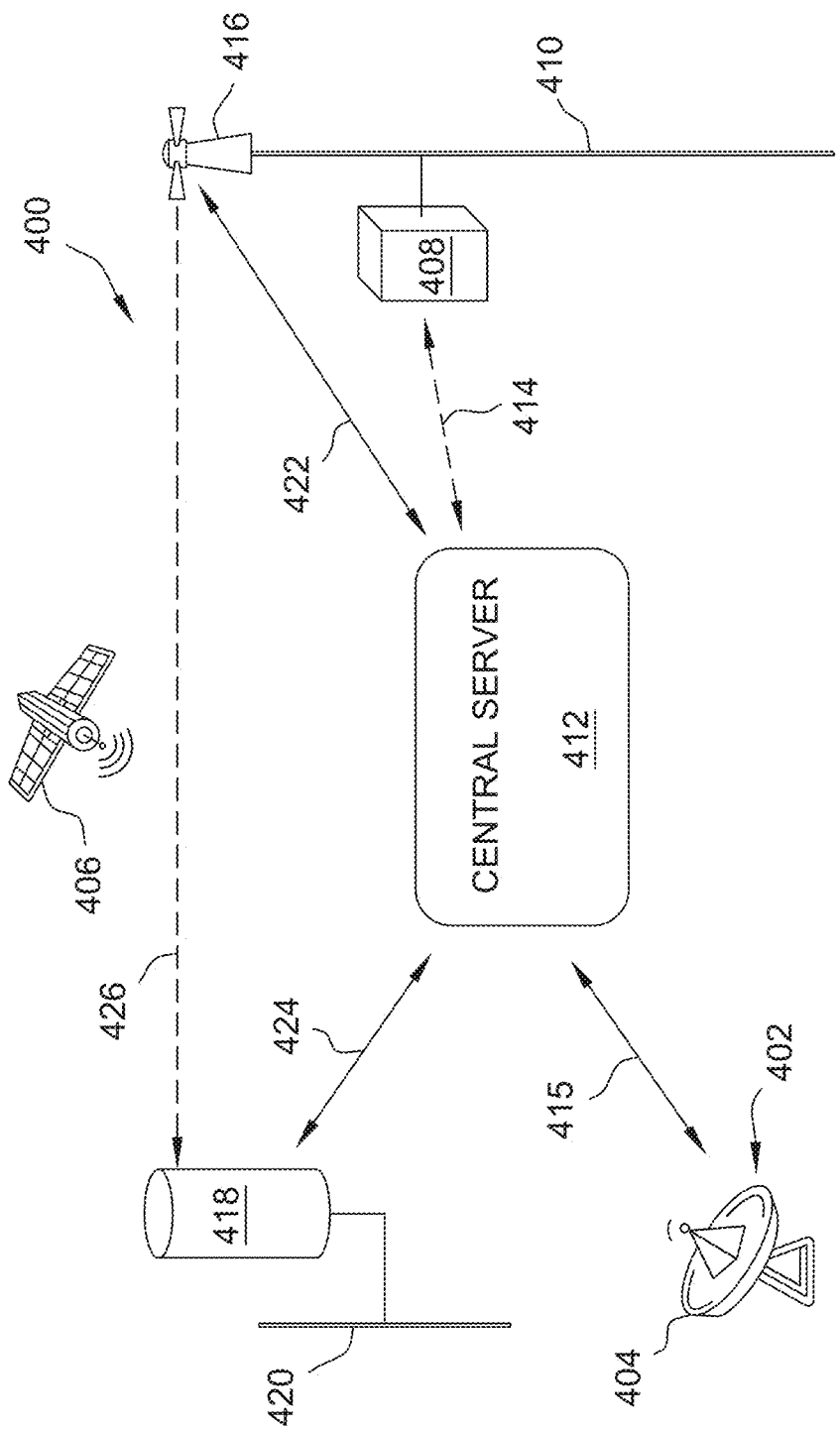
FIG. 4 is a schematic illustration of a satellite service protection scheme, according to an embodiment.

FIG. 4 is a schematic illustration of a satellite service protection scheme 400. In an exemplary embodiment, scheme 400 includes an FSS site 402 including at least one earth station 404, having a dish and a frequency agile receiver (not numbered), for receiving and decoding video/data streams from a satellite 406 (e.g., GEO C-band satellite). Scheme 400 further includes at least one AP 408. AP 408 may include, without limitation one or more of a wireless AP, an eNodeB, a base station, a CBSD, or a transceiver. In the exemplary embodiment, AP 408 is mounted on a first support 410. However, many APs are within buildings. The MBP capabilities of scheme 400 though, would take into account the penetrations loss of walls and metalized windows.

Authorization and resource allocation of FSS site 402 is governed by a central server 412. In some embodiments, central server 412 includes an SAS, and is in operable communication with AP 408 over an AP data link 414. Additionally, an FSS reporting link 415 communicates the operating parameters of FSS site 402, including without limitation, coordinate, elevation, azimuth angle, elevation angle, receiving channel(s), satellite arc(s), frequency range, receiving channels, antenna model, antenna height, antenna gain, feed horn model(s), LNB model(s), service designator(s), operation status of the FSS earth station.

Scheme 400 also includes at least one beacon transmitter 416 and at least one beacon detector 418. In the exemplary embodiment, beacon transmitter 416 is disposed in close proximity to AP 408, such as on first support 410, or alternatively as an integral component or function of AP 408. Similarly, beacon detector 418 is disposed within FSS site 402, in close proximity to earth station 404, and may be structurally mounted on the dish/antenna thereof, or alternatively on an independent second support 420, or alternatively as an integral component of FSS site 402. In some embodiments, each AP 408 includes at least one beacon transmitter 416, and each earth FSS site includes at least one beacon detector 418. In the exemplary embodiment, beacon transmitter 416 includes at least one transmitter, or alternatively, at least one transmitter and at least one receiver (not shown). Beacon detector 418 includes at least one receiving portion. In some embodiments, beacon transmitter 416 and beacon detector 418 includes transceivers.

Beacon transmitter 416 is in operable communication with central server 412 over a beacon data link 422, and beacon detector 418 is in operable communication with central server 412 over a beacon measurement reporting link 424. In an embodiment, beacon detector 418 is located outdoors, using a dedicated antenna (not separately shown). In another embodiment, beacon detector 418 is inserted in the post-LNB signal chain (described further below with respect to FIG. 5). In some embodiments, beacon detector 418 may be located outdoors and attached to the station 404. Beacon detector 418 may separately communicate directly with central server 412.

Beacon detector 418 is configured to receive a direct beacon signal 426 from beacon transmitter 416. Beacon detector 418 may be integrated within the system of FSS site 402 or implemented as a standalone system. In the exemplary embodiment, direct beacon signal 426 constitutes an in-band beacon RF signal including a unique ID, and is transmitted at a power that would not by itself cause any meaningful interference to FSS site 402. Beacon signal 426 may be transmitted on either an on-demand or a periodic basis. In other embodiments, the beacon can transmit the unique ID, its location, and its transmitter power, but is not limited to these parameters. In the exemplary embodiment, the location, frequency of operation, transmitter power, etc. are communicated by over data link 422 to maximize the range of detection. Beacon transmitter 416 is further configured to have its own unique ID that can be registered with a database (not shown in FIG. 4) of central server 412. Accordingly, in the case where AP 408 is a source of potential interference, central server 412 is capable of not only foreseeing or detecting the interference, but also of associating the foreseen or detected interference with the potential interference source (AP 408 in this example) through the unique ID. Moreover, by being able to identify the source of potential interference, central server 412 may be further configured to remedy the foreseen or encountered interference by, for example, instructing the interfering device to change its transmission channel and/or lower its transmission power or cease operation.

According to the exemplary embodiment illustrated in FIG. 4, the in-band beacon transmission from beacon transmitter 416 allows measurement by central server 412 of the actual path loss between AP 408 and FSS site 402. In an embodiment, beacon detector 418 is further configured to include a means of measuring the signal of the interference and reporting the measured signal to central server 412 for calculation of the link loss. Furthermore, in contrast with FIG. 1, FIG. 4 does not illustrate obstructions, because the presence or absence of obstructions between AP 408 and FSS site 402 is rendered irrelevant (for path loss determination purposes) by the nature of real-time measurements. This MBP scheme is advantageously applicable to interference calculations performed by central server 412.

In an exemplary embodiment, central server 412 further utilizes known locations (e.g., in the form of coordinates including longitude, latitude, and elevation) of both FSS site 402 and AP 408, as well as the transmit power and antenna pointing angles, to calculate the specific protection/protection scheme for FSS site 402 with respect to AP 408. In some embodiments, the protection scheme implemented by central server 412 further utilizes a path loss equation that utilizes empirical measurement data from one or more beacon detectors 418 (i.e., upon validation of the equation by the FCC and/or other relevant governing bodies). Central server 412 effectively implements the FCC protection requirements and, according to the embodiments herein, such FCC protection requirements may be advantageously changed, for example, if the protection criteria was deemed to be more or less conservative by itself.

In the exemplary embodiment, transmissions from beacon transmitter 416 (i.e., over links 422, 426) include the unique ID of the transmitter, as well as the transmit power of beacon transmitter 416 itself. Optionally, beacon transmitter 416 further transmits location information (e.g., GPS data and/or map data), and/or one or more UEs associated with AP 408. Under this optional configuration, central server 412 may be further configured to manage not only potential interference from AP 408, but additionally potential UE interference along with consideration of the measured path loss. In an embodiment, the actual path loss is determined by central server 412 using an in-band measurement of a beacon received signal strength indicator (RSSI), and/or in further consideration of the transmitted effective isotropic radiated power (EIRP), as well as a measured antenna gain at one or both of AP 408 and earth station 404. Central server 412 may then assign AP resources according to any and all of these measured parameters.

In further operation, a wide-scale deployment of beacon detectors 418 at existing registered and unregistered FSS sites 402 (estimated at 8,000-10,000 sites or more at present) will provide a significant quantity of real-time information about each transmitting AP 408, and their respective effects on individual earth stations 404. The amount of information is considerable that can be collected from thousands of beacon detectors (each having, for example, a range of approximately 2-5 km depending on the morphology), in a broad deployment at thousands of FSS sites, which are much more highly concentrated in heavily populated areas. The beacon-based MBP protection scheme of scheme 400 thus realizes a two-fold advantage over conventional protection schemes: (1) individual beacon transmitters 416 may be configured to identify themselves to other devices within range, thereby allowing other system elements to carry out measurements and build propagation maps; and (2) in the event of a systematic change or an emerging problem, central server 412 may be configured to utilize the unique beacon IDs to trace back to the source of actual interference and implement remedial measures. In the exemplary embodiment, individual beacon transmitters 416 transmit to other transceivers (e.g., beacon detectors 418, central server 412, other beacon transmitters 418 having a receiver component) within range, and feed the signal strength back to a centralized database (not shown in FIG. 4) of central server 412 (e.g., an SAS).

The MBP scheme of scheme 400 realizes still further advantages over conventional protection schemes that utilize path estimates based on locational maps and propagation models. Conventional CBSDs and APs are known to include GPS capability for an SAS to determine their respective locations on the map. Propagation models built by the conventional SAS, however, must make a number of numerical assumptions (e.g., effects from building heights, number of windows, building materials, effects of trees, contours of the path, general clutter, etc.) to calculate a path loss estimate between the transmitter and the FSS site. According to scheme 400 though, which performs real-time measurements, the propagation model may be dynamically built by central server 412 from empirical data, and updated in a timely manner based on actual system conditions.

In one exemplary operation, scheme 400 implements an MBP protection scheme that initially utilizes the conventional estimated propagation maps. That is, central server 412 may initially operate by performing calculations using estimated propagation maps to determine appropriate frequencies and power levels for individual APs 408. Over time though, as empirical data is collected from beacon transmitters 416 and beacon detectors 418. Such real-time measurements of power and operating conditions may be fed back to central server 412 to update the initial calculations in order to more accurately assign (and reassign) resources under optimum conditions. Central server 412 is then able to become aware of potential interference in real-time, and take remedial measures to resolve such problems, as described above.

In this example, beacon transmitters 416 will be in close proximity to the channel on which transmission is sought, and centralized server 412 may initially instruct AP 408 to operate at a particular frequency and power level. However, before an individual AP broadcasts across the entire band, AP 408 may first cause a beacon transmitter 416, in close proximity to the particular band, to transmit a beacon signal, which may be within the band itself, or in an adjacent guard band. Thus, by initiating transmission from beacon transmitter 416 prior to broadcast from AP 408, central server 412 is able to detect the beginning, learn the properties of the associated AP 408, and determine whether operation of AP 408 would cause interference with respect to a particular FSS site 402.

In the case where central server 412 determines that a particular AP 408 will cause interference, central server 412 may be further configured to instruct AP 408 to lower its power, operate on a different channel, or simply deny authorization and hence operation. In at least one example, central server 412 may reevaluate the beacon power level and determine that the level is sufficiently low enough to allow operation. Because scheme 400 continually receives beacon signal information, if AP 408 is allowed to broadcast but nevertheless causes interference, central server 412 is capable of correcting such a situation in a timely manner. In some embodiments, the band gaps between channels may be utilized in the MBP scheme of scheme 400. Because the transmitted signal of the beacon itself does not cause interference to satellite reception, the beacon signal and the transmitter IDs may be transmitted in any of the channels (12 in this example) of the transmit spectrum. The ID of a particular beacon transmitter 416 always stays the same, and therefore multiple beacons can overlap with other beacons within the same range, and still be decodable by central server 412, even in the case where two different beacons transmit within the same band gap.

According to the exemplary scheme 400, the transmitted beacon signal itself may constitute low spectrum noise density in the C-band, may be spread across the whole of the band, or may be a narrow-band signal (e.g., noise) of the order of about 10-1000 Hz. By itself, this spectrum density—even across the whole of the video channel—is not sufficiently high to cause any interference. According to exemplary scheme 400, the beacon is transmitted in a guard band. The beacon signal is though, sufficiently high that it may be actually measured, i.e., detected, by beacon detectors 418 and the information fed back to central server 412.

Scheme 400 is therefore configured to operate in multiple stages. In an initial stage, AP 408 requests authorization from central server 412, and central server calculates, by an initial propagation model or actual measurements, a safe frequency and power for AP 408 to transmit. In a second stage, beacon transmitter 416 transmits a modulated signal to beacon detector 418, which may be then used by central server 412 to determine whether the amplitude will create interference. As discussed above, when the beacon signal is transmitted within the channel itself or in a guard band, there is no interference to satellite reception. The beacons' spectral power density may operate below the thermal noise level for the band itself. Furthermore, in the case where the beacon signal is out of band, or within band gaps, scheme 400 would be even more tolerant of the beacon, and may increase the beacon transmit power, and thereby potentially the beacon range as well. In a third stage, central server 412 determines that there is no interference, and informs AP 408 of the available resources for the broadcast. In the case where initial stages are based on propagation model estimates, subsequent real-time measurements by scheme 400 are utilized in later stages to dynamically manage AP 408.

According to the advantageous system and protection scheme of scheme 400, the highly conservative safety margins that are built into the conventional protection schemes may be avoided, because scheme 400 is able to remedy interference that is encountered within the conventional safety margins. Scheme 400 is capable of registering the beacons and control the associated AP transmission through the system-wide capability of beacon self-detection. Scheme 400 thus effectively functions as a closed-loop system that continually measures, updates, and controls broadcasting APs. Because the beacon deployment according to scheme 400 allows for sufficiently fast communication and control measures, central server 412 is further configured to sum measured interference to almost zero, thus effectively providing no significant interference. Conventional protection schemes have not considered such a zero-interference closed-loop system.

Figure 5:
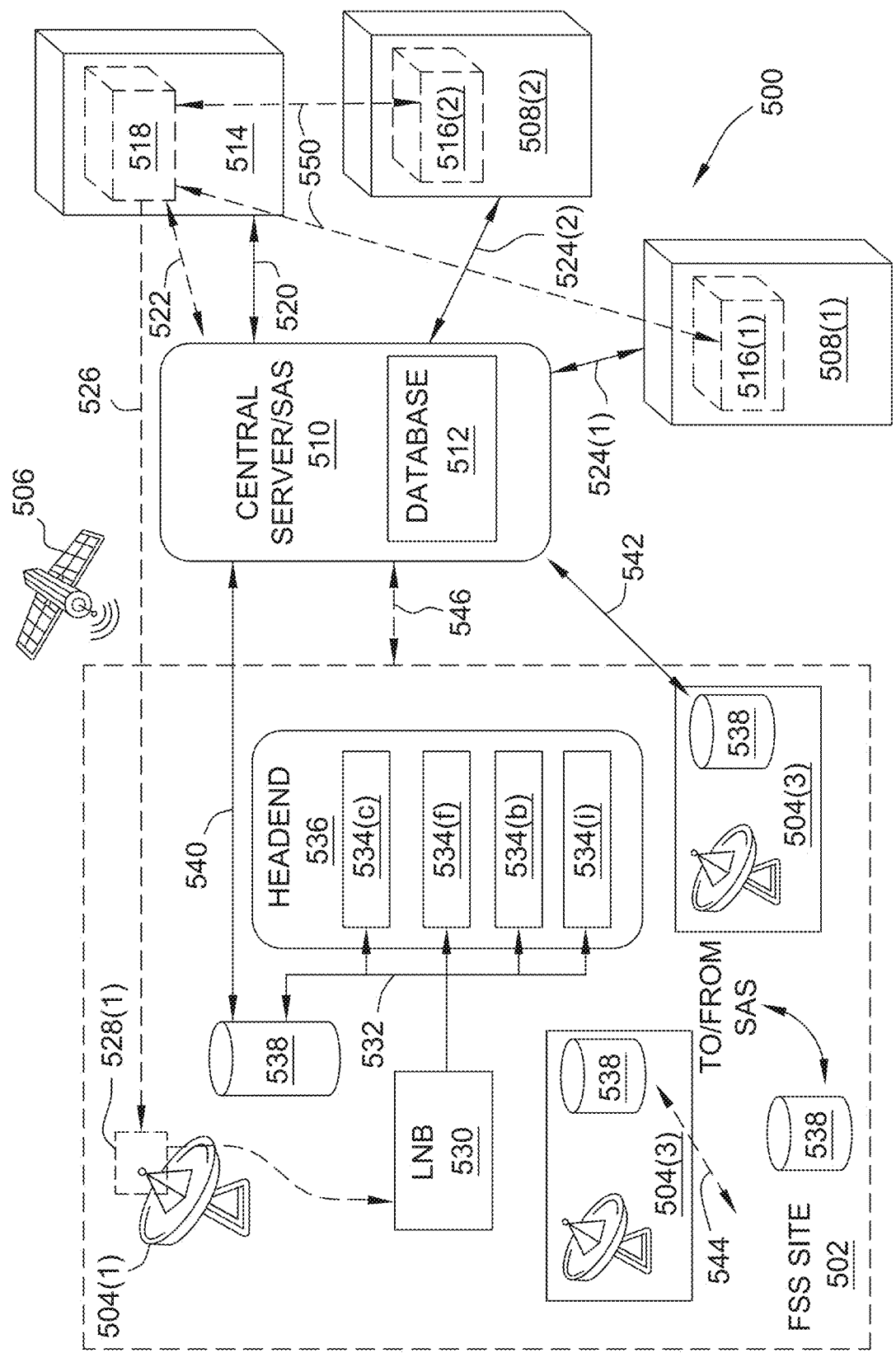
FIG. 5 is a schematic illustration of a satellite service protection system implementing the scheme depicted in FIG. 4, according to an embodiment.

FIG. 5 is a schematic illustration of a satellite service protection system 500 implementing protection scheme 400, FIG. 4, and similar components between system 500 and scheme 400 function in a similar manner to one another. In an exemplary embodiment, system 500 includes an FSS site 502 having a plurality of earth stations 504. In this example, FSS site 502 is a registered site. Each earth station 504 includes a dish and a frequency agile receiver (not numbered), for receiving and decoding video/data streams from a satellite 506. System 500 further includes at least one or more existing APs 508 that have been authorized by, and are under the management and control of, a central server 510 having a centralized database 512. Central server 510 may include, or be, an SAS. System 500 further includes a new AP 514 seeking authorization from central server 510 (e.g., under PAL or GAA terms).

In the exemplary embodiment, each existing AP 508 includes at least one existing beacon transmitter 516 as an integral component or function thereof. In other embodiments, existing beacon transmitters 516 may be separate and distinct components from corresponding existing APs 508. Similarly, new AP 514 includes a new beacon transmitter 518 as an integral component or function of thereof (as illustrated), or as a separate and distinct element. New AP 514 is in operable communication with central server 510 over new AP data link 520. In some embodiments, new beacon transmitter 518 is in operable communication with central server 510 over a separate beacon data link 522. In other embodiments, the beacon transmitter and the AP communicate with central server 510 over a single data link, as illustrated with respect to existing AP data links 524 for APs 508. In the exemplary embodiment, each of beacon transmitters 516, 518 may include a transceiver (not shown), separate transmitting and receiving components, and/or an omnidirectional antenna. For ease of explanation, individual user equipment (UEs) that may be associated with APs 508, 514 are not shown.

New beacon transmitter 518 is configured to transmit a direct beacon signal 526 for reception by one or more beacon detectors 528 at FSS site 502. In the exemplary embodiment, FSS site 502 includes at least one beacon detector 528 for each earth station 504, and in close proximity to the respective earth station. In an alternative embodiment, FSS site 502 includes a single beacon detector 528 for a plurality of earth stations 504. In this alternative embodiment, the distance between the single beacon detector 528 and each individual earth station 504 is known, and recorded in central database 512. A model for the FSS is built so that the single beacon detector can model the interference to each individual dish based on its operating parameters. Beacon detectors 528 may be located indoors or outdoors, and may be integral to the structure of a particular earth station 504 (e.g., earth station 504(1) and beacon detector 528(1)), or separate components (e.g., earth station 504(2)/beacon detector 528(3), 504(3)/beacon detector 528 (3)).

More specifically, in the example where beacon detector 528(1) is an integral portion of earth station 504(1), beacon detector 528(1) utilizes LNB 530 as the effective receiving portion of the beacon signal received by the dish. That is, the dish of earth station 504(1) detects direct beacon signal 526 from beacon transmitter 518 along with the transmit spectrum from satellite 506. LNB 530 demodulates direct beacon signal 526 along with the received transmit spectrum (not shown in FIG. 5), and distributes the demodulated beacon signal, according to an exemplary embodiment, along a distribution chain 532 to a rack of receivers 534 in a headend 536, to reach a reporter 538. In an exemplary embodiment, reporter 538 is configured to filter and process the demodulated beacon signal, and then report it to central server 510 over a first beacon measurement reporting link 540. In an embodiment, first beacon measurement reporting link 540 is a wired or wireless data link, or may be an RF communication. Thus, in this example, beacon detector 528(1) utilizes reporter 538 effectively as the transmitting portion for the beacon measurement.

In the exemplary embodiment, the MBP scheme further configures beacon detector 528 such that a determination may be made if the aggregate signal level at the LNB input is greater than −60 dBm. In at least one embodiment, this determination is based on summing the individual measurements of each transmitter within, for example, a 40 km radius of FSS site 502. Beacon detection within system 500 is further configured such that the system may further monitor (e.g., within FSS site 502, or externally by central server 510) the current, output level, output linearity, and level of known input signal of the LNB. System 500 is further configured to measure noise level at the output of the feed horn (or filter unit) of the LNB, or alternatively, the carrier-to-noise ratio (CNR), the bit error ratio (BER), and/or another metric downstream of the LNB that indicates noise floor impairment. In some embodiments, system 500 is further configured to determine degradation of the noise floor at the intermediate frequencies, and/or degradation of receiver metrics that are attributable to the AP. For the CBRS band, having −129 dBm/MHz as the expected protection level, −10 dB I/N may be sought as the noise target. For other bands, a different noise target may be sought.

The integrated configuration of beacon detector 528(1) is particularly advantageous to FSS sites having one or few earth stations, where additional hardware costs (e.g., additional antenna/transceiver for each dish) might not be cost-prohibitive, or in the case where other considerations would render multiple external antennas to be undesirable. Additional LNBs only marginally add to the hardware cost of an earth station, and many earth stations often include multiple LNBs for a single dish. The present embodiments therefore advantageously utilize one or more of the relatively less-expensive LNBs for beacon detection. According to this exemplary embodiment, system 500 is able to tap into each FSS antenna signal distribution chain downstream of the LNB, and receive the beacon at the downconverted intermediate frequency (IF) frequency of the in-band beacon signal. According to this advantageous technique, the central server is able to avoid adjusting the beacon RSSI for the FSS dish antenna gain, since the beacon signal is received utilizing the FSS dish itself.

The implementation of integrated beacon detector 528(1) provides the further advantage of enabling earth station 504(1) to detect interference in exactly the way that the interference will be affecting the earth station. In other words, any measured value at the reporter 538 will exactly represent the value of the signal causing the interference. In an exemplary embodiment, for narrowband signal, the integral beacon detector 528(1) further includes a sufficiently stable clock for each such integral detector, to realize a more efficient detection.

In some instances, and particularly for a narrow band signal, the frequency stability of the oscillator used in the down conversion process in the LNB may be sufficient for a video signal, but may not by itself sufficiently stabilize the position of a beacon signal. Accordingly, in some embodiments, the local oscillator frequency used for down conversion may synchronize, for example, a GPS signal, such that the beacon signal is stabilized in order to speed the efficiency in which an auto-correlation of the beacon signal can be performed. In other configurations of the beacon detectors described herein, an additional clock (frequency) is not required for efficient functionality.

In the example where detection is performed by a component separate from the earth station, beacon detector 528 is an external antenna. In some embodiments, FSS site 502 includes up to one such external antenna for each earth station 504. In other embodiments, FSS site 502 includes a single external antenna for a plurality of earth stations 504 at the single FSS site. In the case where beacon detector 528 is an external antenna located in close proximity to earth station 504, the beacon measurement reporting to central server 510 may be direct or indirect. More specifically, beacon detector 528(2) communicates directly with central server 510 over a second beacon measurement reporting link 542. In contrast, beacon detector 528(3) communicates first to a central processor (not shown) of FSS site 502 over an internal site reporting link 544, and FSS site 502 communicates directly with central server 510 over a site status reporting link 546. In the exemplary embodiment, FSS site 502 communicates additional site-related information, including per-dish frequency usage, direction of alignment and elevation, dish size, GPS co-ordinates, etc., to central server 510 over site status reporting link 546.

This site related information, such as direction of alignment and elevation, can be provided dynamically to central server 510 by measuring devices (not shown) attached to each dish, and particularly for instances when the dishes are aligned to different satellites frequently. Alternatively, for dishes that are never moved once they are aligned, a database registration process (e.g., within central database 512) could be used which does not need the expense of separate dynamically reporting measuring devices. In at least one embodiment, the satellite measuring device includes a digital compass and/or an elevation angle-measuring component. In another embodiment, the measurement device is similar to a computer-controlled measuring device for a telescope.

Figure 2:
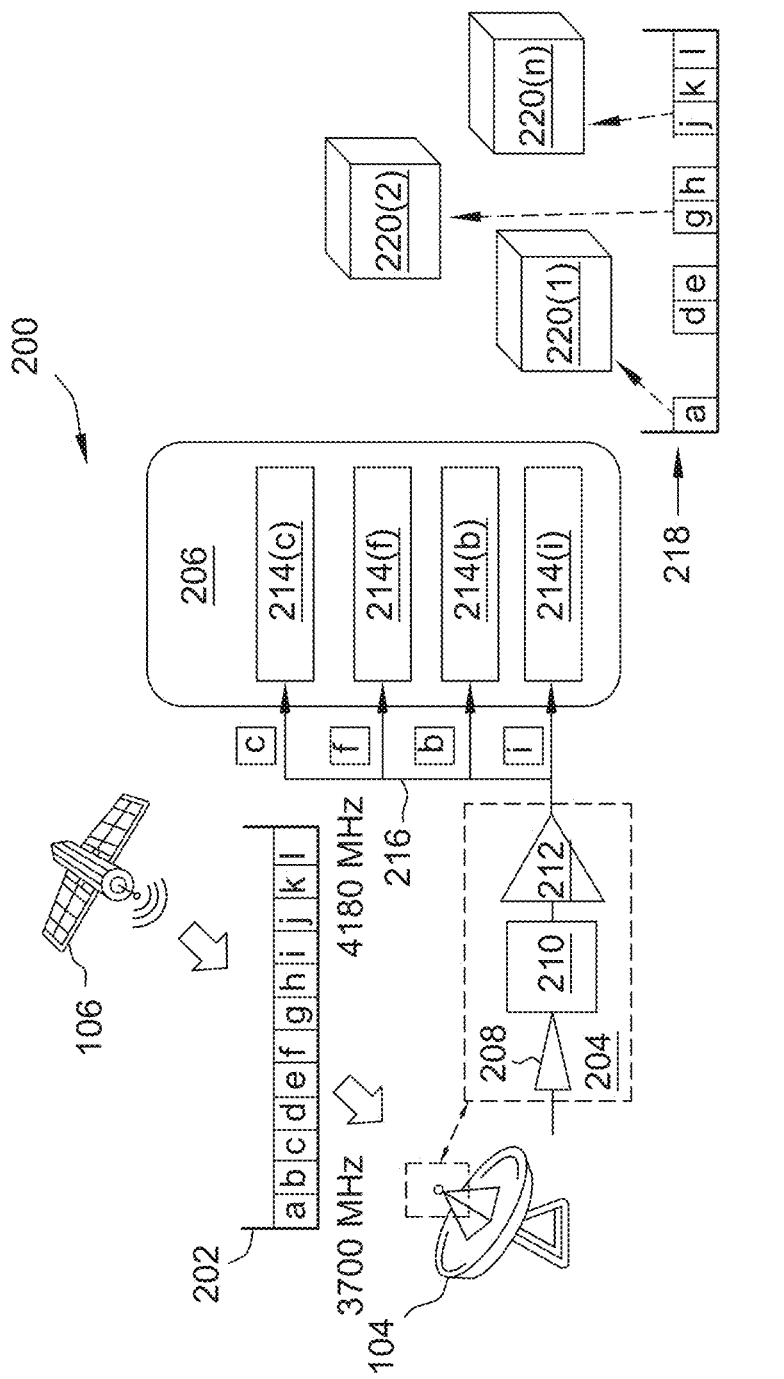
FIG. 2 is a schematic illustration of a conventional satellite service protection system implementing the scheme depicted in FIG. 1.

According to the exemplary embodiments illustrated in FIG. 5, central server 510 is capable of unlocking, for new AP 514, bandwidth that is unused by existing APs 516 (e.g., unused transmit spectrum portion 218, FIG. 2), thereby significantly increasing the spectrum utilization of the band. That is, as described above, not all of the twelve 40 MHz channels in the transmit spectrum will actually be demodulated by every dish receiver distribution chain at every FSS site. System 500 thus advantageously protects the "used" channels at the appropriate level of co-channel protection, and assigns the conventionally "unused" spectrum to a new AP. In the exemplary embodiment, central server 510 further calculates blocking and noise levels to prevent degradation of FSS receivers, using the empirical information obtained by the MBP scheme.

Furthermore, in addition to the improved spectrum utilization, systems and methods according to the protection schemes described herein further achieve advantageous reductions to the geographic size of the protection zone around an FSS site. That is, under current FCC protection schemes, an FSS site may be required to have a 150 km radius co-ordination zone with formal written applications and studies carried out on each transmitter application against very conservative criteria. According to the principles of the present embodiments though, the FCC protection rules may be successfully changed to reduce the required radius of the protection zone immediately about the FSS site, and may further create outwardly-expanding geotiers of protection around new reduced protection radius. For example, as described herein, an immediate first protection zone (i.e., an exclusion zone) around an FSS site may be set to a 150 m radius. A second geo-tier zone, outside of the first protection zone, may be set to a 320 m radius for small cell use, and for operation within 280 MHz at 4 W transmitter power. A third geo-tier zone, outside of the second geo-tier zone, could then be set to a 780 m radius, and for operation within, for example, 500 MHz at 4 W. Beyond 780 m, higher powers are available. These tiers may be further modified according to particular system specifications.

In the case where FSS site 502 includes a single beacon detector 528 for a plurality of earth stations 504, the single beacon detector 528 may further implement multiple-input/multiple-output (MIMO) technology to effectively increase the gain and extended the range of system 500 and the protection scheme. In this example, a single beacon detection antenna may provide greater system visibility around the environment, and may also represent a lower hardware cost outlay for an FSS site having a large number of earth stations. Further to this example, because received interference will affect different earth stations in different ways, each of the plurality of earth stations 504 may further be calibrated to the single antenna such that central server 510 is rendered capable of determining the effect of the interference on a specific earth station 504, and then utilize the unique ID from the interfering source to remedy the interference. Optionally, FSS site 502 includes at least one distributed detector 548 in addition to one or more beacon detectors 528.

In an embodiment, beacon transmitters 516 are transceivers, and are further configured to detect a direct beginning signal 526 over respective RF paths 550, and report such measurement information to central server 510 over links 524. Accordingly, by utilizing individual beacon transmitters for the dual-purpose functionality of transmission and detection, system 500 is rendered capable of significantly increasing amount of real-time information that can be used to measure, manage, and remedy interference for a particular FSS site. This capability is particularly advantageous in the case where FSS sites are not densely populated (and thus potentially fewer available beacon detectors), but APs seeking to utilize the transmit spectrum are more numerous. The APs themselves thus perform a level of self-policing among a community of APs.

In an exemplary embodiment, such beacon transceivers can be implemented in either the hardware or the software of an eNodeB or AP, or may constitute a separate device having a separate antenna, or utilizing a base station antenna. In some embodiments, transmission of the beacon signal may be periodic, on-demand, or according to programming. Where the beacon signal is managed according to a program, in at least one embodiment, program may include instructions to terminate the beacon transmission once the eNodeB or AP has been authorized by the central server, but continue to allow beacon detection as desired. The beacon transmission program may be stored in a central database 512 and run by central server 510, or may be executed at the AP level. In some embodiments, central database 512 further includes data regarding the frequency of satellite 506, one or more frequencies actually received by earth stations 504, as well as the direction of orientation and elevation of the earth station dish(es). All such information may be used to calculate initial resource allocations, as well as empirical interference management by central server 510.

Figure 6:
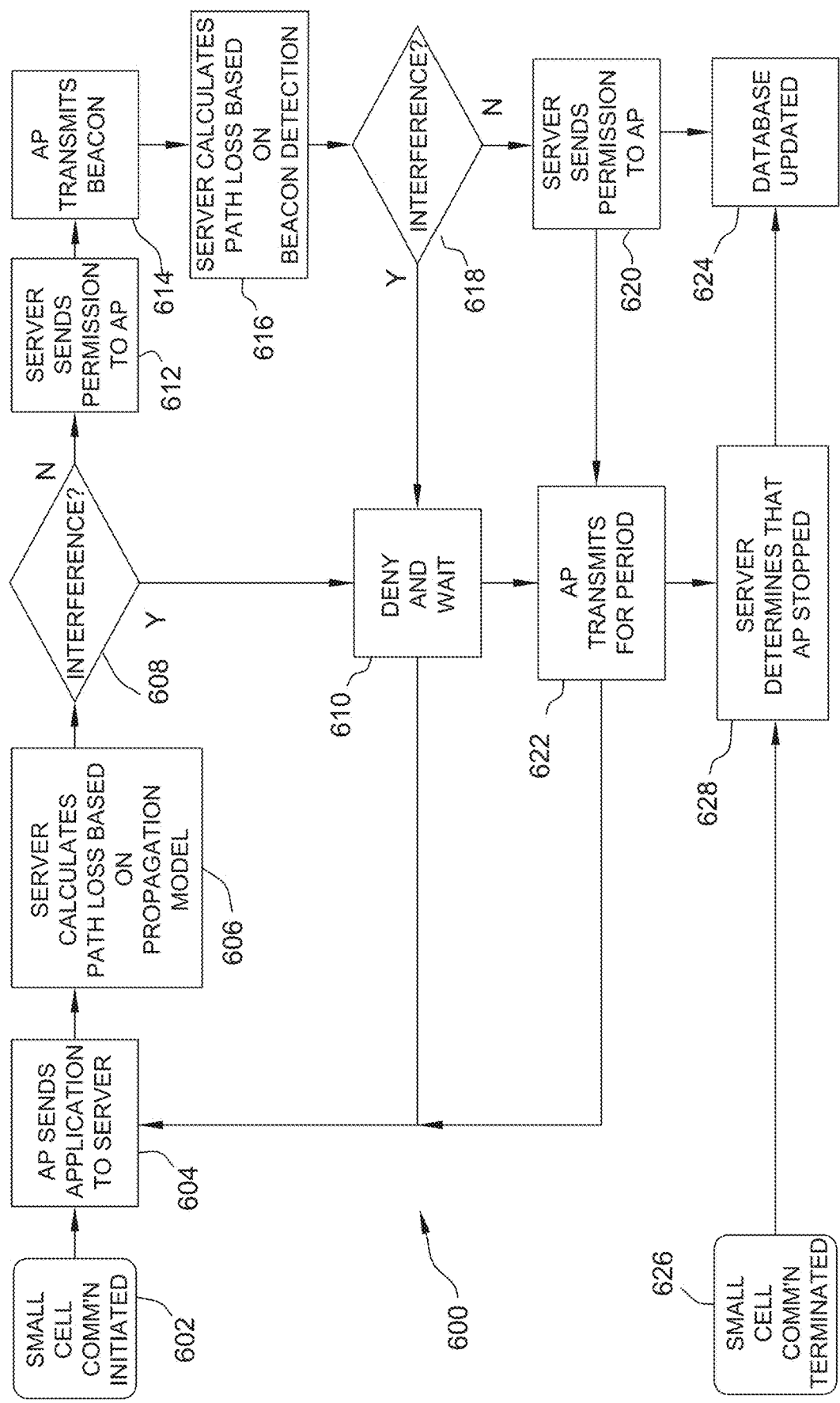
FIG. 6 is a flow diagram for an exemplary process for operating the satellite service protection system depicted in FIG. 5, according to an embodiment.

FIG. 6 is a flow diagram for an exemplary process 600 for operating satellite service protection system 500, FIG. 5. In operation, process 600 begins at step 602, in which small cell communication is initiated by an AP. In one example of step 602, new AP 514 is a small cell access point that initiates communication by one or more of powering up, restarting, wakening from a sleep mode, etc. In step 604, AP 514 submits an authorization application to central server 510, including one or more of a unique small cell identification code, location coordinates, a requested maximum power from the whole small cell, minimum power level(s) for effective operation, a requested frequency channel or channels, elevation, antenna and/or MIMO status, whether the AP use is indoor or outdoor, and an estimated maximal user number. In the exemplary embodiment, AP 514 communicates submitted information over a wired Internet connection. In an alternative embodiment, AP 514 communicates submitted information over the air by an agreed signaling channel.

In step 606, central server 510 calculates a path loss based on a propagation model using the information submitted from AP 514 in step 604. In at least one example of step 606, central server 510 further utilizes information previously stored in a central database 512 to calculate the path loss. Once the initial path loss is calculated, process 600 proceeds to step 608. Step 608 is a decision step. In step 608, process 600 determines, based on the calculations from step 606, whether unavoidable interference would result at any FSS earth station from the operation of AP 514. That is, in step 608, central server 510 determines whether there is a feasible channel and power level at which AP 514 may provide effective coverage for small cell users and, at the same time, will not cause interference to FSS site 502. In at least one example of step 608, the criteria for this interference determination may vary depending on the frequency of operation, the aggregate background noise level contribution, the number and distances of APs, etc.

If, in step 608, process 600 determines that interference will occur, process 600 proceeds to step 610. In step 610, central server 510 rejects the application from AP 514. In further operation of step 610, AP 514 waits for a time period and then returns to step 604, where AP 514 submits a new application to central server 510, including timely updated small cell information, or central server 510 informs AP 514 of a change in conditions.

If, however, in step 608, process 600 determines that interference will not occur, process 600 proceeds to step 612. That is, process 600 determines that no interference occurs when central server 510 calculates the existence of a maximum power level and a frequency channel for AP 514 that will ensure both feasible and interference-free small cell communication. In step 612, central server 510 sends permission to AP 514, including the approved frequency channel, the approved maximum power, and other relevant operational information. The approved frequency channel/maximum power sent by central server 510 is the same or different from the channel/power originally requested by AP 514, based on calculations by central server 510 regarding the available spectrum and/or measured empirical information that updates the initial propagation model. In step 614, AP 514 transmits a beacon having a central frequency derived from the approved frequency channel sent in step 612. In at least one example of step 614, the power level of the beacon is also derived from, but will be significantly lower than, the approved maximum power sent in step 612. In an alternative operation, AP 514 transmits the beacon in an close adjacent guard band. The power level of the beacon may thus be higher if the beacon is out of band, but not high enough such that the FSS reaches −129 dBm/MHz. Spectral density is a factor, and thus a beacon at 4 W/40 MHz could have higher power at 100 kHz, for example.

In step 616, central server 510 collects data from one or more beacon detectors 528, including one or more of the received beacon power, the detector coordinates, etc., and calculates a measurement-based path loss based on the collected data. In the exemplary embodiment, the beacon data is additionally collected from beacon transmitters 516 with beacon receiving functions, distributed sensing locations, or other in-range detection equipment that is communicatively coupled to central server 510. In some instances, where the beacon cannot be detected by one or more desired beacon detectors, central server 510 may use the data collected from the other detector/sensing locations. In at least one example of step 616, central server 510 prioritize the collected beacon data according to the location of the detector (e.g., distance of a detector from a transmitter may be considered as a factor) and/or the reliability of the particular detection component (e.g., not all transmitters and detectors will be of the same known quality). Once the path loss is calculated, process 600 proceeds to step 618.

Step 618 is a decision step, and operates similarly to step 608. That is, in step 618, based on the calculated path loss from step 616, central server 510 determines whether unavoidable interference may occur at any FSS earth station(s) if AP 514 operates at the frequency channel that was approved for beacon transmission, or in a guard band. That is, in step 618, central server 510 determines whether there is a power value at which AP 514 can provide effective coverage for particular UEs and, at the same time, will not cause interference to particular FSS sites 502. If unavoidable interference is foreseen, process 600 returns to step 610. If the central server 510 determines that there exists a maximum power value that will guarantee feasible and interference-free AP communication, process 600 proceeds to step 620.

In step 620, central server 510 sends permission to AP 514 with detailed information including an approved maximum power and an allocated frequency. Similar to step 612, based on calculations by central server 510, the approved maximum power and/or the allocated frequency in step 620 may be different from either or both of the request powers/frequencies from application step 604 or approval step 612. Process 600 then proceeds to step 622 in which AP 514 begins small cell communication at the approved frequency channel (e.g., from step 612 or step 620) and approved maximum power level (e.g., from step 620), and continues the small cell communication for a communication period. After the communication period, process 600 returns to step 604, where AP 514 submits an application for revalidation, including updated information (e.g., the number of small cell users associated with AP 514).

Referring back to step 620, process 600 also proceeds to step 624, in which central server 510 updates its propagation model based on collected measurement data from beacon detectors 528, beacon transmitters 516, and other detection components in the system, if any.

In step 626, small cell communication from AP 514 is terminated. Step 626 occurs, for example, when AP 514 is placed into sleep mode, powered off (e.g., without sending an acknowledgement in time to central server 510), or otherwise rendered non-operational. In various circumstances, step 626 may occur at any time in process 600 after step 602. Upon termination of small cell communication from AP 514, process 600 proceeds to step 628, in which central server 510 determines that AP 514 has ceased communication and any radiation/transmission at the protected band. Process 600 then proceeds to step 624.

Process 600 is therefore particularly applicable to MBP schemes for FSS sites in the CBRS band/C-band and devices (e.g., CBSDs, APs, UEs, etc.) sharing the 3.55-4.2 GHz spectrum, as well as other bands where sharing radio resources is centrally enforced based on the interference contribution of individual transmitters and a spectrum sharing strategy. Furthermore, process 600 may add additional steps to those described above, or in some circumstances, omit particular steps that may become redundant or unnecessary in light of other conditions, or may be performed in a different order. Additionally, process 600 may further adopt one or more of the following considerations.

In some embodiments, central server 510 is configured to determine if AP 514 is within the required protection distance from any registered FSS sites, or within the coordination distance of existing APs. If AP 514 is within the protection or coordination distance, central server 510 may instruct AP 514 to activate its beacon transmitter 518. In some embodiments, as described above, beacon transmitter 518 may communicate directly with central server 510, and outside of the immediate control of AP 514. That is, even in the case where the components are integral, AP 514 and beacon transmitter 518 need not directly communicate with one another. In such circumstances, the beacon link 522 and the AP data link 520 to central server 510 may be separate and independent from one another.

In other optional features of system 500 and process 600, central server 510 may be configured to pass the unique ID code to beacon transmitter 518 for transmission over the air on a particular beacon frequency, and beacon transmitter 518 may begin transmission using this ID code, assigned by central server 510, in its data payload. In an embodiment, the data payload may include one or more of the unique ID, the location of beacon transmitter 518/AP 514, and the transmit power. In at least one embodiment, the data payload further includes information related to UE utilization, as well as means to migrate interference of a UE to a satellite disk. For example, when a UE is determined to be too close in proximity to a protected FSS site 502, central server 510 may instruct the UE to change its frequency out of the protected band. Additionally, in the exclusion zones around an FSS site where any transmission is considered to cause interference, the UE may be instructed, with coordination by the mobile core, to operate in another frequency band (e.g., 900 MHz).

In some embodiments, APs 508, 514 are further configured to directly or indirectly communicate information between one another about individual UEs associated with that respective AP. In at least one embodiment, according to particular operational conditions, such communication occurs over fixed network to reduce the payload of the beacon and maintain a maximum link budget.

In some embodiments, central server 510 is optionally configured to proactively contact beacon detectors 528 that are within a protection distance, and inform the receivers thereof to report any beacon IDs received during an assigned measurement. In some instances, central server 510 may be optionally configured to directly contact selected beacon transceivers at a known nearby existing AP 508, as needed for GAA/PAL protection calculations, to initiate measurement of beacon signal 526 from new beacon transmitter 518. The number of beacon detectors 528 disposed at FSS site 502 is optional, and may be based on morphology, clutter, and expected propagation conditions. Similarly, the height of the particular antenna, as well as its gain, may be assigned at the discretion of the operator. In some embodiments, a particular unique beacon ID may not be known to an FSS (e.g., where it may be desired to protect the integrity of the beacon measurement scheme), but will be stored in central database 512 for confirmation by central server 510 where necessary.

In some embodiments, central server 510 may also be configured (e.g., through software programming or hardware components) to query a management system/processor (if known and/or present) of an FSS site to update information in central database 512 regarding bandwidth usage, antenna azimuth, elevation angle receiving schedule, noise measurements, etc. Similarly, beacon detectors 528 may be programmed (or may be responsive to control by a program from another component) to automatically report to central server 510, upon detection of any beacon ID, the received beacon ID, the RSSI, and/or the signal-to-noise-ratio (SNR). Optionally, central server 510 may be further programmed to wait for a timeout, and note if FSS site 502 has identified the beacon ID assigned to new AP 514 during a measurement period, and then update the FSS site parameters in central database 512 if such beacon information has been received.

In some embodiments, central server 510 is further programmed to calculate the path loss between each AP 508, 514 and each FSS site 502 for each beacon detector 528, and compute the potential for interference to each FSS site dish antenna. Such calculations may further consider the received RSSI values, antenna azimuths, and gain patterns at both the respective FSS sites and the APs, and further take into account the computed path loss between the AP and FSS site locations based on the discrete and continual beacon measurements. Central server 510 may still further be configured to calculate the path loss between new AP 514 and existing APs 508, and calculate the potential for interference by new AP 514 to each existing AP 508. In this example, such calculations may further consider antenna parameters, FSS site parameters, and the computed path loss between AP's based on real-time beacon measurements.

In all of the examples described above, central server 510 is configured to utilize the results of the beacon measurements, as well as updates from the FSS site parameters, to continually monitor the operating parameters for AP (and also UE) communication with respect to one or more FSS sites. Such operating parameters include, without limitation, the power levels, antenna gain/orientations, and transmit frequency.

The systems and methods described herein therefore realize significant advantages over the conventional protection schemes by allowing for the determination of the actual path loss between an AP/CBSD and an FSS site, and also the loss from AP/CBSD to AP/CBSD. The present embodiments thus achieve in-band beacon transmission-to-detection with greater than a 180 dB link budget (e.g., for a single AP) or up to 200 dB link budget (e.g., for multiple APs) for satellite dishes with low elevation angles to Geo-stationary satellites. According to the present embodiments, measurement of third party signals by an AP (e.g., from known transmitters in the direction of the FSS site or other APs) further allows a significantly improved capability to estimate in-building loss and path loss distance-based exponents, as well as means for remedying interference. In at least one embodiment, a plurality of central servers are networked together to share information and complete tasks. In this example, the plurality of central servers may be supplied by different companies and/or operators, work and communicate together in a cloud-like network, and/or assign one central server as a master server to manage other central servers.

The present systems and methods further allow for the determination of the individual interference contribution from each identified transmitter. In some embodiments, the individual interference contribution may be determined using formats for narrow band beacons and reporting, such as weak signal propagation reporting (WSPR), for example, in order to determine path loss within the gain profile of the satellite aperture. The central server is able to prioritize and control AP transmitter parameters to reduce the overall transmitter contributions such that they fall below the noise floor, and/or a particular desired noise target for all the key interference thresholds. According to these advantageous capabilities, other transmitters outside of the aperture can be successfully de-prioritized, multipath contributions can be recognized and managed, and overall noise optimization can be obtained.

According to the present embodiments, further advantages may be realized with respect to mobile device management. For example, UEs associated with an AP/CBSD may contribute interference to an FSS site, even at relatively low transmitter power. Under the protection schemes and systems herein though, UEs may themselves deploy a beacon signal manner similar to that described above with respect to the APs, and thus more effectively report their association with a particular AP/CBSD, and hence the UE location (from the UE beacon or directly from the AP) to the central server/SAS. Accordingly, the actual path loss associated with each UE may be determined, and thus the level of interference from that UE. If the interference from a particular UE is determined to exceed a chosen threshold, the AP may cause the UE to move to another band, such as the macro-cell which uses a different frequency band to the satellite system and does not cause any interference.

In an exemplary embodiment, the AP (or CBSD) reports a number of UEs associated with that particular AP such that the effective transmitter power is proportionally increased to that of the number of UEs, and in consideration of the transmitter power of each individual UE. If this effective transmitter power becomes too high, that is, causes a potential interference problem, then the individual UEs may be instructed to operate in another band, such as a macrocell. In this example, the individual UEs would not be required to utilize the beacon transmissions, since the range of association distance between the UE and the AP is considered relatively small in comparison with the distance of the AP to the FSS site. Therefore, utilization of accurate approximations for these individual UEs (in close association distance) renders optional this use of the beacon technology at the individual UE level.

The systems and methods herein further advantageously provide FSS site monitoring and reporting to the central server of real-time channel usage at each FSS receiver/dish pairing. Under these techniques, receiver frequency assignment can be fixed or dynamic, depending on satellite and FSS customer needs, and such assignments may be continually tracked by the central server to prevent interference by CBRD, Radio Access points, UEs or other interfering devices. FSS receiver bandwidth may therefore be automatically detected, or alternatively, manually input if desired.

When the actual received bandwidth is known at each location and signaled to the central server, the full 500 MHz transmit band will not need 180 dB or 200 dB of co-channel protection from the CBRS fundamental emission. Instead, as little as 104 dB of protection may be adequate to protect FSS to the FCC-mandated level, such as for the second adjacent band. Furthermore, the multi-protocol receiver may be installed at FSS dish to identify CBSD signal sources and report RSSI and identification data to central server. In this example, these co-channel protection values are included for illustration purposes, and not in a limiting sense. These values may reflect upper limits for satellites with low elevation angles within the central beam, but may which have small beamwidth angles. The 180 dB value may therefore be representative of a single AP, and may be greater (e.g., the 200 dB value) for multiple APs within the central beam. Interference falling within the central beam angle (e.g., 3 degrees) is of greater significance than interference outside of the central beam. That is, a greater number of APs may be permissible nearer the FSS site, but outside of the central beam angle.

As described herein, the central server is configured to act to not only approve applications to transmit, but also to monitor, measure, manage active participants, and further to remedy potential and actual interference. The central server of the present systems and methods thus acts upon bandwidth usage reporting by the FSS sites and the measurement-based protection scheme system. Measurements by beacon receivers, multi-protocol receivers, FSS satellite program receivers, other APs/beacon transmitters, and even UEs, are reported to directly or indirectly to the central server to determine one or more of: (i) path loss between the FSS site and the AP/CBSD; (ii) path loss between the FSS site and a UE associated with the AP/CBSD (e.g., with location information); (iii) path loss between a new AP/CBSD and one or more existing APs/CBSDs; (iv) impairment of the FSS noise floor; (v) degradation of FSS receiver performance; (vi) the identify of a particular AP/CBSD that is raising the noise floor at a specific frequency and for a particular FSS site dish; (vii) any interference caused by a UE in close proximity to the FSS site; and (viii) interference from the aggregation of transmitters across the whole satellite band that impacts on the linearity of the LNB.

According to the present embodiments, central server is still further configured to take one or more of the following remedial measures to mitigate interference and migrate the source of interference to a non-interfering communication status: (i) collect input information and determine appropriate actions to take regarding interfering APs/CBSDs/UEs; (ii) issue commands to AP/CBSD to modify operating parameters (e.g., transmit power, operating frequency/bandwidth, antenna pointing angle or direction, etc.) of new and existing APs/CBSDs based on FCC rules, equitable resource allocation calculations, changes to RF propagation, etc.; (iii) issue commands to specific UEs (in conjunction with an associated mobile network or other networks) to modify operating parameters, including changing channel of operation (e.g., in the case of a mobile network, to that of the macro-cell that is in a different band to the FSS site); (iv) continually monitor the operation of an initialized AP/CBSD over time for changes in propagation conditions and other factors could change the interference environment; (v) regularly monitor status reports from FSS receivers and/or master scheduler regarding bandwidth utilization at each site, and recalculate resource allocation values using this updated information; and (vi) modify frequency assignments of existing APs/CBSDs in an impact area of FSS site according to changes in FSS frequency usage.

A person of ordinary skill in the art, upon reading and comprehending this written description and accompanying drawings, will understand the applicability of the present embodiments beyond the specific examples described herein. For example, the principles of spectrum sharing in the C-band and CBRS band may be applied to protection schemes in other bands, and particularly to the "6 GHz" bands, namely, the 5.925-6.425 GHz and the 6.425-7.125 GHz bands, which are presently utilized for satellite uplinks. Such innovative 6 GHz band protection schemes are described immediately below. The present inventors further envision implementing the advantageous beacon detection systems in a "stoplight" system for governing the deployment and operation of particular beacon detectors.

Beacon Based Protection for the 6 GHz Band Spectrum

As described above, the disclosed beacon protection system is particularly useful for sharing the 3.6-4.2 GHz spectrum between the FSS earth stations and other terrestrial radio system users. The following embodiments describe innovative systems and methods for extending these innovative techniques to the 5.925-6.425 GHz spectrum, sometimes referred to as the "designated 6 GHz" spectrum.

A key difference between the 3.6-4.2 GHz spectrum and the 6 GHz spectrum is that the 3.6-3.7 GHz and 3.7-4.2 GHz spectra are used to receive signals from space, whereas the 5.925-6.425 GHz spectrum is used for earth-to-space communications. The 6 GHz spectrum thus involves different propagation physics that are associated with the protection of this particular spectrum range, and also includes different users desiring to share this portion of the spectrum. For example, at present, in the United States, the 5.925-6.425 GHz spectrum has approximately 27,000 or greater microwave point-to-point users. Additionally, the 6 GHz spectrum is significantly less suited for use by mobile users, which, in the main, is the 3.6-4.2 GHz spectrum. However, although the 3.6-4.2 GHz spectrum is presently targeted for 5G mobile use, the 3.6-4.2 GHz spectrum has relatively fewer available microwave point-to-point links.

Although the following embodiments are described with respect to extending the beacon protection techniques, described above, to the 6 GHz spectrum, the person of ordinary skill in the art will understand, upon reading and comprehending the present specification and drawings, that these innovative techniques may be further extended into other satellite bands and spectra for future shared use. The following embodiments provide a solution to a recently-proposed challenge, which recommend portions of the 3.7-4.2 GHz spectrum, presently used for satellite downlinks, be allocated for licensed mobile communications, while designating the 6 GHz spectrum (5.925 to 7.125), which includes the uplink counterpart, for unlicensed use. One recent proposal is to free 1700 MHz of spectrum: 500 MHz for licensed purposes; and up to 1.2 GHz for unlicensed purposes. The systems and methods herein extend the beacon-based protection techniques, described above, will advantageously manage sharing of this new proposed usage of the 6 GHz spectrum in a significantly more efficient manner.

The 6 GHz Spectrum (5.925-7.125 GHz)

In the United States, the 500 MHz of bandwidth in the 5.925-6.425 GHz band (hereinafter, the "Lower 6 GHz" band) of the 6 GHz spectrum is presently allocated exclusively for non-federal usage, on a primary basis for FSS (Earth-to-space) and fixed services (FS). Similar allocation of the Lower 6 GHz band is implemented across the world.

For the FSS uplink, the 5.925-6.425 GHz band (Earth-to-space) is associated with the 3.7-4.2 GHz band downlink (space-to-Earth), which are collectively referred to as the "C-band" in conventional parlance. In this application, the conventional parlance is used for ease of explanation, and is not intended to be limiting. That is, a person of ordinary skill in the art will understand that, by "C-band," the present embodiments are intended to generally refer to the 3-8 GHz spectrum, and satellite systems and/or mobile communication systems that operate within this spectral range, and frequently with respect to similar system elements/components (e.g., satellite dishes, earth stations, transmitters, receivers, APs, UEs, etc.). Moreover, the person of ordinary skill will understand that the systems and methods herein are not limited to only the particular spectral ranges, or portions thereof, described herein.

At present, there are approximately 1,535 earth station licenses in the 5.925-6.425 GHz band. Although most of these earth stations operate at fixed locations, some earth stations have been disposed on mobile vessels but still operate in this band on a primary basis. In at least one instance, mobile devices of one operator have been licensed to transmit to geostationary satellites in order to provide consumer-based text messaging, light email, and Internet of Things (IoT) communications, thereby protecting terrestrial operations by using a database-driven, permission-based, self-coordination authorization system. At present, the 5.925-6.425 GHz band is also used for the transmission of command signals transmitted by the earth stations, typically near 5.925 or 6.425 GHz.

In present FS implementations though, the 5.925-6.425 GHz band is heavily used. FS licensees are, for example, authorized to operate point-to-point microwave links with up to 120 MHz of paired spectrum for each authorized path. Individual paired channels under these licenses may be assigned in specified bandwidths ranging from 400 kHz up to 60 MHz. Present public records indicate that greater than 27,000 licenses have been issued for point-to-point operations in this band. Such operations are known to support a variety of critical public services, such as public safety (including backhaul for police and fire vehicle dispatch), coordination of railroad train movements, control of natural gas and oil pipelines, regulation of electric grids, and backhaul for commercial wireless traffic.

At present, the 5.925-6.425 GHz, or Lower 6 GHz, band portion of the 6 GHz spectrum is the most heavily used FS band for long links, with approximately 63,260 transmit frequencies in use. The lower 6 GHz band is otherwise known to only provide significant applications for FSS uplink earth stations. However, because FSS uplink earth stations do not conventionally include receiver capabilities at the 6 GHz spectrum, the FSS uplink earth stations presently would not require protection from the FS usage.

Accordingly, it is presently easier to coordinate with earth stations at 6 GHz than it is to coordinate at 4 GHz, because there are fewer earth stations to consider in the 6 GHz spectrum. Moreover, because the transmitters are at a higher frequency (6 GHz) than the receivers (4 GHz), other users of the 6 GHz spectrum implement highly directional systems that often exhibit lower gain in comparison with FSS in the 4 GHz band. Thus, many earth stations at the 4 GHz spectrum are configured to receive-only. Furthermore, coordination zones for the 6 GHz spectrum are respectively smaller, and a 6 GHz FS operator is better able to accept the risk of incoming interference from an uplink earth station. Additionally, many 6 GHz earth stations are configured to transmit to only one transponder on one satellite for decades at a time. An FS user has been able to conventionally assume that other frequencies and pointing directions will remain vacant. In contrast, at 4 GHz, the FS user is required to always protect even portions of the band and arc that its particular earth station does not use, and/or is never expected to use.

Nevertheless, 6 GHz uplink earth stations still have the potential to cause interference to FS receivers. As with the 4 GHz downlink earth stations, the 6 GHz uplink earth stations always have the right to operate on any frequency in the band, pointing to anywhere in the entire geostationary arc thereof, at any time and without notice. Therefore, even though it is easier to site FS links for reliable operation at 6 GHz than it is at 4 GHz, potential interference problems still remain.

Remaining portions of the 6 GHz spectrum are defined by the FCC Notice of Inquiry (NOI). That is, the NOI further describes the 6.425-7.125 GHz band to include three different segments, with each segment having a different respective application.

The first segment of the 6.425-7.125 GHz band is the 6.425-6.525 GHz segment. The 6.425-6.525 GHz segment has a mobile allocation with Broadcast Auxiliary Service and Cable TV Relay applications. The 6.425-6.525 GHz segment presently has no FS allocation, and therefore no public position regarding the use of the 6.425-6.525 GHz segment has been taken by the Fixed Wireless Communication Coalition (FWCC).

The second segment of the 6.425-7.125 GHz band is the 6.525-6.875 GHz segment (hereinafter the "Upper 6 GHz" band, or FS band). At present, the upper 6 GHz band is used less intensively by earth stations, but has a narrower bandwidth than the Lower 6 GHz band. Only in the past few years have operators been able to use Upper 6 gigahertz band channels having a bandwidth wider than 10 MHz. In contrast, the Lower 6 GHz band has had available 30 MHz channels for many years, and more recently, 60 MHz channels. Because of these considerations, the Upper 6 GHz band has experienced significantly less total activity than has the Lower 6 GHz band, and using approximately only half as many transmit frequencies. The usage of these upper 6 GHz band though, is growing, in the present embodiments offer advantageous solutions to successfully manage this increased usage.

The third segment of the 6.425-7.125 GHz band is the 6.875-7.125 GHz (hereinafter, the "7 GHz" band), which primarily serves the Broadcast Auxiliary Service and the Cable TV Relay Service, similar to the first segment. In contrast to the first segment, however, FS links are permitted in the 7 GHz band, but these FS links are not permitted to intersect with the service areas of television pick up. Such limitations have thus severely restricted FS access in the 7 GHz band. Similar to the first segment though, the FWCC also has not stated a public position regarding future usage of the 7 GHz band.

The systems and methods herein therefore advantageously utilize the 6 GHz band to address considerations arising from the reallocation of the former 2 GHz FS band, and also in consideration of the problems, discussed above, experienced in coordinating with FSS earth stations at 4 GHz. The present Upper and Lower 6 GHz bands/band segments thus represent the only remaining FS bands that implement frequencies low enough to span tens of miles. These two band segments are discussed together herein because they have similar technical characteristics and are used for similar purposes. These two band segments are further discussed together because the FS links in both segments (at present and for expected future use) will require the highest levels of protection from other services.

The present systems and methods additionally allow devices to advantageously operate both in the lower 6 GHz band and in the spectrum designated (by the FCC) for Unlicensed National Information Infrastructure (U-NII) use. Because the lower 6 GHz band is considered close to the U-NII spectrum, the extension of the present beacon detection schemes to the 6 GHz band provides a technical solution to beneficially enable U-NII devices to flexibly operate in both spectra. Such devices may thus operate with wider channel bandwidths and higher data rates. Such devices would also realize a significantly increased flexibility for all types of unlicensed operation.

As described herein, "U-NII devices" refers to unlicensed devices that presently operate in the 5.15-5.35 GHz and 5.47-5.725 GHz bands. As unlicensed devices, such U-NII equipment operates under Part 15 rules of the FCC. Devices that operate pursuant to Part 15 generally share spectrum with allocated radio services, and therefore must operate on a non-interference basis, that is, such unlicensed devices are not permitted to cause harmful interference, such as from allocated radio services and authorized users. Such unlicensed devices are further required to meet technical requirements or standards designed to minimize the risk of harmful interference. Manufacturers though, enjoy significant flexibility with regard to the hardware and applications that may be implemented to satisfy these technical requirements, which has contributed to the significant recent growth of various technologies such as Wi-Fi.

In 2013, the FCC proposed to make additional spectrum available for U-NII devices in the 5.35-5.47 GHz and 5.85-5.925 GHz bands, but the National Telecommunications and Information Administration (NTIA) concluded in 2016 that there is no viable solution for U-NII devices to share the 5.35-5.47 GHz band with incumbent federal systems. The present systems and methods avoid this problem by providing spectrum sharing techniques that allow U-NII devices to operate in the 6 GHz band.

The present embodiments further advantageously allow for coordination with existing fixed microwave frequencies, which has proven difficult for conventional systems. The present embodiments still further enable coordination with developing cm- and mm-Wave 5G system technology. At present, a fixed microwave applicant coordinates a particular frequency band and a particular azimuth. All other frequencies and directions are thus available to other applicants. In comparison, to coordinate satellite earth station frequencies, an FSS applicant will routinely coordinate the entire band, as well as every pointing direction toward every geosynchronous satellite. By default, the FSS implementations use full-band and full-arc coordination, even if accessing only one transponder on one satellite, and fixed microwave applicants must protect even unused satellite coordination. The difficulties of the fixed microwave coordination are illustrated below with respect to FIGS. 7 and 8.

Figure 7:
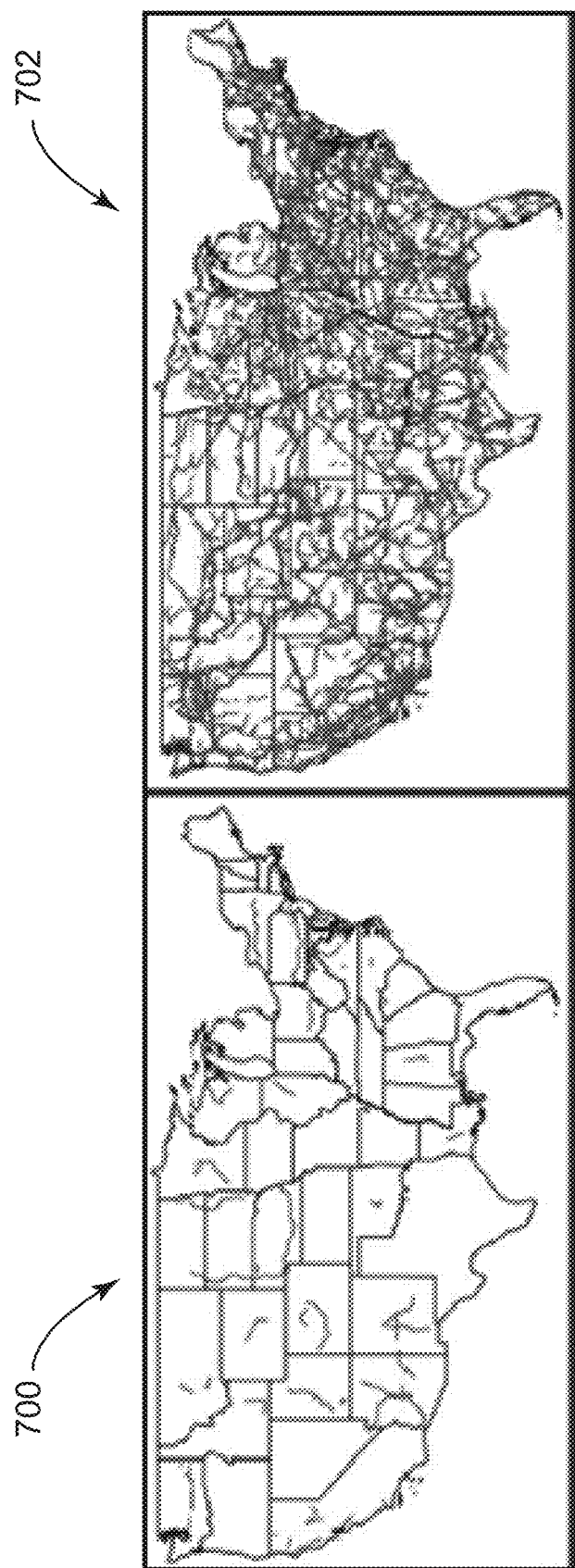
FIG. 7 is a graphical illustration depicting a comparison of conventional fixed point-to-point distributions for the 4 GHz band and the Lower 6 GHz band.

FIG. 7 is a graphical illustration depicting a comparison of conventional fixed point-to-point distributions 700 and 702, for the 4 GHz band (downlink) and Lower 6 GHz band (uplink), respectively. As illustrated in FIG. 7, both distributions 700 and 702 represent full-band, full-arc, and fixed microwave links. Distribution 700 illustrates how the 4 GHz band presently includes approximately 939 of such links, whereas distribution 702 illustrates how the Lower 6 GHz band includes approximately 57, 654 of such links.

A comparison of distributions 700 and 702 further illustrates the applicability of the present techniques with respect to exclusion zones. Distribution 700, for example, demonstrates how the downlink exclusion zones are very large and difficult to avoid, thereby resulting in fixed microwave implementations being barred from significant portions of the geographical territory. Distribution 702, on the other hand, demonstrates how uplink exclusion zones are considerably smaller in comparison, and easier to avoid. Nevertheless, in the uplink, is considered risky under conventional techniques to use vacant channels in an FSS protection/ exclusion zone.

Figure 8A:
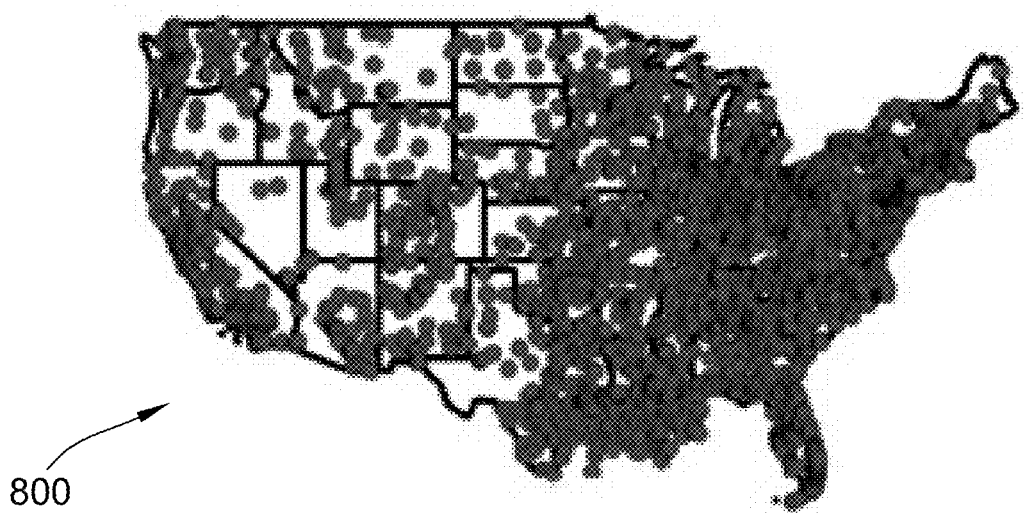
FIG. 8A is a graphical illustration depicting a conventional earth station location distribution for the 4 GHz downlink band.
Figure 8B:
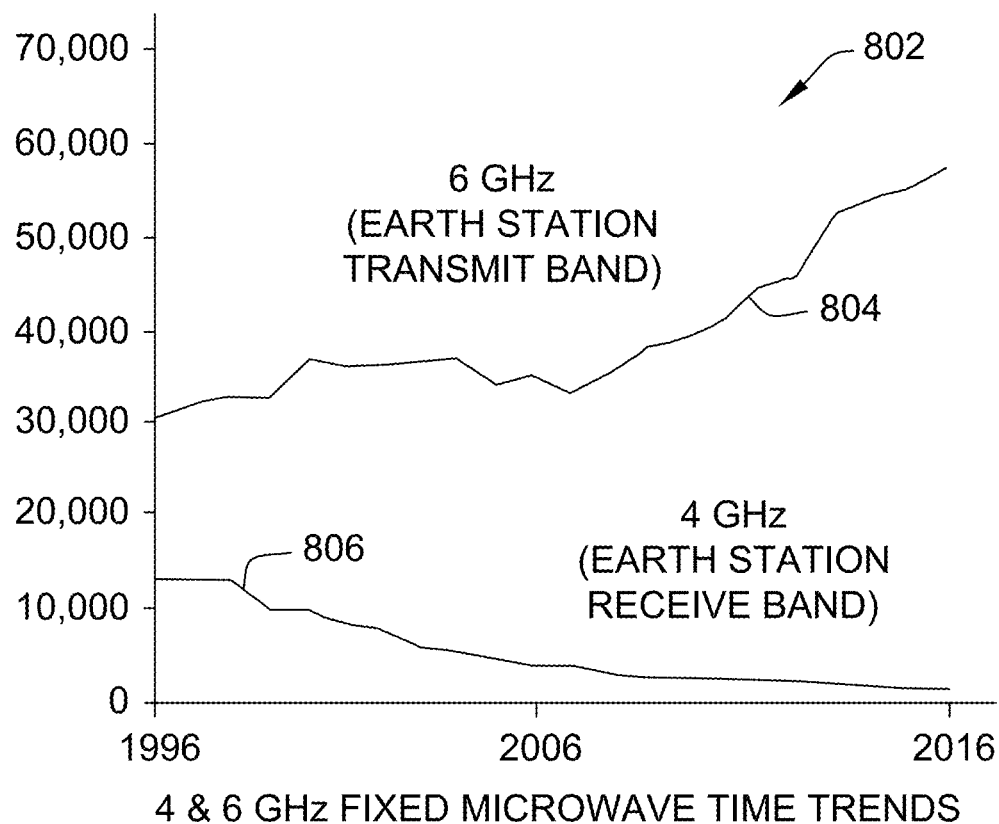
FIG. 8B is a graphical illustration depicting a conventional plot comparison of fixed microwave earth station distribution trends for the 6 GHz uplink band and the 4 GHz downlink band.

FIG. 8A is a graphical illustration depicting a conventional earth station location 800 for the 4 GHz downlink band. FIG. 8B is a graphical illustration depicting a conventional comparison plot 802 of a trend 804 (shown in yearly increments) of the number of fixed microwave earth stations in the 6 GHz uplink earth station transmit band and a similar trend 806 of the fixed microwave earth stations in the 4 GHz downlink band. As can be seen from FIGS. 8A-B, fixed microwave coordination at 4 GHz is conventionally considered to be impossible over much of the country. The beacon detection scheme described above though, solves this problem by providing a fixed microwave coordination scheme at 4 GHz. However, as described further below, this innovative beacon scheme may be even further extended for shared use applications in at least the designated 6 GHz band.

Figure 9:
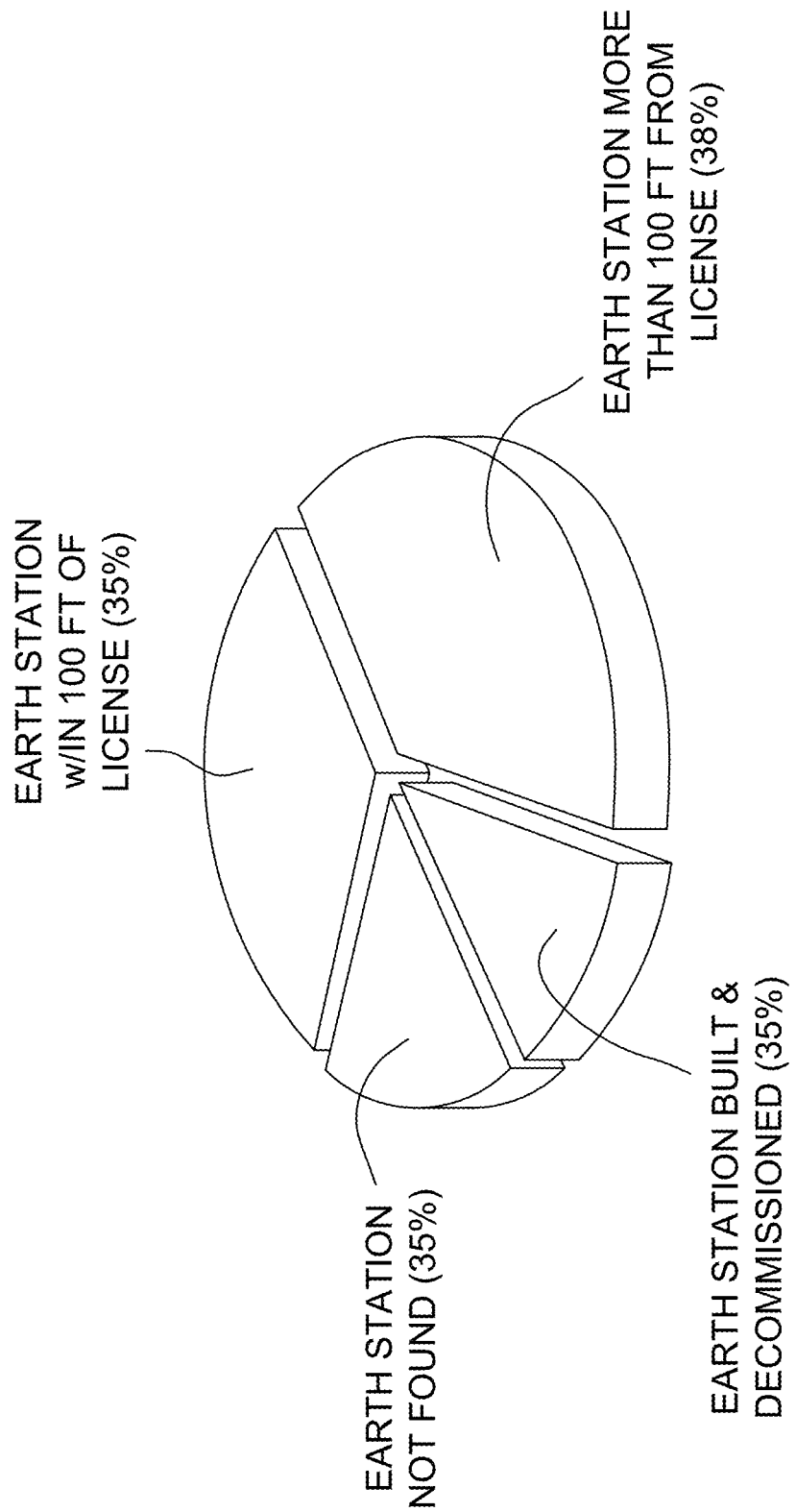
FIG. 9 is a graphical illustration of a chart depicting relative percentages of existing earth station database problems conventionally encountered.

FIG. 9 is a graphical illustration of a chart 900 depicting relative percentages of existing earth station database problems conventionally encountered, such as earth stations being (i) more than 100 feet from license, (ii) built and decommissioned, or (iii) not found. Based on a sample of 300 earth stations to determine usage of registered earth stations, chart 900 demonstrates a relatively low utilization (35%, in this example) in the FCC database. It should be noted though, that chart 900 does not take into account usage of unregistered earth stations. Nevertheless, chart 900 is based on an FWCC study that has been credibly confirmed by other studies.

Conventional interference mitigation techniques have been unable to fully resolve these problems. A collaboration of Working Parties of the International Telecommunication Union (ITU) drafted a recommendation for potential mitigation techniques to improve operation of International Mobile Telecommunications (IMT) in the 3.4-3.6 GHz band without causing interference to FSS earth stations, but the working parties have not reached a jointly approved solution. The ITU Radio Communication Sector (ITU-R) has proposed several other techniques to mitigate interference with coexisting terrestrial and satellite systems in the C-band (assuming a maximum EIRP of 59 dBm for terrestrial systems), but none of these proposed techniques have effectively overcome the basic incompatibility between IMT systems and FSS earth stations. The beacon detection techniques of the present embodiments, on the other hand, successfully resolve these known incompatibilities, and within the parameters described herein.

Band segmentation, for example, has been proposed as one conventional solution for terrestrial service/satellite system coexistence. Real-world deployments, however, have conclusively shown that harmful interference may still occur even when the two respective systems operate in non-overlapping bands. One particular study indicated that a 2 km separation distance from all satellite receivers was conventionally necessary to prevent terrestrial mobile systems from causing harmful interference. This harmful interference arises due to the limited capability of (i) terrestrial systems to limit out-of-band emissions, and (ii) satellite receivers to filter out unwanted emissions in adjacent bands.

Additional filtering techniques have been proposed to address these adjacent band problems, but such additional techniques have also been unable to successfully manage the terrestrial/satellite coexistence. Two interference mechanisms are particularly related to these adjacent band problems: (1) unwanted emissions from terrestrial base/mobile stations (e.g., operating in the C-band) can generate interference to earth stations in other parts of the same band; and (2) since the LNBs and LNAs used on FSS earth stations are designed to receive a broad spectrum (i.e., including the entire C-band), the power radiated by terrestrial base/mobile stations can overdrive the respective amplifier of the first block, thereby compromising the linear response thereof. This overdrive effect on the LNB is reduced by including additional filtering (e.g., bandpass, etc.) on the FSS earth stations, however, the application of such additional filtering to the FSS earth station would prevent the station from using portions of the C-band, which would compromise the service thereof.

Moreover, additional filtering solutions are difficult to apply in the case of transportable earth stations, since, by the nature of their operations, the geographical location and receiving frequencies of the transportable earth station may vary significantly and often over time. A typical Satellite News Gathering (SNG) earth station, for example, may be employed to transmit and receive carriers on different satellite transponders, from the number of different geographical locations, in a relatively short interval of time. Furthermore, the introduction of an RF filter between the FSS earth station antenna output and the input to the amplifier of the first receiving block Will generate loss. Consequently, the system equivalent noise temperature will increase significantly for any 0.1 dB of attenuation, on the order of approximately 2.3-8%.

Filters that are conventionally used in the C-band are known to have an insertion loss of approximately 0.5 dB, thereby resulting in an increase in the noise temperature on the order of approximately 43%, or 1.54 dB. Additionally, an increase to the satellite downlink carrier EIRP will results in a reduction to the overall capacity of the satellite system. Because many FSS earth stations are receive-only, and thus are frequently unlicensed or "blanked licensed," the inability of a system administrator to have access to all of the necessary information places further practical constraints against the application of additional filtering to the FSS earth station. Another conventional filtering technique addresses the interference from unwanted emissions by applying rejection filtering to the transmitting terrestrial base/mobile stations. This technique reduces emissions outside of the assigned frequency blocks, but interference is still known to occur within a separation distance of up to approximately 4 km.

The deficiencies in these conventional proposals are resolved according to the innovative techniques of the systems and methods herein, which dynamically allocate the spectrum between the respective terrestrial and satellite systems. Under these dynamic spectrum access solutions, terrestrial systems within a given territory are enabled to use the portions of the spectral band that are not being used by ground-based satellite systems in the vicinity. According to these advantageous techniques, terrestrial systems are effectively able to "choose" the appropriate frequency of operation, according to the real-time information collected through the disclosed auxiliary system, which includes a network of beacons installed on the FSS earth station antennae, and/or a database with geographical data.

As described for the downlink 4 GHz/C-Band embodiments, above, the FSS receiver is highly sensitive to interference from other users. In this embodiment though, the above dynamic spectrum techniques are further adapted to additionally protect the 6 GHz band, where the FSS transmitter potentially creates interference to other users. That is, according to the embodiments described herein, systems and methods are provided that advantageously protect both a particular FSS from others' interference, and others from potential interference from the particular FSS. As described further below, both techniques largely employ the same infrastructure.

Therefore, the present solution protects not only users of the downlink (e.g., multiple system operators (MSOs) of a cable network, content providers, etc.), but also other users that may be affected by the uplink transmissions. By providing such two-way protection using largely the same beacon detection/transmission subsystem overlay to existing network infrastructures, the present embodiments vastly expand the protection that may be implemented with respect to the several communication bands, but without significantly increasing the implementation costs in proportion thereto. Using this subsystem infrastructure, the present inventors contemplate that the innovative techniques described herein may be further extended into other communication bands according to the same scale of economy.

Previous auxiliary information systems have been proposed, but the design and implementation of such conventional auxiliary systems was complex, and the required maintenance thereof very expensive. In contrast, the beacon detection system of the present embodiments is integrated, in a relatively inexpensive manner, within the existing FSS infrastructure. Through this innovative integration, a real time, measurement-based propagation is determined, which allows exclusions zones to be reduced to as little as only a few hundred meters in radius, e.g., for the circular portion of the "teardrop shape" of a typical transmission. Furthermore, even in the pointed portion (i.e., in the direction of transmission) of the teardrop shape, the beamwidth thereof will be relatively narrow, thus providing for a significant reduction to the total exclusion zone area in comparison with conventional approaches. This dramatic reduction to the size of the exclusion zones also results in a comparable increase to the value of the spectrum.

The reliability of the present embodiments is achieved according to the simplified architecture of the auxiliary beacon detection system, as well as the built-in capabilities to verify the accuracy of the real-time measurements of a particular beacon from a number of other beacons within range. In a given geographical area, the manager of the respective terrestrial system is required to decide whether a base/mobile station may transmit or mute any transmission on the basis of the information concerning the real-time usage of the C-band by FSS earth stations in the surrounding area (and then continue to update such decisions). Accordingly, the correct functioning of the auxiliary measurement system, as well as the timely accuracy of the information it delivers, is of great significance to prevent interference between the systems.

The operational requirements of FSS downlink earth stations are generally subject to constant and rapid variations. Accordingly, to maximize flexibility in response to such variation, the earth stations are generally designed to receive multiple carriers of bandwidth, and typically between 4 kHz and 72 MHz in portions of the C-band. Additionally, the frequencies at which a particular earth station may operate, and the pointing direction of the respective earth station antenna, are not fixed; the frequencies and pointing directions may also be varied at any given point in time by the respective satellite operator according to a number of various operational circumstances, many of which may be unforeseeable. The present embodiments therefore provide an innovative solution that advantageously allows earth stations to access the entire space segment, such that the earth stations may respond without any disruption to changes in operational conditions, which often occur instantly and without notice.

As described further below with respect to FIG. 10, the present systems and methods implement a closed loop system that is capable of planning, monitoring, and controlling interference in a dynamic manner. This dynamic closed loop system advantageously allows shared use of the relevant spectrum among competing users to achieve the maximum commodity of the available spectrum. The innovative approaches described herein measure propagation losses in real-time, thereby avoiding the use of conventional propagation planning tools that are known to be intrinsically inaccurate. The measurement-based propagation techniques of the present embodiments further avoid the limitations of conventional shared-use planning, which utilized propagation tools that were required to make very conservative data assumptions in order to protect the most sensitive user of the particular system being planned. That is, the conventional propagation techniques necessarily introduced significant inefficiencies to the spectrum abuse by being forced to allocate the spectrum according to the requirements of only the most sensitive user.

Figure 10:
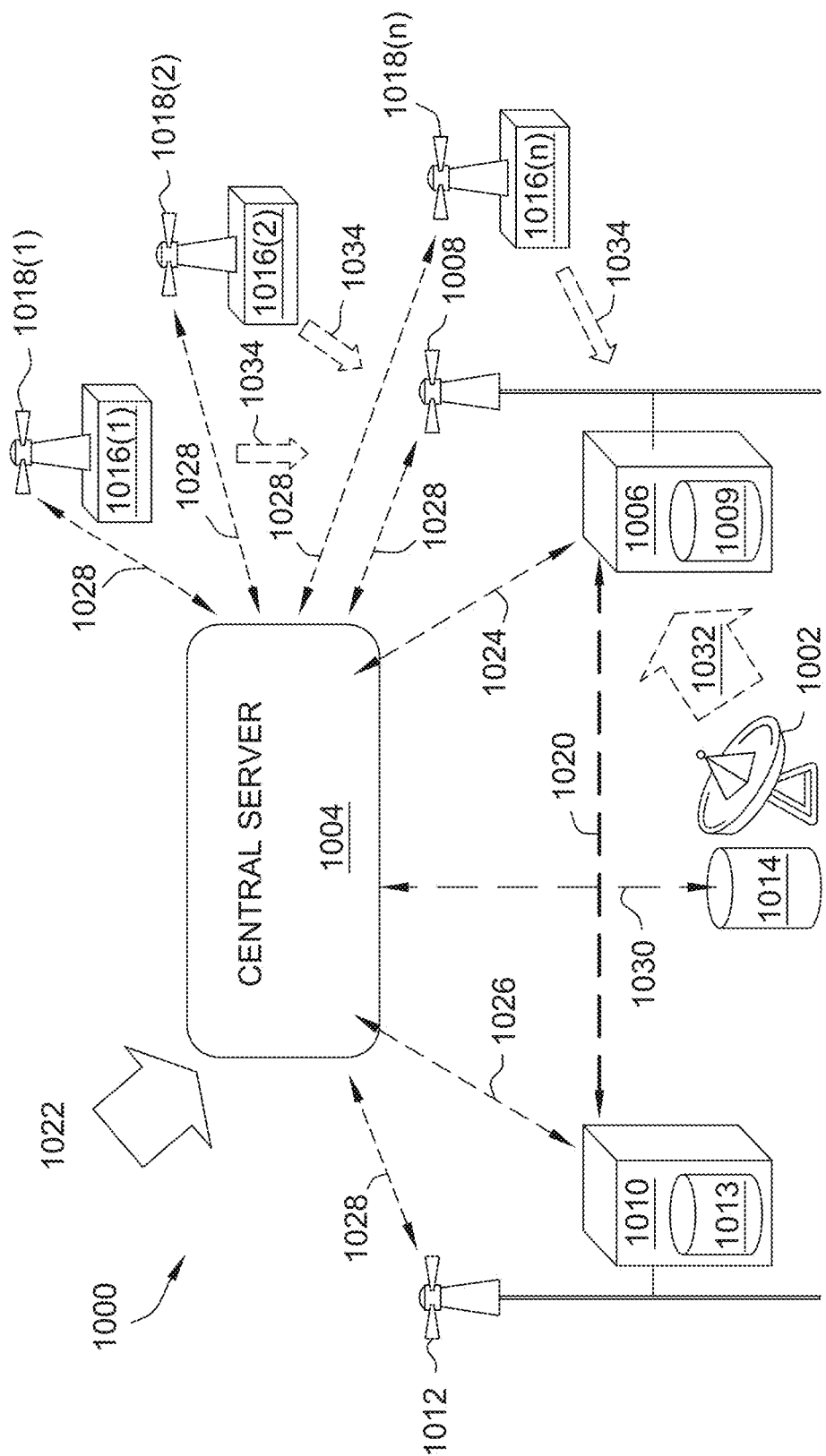
FIG. 10 is a schematic illustration of a shared use system, according to an embodiment.

FIG. 10 is a schematic illustration of a shared use system 1000. In the exemplary embodiment, system 1000 includes an FSS site 1002, a central server 1004, a first FS transceiver 1006 (or a transmitter/receiver combination) including a first beacon transmitter 1008 and a first beacon detector 1009, a second FS transceiver 1010 including a second beacon transmitter 1012 and a second beacon detector 1013. In the exemplary embodiment, FSS site 1002 includes at least one beacon detector 1014. In the example illustrated in FIG. 10, first beacon transmitter 1008 is located within the vicinity of a plurality (i.e., 1-n) of neighboring APs 1016 (e.g., Wi-Fi access points), and each neighboring AP 1016 includes a respective neighboring beacon transmitter 1018. In this example, elements of system 1000 are similar to elements in protection scheme 400, FIG. 4, and system 500, FIG. 5, and that are designated by similar labels. One of ordinary skill in the art will appreciate that additional elements from FIGS. 4 and 5 may be incorporated into system 1000 as described above, but that not all such elements are repeated in FIG. 10 for ease of explanation.

In the exemplary embodiment, first FS transceiver 1006 operates a point-to-point microwave link 1020 with second FS transceiver 1010, and central server 1004 receives fixed network data communications 1022 (e.g., LAN, WAN, Internet, another type of electronic network, etc.). Additionally, first FS transceiver 1006 may be in operable communication with central server 1004 over a first data link 1024, and second FS transceiver 1010 may be in operable communication with central server 1004 over a second data link 1026.

Similar to the embodiments disclosed with respect to scheme 400 and system 500, above, each of respective beacon transmitters 1008, 1012, and 1018 over beacon links 1028. System 1000 may further include an FSS reporting link 1030 for communicating operating parameters of FSS site 1002 with central server 1004.

In the exemplary embodiment, central server 1004 is in operable communication with the beacon detectors 1009, 1013, 1014 to receive information regarding detected beacon transmissions. Central server 1004 may further be in operable communication with relevant transceiver portions (not separately shown) of APs 1016 that are configured to detect neighboring beacon transmissions, e.g., over beacon links 1028. In some embodiments, beacon links 1028 are configured as fixed communications, and may share the same link (e.g., fixed network data communications 1022) used to authorize transmission. In an embodiment, first and second data links 1024 and 1026 also, or alternatively, are fixed communications included in fixed network data communications 1022, which may represent a broadband fixed link or a radio link (e.g., a mobile base station in a rural area, where a fixed cable link is very costly, and all communication to and from the base station is instead by way of a point-to-point microwave link). Accordingly, fixed network data communications 1022 may represent a separate fixed link, or the aggregation of all fixed links where individual system components do not communicate over their own RF path.

In operation of system 1000, operation of FSS site 1002 within the vicinity of first FS transceiver 1006 generates FSS interference 1032 (or potential interference) into the operation of FS transceiver 1006 from the satellite uplinks (not separately shown) associated with FSS site 1002. In a related manner, operation of neighboring APs 1016 within the vicinity of first FS transceiver 1006 generates Wi-Fi interference 1034 (or potential interference) into first FS transceiver 1006 from the respective Wi-Fi operations. Each of respective beacon transmitters 1008, 1012, and 1018 otherwise operates according to the principles described above.

That is, in the example illustrated in FIG. 10, the auxiliary measurement-based techniques of the downlink system are advantageously adapted for the uplink embodiment of system 1000 to enable the shared use of the Lower 6 GHz band for microwave point-to-point FS and satellite uplinks. As described above, the 500 MHz bandwidth of the Lower 6 GHz band in the United States is allocated exclusively for non-federal use, on a primary basis for FSS (Earth-to-space), and for FS, such as microwave point-to-point, and FS licensees may be authorized to operate point-to-point microwave links with up to 120 MHz of paired spectrum for each authorized path.

In accordance with system 1000 though, each user of the Lower 6 GHz spectrum, for both FSS (e.g., FSS site 1002) and FS (e.g., first FS transceiver 1006, second FS transceiver 1010), incorporates a radio beacon (e.g., beacon transmitters 1008, 1012, beacon detector 1014) as part of the transmission of the user's spectrum utilization. The respective radio beacon thus uniquely identifies each respective user or neighbor as the potential source of interference. Also similar to the embodiments described above, the beacons may be included within guard bands, co-channels, or the unused portion of the 500 MHz of bandwidth in the Lower 6 GHz spectrum.

In some cases, a Wi-Fi AP (e.g., AP 1016) is located indoors and operates at low power (e.g., ≤1 W), system 1000 may be configured such that it may disregard, or give lower priority to, a beacon transmission from the low power AP. According to an exemplary embodiment, such low power, "non-interfering" (i.e., low risk of potential interference) APs may be exempt from including their own beacon transmitters. In contrast, Wi-Fi APs located outdoors, and employing higher power transmissions, could be required to include at least one beacon transmitter configured to operate according to the principles described herein, since such outdoor/high power operation represents a significantly higher risk of potential interference. Overall system costs may be reduced by exempting common, known, indoor, low power, low-risk APs.

In an alternative example, the effect of large number of indoor Wi-Fi APs in a cluster may collectively increase the potential risk of interference, even where individual ones of the cluster might not. In this case, system 1000 may be further configured to model such clusters as a single effective AP 1016. Where central server 1004 determines that the cluster AP 1016 represents an interference risk, central server 1004 may be further configured to cause small decreases in the transmitter power of all APs in the cluster to reduce the interference risk. In this example of system 1000 illustrated in FIG. 10, central server 1004 is configured to individually communicate with each AP in the cluster. In other embodiments, central server may communicate with a primary AP in the cluster, and the primary AP communicates with other, secondary, APs in the cluster. As described above, each AP may also include its own beacon detector.

In one embodiment, the transmitter power of the single cluster AP is calculated using the MBP model for each individual transmitter of the respective low power APs in the cluster. This calculation is of particular value in the formation of an optimization strategy for resource assignment of or to the individual APs in the cluster. The central server is thus further advantageously capable of re-optimizing the transmitter powers, using the MBP measurement(s), as conditions dynamically change. In another embodiment, the aggregate power of the cluster is directly measured, without necessarily identifying the individual contribution thereto of each AP in the cluster. By these techniques, system 1000 provides further benefits over conventional systems in that central server 1004 may thus advantageously enable frequency planning of individual Wi-Fi APs, to improve service therebetween, such as through the assignment of different channels to avoid interference between the respective neighboring APs. In some instances of indoor AP use, the beacon detection range for the indoor AP may be limited. Nevertheless, in such cases, the indoor AP may be managed such that it has sufficient power to report to nearby neighboring APs to enable central server 1004 to build up a map of potential interference that includes such indoor APs.

Thus, as with the downlink embodiments described with respect to scheme 400 and system 500, the beacon transmission scheme of the uplink system 1000 enables the identification of the registered transmitter by transmitting the unique ID of the transmitter in a beacon. Also similar to the downlink beacon implementation, the beacons in the uplink scheme are further enabled to transmit other useful information associated with the service use, such as the transmitter and beacon GPS co-ordinates, azimuth, used frequencies, transmitter power, antenna parameters, system parameters, etc. In an exemplary embodiment, transmission by the beacon includes only the unique beacon ID to minimize the information content of the transmission, and the hence associated bandwidth, and to extend the range for subsequent beacon detection through optimum signal formatting. Thus, each user of the Lower 6 GHz spectrum incorporates a data connection (e.g., first data link 1024, second data link 1026, reporting link 1030) to a database of the central server (e.g., central server 1004) to register operating parameters, and other key parameters in real-time, for use of the Lower 6 GHz spectrum by the respective user.

As illustrated in FIG. 10, central server 1004 is similar to central server 412, FIG. 4, and central server 510, FIG. 5, in that central server 1004 represents a new form of SAS system. Central server 1004 therefore provides yet a further improvement over conventional SAS systems that have been developed to introduce greater flexibility of spectrum sharing. Although some conventional SAS systems have historically included capability for scalability, the present systems and methods achieve significantly greater scalability potential through use of the improved and simplified propagation model described above.

In operation, central server 1004 performs database registration similarly to the processes described above for the downlink embodiments. The database registration of central server 1004 includes all of the operating system parameters, including the beacon ID, the transmitter GPS co-ordinates, azimuth, frequencies of use, transmitter power, and other key operating requirements. In some embodiments, the beacon is separate from the transmitter. For example, a farm of satellite uplinks may utilize a single beacon transmitter to transmit all such information together, or as a series of IDs. The registered operating parameters of each beacon are relevant to the system operating parameters, and are thus sufficient to calculate potential interference. In an exemplary embodiment, after a user (or AP) is registered in the database (not separately shown in FIG. 10) of central server 1004, only the beacon ID is subsequently transmitted, since all subsequent detections of the beacon transmission will enable central server 1004 to perform a lookup within its database for the ID of the detected beacon to determine other useful information required for subsequent control within the closed loop of system 1000. That is, the beacon operating parameters are provided at the time of registration, and do not need to be subsequently transmitted to beacon detectors. Subsequent changes to the beacon operation need only be sent to central server 1004 as a single registration update.

In an embodiment, the number range associated with the beacon ID is configured to transmit sufficient bits of information to uniquely identify a user. For example, if a 16-bit word is used for the beacon ID, as many as 65,536 users may be supported. At present, this exemplary bit structure is more than sufficient to address the number of present FSS and FS users, which is approximately 1,500 and 27,000, respectively, as demonstrated above. As the number of FSS and FS users increase, the present systems and methods may be further advantageously scaled to accommodate such increases without system redesign. In one example, the word range of the beacon may be further reduced, but while supporting an even higher number of users. That is, ID numbers may be reused for where both users of the same ID are geographically separated from each other. Because both FS and FSS use confined transmitter radiation beams, the known geographic separation may significantly reduce ID word size. The present inventors contemplate that, given that the number of main FS users is 27,000 at present, this number reuse technique will enable a reduction of a 16-bit word to less than 12 bits, with a reuse factor of 16.

In practice, the beacon detection systems are installed at the location of each spectrum users, e.g., at the receiver site thereof, to detect potential interference to the user's service. In the exemplary embodiment, beacon detectors are installed at each FS receiver, which are much more sensitive to FSS transmitter interference than are the FS transmitters. Although the present embodiments are therefore particularly advantageous for FS users, the FSS beacon detectors nevertheless also provide further significant benefits to the overall system, namely, the measurement-based propagation techniques, which may be implemented at relatively low marginal costs in comparison with conventional techniques. The overall cost savings are even greater when implementing the uplink protection techniques together with the downlink protection techniques, described above, since both embodiments substantially utilize the same system beacon transmitter/detector infrastructure overlay and functionality.

In further operation of system 1000, the system detection sensitivity is sufficiently high such that, in normal use, potential interferers are identified well below the system noise floor before actually causing any interference. In practice, during the initial planning phase for the introduction of a new radio AP or FS, the operating parameters of the radio AP/FS are determined in advance to avoid any potential interference from the FSS, based on dynamic knowledge of the FSS operating parameters and the use of the MBP for greater accuracy. Similarly, for point-to-point microwave FS implementations, system 1000 further advantageously enables planning for new a FS use in such a manner that an existing FS will not cause interference to the new FS.

Accordingly, the further implementation of the present auxiliary beacon transmission and detection systems onto the newly-introduced radio AP/FS provides distinct advantages over conventional techniques. First, the present systems and methods provide a failsafe in the case of an unforeseen event; the real-time detection of the beacon may be used to control the operating parameters of the FS users. Second, the present systems and methods provide a real-time measurement based propagation (MBP) system that enables accurate pre-planning of the initial operating parameters open FS user to effectively avoid potential interference before the interference occurs. In combination, both of these distinct advantages form a closed loop system that advantageously enables the dynamically adjustable planning, monitoring, and control of interference in real-time. Furthermore, operation of the present central server improves Wi-Fi service by assigning non-interference channels to adjacent Wi-Fi APs, and point-to-point FS systems may be planned in advance to avoid interference from existing operations.

According to the advantageous principles herein, shared use of the Lower 6 GHz band may be further extended for future Wi-Fi, as well as other radio APs and satellite uplinks. The Lower 6 GHz band is ideally suited for such spectrum extension for Wi-Fi use. The Lower 6 GHz band is close to the spectrum that the FCC has designated for U-NII use. The present embodiments thus avoid the problems identified by the NTIA, above, and further, overcome the NTIA conclusion that there is no viable solution for U-NII devices to share the 5.35-5.47 GHz band with incumbent federal systems. The present systems and methods provide an innovative technical solution in the downlink for FSS/FS systems that allow each system to economically share the central infrastructure.

In the exemplary embodiment, each radio AP, such as a Wi-Fi AP, innovatively transmits a radio beacon in its guard band or co-channel which uniquely identifies the beacon transmitter. As described herein, the present embodiments distinguish between radio/Wi-Fi APs, on the one hand, and FS devices, on the other hand, as different devices. As described above, unlicensed devices, such as U-NII equipment operating under the Part 15 rules, achieve significantly lower EIRPs, and may therefore be managed differently from other devices, according to such factors as indoor/outdoor use, and/or individual and collective operating power. Another significant difference is, for FS, the Azimuth may be obtained during this coordination. However, in the case of small cells, the small cells are either omnidirectional, or else it is hard to obtain their respective Azimuths. However, according to the present systems and methods, the respective small cells may include beacons attached thereto, and the respective beacons may be detected at both the FS and FSS sites and the collected measurements passed thru to the central server.

In at least one embodiment, as described above, the interference from such small cell devices may be further reduced in the case where the small cell devices are mandated only for indoor use only. Although such mandates would be difficult to enforce, the known shielding effect of walls and metallized glass windows significantly reduces the potential for external interference on or from the small cell transmission. In an embodiment, system 1000 may be further configured to detect the presence of a small cell device operating outside of its mandated use.

To support a much large user group, the number space (word length) allocated to the beacon is accordingly increased as well. Where the same beacon frequencies are used, a contrast may be seen between the approximately 27,000 present microwave point-to-point links, against the millions of Wi-Fi access points presently available. Nevertheless, as described above, the number range of the IDs associated with these Wi-Fi APs may be significantly reduced by the present number reuse techniques.

In at least one embodiment, the systems and methods here further utilize two different beacon frequencies/frequency ranges: (i) one for FS microwave users, which is likely to require a significantly faster response time for any unforeseen interference; and (ii) another for the Wi-Fi radio APs, where a primary form of interference may be associated with an increase in the noise floor of the system, which in turn reduces the system capacity, and thus results in a much slower response time to potential interference. Accordingly, these different number ranges may support the enhanced link budget performance of the entire beacon system. Alternatively, if the link budget of the beacon detection system is increased to account for the relatively high propagation loss at the Lower 6 GHz band in comparison with the 4 GHz band, then a single beacon frequency may be implemented with an expanded beacon ID number range. In one embodiment, an indoor-only Wi-Fi AP may not employ its own beacon, as the cost of implementation may be greater than the risk of interference in comparison with an outdoor AP.

Referring back to FIG. 10 and system 1000, advantageous fixed network data communication techniques are achieved, which avoid potential interference into the FS from satellite uplinks (e.g., FSS sites), and from Wi-Fi APs. In both instances, the present systems and methods equip the satellite uplinks, the FS, and the Wi-Fi APs with beacon transmitters. The associated beacon receivers according to system 1000 will be, in the exemplary embodiment, geographically distributed.

The downlink implementation of system 1000 retains many of the innovative techniques of the uplink system 500 and associated protection scheme 400, as well as a substantial portion of the same hardware, and therefore the implementation of both of the downlink and uplink schemes together realizes significantly greater cost advantages. In an embodiment of system 1000, the beacon receiver may utilize one of several multi-antenna technologies, such as MIMO, to improve receiving diversity and sensitivity. Given the concentration of microwave links in populated areas, and the number of existing microwave point-to-point links to be approximately greater than 27,000, the present techniques are highly effective at measuring virtually all potential interference sources alone. In additional, the approximately 4,700-10,000 FSS in the 4 GHz band would also include beacon detectors. Many of these will have co-located the 4 GHz uplinks while separate Lower 6 GHz would also have beacon detectors.

For example, in the case of a single beacon detector at a given location, a steerable antenna may be utilized similar to that used with MIMO technologies, in order to detect beacons from different directions. Thus, each satellite dish located on a particular site can be pointed in a different direction, and this ability to steer the antenna advantageously enables a more accurate measurement of the effect on each separate dish.

In combination, the novel and improved beacon sensor network overlay could, at present, include as many as 30,000-40,000 sites in populated areas of the United States, with an equivalent cellular coverage of approximately hundreds of meters of radius. In an exemplary embodiment, the link budget of system 1000 is approximately 200 dB or greater, thereby enabling system 1000 to adequately measure interference significantly below the system noise floor. The present embodiments thus further improve over conventional schemes that realize link budgets greater than 200 dB because, as described herein, once a device is registered (including its operating parameters), only the beacon ID needs to be transmitted periodically to monitor environment changes which would affect interference propagation. In the exemplary embodiment, other changes to the operation of a user or AP would be instigated by the central server and directly recorded within its database, and would not need to be communicated to by the user or AP itself. The present embodiments are therefore particularly useful with respect to multiple access schemes developed for IoT, and may further implement Zadoff-Chu functions used in LTE, or Weak Signal John Taylor (WSJT) used in amateur radio communications.

The central server according to the present techniques therefore represents a new and improved form of a Spectrum Access Sharing System, which represents a key innovative component in the present closed loop system that plans, monitors and controls interference dynamically. This dynamic control is best illustrated according to the following advantageous examples of implementing the present systems and methods.

(1) In the initial planning phase for the introduction of a new radio AP or FS, the central server can supply operating parameters on grant for such successful introduction, because the central server has dynamic knowledge of the operating parameters of the FSS and other existing FS use. At present, FS usage requires study prior to grant. According to the present systems and methods though, the FS grant may automatic from the central server. As described above, the central server may optionally utilize conventional propagation models and optimization theory as a starting point, but automatically grant the new FS use based on the additional dynamic knowledge provided by the new beacon infrastructure overlay. The present systems and methods are able to advantageously consider the influence of neighboring APs sharing the band, and then calculate aggregation to the system noise floor, as well as direct interference.

(2) With knowledge of the transmitter powers, their EIRPs, and their location, together with the measurements from the beacon detectors, the present central server is able to more reliably build accurate propagation maps, with real-time measurements. Such real-time dynamic calculations thereby avoid the problems experienced through use of conventional propagation tools, which are intrinsically inaccurate because they necessarily require highly conservative assumptions to protect the most sensitive users in the model.

(3) Once the operating parameters of a user/AP have been established and registered, the central server is able to verify an optimal solution for each system element using only the received beacon transmissions (and subsequent real-time detections, such as by other beacon detectors in the vicinity), and the real-time measurements thereof, to accurately calculate the propagation model). The central server may reliably then confirm the propagation loss, and only then authorize the particular operation.

(4) Once the initial settings have been confirmed, then the central server monitors the specific interference, as well as the source thereof, to look for any changes in the environment which would necessitate changes in real-time. Most of the changes detected would be below a performance threshold, thereby allowing small infrequent changes. In some embodiments, such changes may be localized to a small area to avoid global changes (e.g., using optimization goals/optimization theory, and/or by using a pool of reserved frequencies in that local area). However, should a strong interference occur, then the detection of the associated beacon would allow rapid remedial action.

The techniques and inventions described above introduce new in the innovative systems and methods that enable a significantly expanded system for sharing access to the same spectrum, but described herein with respect to the designated 6 GHz band, both between an FSS and an FS, and also between radio access points and Wi-Fi access points. All such embodiments form a closed loop system that has the capability to plan, monitor and control interference in a dynamic fashion, such the system will allow shared use of the spectrum amongst competing users such that the maximum commodity of the spectrum is achieved.

The principles of the systems and methods described herein may be further adapted to: massive MIMO transmissions, utilizing beamforming at the AP/mobile base station to reduce interference to satellite systems in the downlink; beacon formatting and transmission schemes to allow for gradual power increases to the beacon; extending the effective detection range of an individual beacon beyond a 2.4-5 km limit for an individual site, where a network of widely deployed beacons may be directly or indirectly reported back to a central server, and particularly across populated areas; include on-site geo-distributed antenna arrays to reduce inaccuracies caused by multipath transmissions; computer programs and models to further refine the collection of real-time empirical data and more accurately manage spectrum sharing and re-use across a range of transmission bands; and technology upgrades to AP devices to include their own beacon detectors to better systematically link with FSS sites and other APs for more accurate path loss estimates and more secure protection.

The advantageous closed-loop configuration of the present embodiments therefore provides significant versatility in the implementation of protection schemes utilizing the disclosed beacon detection techniques. That is, interference is effectively eliminated irrespective of whether a spread spectrum is utilized, or a narrowband transmitter. Beacon detectors may be deployed as integral components of the satellite dish, or as separate antennas, but neither deployment will create interference to the satellite dish itself. The present techniques create a self-organizing and self-policing network of beacon detection components that avoids the need for overprotective safety margins, while unlocking significant—and previously unavailable—portions of the transmit spectrum for further usage, such as by mobile devices.

The present systems and methods are further advantageously applicable to new and developing 5G technologies, and also for frequency ranges both above and below the spectral bands described herein by way of example. For example, the embodiments described above for microwave point-to-point link protection may be implemented along lines similar to those described herein with respect to cm- and mm-Wave 5G frequencies. However, since 5G beam transmissions are steerable to the direction of the receiver (which can move), in an exemplary embodiment, the present beacon detector is configured such that the beacon detector is able to scan 360 degrees. In this example, each individual operator may be assigned different bands, and thus it is very important to monitor the adjacent channel interference. Where operators share the same spectrum, protection will more closely follow the microwave point-to-point embodiment of FIG. 10.

The central server of the present embodiments may be, for example, implemented within the context of current CBRS band infrastructures, as described above, where multiple SAS operators share information with regard to their registers users (e.g., APs) such that each SAS operator may individually perform the calculations needed to prevent interference. According to this current model, all SAS servers are considered equal, and there is no master server. The present embodiments though, enable a master server to be optionally designated. The present embodiments are further advantageously capable of realizing, in the case of a single operator, the deployment of a plurality of central servers in a cloud architecture in order to improve calculation speed, scalability and residence. In the exemplary embodiment, a master server for the infrastructure is designated to maximize such improvements.

UE Interference Management and Spectral Frequency Reuse

In the embodiments described above, although some of the registered FSS sites in the 3.7-4.2 GHz band may not be in use, the total number of these registered sites is nevertheless likely to exceed the number operating within the 3.55-3.7 GHz spectrum by at least two orders of magnitude. As described above, the CBRS band is considered manageable due to the relatively small number of FSS sites, whereas the 3.7-4.2 GHz band includes over 4700 registered FSS sites, and possibly as many or more unregistered FSS sites.

Signal path loss to a specific point within a cell is determined in consideration of a number of factors, including transmission, environment, and losses due to multiple signal paths (multipath) causing self-destructive interference. At locations within an FSS coverage area transmission modeling may be utilized to predict the available power from the antenna with respect to interference. As used herein, "coverage" refers to the geographic area around the FSS site where interference from terrestrial radio transmitters may cause interference. In general, the amount of power at the antenna output is a function of the amount of power provided to the antenna, as well as the antenna radio frequency radiation pattern. This power output and antenna gain is sometimes referred to as Effective Radiated Power (ERP) or, if referenced to an Isotopic antenna, the Equivalent Isotropically Radiated Power (EMI)), which is the product of transmitter power and the antenna gain in a given direction relative to an isotropic antenna of a radio transmitter. The EIRP is typically listed in dBi (decibels over isotropic), and enables the conventional determination of signal strength along various radials from the antenna. Other conventional techniques are known for calculating the ideal transmission loss utilizing transmitter power output, transmission cable loss, antenna gain, free space propagation loss, and antenna and receiver gain. However, such conventional techniques are only able to predict a theoretical, best case scenario for coverage.

Another conventional technique is known as environment modeling, which is used to determine the effect of terrain features between the cell site and a specific position within the cell. In conventional parlance, the term "environment" refers to these terrain features, and not to actual weather conditions such as humidity, precipitation, temperature, etc. In general, the signal path losses attributable to dispersion will increase as the inverse square of the distance from the cell site increases, however, environment factors can greatly affect these losses. Environment modeling considers the signal reduction due to the distance from an AP site, as well as diffraction losses caused by buildings or other terrain features between the cell site and the specific point within the cell. Furthermore, since radio propagation conditions vary significantly in typical operating environments, signal path loss models are known to account for the statistical variability of the received signal (e.g., environmental shadowing) by incorporating suitable power margins/offsets for the purpose of system planning. Nevertheless, as described above with respect to FIG. 1, such conventional modeling techniques still require highly conservative planning schemes that do not consider the actual conditions of the particular environment for the cell/AP site.

A third conventional modeling technique is used to predict the effect from multiple signal paths, and the resultant destructive interference therefrom, at the received location, i.e., multi-path fading. Multi-path fading results from multiple paths taken by a signal from the cell site to a specific point within a cell. Specifically, when two or more signal components arrive at a particular reception point in space after traveling different distances, the received signals from these different paths may no longer be in phase. Accordingly, when these different signals are reunited, the difference in their respective phase shifts may combine in a destructive manner, and produce a degraded sum signal at the specific point of interest. Thus, it is not possible in practice to achieve precision modeling of destructive interference because of the number of variables involved, their associated parameter accuracy, and the relatively short (e.g., 7.1 to 8.3 cm) wavelengths used by the FSS services (e.g., 3.6 to 4.2 GHz). Therefore, for system planning purposes, conventional multi-path modeling techniques typically include power margins/offsets in the path loss predictions to account for the effects of multi-path fading, and such statistical modelling is highly dependent on the environment. Similar to the other conventional modeling techniques, such margins/offsets typically require overly conservative predictive values.

Furthermore, when determining the signal path loss from the FSS site to a specific point, where an AP may be placed, under one or more of these conventional techniques, conventional signal path loss equations for cellular service communications must also be calibrated to accurately model the specific area around the FSS site. However, because the specific area around the FSS site might typically extend over tens of kilometers for consideration of interference with placement of potential interfering antenna at clutter or below clutter, such calibration is particularly challenging in practice and still require conservative protection margins. Conventional calibration techniques are known to calculate values for geographical environment parameters, in order to account for such factors as urban, suburban, and/or rural morphology, height differences between the transmitter and the remote receiver, and the density and height of terrain features between these two respective antennas. As described above, obtaining this information is expensive, and the information that is obtained is still subject to change according to changes in the terrain (i.e., buildings built/demolished, trees leafing in the spring, shedding in the fall, etc.). Seasonal foliage changes can have a significant impact upon signals in the 3.6-4.2 GHz downlink frequency range.

Effective interference planning thus requires the use of suitable models to adequately predict interference, but the conventional models described above are semi-deterministic or empirical, and therefore must be calibrated to the specific environments in which they are implemented, which involves modifying the particular model parameters to approximate the relevant measurement data. Some conventional propagation models include geographical parameters such as whether the environment is rural or urban, the ground height relative to the transmitter, and the terrain between the transmitter and receiver. In the conventional techniques, such environment information may be obtained from a source such as the Geographical Information System (GIS), but this information is not obtained in real time.

Conventional modeling techniques also do not sufficiently consider the interference effect from mobile UEs to the FSS site. Although an individual UE may transmit an EIRP that is an order of magnitude lower than that of a fixed AP (see Table 2, below), the density of multiple UEs with in the area of interest may often be at least an order of magnitude greater than the density of APs within the same area, and therefore the effect of multiple UEs may be as significant as, or greater than, an individual AP, and the UEs are likely to be more evenly distributed over the area than the APs. Moreover, because the UEs are mobile, and will often move locations around the terrain, the resultant interference effects from the UEs may abruptly change, for example in the case of a UE emerging from the shadowing effect of a building to obtain a direct line of sight to the FSS. Thus, the conventional modeling techniques described above, which are not based upon real-time measurements, are particularly limited in their ability to accurately predict interference to the FSS.

Through further development of the embodiments described above though, the real time measurement capabilities offered by the beacon-based infrastructure overcome these challenges presented by the conventional modeling techniques. The systems and methods described herein able to obtain (e.g., through implementation at the central server) a more accurate interference determination by first reasonably assuming that particular APs sharing the spectrum are at fixed points. Once the propagation loss between an AP and the FSS site has been established (described above) the server is able to assume that this established propagation loss of value is unlikely to rapidly change. However, in some instances, it may be impractical to utilize only the real-time beacon transmissions to determine the UE effects due to such considerations as (i) the considerable number of UEs that may be present within a selected area, (ii) the variable range of speed at which the mobile UE might be traveling (e.g., 0 km per hour (kph) for a stationary UE, up to 130 kph for a UE traveling in an automobile on the highway), and (iii) variable shadowing effects as a UE comes within range of taller or shorter buildings. That is, in some embodiments, beacon transmissions may be implemented at the UE level, in other embodiments, other parameters may be more practical to determine the UE effects on the FSS site.

Table 2, below, lists the CBRS (i.e., 3.55-3.7 GHz) EIRP transmitter powers according to device classification. As can be seen from Table 2, the EIRP of the typical UE device is considerably lower than the EIRP values of the several APs, namely, by an order of magnitude or more. Nevertheless, because the number of UEs that may be present within a given area around the FSS site may be an order of magnitude or greater than that of the number of APs, the following embodiments implement techniques for spectrum re-use and UE management around an FSS site.

TABLE 2

| Device Classification | dBm | dBm/MHz |
|---|---|---|
| AP - Category B: Rural | 47 | 37 |
| AP - Non-Rural | 40 | 30 |
| AP - Category A | 30 | 20 |
| UE - End User | 23 | 13 |

Spectrum Re-Use

Figure 11A:
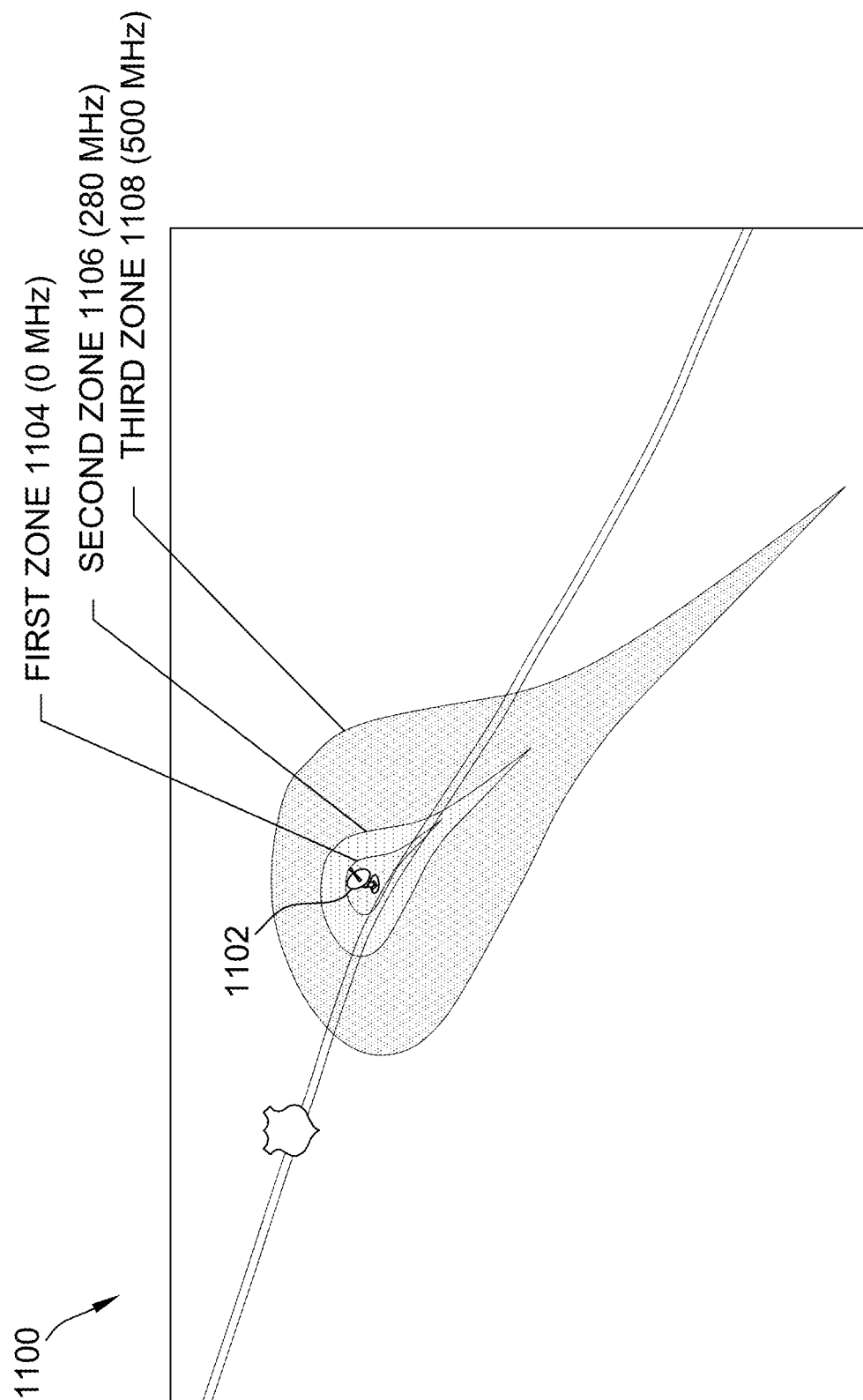
FIG. 11A depicts an exemplary protection zone layering scheme, according to an embodiment.

FIG. 11A depicts an exemplary protection zone layering scheme 1100 for an FSS site 1102. FSS site 1102 is surrounded by a first area zone 1104, a second area zone 1106, and a third area zone 1108. First area zone 1104 is smaller than, and encompassed entirely within, second area zone 1106, and second area zone 1106 is smaller than, and encompassed entirely within, third area zone 1108. For purposes of this explanation, second area zone 1106 excludes first area zone 1104, and third area zone 1108 excludes second area zone 1106 and first area zone 1104.

FIG. 11B illustrates a data table 1110 for calculating the respective parameters of area zones 1104, 1106, and 1108 according to scheme 1100, FIG. 11A. In the exemplary embodiment, data table 1110 is implemented to calculate zones of spectral use, with satellite gain profile, for the several device classifications shown above in Table 2 distributed radially around the FSS. In some embodiments, calculations according to data table 1110 are further implemented for adjacent channels and co-channel interference. Data table 1110 depicts values for minimum link budgets, as well as safe responding distances, regarding examples of a single interference source having the respective transmitter powers shown for the three different APs listed in Table 2. In the exemplary embodiment, data table 1110 includes calculated values based on measurements regarding a propagation model for a residential morphology, having transmitter antennas deployed below clutter (e.g., 20 m), and developed for 3.5 GHz. An AP operating in one of area zones 1104, 1106, 1108, may be limited to an amount of allowable power and/or available spectrum.

As illustrated in data table 1110, the calculated values assume a maximum interference value (e.g., noise input) of −129 dBm/MHz at the satellite antenna waveguide for co-channel, and includes defined limits for the first adjacent channel and second adjacent channel. As illustrated in FIG. 11B, higher limits for the first adjacent channel and the second adjacent channel take advantage of the out of band emission limits of 40 and 52 dB, respectively. In the particular environment measured to obtain the exemplary values illustrated in data table 1110, it is expected that higher safety distances would be yielded over the −60 dBm aggregate LNB blocking limit. The calculations illustrated in FIG. 11B are further shown with respect to the relative satellite antenna elevation(s) to satellite(s) in geostationary orbit. From the exemplary values shown in data table 1110, it can be seen that, at a measured elevation of approximately 35 degrees, −6.6 dBi of antenna gain is experienced from the terrestrial interference source. However, at 5 degree elevation, further north of this measurement location, the interference source would experience 14.5 dBi of gain.

According to scheme 1100 and data table 1110, therefore, the link budget for co-channel may be calculated as being equal to −129 dBm/MHz (representing the maximum interference value) minus (i) the antenna gain (i.e., as a function of the elevation) and the transmitter power (in dBm/MHz). Accordingly, two effective regions around the satellite of FSS site 1102 are provided, namely, within the main beam satellite, and outside of the main beam.

In the first effective region, which is within the satellite main beam, the positive gain profile of the satellite antenna is typically narrow. For a typical large satellite dish of several meters diameter, the half power (−3 dB) beamwidth is less than 5 degrees. However, for ITU interference analysis using a conservative approach, the gain profile is assumed to extend over +/−20 degrees, and this gain profile is defined according to: Gain (in dBi)=32−25*LOG 10(in degrees) with 0 dBi at 20 degrees angles around the center (e.g., not taking LNB filter into account). This gain profile equation thus follows the envelope of the satellite gain profile, which will have various peaks and troughs. Nevertheless, when implemented with respect to the dynamic closed loop the embodiments described above, the actual gain of the satellite obtained from real-time measurements may be used.

Data from data table 1110 is taken, for example, from an exemplary 3.5 GHz transmitter value, and assuming Non-Rural, Cat B Rural, and Cat A (e.g., height-limited to 6 m) APs, and a maximum number of end-user devices. Accordingly, the loss for residential below Clutter may be 15.2+45*Log D, where D is less than 200. For values of D greater than 200, the loss may be −53.9+75*Log D. In this example, external small cell deployment is assumed to be below Clutter. The data of data table 1110 does not assume indoor use, for which the relevant safety margins would improve. Additionally, the size of the exclusion area, away from the bore sight, may be dominated by −10 dBi, and calculations of LNB may be based on a single source, and then distance-modified for an equivalent hundred transmitters.

Use of such real-time measurements will thus advantageously enable the present systems and methods to advantageously implement significantly narrower gain profiles than what are typically assumed by conventional techniques. Data table 1110 thus provides safe distance values from the FSS site for an interferer, and for several types of frequency positions with respect to the satellite channel and the satellite elevation.

In the second effective region, which is outside of the satellite main beam the gain is assumed to be −10 dBi. In the exemplary values shown in data table 1110, an elevation angle of 48 degrees corresponds to −10 dB gain, and thus a corresponding safe distance may be adequately determined for the radius of this second effective region.

These two effective regions from the antenna around the satellite of FSS site 1102 thus account for the respective "tear drop" shapes illustrated for the respective interference zones represented by first, second, and third area zones 1104, 1106, and 1108. The present systems and methods advantageously utilize these effective regions such that portions of the unused spectrum that are not used by FSS 1102 may be used by APs that are relatively close to FSS site 1102 in distance.

In the exemplary embodiment illustrated in FIG. 11A, the "round" portion of first area zone 1104 has a radius of approximately 150 m. First area zone 1104 thus represents an exclusion zone within which an AP or UE may not use any of the spectrum. First area zone 1104 may therefore be labeled as a "red zone." Further to this example, the round portion of second area zone 1106 has a radius of approximately 300 m. Second area zone 1106 thus represents a "yellow zone," within which an AP may utilize 288 MHz of the available 500 MHz of spectrum, and for AP transmitter powers of 1 W (e.g., 30 dBm). Similarly, the round portion of the third area zone 1108 has a radius of approximately 750 m, and third area zone 1108 thus represents a "green zone," within which an AP may utilize the whole of the spectrum, and for AP transmitter powers of up to 4 W. Outside of the green zone/third area zone 1108, the same full spectrum is available for an AP, and for AP transmitter powers of up to 50 W. The exemplary embodiment illustrated in FIG. 11A is depicted for the use case two different channels. Other frequency utilization may yield different frequency availability.

In the example illustrated in FIG. 11A, these exemplary values were calculated under particular conditions. In actual practice of the these techniques, the central server may be configured to determine the actual power, spectrum, etc. and dynamically adjust such operating parameter to reflect changes to the utilization of the spectrum, the arrangement or number of APs (and also their associated UEs, or other significant changes to the environment.

The determination of these areas is calculated by the central server (SAS). They would be dynamic. For example, the available spectrum outside the red zone would be a function of the utilization of channels by the FSS. As it uses more channels less is available in yellow zone. Also, should the propagation environment change then the size of the zones can be re-calculated. This would influence the handover zones coordinated by the central server and the EPC. If interference was detected, then the safety zones could be increased.

As demonstrated from scheme 1100, and according to the exemplary values in data table 1110, the effective operating distances for an AP near FSS site 1102 are considerably closer to FSS site 102 than what is conventionally allowable, or possible, today (e.g., at present, the co-ordination distance for radio planning any potential shared use is 150 km). The amount of spectrum that may be re-used, and the safe operating distances thereof, are greatly improved according to these advantageous techniques, as well as the closed loop system of the embodiments described above.

Management of UE Interference

The advantages realized from the present embodiments are even further increased by the effective management of interference from the UEs. The present systems and methods further includes techniques to modify the effective transmitter EIRP to represent its own AP EIRP, as well as the sum of all of the individual UE transmitter powers associated with the particular AP, for interference calculations to adequately represent the effect of UE interference. In this example, the power of the UE is considered as a function of the multiple access scheme of the UE, which has a maximum EIRP value of 23 dB in CBRS.

Thus, in the exemplary embodiment, the effective transmitter EIRP resembles a single point for the interference calculation, with the single point representing the AP and its corresponding UE community. This "single point" assumption it is justifiably accurate for the approach of this exemplary embodiment, because the cellular coverage area radius of the AP is relatively small in comparison with the much greater distance of the AP to the FSS site, and because this approach scales with the power of the AP itself. Accordingly, higher power APs will be to be deployed at distances further from the FSS site. In the case of a UE having an EIRP of 23 dBm, associated with an AP with a transmitter EIRP of 47 dBm, the potential interference is significantly more dominated by the AP EIRP.

However, this likelihood compares the actual EIRP of the AP against the EIRP of a single UE. The present embodiments therefore further consider the effective transmitter EIRP to additionally reflect, in real-time, the number of UEs associated with the particular AP according to their multiple access scheme type. In some embodiments, this number of associated UEs is obtained through the beacon transmission/measurement techniques described above. In other embodiments, the number of UEs is obtained using a fixed line connection from the AP to the central server, thereby avoiding the need to transmit a beacon with such information each time there is a change to the number of associated UEs, which might occur often for some APs.

In at least one embodiment, the central server is configured to protect the FSS site by assuming a predetermined, or pre-loaded, number of UE devices associated with each class of AP. In this example, the pre-loaded number of UE devices represents a loading for the effective coverage areas of the differing types of transmitter. For example, more UEs may be associated with a Class B AP transmitter than might be associated with a Class A AP transmitter. Accordingly, if the number of UE devices actually associated with the AP is lower than the pre-loaded value, then no reporting of changes would be required from the AP. In such circumstances, the AP may be configured to only report the associated UE number to the central server when the pre-loaded number is exceeded, thereby advantageously reducing and/or minimizing the signaling across the system.

In some instances, the variance of UE power associated with a shadow effect may be assumed to be relatively small in consideration of the safety margins described above, such as in the case of APs located a significant distance from the FSS. Nevertheless, in an exemplary embodiment, the central server is further configured to provide an estimate from its particular propagation model to represent a maximum likely value of the shadow effect. This maximum likely value is of particular utility with respect to APs near FSS site 1102 in the yellow zone/second area zone 1106 outside of first area zone 1104 (the exclusion zone/red zone). Similarly, the central server may also be configured to estimate any significant multipath effects from the underlying propagation model, that is, which has been self-calibrated by registration of the respective beacons according to the systems and methods described above. Accordingly, in the case where shared use of the selected spectral band permits carrier aggregation with the CBRS band, the present systems and methods will further advantageously enable development of APs that support the whole of the aggregated band.

Figure 12:
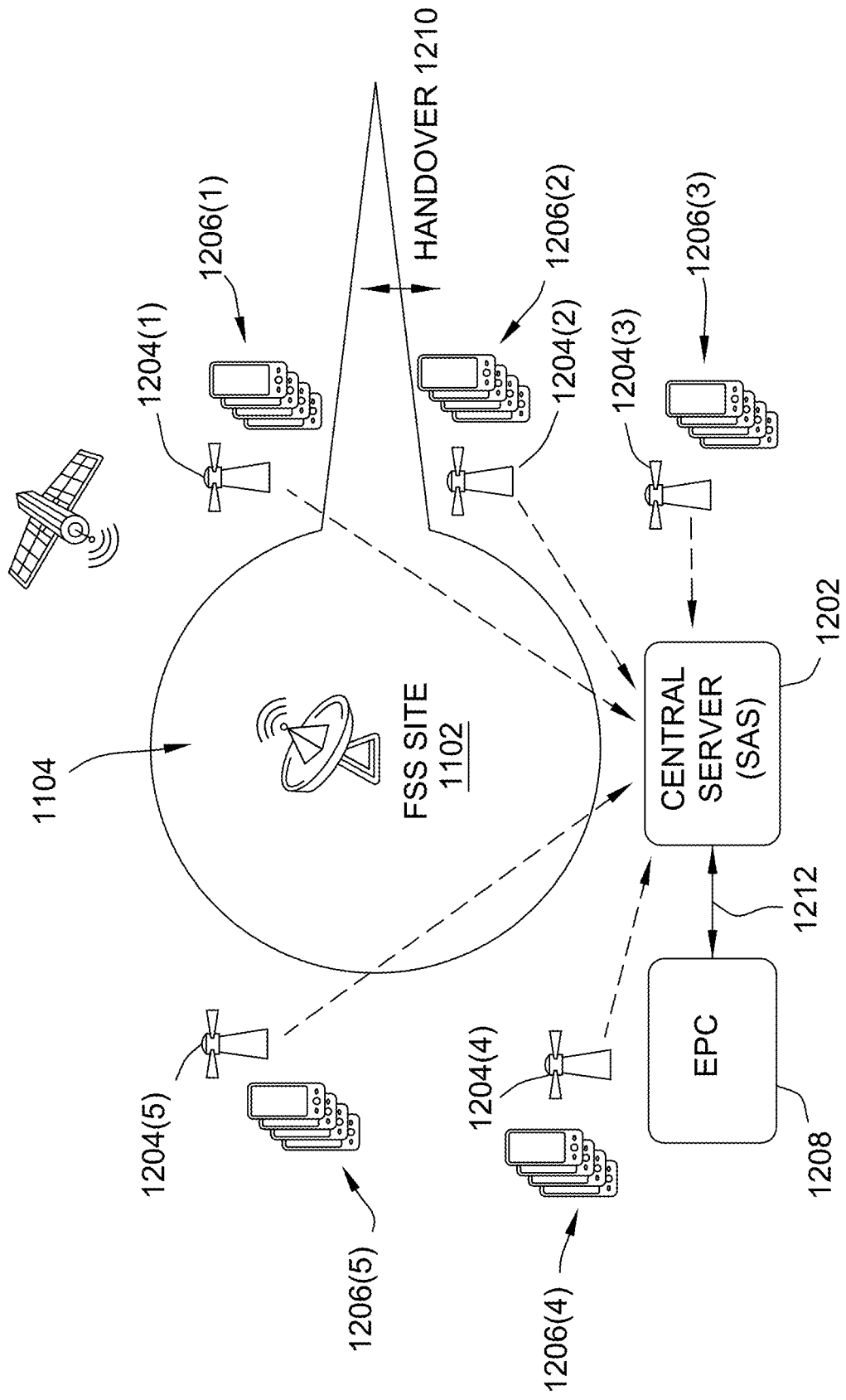
FIG. 12 is a schematic illustrations of a shared use system within the exclusion zone depicted in FIG. 11A, according to an embodiment.

FIG. 12 is a schematic illustration of a shared use system 1200 within the exclusion zone (i.e., first area zone 1104) around FSS site 1102, FIG. 11A. In the exemplary embodiment, system 1200 includes a central server 1202 (e.g., an SAS), a plurality of beacon-equipped APs 1204, with each AP 1204 having associated there with one or more UEs 1206. In the exemplary embodiment, system 1200 further includes a mobile core network 1208, which may represent an Evolved Packet Core (EPC) of a Long Term Evolution (LTE) network.

In exemplary operation of system 1200, contiguous service to the UEs 1206 may be provided even within the satellite exclusion zone of first area zone 1104 through implementation of a handover 1210 to one of the umbrella CBRS bands, or alternatively, another one of the mobile spectrum bands under the control of core network 1208. If, for example, a portion of the C-band is re-allocated for mobile use (e.g., the lower 200 MHz), while the remaining portion (e.g., upper 300 MHz) is retained for satellite use, the coexistence systems and methods described herein are fully applicable to enabling a handover to this re-allocated spectral portion where interference is detected. The principles of the present embodiments though, are not limited to this specific re-allocation case, or the particular spectral division even within this exemplary case. In the exemplary embodiment, handover 1210 is accomplished through utilization of a link 1212 between central server 1202 and core network 1208. In one example, handover 1210 may be triggered when a particular UE 1206(2), associated with AP 1204(2), comes within a defined distance from FSS site 1102. Further to this example, outside of the exclusion zone of first area zone 1104, association and use the given spectrum (e.g., C-band, etc.) may be implemented when in range of a small cell.

According to an exemplary embodiment of system 1200, central server 1202 may be further configured to permit no spectral band registration within the exclusion zone of the first area zone 1104 as the AP registration process will include the geographical coordinates of the AP. Under this embodiment, APs within the exclusion zone of a 3.7-4.2 satellite FSS may cover the whole 3.55-4.2 GHz spectrum, but only the 3.55-3.69 GHz spectrum would actually be available. In this example, the 10 MHz of spectrum from 3.69-3.7 GHz is withheld from availability to represent a guard band. In the case where no guard band might be required, this additional 10 MHz might also be made available. In an alternative embodiment, the macrocell of a Mobile Network Operator (MNO) is utilized.

According to the advantageous systems and methods described further herein, a more effective and accurate means is provided to represent the effects of UE-based interference on an FSS site, and particularly with respect to the particular spectral band and a UE associated with an individual AP. Such representative means is distinguishable over conventional techniques, and that it reflects the actual number of UEs associated with an AP in real-time, and further enables an accurate estimate of the statistical variation of the UE interference due to shadowing effects.

The present embodiments further advantageously enable the creation of a strict exclusion zone around an FSS site for protection, while still allowing UE use of CBRS and macrocellular spectrum within the exclusion zone. The present embodiments further provide a series of zones outside of the exclusion zone (two such additional zones described herein, but more could be realized within the scope of this disclosure), which increasing allow the use of the band spectrum at greater distances, and for higher transmitter powers. According to the exemplary principles described herein, contiguous UE service across is realized within the vicinity of an FSS site, and up to the location of the FSS site itself through use of a handover (e.g., with an EPC). This handover is further enabled by providing a new communications link between the EPC in the central server. The dynamic nature of these zones thus reflects the changes in FSS channel utilization, as well as changes in the environment.

The central server according to the present embodiments may be further advantageously configured to enable the combination of the CBRS spectrum (3.55-3.7 GHz) and the C-band spectrum (3.7-4.2 GHz), etc., within an AP, as well as the development of APs that more effectively utilize this combined spectrum. The central server may be further configured to prevent AP registration within the exclusion zone, while additionally being able to obtain the location of a given AP based on broadcast or hard link signal of a GPS location, or according to the other beacon transmission/detection techniques described above.

UE Beacons

As described above, the beacon infrastructure and techniques of the present embodiments are applicable to UEs, in addition to APs. Although, due to the vast number of UEs operating throughout the country, as well as the additional cost involved in extending the beacon infrastructure to the UEs and the related reduction in transmitter power that effectively reduces the link budget (and thus the system detection range), it might not always be practical to extend the infrastructure to all UEs.

Nevertheless, it is useful to enable the UEs to emit their own transmitter beacon in the case where the relevant AP or APs is/are close in proximity to the FSS site where the variance of the effects of the UE transmitter power would be more difficult to model or require overly conservatively protection limits. In an exemplary embodiment, a UE beacon may be provided using a client on the UE device or within its operating system, which is instructed to operate according to the central server. It may be assumed that such devices are close in proximity to the FSS site, however, the issue of limited link budget would not be a significant concern because the close-proximity of UE devices and also because this number may be considered to be relatively small.

Additionally, the use of UE beacons may be advantageously limited to be performed only, for example, during a training or calibration phase, and not as a continuous operation. That is, in this example, during an initial calibration phase, the UE beacons associated with a particular AP may be measured at different locations around the AP with which they are associated. These UE beacon measurements, together with the measurement of the AP beacon, may then be used to determine the effective AP transmitter power and its statistical distribution to represent the whole interference effect as a single point as function of the number of UEs, namely, the effective EIRP of the AP. Over time, central server may be configured to develop a detailed statistical model for the AP and the number of UEs associated there with. This statistical model may then be used to determine the safe transmitter power of APs in close proximity to the FSS site, for example, up to 500 m.

The central server may be further configured to dynamically reduce the allowed transmitter power of the AP by taking into account the shadowing effects of buildings within the area experienced by UEs. By accounting for the shadowing effects, the operation of the system is further enabled to directly reduce the AP interference, while also reducing the size of the coverage area of the AP, and thus the number of UEs that will likely be supported by the AP. In some instances, the central server may be configured to subtract the shadow effect of buildings on the edges of a particular area where the relevant UEs good instead be supported by a CBRS or macrocell, thereby rendering the total effect of the APs and associated UEs significantly more deterministic.

Figure 12A:
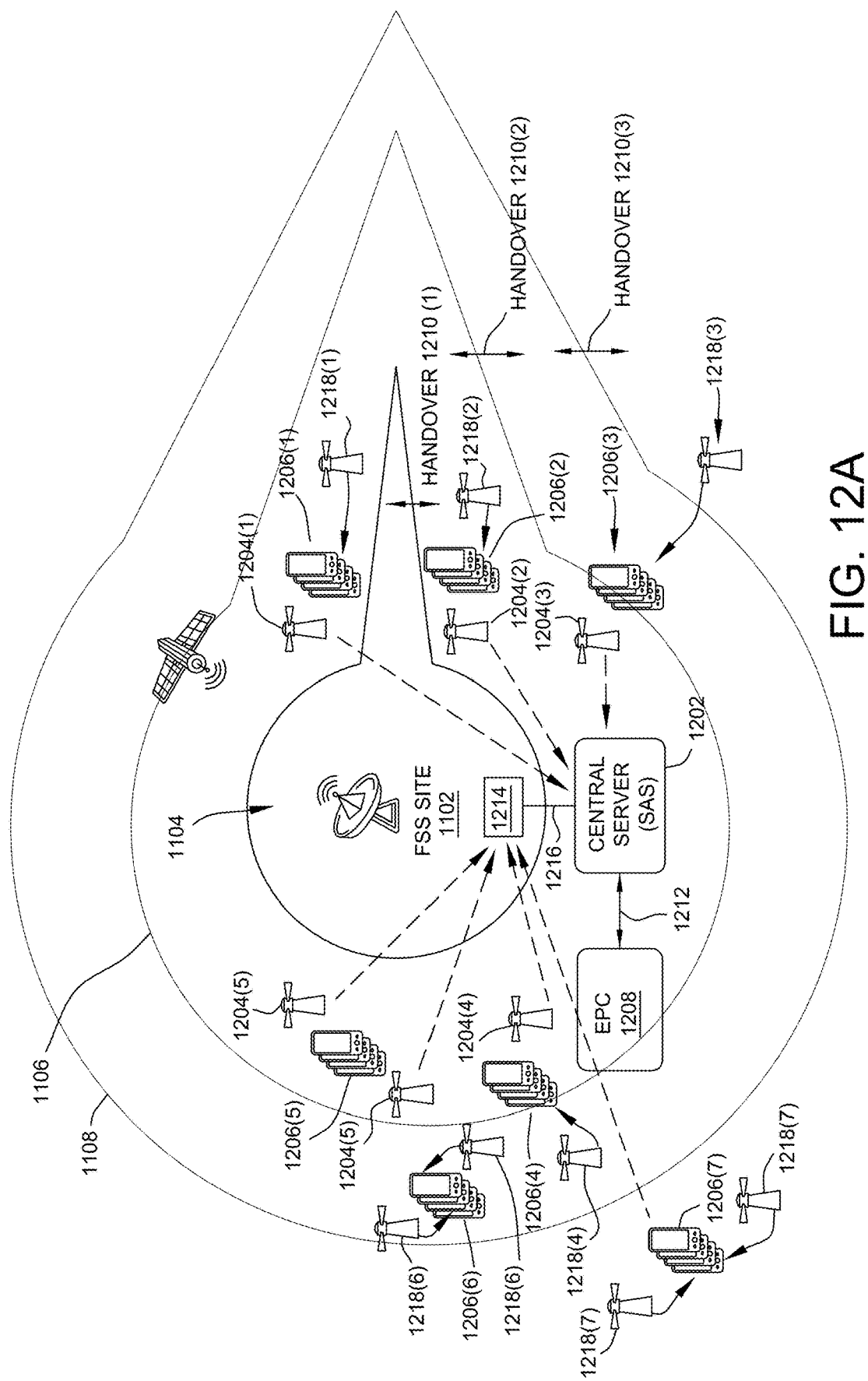
FIG. 12A illustrates a multi-zone operational distribution of UEs around the FSS site depicted in FIG. 11A, according to an embodiment.

FIG. 12A is a schematic illustration of shared use system 1200, FIG. 12, with respect to all three area zones (i.e., first area zone 1104, second area zone 1106, and third area zone 1108) around FSS site 1102, FIG. 11A. In this exemplary embodiment, system 1200 further includes at least one beacon detector 1214 within exclusion zone 1104, which has a fixed connection 1216 to central server 1202. In this exemplary embodiment, respective UEs 1206 include a UE beacon transmitter 1218, and measurement of the beacons transmitted from one or more beacon transmitters 1218 is performed by beacon detector 1214. The data measured from the received beacons may be then relayed to central server 1202 over fixed connection 1216. In other embodiments, a wireless link may be used where a fixed link is not available.

FIG. 12A thus illustrates a multi-zone operational distribution of UEs 1206 around FSS site 1102. In the exemplary embodiment, central server 1202 manages potential interference by preventing any of UEs 1206 or APs 1204 from broadcasting within innermost exclusion zone 1104 (red zone). In further operation the exemplary embodiment, system 1200 permits UEs 1206 within second area zone 1106 (i.e., UEs 1204(1), 1204(2), 1204(4), 1204(5) in the yellow zone), exploitation of the available spectrum, at reduced transmitter power(s). Outside of second area zone 1106, within third area zone 1108 (green zone), central server 1202 is configured to allow further spectrum availability, and at higher transmitter powers (e.g., UE 1206(6)). High propagation loss over distance from FSS site 1102 thus contributes to the additional spectrum availability and higher transmitter power in third area zone 1108. Beyond third area zone 1108, UEs 1206 operate in a conventional fashion (e.g., UE 1206(7)).

The examples described above are discussed with respect to UEs at distances of less than approximately 500 m from the FSS site. In the exemplary embodiment, at distances greater than 500 m, the effect of UEs 1206 may be alternatively modeled using the effective EIRP, which represents the AP transmitter power, and also considers the additional effect of the number and type of UEs associated with the particular AP. Under 500 m, such modeling techniques would not be expected to be as accurate due to the difficulty in modeling the effect of UEs 1206 as a single point source of interference coincident with the AP position due to the propagation variation associated with UE movement. Thus, in system 1200, UEs 1206 are configured to transmit a beacon from respective UE beacon transmitters 1218, when instructed by central server 1202, such that beacon detector 1214 is able to detect the transmitted beacon by measuring the received power against the position of the UE 1206 transmitting the beacon.

In an alternative embodiment, an exclusion zone of 500 m around the FSS is created, and in which central server 1202 permits no UE to operate using the 3.7-4.2 GHz spectrum. At distances of 500 m and greater, the UE may then be permitted to operate using the effective AP power. This alternative may be useful in the case where the system might more optimally determine that risk of interference is outweighed by the operational cost (e.g., power, computational requirements, etc.) of having the UEs transmit their on beacons, and the associated modeling computations that arise therefrom.

Similar to the embodiments described above, in the exemplary embodiment, the transmitted beacon includes the ID of the particular UE 1206, its transmitted power, and its GPS location/position. Through such measurements, central server 1202 is able to collect detailed measurements of the plurality of UEs 1206 associated with respective APs 1204, and dynamically model the interference management therefrom. In some embodiments, beacon detector 1214 is alternatively, or additionally, in communication with central server 1202 over a communication link other than fixed connection 1216.

The interactive functionality of central server 1202 with EPC 1208 thus enables handovers 1210(1), 1210(2), 1210 (3) from the associated spectrum (e.g., including the C-band), to either the CBRS or mobile network macrocells. Accordingly, any interference to FSS site 1102 from UEs 1206 may be avoided by locating the UE broadcast within other spectrum bands or C-band guard bands. In an embodiment, central server 1202 is configured to initiate and sequence the beacon transmission from both APs 1204 and respective associated UEs 1206. According to this exemplary multiple access scheme, the signaling load on system 1200, as well as the computational load on central server 1202, is significantly reduced, and conflicts are further advantageously avoided.

Through the collection of measured beacon transmissions from the several UE beacon transmitters 1218, a detailed coverage map of one or more APs 1204 may be built, dynamically and in real-time. Dynamically because these models can be updated from time to time to take into effect any environmental changes. This coverage map thus represents an effective means of representing the AP transmitter power, with an effective EIRP that reflects a sum of the individual respective UE transmitter powers associated with that AP 1204, as well as the type of individual UE 1206, and the associated variance of different UE positions. In an exemplary embodiment, central server 1202 is further configured to calculate a statistical distribution of respective UEs 1206, and utilize this statistical distribution within an optimization algorithm for protection of FSS site 1102.

Figure 12B:
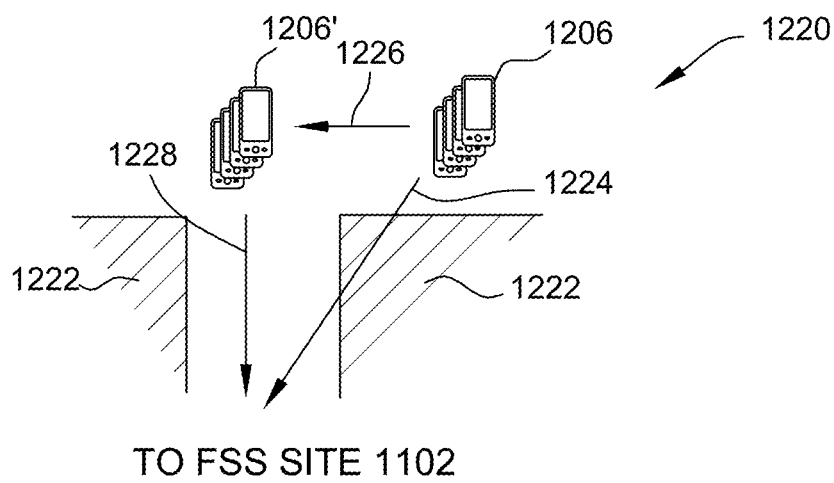
FIG. 12B is an overhead view of a partial schematic illustration of a corner effect, according to an embodiment.

FIG. 12B is an overhead view of a partial schematic illustration of a corner effect 1220. In the exemplary embodiment illustrated in FIG. 12B, corner effect 1220 is depicted with respect to a presence of the buildings 1222 disposed between one or more UEs 1206, FIG. 12-12A, and FSS site 1102. In this example, building 1222 is disposed along a first direct path 1224 between UE 1206 and FSS site 1102 at an initial position of UE 1206. As UE 1206 moves in a direction 1226, a second direct path 1228, between UE 1206' and FSS site 1102, is unblocked by buildings 1222. That is, movement of the UE 1206, from "behind" building 1222, and into a direct line of sight as UE 1206', can lead to a dramatic increase in the potential interference to FSS site 1102 when UE 1206' is in close proximity to FSS site 1102, in comparison with UE 1206 behind building 1222.

Figure 12C:
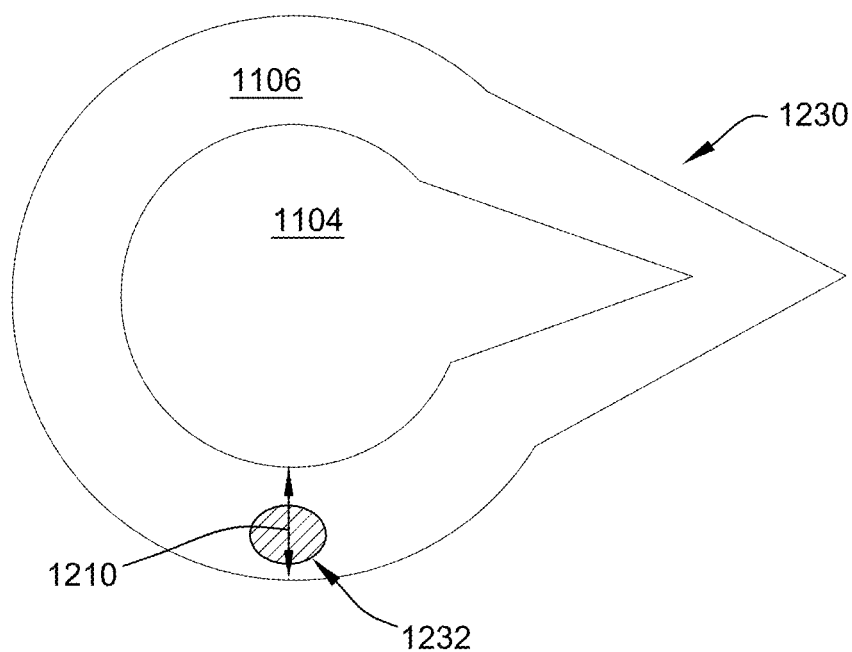
FIG. 12C is a partial schematic illustration of a hotspot effect, according to an embodiment.

FIG. 12C is a partial schematic illustration of a hotspot effect 1230. In the exemplary embodiment illustrated in FIG. 12C, hotspot effect 1230 is depicted with respect to handover 1210 in the vicinity of a hotspot 1232, and with respect to first area zone 1104 and second area zone 1106. More specifically, where there is unacceptably high signal strength from a particular UE 1206 to FSS site 1102, i.e., at beacon detector 1214, central server 1202 may be configured to coordinate with EPC 1208 to cause handover 1210. This region of unacceptably high signal strength thus creates hotspot 1232. In the exemplary embodiment, central server 1202 is further configured to identify such hotspots 1232 of potential interference during an initial calibration phase. In the case where hotspots 1232 identified during initial calibration, hotspot identification need not be a continual or ongoing operation of central server 1202. In some embodiments, central server 1202 may be configured to perform hotspot identification periodically, continually, or upon measurement of an environmental change. According to this advantageous embodiment, central server 1202 is further able to managing potential interference by directing APs 1204 or UEs 1206 to avoid hotspots 1232.

Similar to the embodiments described above, in the examples depicted in FIGS. 12-12C, the resulting propagation loss and lower UE transmitter powers may be considered to have a negligible effect outside of distances approximately 500 m away from FSS site 1102. The 500 m threshold in this example though, is discussed by way of example, and not in a limiting manner. As described above, transmitter power and the respective radii of area zones 1104, 1106, 1108 may vary. However, according to the several embodiments depicted in FIGS. 12-12C, central server 1202 is able to dynamically adjust the size of the respective area zones according to the dynamic measurements that are collected in real-time. System 1200 is thus able to further consider the relative distances and powers of APs 1204 from FSS site 1102. That is, as relatively high-power APs 1204 are located distances far from FSS site 1102, the contribution of UEs 1206 associated with that high-power AP 1204 is considered to be relatively small in comparison to the much stronger AP power.

Self-Calibrating Propagation Models

Several conventional techniques utilize empirical propagation models to determine FSS interference from other APs and mobile UEs for shared spectrum use and/or realization of the maximum commodity of the spectrum. One such conventional technique simulates wireless information transport systems using time and frequency dynamic effects on stationary and mobile systems. The technique employs several modules in a distributed interactive simulation structure to provide a real-time simulation output signal that is adjusted by voice and data inputs. Another conventional technique utilizes a computer implemented modeling tool for cellular systems that predicts signal strength in consideration of terrain effects and the presence of man-made structures. This conventional technique predictively models under the line of sight conditions, similar to the highly conservative propagation tools described above with respect to FIG. 1.

A third conventional technique performs interference studies in a two-step process, which first analyzes all potentially interfering systems to exclude systems that can be determined to not be causing interference, and second, performs a more detailed analysis on the remaining systems that cannot be excluded in the first step. This technique utilizes pre-calculated average terrain and roughness values, and substitutes an effective antenna height for the actual antenna height in its propagation loss calculations. A fourth conventional technique models radio field strength for cellular site coverage by automating sampling procedures, collecting data at various monitoring points, and interpolating the collected samples/data. An iterative approach is used to mitigate calibration errors, but conventional technique requires the introduction of noise into the data analysis to avoid convergence on a local minimum.

Accordingly, each of these conventional empirical propagation modeling techniques produce significant inaccuracies from the assumptions that are required in the respective model. Furthermore, calibration of these conventional empirical tools is expensive, and also particularly challenging for determining the interference to an FSS site from other APs/UEs for shared spectrum use. The following embodiments therefore further expand upon the innovative MBP model and beacon-based systems and methods described above. More particularly, the embodiments described further herein provide a more accurate and inexpensive self-calibrating propagation model is provided.

Referring back to FIG. 4, transmit frequencies and power levels may be authorized for an AP based upon a measured path loss, or on a calculation of the loss between the AP and the FSS site. In both instances, a propagation model may be implemented to calculate the respective loss. The present embodiments therefore derive a propagation model that overcomes the weaknesses of the conventional empirical propagation models described above. The exemplary propagation model described herein avoids the inaccuracies associated with the empirical models, and also the expense of calibrating the empirical models to achieve maximum commodity of the spectrum. The present propagation model embodiments represent significant improvements over the conventional models that are unable to determine from individual measurements the signal strength at every point within the cell, such that cell coverage can be confirmed, and problem locations can be identified and addressed. The improved modeling techniques herein allow cellular service providers, for example, to more optimally determine an initial cell site location, the optimum placement of additional cell sites, frequency planning, and required power levels at specific sites.

In the exemplary embodiment, modeling of the environment further considers the reduction of the signal caused by the distance from a cell site, as well as diffraction losses caused by buildings or other terrain features between the cell site and the specific point within the cell. Such considerations are determined in real time from the MBP scheme described above, and therefore represent still further improvements over conventional techniques, which are unable to accurately track the variance of radio propagation conditions that will inevitably occur in the typical operating environment. As described above, conventional signal path loss models are only known to account for the statistical variability of the received signal (e.g., environmental shadowing) by incorporating suitable power margins/offset calculations for system planning purposes.

In an exemplary embodiment, a propagation modeling scheme utilizes radio beacons to further implement MBP: (i) as part of the overall system that protects against/prevents interference to the FSS site from the introduction and service of an AP/RAP sharing the same spectrum; and (ii) to develop a self-calibrating, "learning," propagation model that becomes increasingly more accurate over time, such that the model substantially reflects the actual dynamic environment conditions in the system. In the exemplary embodiment, such self-calibration capability is automatic, and does not require (human) operator direction or intervention for cellular planning.

In some embodiments, utilization of the present propagation model may not be considered to play a significant role with respect to interference prevention. In other embodiments, as described above, the dynamic and closed loop nature of the propagation model is significantly advantageous to mitigate interference effects. Nevertheless, in either case, the exemplary propagation model described herein is particularly advantageous with regard to the planning of optimum coverage and capacity in the design and evolution of APs for a service provider. The present self-calibrating propagation model is further useful to identify "hot spot" regions of potential interference, which are conventionally known to be chaotic and unpredictable. The present propagation model still further is useful to identify areas where the multipath effect is significant; the present model enables the central server to accurately estimate the multipath effect for interference migration.

The propagation model described herein further avoids the problems encountered through implementation of the conventional empirical models, but without sacrificing some useful capabilities of the empirical models. That is, the present propagation model is advantageously scalable, and may be configured to enable to include additional margins built into the system model to address potential interference that night not to be fully addressed by measurements only. For ease of explanation, the embodiments below are described with respect to one particular example in which operation of the system is based on a requirement to achieve a beacon link budget of at least 200 dB (satellite elevation of 5 degrees with a significant number of APs). Although different link budgets and other parameters are well within the scope of this application, the examples below are illustrative to demonstrate the detection of distance co-channel interference from multiple sources. Such multiple source detection may be achieved, for example, through transmission and detection of the unique ID of the AP (e.g., to minimize bandwidth usage, described above), or according to one or more complex detection schemes designed with respect to IoT applications.

Figure 13:
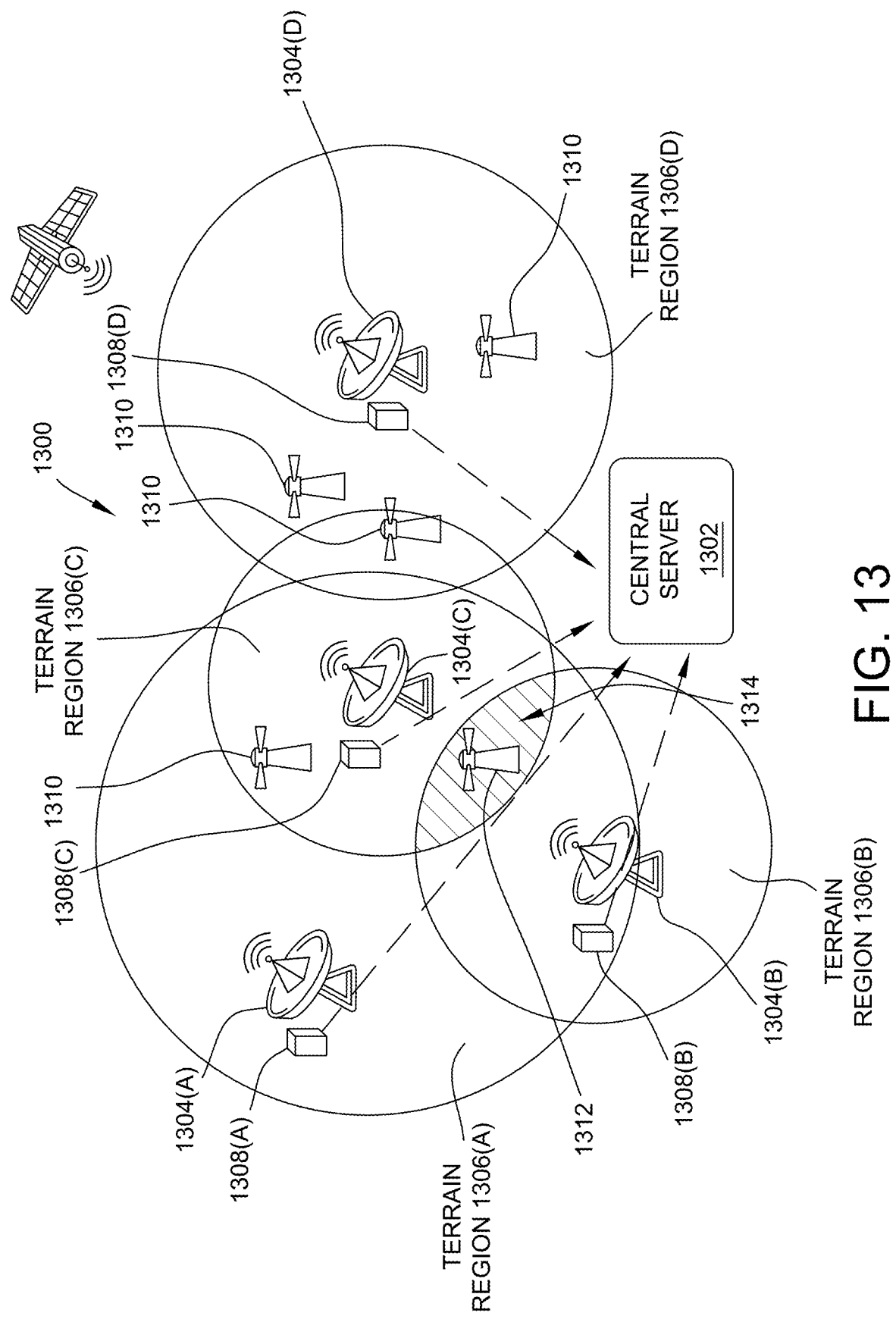
FIG. 13 is a schematic illustration of a shared use system that implements a measurement-based protection scheme for a self-calibrating propagation model, according to an embodiment.

FIG. 13 is a schematic illustration of a shared use system 1300 that implements an MBP scheme for a self-calibrating propagation model. In the exemplary embodiment, system 1300 includes a central server 1302 (e.g., an SAS) for managing interference to a plurality of FSS sites 1304 (four such FSS sites shown in this example, 1304(A)-1304(D))). In this example, each FSS site 1304 operates within a respective terrain region 1306, and each FSS site 1304 is equipped with at least one respective beacon receiver 1308 in operable communication with central server 1302. A system 1300 further includes a plurality of beacon transmitter-equipped existing APs 1310 distributed among the plurality of terrain regions 1306. As illustrated in FIG. 13, an individual one of the respective terrain regions 1306 may overlap with one or more other terrain regions 1306.

In exemplary operation of system 1300, each of beacon receivers 1308 records the signal strength of a beacon transmission detected from one or more existing APs 1310, similar to the embodiments described above. In at least one embodiment of system 1300, one or more of beacon receivers 1308 is further configured for direct connection to central server 1302, and dynamically informs central server 1302 of the operating conditions (e.g., channel of operation, location, pointing direction, etc.) of the respective FSS site 1304.

In further exemplary operation of system 1300, a beacon transmitter-equipped new AP 1312 is introduced and seeks transmit authorization from central server 1302, similar to the operation of system 500, FIG. 5. In this example, new AP 1312 is located within an overlapping region 1314 that extends across portions of each of terrain regions 1306(A), 1306(B), and 1306(C). Introduction of new AP 1312 into system 1300 may, for example, be performed in a manner similar to process 600, FIG. 6, such that new AP 1312 may share the same C-band spectrum, within overlapping region 1314, as FSS site 1304(A), FSS site 1304(B), and FSS site 1304(C). In the exemplary embodiment, the self-calibrating propagation model of system 1300 is implemented by central server 1302 within step 606. Process 600 otherwise may be implemented in a manner similar to that described above with respect to FIG. 6.

That is, central server 1302 of system 1300 is configured to implement step 614 such that new AP 1312 AP transmits a beacon which is detected by beacon receivers 1308(A), 1308(B), and 1308(C). In the exemplary embodiment, the detection by the respective beacon receivers 1308 occurs substantially simultaneously. Similar to the embodiments described above, the beacon transmitted by the beacon transmitter (not separately shown) of new AP 1312 includes the unique ID of that particular transmitter and/or AP, as well as the transmit power of beacon transmitter itself. In some embodiments, the beacon transmitter is further configured to transmit location information (e.g., GPS data and/or map data in x, y, z co-ordinates), as well as the number of UEs associated with new AP 1312, over a fixed communication channel, wirelessly, or over the Internet.

In the exemplary embodiment, information other than the beacon ID is transmitted over the Internet to maximize efficiency, and thereby further enhance the link budget of system 1300 by reducing the overall information content between beacon transmitters and receivers. In at least one embodiment, central server 1302 is further configured to manage not only potential interference from new AP 1312 to all FSS sites 1304 encompassing overlapping region 1314, but additionally potential interference by UEs (not shown in FIG. 13) associated with new AP 1312 (as well as existing APs 1310, as needed) along with consideration of the measured path loss.

Central server 1302 may, for example, include an SAS, and may be further configured to calculate the respective three-path loss associated with the three separate links (not separately shown) between new AP 1312 and FSS site 1304(A), FSS site 1304(B), and FSS site 1304(C), respectively, to determine if there is likely to be interference. In at least one exemplary operation, FSS site 1304(D) is also able to detect the beacon transmitted by new AP 1312, thereby resulting in a four-path loss calculation. In this instance, central server 1302 of system 1300 is configured to calculate four propagation models, respectively, representing the four different terrain regions 1306 (in the example illustrated in FIG. 13) associated with each FSS site 1304. That is, central server 1302 manages the introduction of new AP 1312, and the potential interference therefrom, according to the four different morphologies.

In one exemplary morphology of FSS site 1304(D), if the signal strength of the beacon (i.e., transmitted by new AP 1312) received at beacon receiver 1308(D) falls below the sensitivity of beacon receiver 1308(D), the beacon will not be successfully detected. In such cases, central server 1302 is configured to determine that new AP 1312 would not cause interference two FSS site 1304(A). That is, although the beacon signal would have fallen below the threshold for detection at 1308(D), the beacon may still be detected by other APs, which will have reported such beacon detection to central server 1302. Therefore, central server 1302 will still be able to verify that the beacon signal from AP 1312 was originally transmitted.

In the embodiments described above, the self-calibrating propagation modeling technique not only serves an important role in the authorization process for subsequent transmissions by new AP 1312, the new technique further provides valuable information pertaining to the calibration of each of the four respective propagation models for each potential communication pathway. Although each of the four respective propagation models may be calculated in similar manner as with respect to one another, each model will involve different associated parameters.

Systems and methods according to the exemplary embodiment depicted in FIG. 13 further advantageously enable the real-time identification and remediation of potential interference. That is, although the primary function of the beacons described above is to enable MBP, because each potential source of interference will have its own unique ID, central server 1302 is enabled to immediately identify and remedy the interference by instructing the interfering AP to cease operation and/or use a different frequency/transmit power, similar to the remediation steps of process 600, FIG. 6. According to the improved configuration of system 1300, such interference may be detected and remedied either during the initial installation phase, or during subsequent operation. In the exemplary embodiment, beacons are periodically transmitted according to a schedule, such that the overall health of system 1300 may be maintained even as changes occur to the system environment. In at least one embodiment, central server 1302 performs regular measurements and calculates statistical variations over short time periods, such that further valuable multipath information is advantageously provided to enhance the overall interference protection by including a margin for the statistical variation, separately from or in addition to specific parameter measurement values.

Similar to system 400, FIG. 4, system 1300 may also be configured such that individual beacon transmitters transmit to other transceivers (e.g., beacon detectors, central server, other beacon transmitters having a receiver component) within range, and feed the signal strength back to a centralized database of central server 1302, which thereby significantly enables central server 1302 to train the propagation tool to be more effectively self-calibrating. In conventional systems, information is collected by physically driving automotive vehicles equipped with signal measurement equipment and GPS technology along the respective signal paths to log into the measured values. According to the improved techniques according to system 1300 though, central server 1302 and beacon receivers 1308 are configured to automatically collect the measurement information with each beacon transmission, since the location of each AP is considered to be fixed, and the respective beacon ID is recorded upon registration, the new measurement information may be recorded without having to recalculate the AP, and by verifying the beacon ID using a lookup within the database of central servers 1302.

Because, in the exemplary embodiment, the beacon transmissions are transmitted regularly, the self-calibrating propagation model of system 1300 is able to evolve over time, and thus rapidly represent the true and accurate dynamic conditions in each terrain that occur in real time.

The dynamic self-calibrating features of the present embodiments further provide the advantageous extension of the beacon infrastructure into a form of self-organizing protection (SOP). Specifically, apart from the primary beacon function for MBP, the present embodiments further enable the configuration of central server 1302 such that the introduction of new AP 1312, or its periodic beacon transmission, will serve to additionally measure the transmission loss to existing APs 1310 to yield further valuable information useful for network planning, such as FDMA, and for improving the underlying self-calibrating propagation model for the whole area of the plurality of terrain region 1306. According to this advantageous configuration, the MBP capabilities of the beacon infrastructure described above are effectively extended to SOP. Whether directly or indirectly implemented for FSS protection, the exemplary embodiment of FIG. 13 nevertheless yields considerable information useful for the inexpensive calibration underlying self-calibrating propagation model. In some embodiments, the beacon ID is transmitted over a dedicated signaling channel. In other embodiments, the beacon ID is transmitted over a guard band close to the channel of potential operation.

In a practical example, system 1300 may include thousands of existing APs 1310. In such instances, the introduction of a new AP 1312, along with the announcement of the beacon/beacon ID associated there with, will yield potentially hundreds of measurement data points (or more) at other locations, and substantially at the same time as the corresponding measurements at the relatively fewer FSS sites 1304. According to this example, existing APs 1310 may be structurally configured to include an additional radio receiver dedicated for beacon detection, which may be specifically tuned to the relevant beacon signaling channel or guard band. This exemplary configuration further allows a main radio of the system (not shown), such as for an LTE network, to operate full-time on communication, with the secondary radio on full-time beacon detection service. Where only one radio receiver is included, an LTE network radio might be disturbed if required to periodically go into a listening mode/pre-planned listening mode. According to these advantageous techniques, as the concentration of APs within one or more terrain regions could effectively converge the self-calibrating propagation model with the regular MBP functioning of central server 1302, since the transmission loss vectors between the individual points in space will have already been measured and continuously updated. In the case of the system reset, the evolving self-calibrating propagation model may be restarted and run until the concentration of APs increases to a level to render the propagation model unnecessary.

Figures 3A, 3B:
FIGS. 3A-3B illustrate data tables for gain and separation distances according to the conventional protection scheme depicted in FIG. 1 and system depicted in FIG. 2.

In an exemplary embodiment, central server 1302 is further configured to consider the range of individual beacon transmissions. Referring back to FIG. 3A, for an azimuth of 0 degrees, a satellite dish elevation of 5 degrees, and a satellite gain of 14.5 dB, the limit for co-channel interference is 180.5 dB with a single interference source within the satellite main beam. Accordingly, allowing for higher gain antennas and multiple sources, it can be seen that a link budget of at least 200 dB would be required for an elevated 5 degree FSS site. In some cases, link budgets of up to 240 dB are achievable. However, according to the advantageous embodiments herein, it will not be necessary to require significantly greater link budgets, since the amount of additional interference from this difference would be considered to be relatively small. Nevertheless, in at least one embodiment, central server 1302 may be further configured to include a fixed penalty in its interference calculations to account for this relatively small increase in interference.

The present systems and methods are further advantageously capable of considering, within the self-calibrating propagation model, respective atmospheric effects encountered by the system, such as troposphere scatter, which may results in unpredictable long-range propagation behavior. For purposes of this discussion, "atmospheric" is defined differently from "environmental," as described above. Atmospheric effects are not only highly unpredictable; such effects also tend to be very short-lived. Conventional systems are thus incapable of determining the atmospheric effects on the system in real-time. According to the present systems and methods though, the MBP capabilities achieved from the beacon infrastructure is further useful to identify the source of the AP(s) subject to the atmospheric effects, and then control the potential interference resulting from the affected AP(s).

In the conventional systems, the unpredictability of the potential atmospheric effects is often cited as a reason for requiring such large protection zones around an FSS site. In practice, however, the protection zone requirements are often because of the mobile use case, which involve sharing with macro-cells, which are designed to have antennas above clutter, in order to provide longer range cellular coverage. Nevertheless, such affects may migrated by the use of small cells below clutter, which take advantage of the more hostile propagation conditions. This migration though, effectively rules out the shared band use with the respective macro-cellular base stations, which have antenna heights above clutter, and hence suffer relatively low propagation losses to those antenna below clutter, as illustrated below with respect to FIG. 14 (as described further below, small cell use may be realized within the scope of the present systems and methods).

Figure 14:
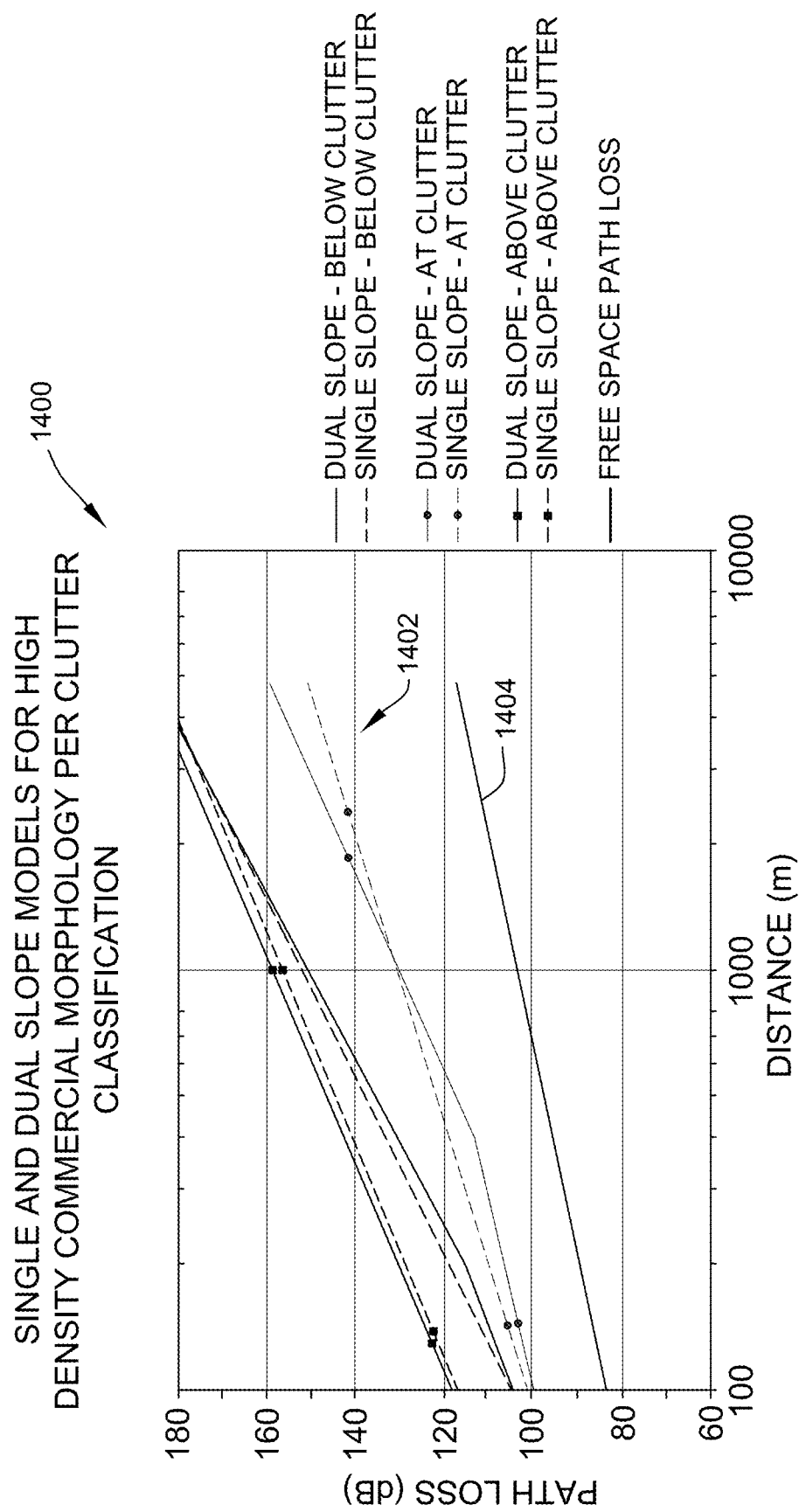
FIG. 14 is a graphical illustration depicting comparative data plots of single-slope and dual-slope models for high density commercial morphology-per-clutter classifications, according to an embodiment.

FIG. 14 is a graphical illustration 1400 depicting comparative data plots 1402 of single-slope and dual-slope models for high density commercial morphology-per-clutter classifications. In the example illustrated in FIG. 14, the path loss (vertical axis, in dB) is plotted against distance (horizontal axis, in meters) for both of the single-slope and dual-slope models, and for both model types below clutter, at clutter, and above clutter. As illustrated in FIG. 14, the comparative data plot 1402 are charted against a free space path loss plot 1404. In an exemplary embodiment, one or all of comparative data plot 1402 and free space path loss plot 1404 are utilized within the self-calibrating propagation model described above.

According to the advantageous techniques described herein, small cells may therefore be deployed below clutter to share the same spectrum as the FSS site using the relevant spectral band. The present embodiments further provide the self-calibrating propagation model that uses a beacon infrastructure to more accurately measure the interference contribution from the one or more APs sharing the same band (e.g., the C-band) as the FSS site. This new propagation model further enables the central server capability to detect environmental changes, and then incorporate those detected changes within its calculations to dynamically protect the FSS sites.

The present systems and methods further enable the capability of the shared use system, using the unique IDs of the separate beacons, to detect both short and long-range interference. Using the MBP scheme of such beacon detection, the system is further enabled, at the central server, to control the individual APs to mitigate the potential interference. The self-calibrating capabilities of the propagation model further enables a significantly improved capability for the design and optimization of AP coverage and capacity for mobile systems, as well as the measurement of individual beacon signal strength to assess the potential multipath effect, and thereby build in additional parameter or statistical variation margins for still further interference protection. The same beacons may be used for self-organizing protection, and for a learning calibration model that automatically improves the accuracy of the propagation modeling over time. The present systems and methods are additionally scalable, and may include two separate radios, with one such separate radio dedicated for beacon detection.

Increased Beacon Detection Range

Further to the beacon infrastructure embodiments described above, it is desirable to increase the range for beacon detection, and particularly within the 3.55-4.2 GHz CBRS-FSS band, such that potential sources of interference may be more optimally detected and managed. That is, the beacon detection range should be sufficient to not only detect any source of potential interference, but also to enable the central server to better plan the spectrum utilization across the region managed by the central server. The greater the range of a beacon, the more APs it will encounter. Each of these APs may then be directly managed by the central server to ensure a more efficient global optimization solution.

The utilization of radio beacons associated with C-band APs (as well as other spectral transmitters), as described above, enables the identification of the beacon transmitter, as well as the detection and the determination of the FSS interference contribution from each individual transmitter. However, successful detection of a beacon transmission is subject to finite range, or maximum path loss, which is a significant consideration. That is, the ability to detect the beacons must achieve a minimum sufficient level such that the central server is able to observe all significant interference, and thereby implement the closed loop system to manage and control interference to allow sharing of the band with both satellite users and other terrestrial radio communications.

For example, in order to detect transmitters causing potential co-channel interference, the central server must, under present regulations, consider distances up to 150 km from the FSS site. Additionally, the beacon detection systems described above should also be capable of determining the effects of aggregation of all transmitters, in the entire 500 MHz (e.g., C-band), and up to 40 km from the FSS site. Until new operating regulations are adopted, these conservative limits must be addressed by the present systems and methods. Nevertheless, it is important to note that the conservative limits of the present regulations were defined according to the conventional techniques, which did not include the closed loop system of the present embodiments. As described above, the present techniques enable significantly lower transmission power and distance limits from the FSS site, but without reducing the interference protection to the site.

More particularly, for the lowest elevation angle of 5 degrees, and an Azimuth of 0 degrees, the satellite dish would be assumed to have a gain of 14.5 dB. For a 1 W transmitter in a 10 MHz bandwidth, the required minimum path loss is then 180.5 dB for a single co-channel interference source. For high elevation angles, the minimum link budget would then be lower than the minimum path loss value, thus yielding greater beacon detector ranges. For this example, implementation of WSJT in the beacon infrastructure described above will then advantageously allow a maximum path loss of 198 dB at a transmitter power of 1 W with an isotopic antenna. In the case where directional antennas are implemented instead of (or in addition to) an isotropic antenna, the link budget may be even further extended, as described in greater detail below.

Accordingly, for a one-minute Private Use Area (PUA) 43 transmission, e.g., containing 28 characters sent at 0.5 characters per second, the transmission can still be copied down to approximately 27 dB below the level of receiver noise. Post-detection averaging can yield nearly another 6 dB improvement in 0.5 hours of alternating one-minute intervals of WSJT transmission/reception. PUA 43 is cited in this example because of its decoding capability at low SNR values. Fast detection using PUA 43, however, requires very accurate alignment of the receiver local oscillator with the transmitter. Because the LNB frequency offset may span several kHz, costly GPS discipline and/or Rubidium based frequency reference techniques are often further required. Furthermore, an additional margin of 33 dB for WSJT can be quickly consumed by an increase in the number of transmitters. It should be noted though, that the gain of a satellite dish is typically defined over a relatively small angle, and within these small angles that this co-channel considerations are significant.

According to the innovative systems and methods herein, the beacon infrastructure advantageously implements a beacon format that (i) carries necessary information, such as the unique Radio Access ID used for identification, (ii) supports significantly lower SNR values, (iii) is measurable at the receiver, (iv) is able to utilize existing receiver systems, or alternatively implement lower-cost transmitters and receivers, and (v) supports a multiple access scheme that enables implementation of a large and/or scalable number of transmitter beacons. WSJT techniques are described herein by way of example, and should not be interpreted in a limiting sense. The present embodiments may also implement other modulations schemes, such as WS propagation reporting, or schemes used in IoT applications, such as Lora or Ingenu. In Ingenu, for example, random phase multiple access scheme has a maximum path loss of 176 dB for 1 Mbit/s signal. In an exemplary embodiment, the information requirement for the beacon does not require such as high speed, 1 Mbit/s, therefore the link budget can be accordingly increased with a much lower speed. As described above, some LTE modulation schemes additionally utilize Zadoff-Chu (ZC) functions/sequences.

The present embodiments are thus able to calculate loss for a UE utilizing LTE as equal to −53.9 dB+75 Log(D) (e.g., D in meters), in a measured 3.5 GHz propagation model. In this example, the beacon range is calculated according to a worst case operational scenario, where loss is assumed to be greatest with increasing distance below clutter in a residential morphology. According to these assumptions, the upper limit of the detection range is calculated to be 2.7 km. In practical applications though, different from this example, other morphologies in a typical city environment may yield detection ranges of up to 36 km, whereas rural morphologies may yield even greater detection ranges. In the case where the infrastructure described herein is implemented primarily (or entirely) for small cell use below clutter, the effect of transmitters beyond a 200-220 dB maximum path loss is likely to be insignificant with respect to the parameters described herein, and therefore these conventional maximum path loss requirements are significantly more conservative than would be required according to the present dynamic closed loop system. See also Table 3, below.

In another example, assuming the minimum path loss to be approximately 180.5 dB for co-channel interference, for a 14.5 dB satellite gain having a minimum elevation angle of 5 degrees, 0 degrees Azimuth, and a single 1 W transmitter in a 10 MHz bandwidth for a single interferer, then a 180.5 dB yield is obtained at a minimum distance of 1300 m. Beyond this distance, a single interferer would increasingly contribute less than the present FCC interference limit, that is, as the distance further increases. Further to this example, by doubling the distance to 2600 m, the loss would be 203 dB, and the same interference source would then be contribution less than 1% of the FCC threshold limit. In this example, the main beam of a satellite having a Full Beamwidth Half Power point of 5 degrees is considered. Implementation of the present beacon detection systems and methods on existing conventional satellite systems link budgets of approximately 200-220 dB would thus enable measurement and control of all significant interferers within the main beam of the satellite. This particular example represents a worst case scenario, in the sense that an FSS with higher elevation angles would require a lower protection budget, and thus support a greater beacon transmission detection range.

At present, the United States contains a relatively large number of registered FSS sites across the country (e.g., approximately 4700), the positions of which correlate fairly closely with the population density, and thus the relative levels of mobile use by such populations. Theoretically, a number of the registered FSS sites may not be in use, it is nevertheless believed that the number of sites that are actually in use is quite high, and may even exceed the number of officially registered FSS sites when unregistered FSS sites are considered. However, unregistered FSS sites that consider future mobile use for this spectrum are more likely to seek registration. Accordingly, in the case where different APs are likely to share the 3.7-4.2 GHz spectrum, these APs are likely to affect more than one FSS site within range of the AP (e.g., registered and unregistered).

The detection range of an FSS site might be seen as limited, when considering only that FSS site and its beacon detector individually, and also compared with present limits of 150 km and 40 km. However, if all of the beacon detectors of the infrastructure are considered together, the detection range may be significantly increased. Specifically, by implementing a beacon detector at each FSS site, and then networking all of the beacon detectors to the central server/SAS, the detection range is effectively extended considerably beyond the 2.7 km that might be expected according to the propagation model calculations described above. Other morphologies may support significantly higher distances due to lower attenuation losses. According to the present embodiments, the detection range can be extended even further through the calibration techniques of the propagation model using the real-time measurements of the MBP, as also described above.

For example, when a beacon is transmitted (e.g., by a new AP requesting to transmit) below the capability of the individual site to detect the beacon, the broadcast beacon still may be detected by other beacon detectors (i.e., at other sites) during the initial registration process of the AP/transmitter, and without causing significant co-channel interference. The present systems and methods thus advantageously utilize beacon detections from other sites (whether registered or unregistered) to effectively extend the range of beacon detection for the first FSS site of interest. The APs from other sites would not cause any significant interference to the local individual FSS. Nevertheless, through use of the larger network of beacon detectors and the MBP system, it is possible to accurately determine the other APs' contribution to blocking and total aggregation effect, with respect to the co-channel, first, and second interference limits at the individual FSS. Where the other APs are within the control of the central server, the central server is further enabled to more effectively manage the outside APs. Additionally, the present embodiments further enable the central server to effectively detect beacon transmissions according to the radio access point information used in the propagation measurements described above.

Thus, as each beacon detector reports to the central server(s)/SAS, the beacon transmissions across the entire country (or area of beacon infrastructure deployment) are detectable anywhere where people live, as emphasized below with respect to FIG. 15. That is, a beacon transmitted on the east coast of the country is detectable with respect to an FSS site on the west coast, through the central server and the reporting system of the infrastructure embodiments described above.

Figure 15:
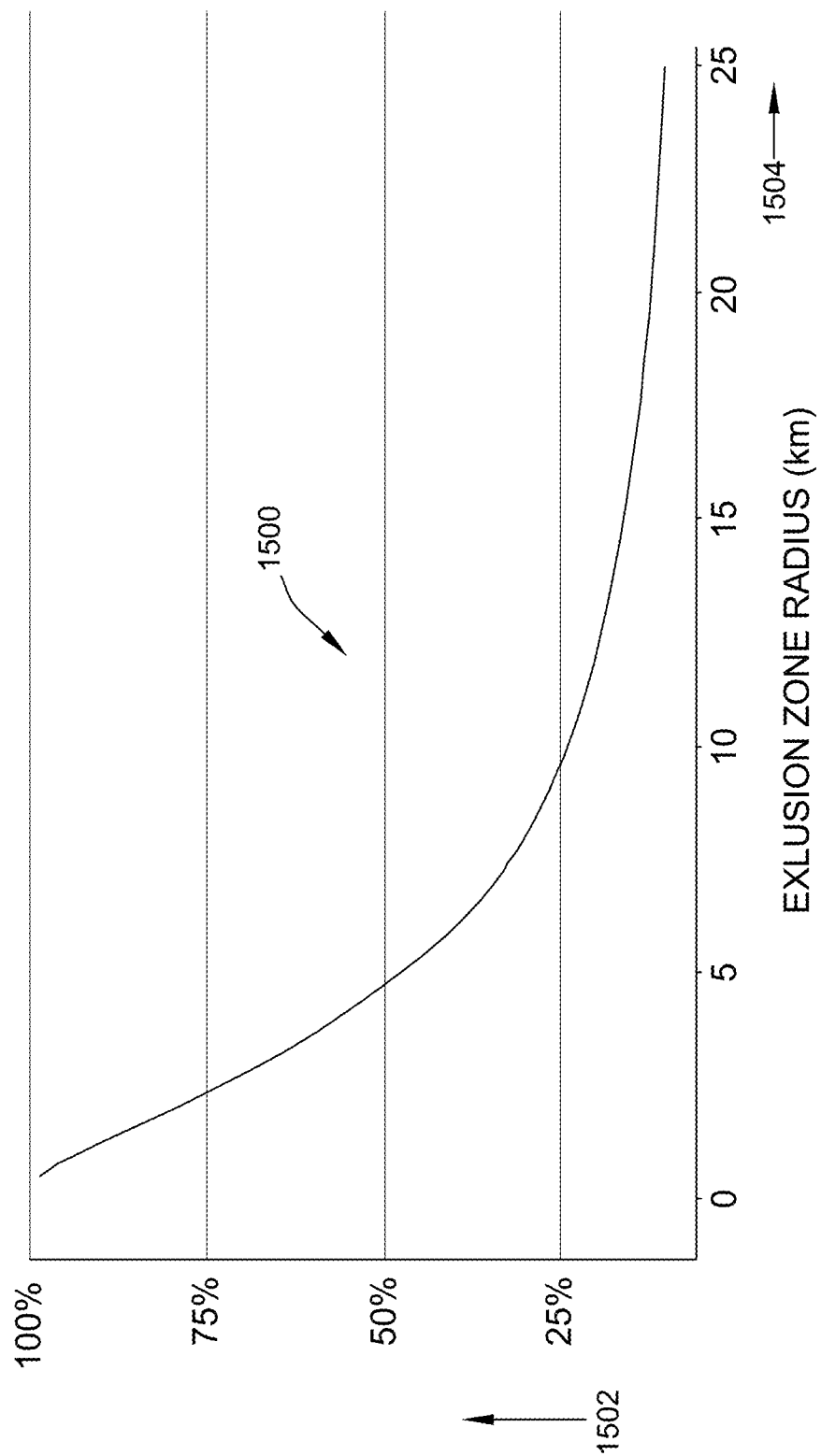
FIG. 15 is a graphical illustration depicting a plot of an addressable population with respect to a radius of an exclusion zone, according to an embodiment.

FIG. 15 is a graphical illustration depicting a plot 1500 of an addressable population 1502 (in percent) with respect to a radius 1504 (in km) of an exclusion zone (e.g., first area zone 1104, FIG. 11A). Plot 1500 is therefore of particular value for use in estimating overlap of coverage according to the embodiments described above. Coverage overlap is an important consideration in LTE systems. In an exemplary embodiment, plot 1500 illustrates a statistical analysis of the U.S. population based on U.S. census data sets (ESRI) showing the average effects of an exclusion zone radius around each of the 4700 FSS sites described herein. This analysis enables effective removal from radio coverage of portions of the population around the respective FSS sites. For example, with an exclusion zone radius of zero around each FSS site, approximately 99% of the U.S. population would be within the coverage area. In comparison, with an exclusion zone radius of 25 km, approximately 10% of the U.S. population would be within the coverage area. Accordingly, the positions of these FSS sites collectively provide radio coverage for nearly the entire U.S. population (e.g., also considering the unregistered FSS sites to reach the greater-than-4700 number).

In the example depicted in FIG. 15, a simplest path loss model is able to assume that the received power (in dBm) may be calculated according to:

$$\Omega_{dB}(d) = \Omega_{dB}(d_0) - 10 B_{eta} \log_{10}(d/d_0) + e_r \quad \text{(Eq. 1)}$$

where d represents the distance in meters, and $\Omega_{dB}(d_0)$ represents the received signal power at a known reference distance in the far field of the respective transmitting antenna, which may be 1 km for a macrocell, for example, 100 m for typical outdoor microcells, and/or 1 m for a typical Pico-cell. In contrast, the value for $\Omega_{dB}(d_0)$ will be dependent on the frequency, antenna heights, gains, etc., as well as other environmental factors. $B_{eta}$ represents the path loss exponent parameter, and will be more dependent on the cell size and the local terrain. In some embodiments, the path loss exponent $B_{eta}$ may range from 3 to 4 for a typical urban macrocell environment, and from 2 to 8 for a microcellular environment. In the exemplary embodiment, the loss exponent $B_{eta}$ is determined by system 1200 (e.g., central server 1202) for each individual interferer, and each such exponent value may be used to further build the detailed local propagation model. The term $e_r$ represents a zero-mean Gaussian random variable (in dB), and represents the error between the actual and estimated loss.

Shadow and corner effects will cause variance in the measured received signal power $\Omega_{dB}(d)$ (e.g., by beacon detector 1214, FIG. 12). Accordingly, the statistical variation of the measured $\Omega_{dB}(d)$, caused by shadowing, may be modeled as being log-normal distributed according to the following equation:

$$p\Omega_{dB}(x) = (1/\sqrt{2\pi}\delta_\Omega) \exp\{-(x - U_\Omega)/2\delta_\Omega^2\} \quad \text{(Eq. 2)}$$

where $\delta_\Omega$ represents the shadow standard deviation. Thus, a more accurate path loss determination will result in smaller values being obtained for $\delta_\Omega$. In the case of macrocells, values for $\delta_\Omega$ may range between 5 and 12 dB, with 8 dB representing a more expected value. In this example, $\delta_\Omega$ may be observed to be substantially independent of the path loss distance d.

As described further herein, the present beacon infrastructure and beacon transmissions are of particular use in the dynamic and real time determination of the path loss model. For example, when a beacon is transmitted by a radio AP and detected by the beacon detector (e.g., at an FSS site) the transmitted beacon will provide a path loss value according to Eq. 1, above. From this detected value, the central server may determine the path distance d according to several conventional techniques, including use of the known geographical coordinates for both of the AP and the FSS site, which may, for example, be pre-loaded into the central server database. In some instances, and particularly at the initialization phase, an AP may not have any UEs associated there with, and thus no additional interference from the UEs will be calculated. Nevertheless, some statistical variation in the measured received power will still occur, due to multipath and shadowing effects, but may be accounted for by the value for $e_r$.

In an exemplary embodiment, a determination scheme for a propagation model calculates the additional interference for both the APs and the UEs. After the initial determination, subsequent measurements of beacon path loss will advantageously provide further information useful for calculating the value of $e_r$. In this example, $e_r$ may be represented by a probability density function, which is a zero-mean Gaussian random variable. An average value for this probability density function may then be determined from repeated measurements, and will provide an accurate estimate for $P_L(d_0) - 10 B_{eta} \log_{10}(d/d_0)$. In some embodiments, the same measurements are further useful to determine the value for $B_{eta}$ according to curve fitting mechanisms and other mathematical techniques.

In most instances, the path loss exponent $B_{eta}$ will be strongly dependent on the cell size and the local terrain. Accordingly, the present techniques are further advantageous in that they may be extended to other locations in a FSS locality (i.e., the FSS cell site) to determine a representative value of $B_{eta}$ for that locality.

The techniques herein are still further effective for modeling the effect of UEs on the dynamic system model. For example, once the parameters of Eq. 1 have been established, and the AP is authorized to transmit (according to one or more of the processes described above) the central server may be further configured to assign an EIRP power such that the authorized AP transmissions will be below an interference threshold, such as a predetermined threshold. In the exemplary embodiment, central server may determine the initial association of UEs without first performing such calculations. In this case, after the initial association, subsequent calculations may be performed to represent the interference effect from the UEs, and the transmitter EIRP may be dynamically modified to represent the AP EIRP, as well as the sum of UE transmitter powers associated with that AP. According to this embodiment, a more accurate interference calculation may be performed by the central server for extending the spectrum access sharing system.

In this example, the central server is configured such that the effective transmitter EIRP of the AP reflects, in real-time, the number and type of UEs associated with that AP. The type of UE may be significant, in that the type may determine the duty cycle of the transmission (e.g., LTE FDD vs. LTE TTD). The number and type of associated UEs may be communicated, for example, over a fixed line connection (e.g., AP data link 414, FIG. 4) from the AP to the central server or SAS. By using a fixed line connection in such manner, the system avoids having to transmit this information with the beacon each time there is a change to the number of associated UEs. In some embodiments, the signaling load may also be reduced by providing to the central server a predetermined assumption for the number of UEs associated with the AP, and this presumed value may be used as a threshold for the relevant calculations for the effect of UEs on interference. In other embodiments, the value is based on historic records (e.g., day use vs evening use). This threshold presumption further provides a level of safety margin for the calculations when the number of associated UEs is actually fewer than the presumed value. In this case, when a presumed threshold UE value is used, the central server need only be updated when the actual number of UEs exceeds this threshold value, whether communicated over the fixed connection or transmitted with the beacon. According to this exemplary configuration, the interference effect of UE power is a function of the multiple access scheme of the particular UE. For example, in the case of LTE TDD, the duty cycle of the transmission will modify the effective interference effect. In the case of CBRS device, a maximum value EIRP may be 23 dBm.

In these examples, the effective transmitter EIRP essentially resembles a single point source with respect to the interference calculations. That is, a single received power value may be used to represent the AP and its associated UE community. According to the present embodiments, this particular technique is effective due to the relatively small cellular area of the AP (i.e., radius of coverage) in comparison with the distance to the FSS site, which may, in this example have substantially similar dimensions. Accordingly, higher-power APs may be deployed according to the present techniques that distance is farther from the FSS site.

An alternative, or additional, safety margin for locality may be provided using the error term $e_r$ featured in Eq. 1, above. In an embodiment, the error $e_r$ influences the link budget by providing a safety margin for the initial beacon transmission, which prevents the particular beacon signal from being used to interfere with the FSS sites in the local area. In one example, the link budget is optimized to allow a highest reasonable value for the error term $e_r$, which will thereby produce the highest potential link budget. This exemplary configuration further enables the central server (or other detectors) to identify each separate AP from the beacon detection system of the FSS site, and determine the interference effects of each particular AP.

In some embodiments, these techniques are further applied to the effective EIRP of an AP such that the determined value for the EIRP is sufficient to include the UEs associated with that AP. Accordingly, a statistical distribution associated with the particular AP will model the effect of multi-path and shadowing for both the AP and its associated UEs. Because the AP cellular area, and thus its radius of coverage, is considered relatively small in comparison with the distance to the FSS site, the interference may be approximated to a point source. The individual power of the associated UEs will be, in this instance, significantly smaller than the power of the AP, and therefore any additional increase to the parameter $\delta_\Omega$ (e.g., from a building corner effect (FIG. 12B)) may be considered relatively insignificant. Accordingly, in some examples, a lower bound of propagation path loss, such as from conventional modeling techniques, may be used for the determination of initial beacon transmission power. This lower bound represents the most conservative static and value that will ensure no significant interference.

The value of error $e_r$ further extends to determinations of ongoing AP/associated UE use. For example, when a particular AP is authorized to transmit at a particular power on a particular channel, there will be an expected statistical variation to the measurable interference that the FSS site will experience. Using this expected statistical variation, the central server may be configured to use a higher value for the error $e_r$ than would be required for the conservative conventional propagation model. In one example, the central server is configured to use the statistical averaging of path loss value for AP transmitter powers across the locality, such that somewhat higher transmitter powers may be authorized, but without increasing the risk of interference to locality. By allowing higher transmitter powers within the locality, significant increases to the coverage and capacity of the system are advantageously realized.

In the examples described above, a 4 dB improvement to the transmitter power (and thus the link budget as well) is realized in comparison with conventional techniques that are limited to using only the lower bound of propagation loss (e.g., based on known for macrocell parameters). This 4 dB improvement though, only reflects the initial gains from the improved calculation model. The present systems and methods achieve still further improvements to the link budget due to the real-time MBP configuration of the network, which may dynamically optimize the model such that improvements of up to 8 dB or greater are realized during operation.

The improved MBP propagation model of the present embodiments therefore provides a number of significant advantages in comparison with the conventional modeling techniques. The present techniques are able to ensure that an initial beacon transmission will not cause interference to the FSS site. Indeed, according to the present techniques, the central server may be configured to utilize the highest value of beacon transmission power to actually enhance the link budget. These techniques further enable the more efficient use of the allocation of transmitter powers based on derived information of APs within a locality, which will realistically yield a 4-8 dB improvement in transmitter power. The dynamic propagation model of the present embodiments is also scalable, and may be extended to model the AP itself, and/or its associated UEs, using the effective EIRP of the AP.

The number of associated UEs for a given AP may thus be presumed according to a predetermined threshold, and/or updated in real-time over a fixed communication link of the network to reduce signaling load. Moreover, the present systems and methods are capable of dynamically "learning" the average number of UEs associated with an individual AP, and such learned values may be retained (e.g., by the central server database), thereby further reducing the potential signal load. These learned values may, for example, further includes a statistical association of UEs according to a time of day, week, etc., and apply these learned values to the calculations/models as well.

In the example depicted with respect to FIG. 15, ZC sequences are known to be utilized in LTE systems such as the 3GPP LTE air interface in the Primary Synchronization Signal (PSS), the random access preamble (PRACH), the uplink control channel (PUCCH), the uplink traffic channel (PUSCH), and the sounding reference signals (SRS). In such systems, orthogonal ZC sequences are assigned to each LTE eNodeB, and the transmissions of these sequences are multiplied by their respective codes. Accordingly, the eNodeB transmissions are uniquely identified, while the cross-correlation of simultaneous eNodeB transmissions and the inter-cell interference are reduced. In an exemplary embodiment, the present systems and methods implement ZC sequences to achieve further advantages according to the valuable properties thereof.

A ZC sequence is a complex-valued mathematical sequence which, when applied to radio signals, gives rise to an electromagnetic signal of constant amplitude. Cyclically shifted versions of the ZC sequence, when imposed on the signal, result in zero correlation with one another at the receiver of the signal. A generated ZC sequence that has not been shifted is referred to as a "root sequence," and such sequences exhibit the useful property that cyclically shifted versions of themselves are orthogonal to one another, provided that each cyclic shift, when viewed within the time domain of the signal, is greater than the combined propagation delay and multi-path delay-spread of that signal between the transmitter and receiver.

It has recently been proposed that a 100 MHz portion of the 500 MHz of C-band spectrum be allocated for mobile use (e.g., LTE). This proposed allocation would leave the remaining 400 MHz available for implementation of the MBP scheme for spectrum sharing. As described above, some embodiments utilize a guard band for transmission of the beacon signal. Under these new proposals, the ZC sequence beacons may be alternatively or additionally utilized for the same purposes within this new mobile band, and without causing interference to other mobile users of that band. Under this new proposal, users sharing the 400 MHz spectrum portion could be provided additional access to this new 100 MHz portion of mobile spectrum for beacon transmissions. Users that do not access this 100 MHz portion would still be able implement the adjacent guard band solution described above. Alternative proposals allocate 200 MHz of the available spectrum, and/or upper or lower portions thereof. The person of ordinary skill in the art will understand that the principles of the present embodiments are not limited to 100 MHz or 200 MHz, or upper or lower edges of a given spectrum, such as the C-band.

While the propagation characteristics of a different band (e.g., new 100-300 MHz allocation portion) for beacon transmission may be different than that of an adjacent guard band in close proximity to the channel in use, assuming implementation in the 3.7-3.8 GHz spectrum, MBP measurements in this new band are expected to indicate a more conservative protection scheme, since the measurements thereof would yield lower propagation losses than experienced at higher frequencies. Alternatively, the central server may further utilize a calibration parameter to correct for this propagation loss difference. The systems and methods herein are also advantageously capable of further adaptation such that the beacons utilize other radio bands, such as the CBRS band, as an alternative solution where warranted.

Implementation of this new proposed 100 MHz portion (or similar) will influence the choice between an adjacent guard band and this different band according to such considerations as (i) beacon range (e.g., due to differences in beacon transmitter power), (ii) similar propagation characteristics, and (iii) the ability to accurately predict the actual channel characteristics of the signal channel as well as access rights to this new mobile band for transmission of the beacon. It is expected that this new 100 MHz band portion, if implemented as proposed, will be used for 5G Mobile, in which case the existing infrastructure for LTE ZC functionality may be advantageously utilized to transmit the beacon functionality described herein.

As described above, WSJT techniques achieve notably superior SNR values below the receiver threshold. However, these techniques require very accurate alignment of the receiver local oscillator with the transmitter for successful and fast detection. As also described above, the phase drift (phase noise) of the LNB down conversation may span several kHz, and therefore typically require expensive GPS discipline Rubidium sources. Conventional ZC implementation techniques may require, for example, a 1 W/3.25 MHz transmitter power, a high gain multiple-input and multiple-output (MIMO) antenna (e.g., steerable such that, as gain increases, so does the antenna directivity, thereby reducing the angular field of view) as a separate beacon detector or satellite gain, as well as a low-noise receiver, to achieve 6 dB higher than WSJT performance, as illustrated in Table 3, below, due to the receiver antenna gain. As described above, 198 dB may be realized in the case of an isotopic receiver. Alternatively, the implementation of WSJT with MIMO or satellite gain would likely yield higher than ZC values. According to the present techniques, however, such obstacles are overcome, and particularly with respect to the LNB down conversation.

In an exemplary embodiment, the present techniques convert (e.g., at the central server) a linear convolution to a circular convolution by repeating one ZC sequence shoulder-by-shoulder. Through this innovative technique, applied to the beacon infrastructure described above, the individual computation speed is reduced from N*N, to N*log N, which will thereby avoid an N-squared computation problem seen using conventional modeling techniques.

This exemplary technique therefore utilizes ZC sequences to resolve the budget for the beacon-based systems and methods described above. According to an exemplary calculation, the maximum path loss (MPL) may be represented by the equation:

$$MPL = Tx - Rx + Gain(Rx) + SNR \quad \text{(Eq. 1)}$$

Where Tx represents the transmitter power of the beacon (i.e., ERIP) per MHz, Rx represents the sensitivity (noise power per MHz=Noise Figure*k*T*B) of the receiver, where T=300K and k=1.38 10 exp(-23), Gain(Rx) represents the gain of the beacon detector, and SNR represents the signal-to-noise ratio value below the receiver sensitivity (e.g., coding gains, etc.). Accordingly, the budget may be thus calculated in consideration of the values depicted in Table 3, below.

TABLE 3

| ZC Budget (3.25 Mbits baud rate) | value | units |
|---|---|---|
| Transmitter Power: 1 W per 3.25 MHz | 25 | dBm/MHz |
| Bandwidth | 3.25 | MHz |
| Rx Noise Power (Noise FIGURE = 1.5 dB) | −112 | dBm/MHz |
| Rx S/N | −30 | dB |
| Rx Antenna/Satellite Gain | 37 | dB |
| Max Path Loss | 204 | dB |

It can be noted, from Table 3, the significant role played by the receiver gain. In at least one embodiment, by directly using the actual satellite dish gain with in-band detection having a post-LNB of approximately 37 dB (e.g., for a 2 m dish), a 204 dB link budget can be achieved. In an exemplary embodiment, the transmitter power Tx of the beacon is further increased using the guard band. In some embodiments, the SNR and/or the receiver gain are also further increased. These additional increases may be of particular advantageous value in the case where both external and in-band satellite beacon detection are performed together.

Table 4, below, illustrates the change in beacon range, below clutter, for use in (i) residential, (ii) residential/commercial mixed, and (iii) high density commercial implementations. In the exemplary MPL budgets depicted in Table 4, ZC sequences are implemented at 3.25 MHz, with receiver power established at NF=1.5 dB, and T=300K. In this example, the beacon Tx 25 dBm/MHz (i.e., at 3.25 MHz), and the AP transmitter power is 20 dBm/MHz (at 10 MHz) for a class A CBRD.

TABLE 4

| Transmitter Power (dBm) | Maximum Path Loss for ZC: Single Interferer | Beacon Range (residential, below clutter) [D > 200: −53.9 + 75 LogD] | Beacon Range (residential/commercial or mix below clutter) [D > 200: −31.2 + 40 LogD] | Beacon Range (high density commercial below clutter) [D > 200: −31.2 + 40 LogD] |
|---|---|---|---|---|
| 25 | 192 dB | 1.9 km | 10.5 km | 6.8 km |
| 35 | 202 dB | 2.6 km | 18.6 km | 12.1 km |
| 42 | 209 dB | 3.2 km | 27.9 km | 18.1 km |

These innovative techniques for extending the ability to detect the beacons well beyond the beacon transmission range provides further advantages to satellite protection schemes. For example, conventional satellite protection regulations require consideration of distances of up to 40 km for blocking, and up to 150 km for the co-channel implementations described above, both of which are significantly greater than the transmission range of the beacons. Nevertheless, considering a link budget greater than approximately 210.5 dB (i.e., 30 dB above 180.5 dB), for the worst case scenario of the lowest satellite elevation of 5 degrees, at an azimuth of 0 degrees, the integral power for small cell deployments, below clutter and beyond the beacon range boundary, will generally be insignificant, as illustrated below with respect to Table 5. In the case where the small cell integral power is considered to be greater than this insignificant amount, the integral power may be addressed, if necessary, by slight increases to the protection limit.

TABLE 5

| | Free space | Residential below clutter | Residential/ commercial mix below clutter | High density commercial below clutter |
|---|---|---|---|---|
| a | 44.3737141 | −53.9 | 31.2 | 38.7 |
| b | 20 | 75 | 40 | 40 |
| Small cell power/dBm | 37 | 20 | 20 | 20 |
| Cell size/ m^2 | 1000000 | 1000 | 500 | 100 |
| Link budget boundary/m | 150000 | 1200 | 1200 | 1200 |
| Integral power outside boundary/ dBm | −111.152828 | −156.3941159 | −127.3545513 | −127.8648512 |

FIGS. 16A-16B illustrate data tables 1600, 1602 for satellite protection MPL with respect to a single AP, and 800 APs, respectively, within the satellite beam width. In the exemplary embodiments illustrated in data tables 1600 and 1602, the MPL is 192 dB, which is capable of managing 800 CBSDs, which is indicated by the values contained within data table 1402 specifically, representing a worst-case scenario. Small cell considerations are described above. Macrocell interference considerations may be calculated with respect to Table 6, below.

TABLE 6

| Elevation (degrees) | Gain (dB) | Below Clutter Residential (km) [−53.9 + 75 logD] | Above Clutter Residential (km) [−100 + 75 logD] | Above Clutter Residential/ Commercial Mix (km) [−13.3 + 50 logD] |
|---|---|---|---|---|
| 5 | 14.53 | 2.47 | 10.18 | 18.95 |
| 10 | 7.00 | 1.96 | 8.08 | 13.40 |
| 15 | 2.60 | 1.71 | 7.06 | 10.94 |
| 20 | −0.53 | 1.56 | 6.41 | 9.48 |
| 25 | −2.95 | 1.45 | 5.95 | 8.48 |
| 30 | −4.93 | 1.36 | 5.60 | 7.74 |
| 35 | −6.60 | 1.29 | 5.32 | 7.16 |
| 40 | −8.05 | 1.24 | 5.09 | 6.70 |
| 48 | −10.03 | 1.16 | 4.79 | 6.12 |

It is noted that, with respect to the values illustrated in Table 6, the calculations do not assume the use of MIMO antennas or real gain of the satellite dish (37 dB in the case of a 2 m dish). The satellite gain is calculated using the standard ITU equation for interference calculations. In such cases of MIMO implementation, the interference considerations are presumed to be worse. For the macrocell calculations illustrated in Table 6, the exemplary transmitter power (EIRP) is 37 dBm/MHz (50 W in a 10 MHz band), and the interference is assumed to be equal to 1% (−20 dB) of the satellite threshold of −129 dBm/MHz. This assumption therefore effectively takes into account more than one single interferer with a safety margin. The calculations illustrated in Table 6 further take into account the satellite elevation, satellite dish azimuth of 0 degrees and thus the gain, for this form of co-channel interference. These calculations additionally implement the exemplary measurement model described above, which is suitable for residential/commercial use. A rural-based model, on the other hand, would predict larger propagation distances, and the macrocells may be constructed to be above clutter for greater coverage. Nevertheless, the first column of Table 6 illustrates a residential case below clutter.

According to the exemplary calculations included in Table 6, that can be seen that a safe macrocell distance, according to these parameters, is found between 10 km and 19 km for low elevations (e.g., 5 degrees), but may be as low as between 5 km and 7 km at 35 degrees. Given the density of FSS sites in residential and residential/commercial type areas across the country, where the "blocking effect" is greatest, the use of 3.7 GHz for macro-cells may not be practical. That is, when the particular transmitter is that far from a single FSS site of concern, it is highly likely that the transmitter is closer in distance to a different FSS site. In this example, a relatively low transmitter power (in comparison with normal power) is assumed for the macro-cell. In this case, range extensions using MIMO antennas may be less practical, and instead contribute to interference and possibly increase the safe operating distances.

As illustrated in Table 6, the calculated results in the case of below clutter indicate that the safety distance is approximately 1.3 km for an in-band transmitter at 35 degrees. It should be noted, that in this example, a higher transmitter power (Cat B Rural) is used for the calculation than would be the case for a typical indoor CBRS AP. The present techniques are not bound by such limitations though, because the 3.7 GHz spectrum is not generally considered to be particularly suitable for macro cellular coverage due to its poor propagation, and particularly with respect to handset devices that are limited in transmitter power for the return path, and therefore cannot utilize MIMO of significant proportions. Nevertheless, the present embodiments consider the 3.7 GHz spectrum because it may still affect the FSS site(s) of concern. Additionally, there exist other low frequency bands that would not cause interference to the FSS site, and which may be re-purposed for similar use.

Accordingly, these macrocell considerations further emphasize how the 3.7 GHz spectrum is of particular value for use with small cells, as described above, similar to the power bands utilized for CBRS, namely, the 1 W, 4 W and 50 W power bands. The present embodiments still further demonstrate the advantages obtained through utilizing beacons in the macrocell, wherever such implementation is possible, and particularly in instances outside of the United States regulatory structure.

In another embodiment, number range reuse techniques provide an alternative process to increase the maximum path loss for beacon detection. In this example, the transmitted beacon includes information for successful operation, including without limitation one or more of: (i) the unique ID of the AP; (ii) the transmitter power; (iii) the signal channel(s) desired on which to transmit; (iv) the AP location; etc. In some embodiments, the present systems and methods limit the information included in the beacon so as to minimize the bit rate and/or duration of the beacon transmission that might potentially detract from the MPL budget or overall ability of the system to detect and rapidly protect from interference. In at least one embodiment, only the unique ID of the radio AP is transmitted over the air, and other information is transmitted to the central server/SAS over a fixed network along with the AP unique ID.

In this embodiment, supporting a number range of up to 1 billion (e.g., for potentially all possible future IDs) would require a binary work length of 30 bits. Reducing this binary work length to 16 bits would only allow a number range of approximately 65 thousand, which would not be sufficient for this foreseeable future use. Such reduction though, would nevertheless increase the MPL budget by as much as 3 dB, while also reducing the speed of identification by nearly a factor of two. The present number reuse techniques realize the advantages obtained by reducing the binary work length, but without the corresponding conventional disadvantages of the reduced number range. These advantages are achieved by allocation to each FSS site a cell around the site in which each AP has a unique ID, but these unique IDs may be simultaneously used outside of the cell.

Figure 17:
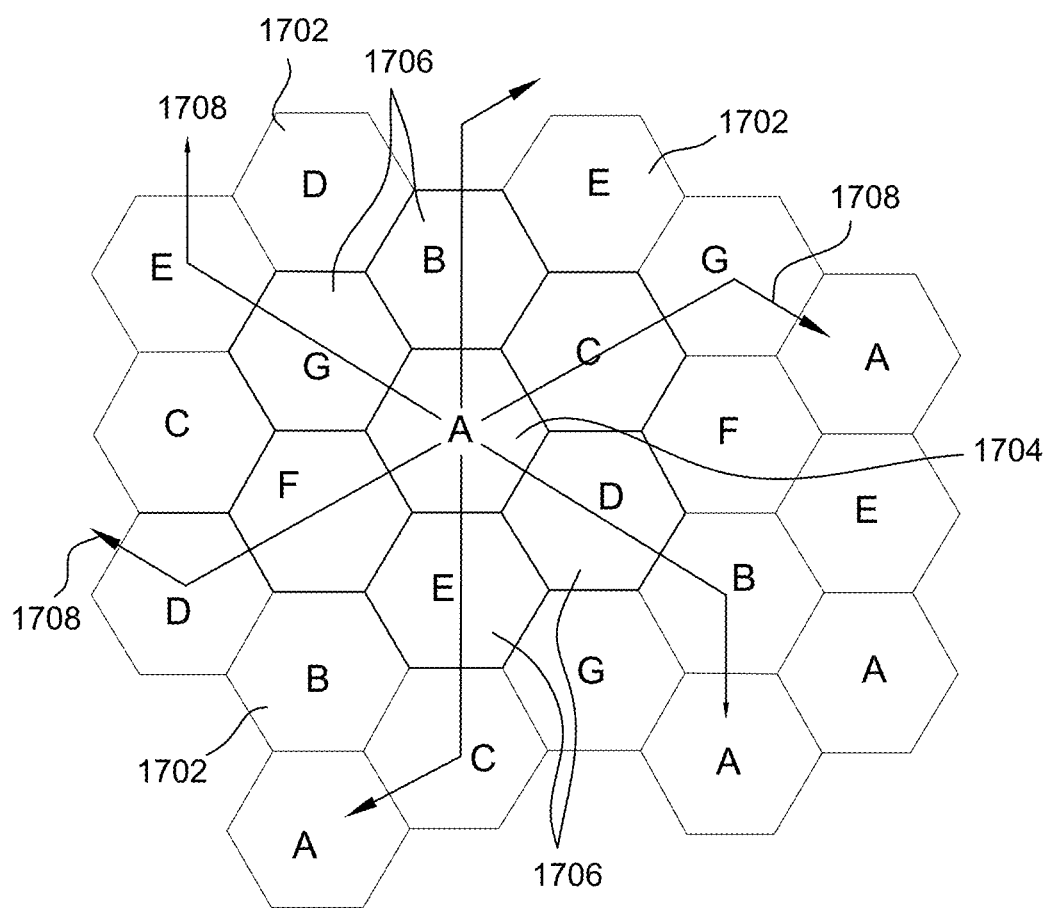
FIG. 17 illustrates a patterned grid region including a plurality of contiguous grid blocks, according to an embodiment.

FIG. 17 illustrates a patterned grid region 1700 including a plurality of contiguous grid blocks 1702. In the exemplary embodiment, contiguous grid blocks 1702 are illustrated as being substantially hexagonal for ease of explanation. In this example, a hexagonal shape approximates a round coverage area having a somewhat uniform radius from center, and which does not include gaps between respective coverage areas represented by grid blocks 1702. Additionally, the hexagonal boundary shape simplifies the discussion to ignore overlap of adjacent grid blocks 1702 (see e.g., FIG. 13, above).

According to the exemplary embodiment, the present systems and methods may utilize an 18-bit word, which would thus allow the reuse of 4 patterns, and thereby accommodate approximately 65 k APs per cell. In other embodiments, reuse of a greater number of patterns may be desired. Such higher reuse examples are somewhat similar in concept to Frequency Division Duplex (FDD) techniques used in cellular systems, where blocks of frequencies are used per cell with a reuse repeat pattern. In at least one embodiment, APs having the same ID may be differentiated from one another by use of triangulation by a network of beacon detectors.

According to the embodiment illustrated in FIG. 17, each of the individual grid blocks 1702 in patterned grid region 1700 is assigned a different one of six individual use patterns (e.g., designated as letters A-G), and thus indicates a cellular reuse factor of 7. Each individual grid block 1702 therefore represents a different block of 65 k numbers per lettered pattern, e.g., A65 k, B65 k, C65 k, D65 k, E65 k, F65 k, G65 k. Accordingly, similar to cellular network techniques, no two blocks of 65K APs having the same pattern (i.e., one of A-G) are immediately adjacent one another.

In an exemplary operation of patterned grid region 1700, a triangulation scheme according to the present embodiments enables spatial reuse of a first grid block 1704 having pattern A. More particularly, the triangulation scheme applied to grid region 1700 effectively separates the number range used in pattern A from being also used in immediately adjacent blocks 1706. As illustrated in FIG. 17, in each direction 1708 from first grid block 1704, at least two grid blocks 1702 of different patterns (e.g., B-G) are interposed between first grid block 1704 and each instance of a second grid block 1710 that uses the same pattern A.

In an embodiment, time division multiplexing techniques are implemented, in an alternative or supplemental manner, to further separate and extend the reuse of number patterns A-G. For example, the system of patterned grid region 1700 may be configured (e.g., at the central server) such that transmission in first grid block 1704 is controlled such that the APs of first grid block 1704 transmit on even number days, while the APs of an instance of adjacent block 1706 transmits on odd numbered days using the same number range of the pattern (e.g., pattern A) of first grid block 1704. This time division technique is scalable, and therefore may be further implemented to alternate transmission at the odd/even minute level (or less) using the GPS technology and information within each block 1702.

Referring back to FIG. 5, in another embodiment, beacon measurements may be obtained utilizing the LNB (e.g., LNB 530), the dish, and/or the feed horn of the earth station (e.g., earth station 504) of a particular FSS site (e.g., FSS site 502). A beacon receiver (e.g., beacon detector 528) communicates over an operable data link (e.g., reporting links 540, 542, 544, 546) to the central server (e.g., central server/SAS 510). In this example, the hardware of the particular dish/earth station may serve as an alternative to an outdoor beacon receiver and antenna, or multiple receivers and antennas per dish, by tapping into each FSS antenna signal distribution chain downstream of the LNB. The beacon may then be received at the down converted (IF) frequency of the in-band beacon signal, and the central server may then avoid having to adjust the RSSI of the beacon with respect to the FSS dish antenna gain, due to the beacon signal having been received using the FSS dish.

Alternatively, the present systems and methods may be instead (or additionally) configured to utilize MIMO antennas to detect beacon transmissions. More particularly, instead of utilizing the beacon detection obtained after the LNB down conversion, an infrastructure according to this example may be configured to deploy an external antenna covering the 3.7-4.2 GHz band, and which can be orientated in the same direction of the satellite dish, or may be configured made such that it may sweep a 360 degree rotation with a narrow beam and corresponding high gain. In this alternative embodiment, MIMO technology achieves at least 37 dBi of gain over angular view greater than the satellite beam width. A further advantage to this alternative technique is that a single external antenna may be deployed to cover the entire FSS site, which may contain many individual satellite dishes. In this example, only the single external antenna need be in operable communication with the central server. In at least one embodiment, a parabolic antenna is implemented, which realizes a 37 dBi gain, covering the 3.4-3.7 GHz band, with a beam width of 8.5 degrees that effectively complements the beam width of satellites used in the C-band.

In some embodiments, the link budget is still further extended through an innovative implementation of MIMO technology. For example, since the effective interference contribution outside of the beam width of the satellite is −10 dBi, which is approximately 47 dBi (37 dBi+10 dBi) less than that within the satellite beam, the most significant interference considerations are taken in the direction of the satellite dish, that is, within the satellite beam. However, since the antenna may be configured (whether electrically or mechanically) to sweep a 360 degree field of view, such use of an external antenna will require calibration with the satellites being protected, in order to accurately measure the relevant interference. In this embodiment, therefore, implementation of the external antenna provides at least a 10 dB improvement in maximum path loss/range.

In one embodiment, the present beacon detection infrastructure further utilizes the measurement-based propagation models, described above, to extend the effective range of beacon detection. As described above, the measurement-based propagation techniques enable the central server to regularly and/or constantly update the propagation model(s) of the network, using information obtained from the multiple APs and beacon detectors that are integrated within the overall spectrum access sharing system. According to this MBP scheme, more accurate calculations of link budgets are obtained in the initial set up of channel allocations, and subsequent beacon transmissions serve to verify successful operation. Through these MBP propagation techniques, central server is advantageously configured to calculate not only the co-channel emissions, but also the first and second adjacent channel emissions to ensure regulatory compliance of the network. This measurement scheme is also further scalable to address the aggregate interference across the 500 MHz band, for example, by calculating the relevant LNB blocking considerations. In one embodiment, such considerations may be limited at −60 dBm, or measured directly by the beacon detector as part of its functionality.

Figure 18:
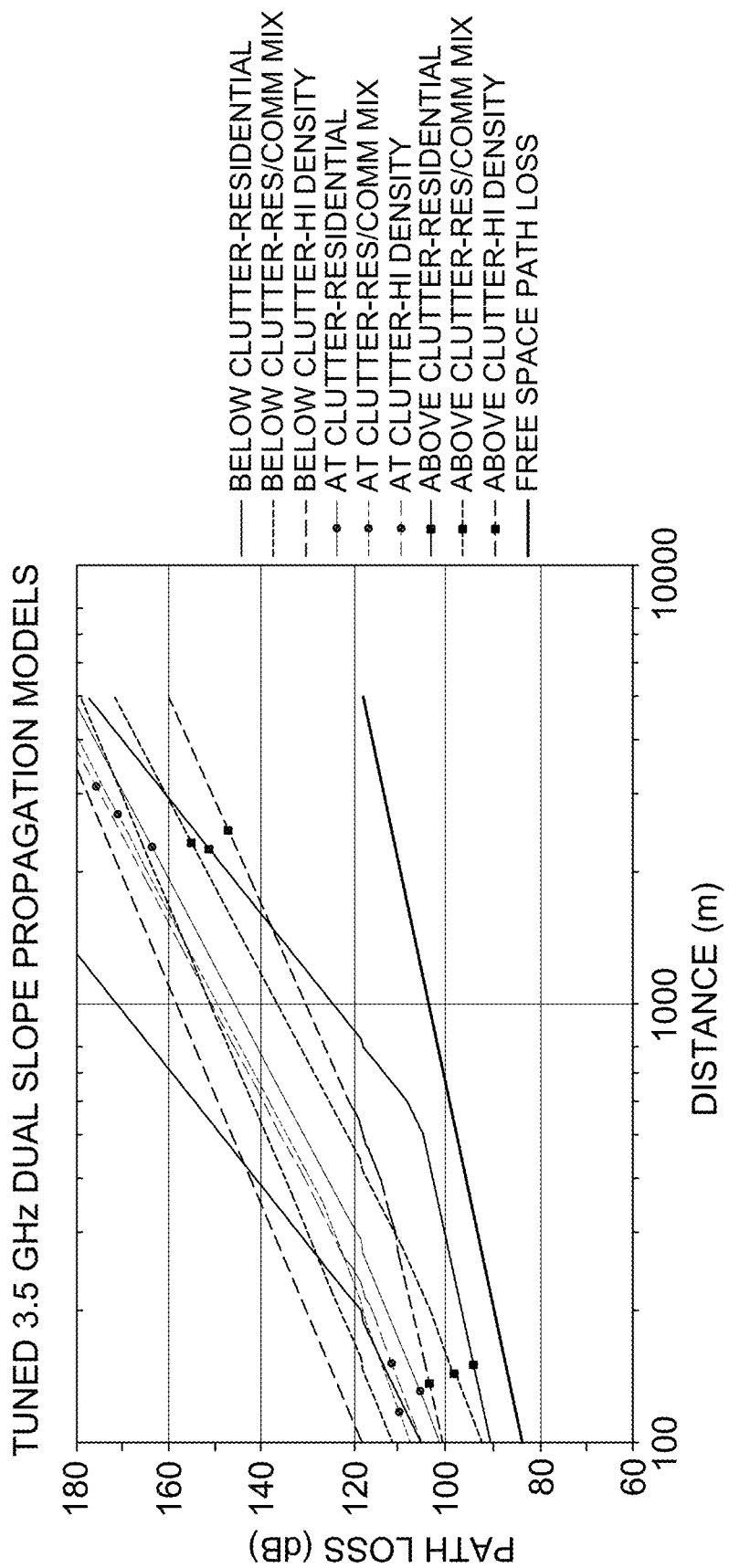
FIG. 18 is a graphical illustration depicting comparative data plots 1802 of dual-slope propagation models, according to an embodiment.

FIG. 18 is a graphical illustration 1800 depicting comparative data plots 1802 of dual-slope propagation models (i) at clutter, (ii) below clutter, and (iii) above clutter, and for each morphology of (a) high density commercial, (b) residential, and (c) residential/commercial mixed classifications. In the example illustrated in FIG. 18, the path loss (vertical axis, in dB) is plotted against distance (horizontal axis, in meters) for each model, and all such models are charted against a free space path loss plot 1804. In the exemplary embodiment, the resulting data plots 1802 represent empirical or tuned 3.5 GHz dual-slope propagation models, as well as the dual-slope log-distance path loss models for all morphology/clutter classifications and free space loss.

As shown in illustration 1800, the "below clutter" data plots 1802 generally indicate the greatest path loss, whereas the "above clutter" data plots 1802 generally indicate the least amount of and path loss. Additionally, the high density commercial morphologies similarly indicate greater amounts of path loss, whereas the residential morphologies indicate less path loss. Data plots 1802 are illustrated in greater detail below with respect to Table 7, which further provides breakpoint and slope values for each of the propagation models depicted as data plots 1802, and compares these values against relevant values of the single slope model.

TABLE 7

| | | RESIDENTIAL | | | RESIDENTIAL/ COMMERCIAL MIX | | | HIGH DENSITY COMMERCIAL | | |
|---|---|---|---|---|---|---|---|---|---|---|
| | | Below Clutter (m) | At Clutter (m) | Above Clutter (m) | Below Clutter (m) | At Clutter (m) | Above Clutter (m) | Below Clutter (m) | At Clutter (m) | Above Clutter (m) |
| Dual Slope Model | Breakpoint 1st slope | D < 200 | D < 250 | D < 550 | D < 300 | D < 350 | D < 250 | D < 100 | D < 200 | D < 400 |
| | Breakpoint 2nd slope | D < 200 | D < 250 | D < 550 | D < 300 | D < 350 | D < 250 | D < 100 | D < 200 | D < 400 |

TABLE 7-continued

|  | RESIDENTIAL | | | RESIDENTIAL/ COMMERCIAL MIX | | | HIGH DENSITY COMMERCIAL | | |
| --- | --- | --- | --- | --- | --- | --- | --- | --- | --- |
|  | Below Clutter (m) | At Clutter (m) | Above Clutter (m) | Below Clutter (m) | At Clutter (m) | Above Clutter (m) | Below Clutter (m) | At Clutter (m) | Above Clutter (m) |
| Single Slope Model | −10 + 57logD | 21.3 + 41.6logD | 30 + 32logD | 35.2 + 38.9logD | 20.5 + 43.3logD | 9 + 42.5logD | 39.2 + 39.1logD | 9.2 + 47.7logD | 42.4 + 29.5logD |

Extensions of User Equipment Management

As described above, the beacon-based infrastructure and associated techniques are applicable to both UEs and APs, and that the potential interference effect of the UEs on the FSS site may be models using effective EIRP techniques. The examples described above are provided, without limitation, for APs at a "reasonable" distance from the FSS site, and in the case where the radius of the AP coverage is relatively small in comparison with the distance of the AP from the FSS site (e.g., approximately 500 m). The adoption of beacon transmitters within individual UEs though, may be impractical according to present-day communication network technologies, given the significantly large number of UEs (and APs) presently in operation, and the reduced link budget of the UEs in comparison with that of the APs. Nevertheless, the rapid advances in technology and communication network transmission may make possible, or even necessitate, beacon transmissions from every UE in the near future.

Beacon transmissions at the UE level, however, are of immediate value in the case of APs relatively close to the FSS site (e.g., less than 500 m), where the effects of the UE transmitter power may vary greatly according to changing locations of the UE, such as when the UE is a mobile device. Such variation makes the UE more difficult to model, but much of this difficulty is resolved by real-time beacon transmissions from the UE. In one embodiment, the UE beacon transmissions may be triggered by a client on the UE device, which is instructed to operate according to management from the central server when the UE device comes within close proximity to the FSS site (and/or during an initial calibration phase). In this example, only this small subset of UEs, close to the FSS site, are affected in this manner.

During an initial calibration phase, the UE beacons associated with a particular AP may be measured at different locations around the AP, and such measurements, together with measurement of the associated AP beacon, are useful to determine the effective AP transmitter power, as well as its statistical distribution, which will accurately estimate the interference effect of the AP/UEs combination as a single point source, and as function of the number of UEs. The dynamic capabilities of the present system further enable the development of a more detailed AP/UEs model over time, during the real-time operation of the system. The statistical model that is derived therefrom is particularly useful to determine the safe transmitter power of APs that are in close proximity to the FSS site, and to enable the central server to instruct one or more UEs to reduce their individual transmitter power when needed, or for the AP to reduce its power thereby reducing the coverage area and influence over the number of associated UEs.

Such instructions from the central server, namely, for the APs/UEs to reduce their allowable transmitter power, that further utilize calculations that consider the shadowing or cornering effects of buildings (e.g., FIG. 12B) as mobile UEs move in and out of direct lines of sight from the FSS site. By reducing the allowed transmitter power of the AP itself, the central server is enabled to directly reduce the AP interference, as well as the geographic size of the AP coverage area. Reduction in the size of the AP coverage area will thereby also reduce the number of UEs that will be likely to be supported by the AP. In some instances, such AP power reductions by the central server are a useful tool to reduce or eliminate the shadow effects of buildings on the cell edges, where the relevant UEs may instead be supported by a CBRS or macrocell. According to this advantageous configuration, the overall effect on the system, from APs having associated UEs, is significantly more deterministic.

The interference effect from the UEs themselves is considered with respect to the exemplary values illustrated in Table 7, above, such that a dynamic propagation model may be derived therefrom. For this exemplary propagation model, the respective transmitter powers associated with the different devices is obtained using the values provided in Table 2, also above. The relevant propagation model may be further constructed to implement the following parameters included in Table 8, below.

TABLE 8

| PARAMETER | | VALUE | REFERENCE |
| --- | --- | --- | --- |
| In-band interference requirement (dBm/MHz) | | −128.35 | FCC §96.17(a)(2)&(b)(1) |
| Reference antenna (dBi) | | 32− 25 log10 (theta) | FCC §25.209(a)(1)&(4) |
| CBRS BW (MHz) | | 20 | NA |
| Aggregated blocking requirement (dBm) | | −60 | FCC §96.17(a)(3)&(b)(2) |
| Spectrum mask | 1st adj channel (dB) | 40 | ITU-R M.2109 7.2 |
| | 2nd adj channel (dB) | 52 | http://www.jatit.org/volumes/ Vol65No3/21Vol65No3.pdf |
| Max Tx power | UE (dBm/MHz) | 13 | FCC §96.41 |
| | | 37 | FCC §96.41 |
| Reference filter | Passband insertion loss (dB) | 0.5 | FCC §96.17(a)(2)&(b)(1) |
| | 1st adj suppression (dB)* | 12.5 | FCC §96.17(a)(3)&(b)(2) |
| | 2nd adj suppression (dB)* | 33 | FCC §96.17(a)(3)&(b)(2) |

Using the parameters provided in Table 8, propagation losses between the UE and the FSS site may be calculated such that an interference level of no greater than −129 dBm/MHz, for example, is achieved, as indicated below with respect to the values provided in Table 9. In the case where a pass band response is considered, the optimum interference level may be, for example, no greater than −128.35 dBm/MHz.

TABLE 9

| Elevation degrees | Antenna gain (dBi) | Link budget (dB) | | | | |
|---|---|---|---|---|---|---|
| | | In-band UE | 1st adj blocking UE | 2nd adj blocking UE | 1st adj emission UE | 2nd adj emission UE |
| 5 | 14.53 | 155.38 | 89.33 | 67.73 | 115.38 | 103.38 |
| 10 | 7.00 | 147.85 | 81.80 | 60.20 | 107.85 | 95.85 |
| 15 | 2.60 | 143.45 | 77.40 | 55.80 | 103.45 | 91.45 |
| 20 | −0.53 | 140.32 | 74.27 | 52.67 | 100.32 | 88.32 |
| 25 | −2.95 | 137.90 | 71.85 | 50.25 | 97.90 | 85.90 |
| 30 | −4.93 | 135.92 | 69.87 | 48.27 | 95.92 | 83.92 |
| 35 | −6.60 | 134.25 | 68.20 | 46.60 | 94.25 | 82.25 |
| 40 | −8.05 | 132.80 | 66.75 | 45.15 | 92.80 | 80.80 |
| 48 | −10.03 | 130.82 | 64.77 | 43.17 | 90.82 | 78.82 |

From the values obtained above, the central server may be further configured to calculate corresponding protection distances according to the parameters depicted in Table 10, below (i.e., illustrating the residential example, below clutter).

TABLE 10

| Elevation degrees | Antenna gain (dBi) | Protection distance for UE below clutter (m) | | |
|---|---|---|---|---|
| | | In-band UE | 1st adj UE | 2nd adj UE |
| 5 | 14.53 | 617.08 | 168.32 | 91.09 |
| 10 | 7.00 | 489.78 | 114.52 | 61.98 |
| 15 | 2.60 | 427.86 | 91.42 | 49.48 |
| 20 | −0.53 | 388.74 | 77.92 | 42.17 |
| 25 | −2.95 | 360.87 | 68.84 | 37.75 |
| 30 | −4.93 | 339.59 | 62.20 | 33.66 |
| 35 | −6.60 | 322.58 | 57.10 | 30.90 |
| 40 | −8.05 | 308.54 | 53.02 | 28.69 |
| 48 | −10.03 | 290.35 | 47.91 | 25.93 |

According to the values depicted above, for the case of residential below clutter, several determinations may be made: (i) at low elevation (e.g., 5 degrees), the UE exclusion zone is 617 m for co-channel use, however, the central server of the present system may utilize an optimization algorithm with respect to the use of the 2nd Adjacent channel, and then the 1st Adjacent channel, in zones around the FSS site, effectively reducing the exclusion zone radius to approximately 91-168 m, respectively; and (ii) at 35 degrees, the in-band UE protection distance is approximately 322 m, and the 1st Adjacent band protection distance is approximately 57 m.

In this example, the exemplary values provided in Table 10 are applicable within the range of the main beam, which has a half power beam width (HPBW) of approximately 5 degrees for a 2 m satellite dish. Outside of the main beam (assuming the "teardrop" shape of the respective zones described above), the gain rapidly approaches a value of −10 dBi, thus accounting for the reduction of the in-band protection distance from approximately 617 m to 290 m, and the reduction in the 2nd Adjacent protection distance from approximately 91 m to 26 m. Further to this example, it is assumed that UEs are likely to be inside buildings (which may typically require 17 dB of additional link budget). However, for ease of explanation, the above Table values are provided for a case assuming that the UEs are located outside of buildings.

The analysis of the data provided in Table 10 may be similarly applied to data for the at-clutter model, as provided below in Table 11, and to data for the residential above-clutter model, as provided further below in Table 12.

TABLE 11

| Elevation degrees | Antenna gain (dBi) | for UE distance at clutter (m) | |
|---|---|---|---|
| | | In-band UE | 1st adj UE |
| 5 | 14.53 | 1554.23 | 246.17 |
| 10 | 7.00 | 1099.01 | 154.11 |
| 15 | 2.60 | 897.33 | 117.18 |
| 20 | −0.53 | 777.11 | 96.48 |
| 25 | −2.95 | 695.07 | 82.98 |
| 30 | −4.93 | 634.51 | 73.36 |
| 35 | −6.60 | 587.44 | 66.10 |
| 40 | −8.05 | 549.50 | 60.40 |
| 48 | −10.03 | 501.63 | 53.40 |

TABLE 12

| Elevation degrees | Antenna gain (dBi) | for UE distance at clutter (m) | | |
|---|---|---|---|---|
| | | In-band UE | 1st adj UE | 2nd adj UE |
| 5 | 14.53 | 2541.03 | 744.18 | 514.85 |
| 10 | 7.00 | 2016.82 | 780.73 | 196.11 |
| 15 | 2.60 | 1761.85 | 470.31 | 118.14 |
| 20 | −0.53 | 1600.75 | 328.26 | 82.45 |
| 25 | −2.95 | 1486.00 | 248.36 | 62.38 |
| 30 | −4.93 | 634.51 | 197.74 | 49.57 |
| 35 | −6.60 | 1328.34 | 163.09 | 40.97 |
| 40 | −8.05 | 1270.52 | 138.01 | 34.67 |
| 48 | −10.03 | 1195.60 | 109.89 | 27.60 |

According to the values depicted above, determinations may also be made for the case of residential above clutter: (i) at low elevation (e.g., 5 degrees), the UE exclusion zone is 2541 m for co-channel use, however, the optimization algorithm applied to the 2nd Adjacent channel, and then to the 1st Adjacent channel, effectively reduces the exclusion zone radius to approximately 515-744 m, respectively; and (ii) at 35 degrees, the in-band UE protection distance is approximately 1328 m, and the 1st Adjacent band protection distance is approximately 163 m and the 2nd Adjacent band protection at 41 m.

In this example, "clutter" is determined to be approximately 20 m, which reasonably represents a three-story high building having UEs located on the third floor. In practice, the UEs are likely to be inside the building, and also located on other floors. Similar to the below clutter model considerations, above, outside of the main beam, the gain rapidly approaches −10 dBi rapidly, thus accounting for the reduction of the in-band protection distance to approximately 1195 m, and the 1st Adjacent band protection distance two approximately 110 m. Furthermore, at low elevations, a clear line of sight to the main beam is more necessary, since there is less likely to be building interference above the building clutter. Accordingly, in practical applications, and FSS site disposed above clutter would realistically experience less interference than the values provided in the Tables above. The shadow/corner effects described herein are more likely to occur below clutter (e.g., at or near ground level).

According to these models, it can be seen that UE migration may be analyzed according to techniques similar to the other morphologies described herein. For example, with respect to the values for the 1st Adjacent channel, the above clutter protection distance of 744 m is reduced to approximately 168 m at a 5 degree elevation for below-clutter, and further to 57 m at a 35 degree elevation. Outside of the main beam, a similar protection distance reduction would be realized, i.e., from 109 m to 48 m. These modeling values therefore demonstrate the proximity effect of UEs considered to be "close" to an FSS site, and therefore also the considerable value in implementing a UE-specific beacon to enable measurement of the actual UE interference, as well as the variance of the UE transmission caused by shadowing/cornering effects.

The embodiments herein this also demonstrate the particular value of summing an aggregate of UEs as a single reference point to model the effective EIRP. In the exemplary embodiment, the UE beacon itself may be transmitted at −7 dB with respect to a Category A AP, −24 dB with respect to a Category B rural AP, or −17 dB with respect to a Category B non-rural AP. The implementation of the present MBP techniques at the AP level further advantageously enables the AP to determine when UE beacons are activated, thereby further significantly reducing the signal/computational load on the central server/SAS.

Beacon Receiver Implementations at Earth Station Sites

The beacon transmission/receiver infrastructure described above detects beacon transmissions throughout the system to determine, in real-time, the potential for interference at FSS earth station sites. The following description provides further detail regarding the exemplary implementation, distribution, and operation of the exemplary beacon receivers/at and among the FSS earth station sites. As described herein, the present systems and methods achieve significantly improved measurements with respect to conventional techniques, and also more accurate estimates of interference levels in comparison with single detector operations.

As described above, mobile communication systems may coexist with satellite communication systems in the same CBRS band, but there are fewer than 20 such FSS sites across the United States, and having respective frequencies of operation restricted to the top end of the CBRS. Nevertheless, these FSS sites at present have large associated protection areas effectively segregating wireless and satellite users. System operators and the FCC are presently considering to additional spectrum within the 3.7-4.2 GHz, 5.925-6.425 GHz, and 6.425-7.125 GHz bands for flexible use, such as for mobile communication (5G in particular) in the United States. For ease of explanation, the United States is discussed herein by way of example, but is not intended to be limiting. The principles of the embodiments herein are applicable to other countries and their respective communication systems and networks.

With respect to the 3.7-4.2 GHz band, for example, 12 channels are provided for the downlink satellite communications, with 40 MHz channels spanning each polarization. At present, thousands of earth stations operate in this band across the United States, and require protection from radio interference from other wireless services. In the United States, the FCC regulates the interference levels from such services that share the same band.

In operation, the interference level from other wireless services may be measured (e.g., according to the techniques herein) or calculated (e.g., according to conventional techniques or conservative propagation models) as described above, at a reference point disposed at the output of a reference RF filter (RRF), such as between the feed horn and the LNB (described further below with respect to FIGS. 20 and 21). In conventional systems, each implementation of proposed sharing is performed in consultation with other FSS users, and using conservative radio planning tools in models. Such implementations typically require months to complete the necessary consultation and modeling of the respective proposal.

The innovative systems and methods described above though, provide new and improved techniques for coexistence of terrestrial wireless systems (e.g., including mobile communication systems) with satellite systems. The present techniques are drawn to a new operation model that expands upon the promotion of CBRS at the 3.5 GHz range, as described above. In the exemplary embodiment, a coexistence mechanism is advantageously utilizes priority tiers, protection zones, and coordination through a central server/SAS to plan use based initially on conservative propagations models, but which is also dynamically adjustable in real-time to the actual operational conditions of the system. In some embodiments, particular critical communication systems or subsystems (e.g., security or safety systems) may be assigned to have the highest priority use of the larger system, or portions thereof.

As described in detail above, the beacon infrastructure of the present systems and methods is unique to this field of technology, and advantageously provides a system for sharing the given satellite band spectrum with other wireless users, while also protecting FSS installations. In the exemplary embodiment, low power level radio beacons are implemented at each AP, and may be configured during registration to estimate in real-time the potential interference levels to FSS sites, and in coordination by the central server. In the exemplary embodiment, each FSS site is provided with its own beacon detection system to measure the interference. The transmitted beacons that are detected at the FSS sites thus enable the real-time measurement-based propagation system for closed loop control of interference, and thus the capability to share the chosen spectrum band (e.g., the C-band). Specific embodiments of these beacon detection systems are described in greater detail as follows.

In an exemplary embodiment, the design and implementation of the beacon detection architecture at each earth station site is accomplished by one or more of several types of individual detectors, and according to one or more various implementation processes. In some embodiments, one or more of the following detector types and implementation processes are utilized together for additional accuracy and reliability of interference measurements, calculations, and mitigation, and also for the ease of integrating separate infrastructures as the present systems and methods are scaled upward to accommodate more sites.

Figure 19:
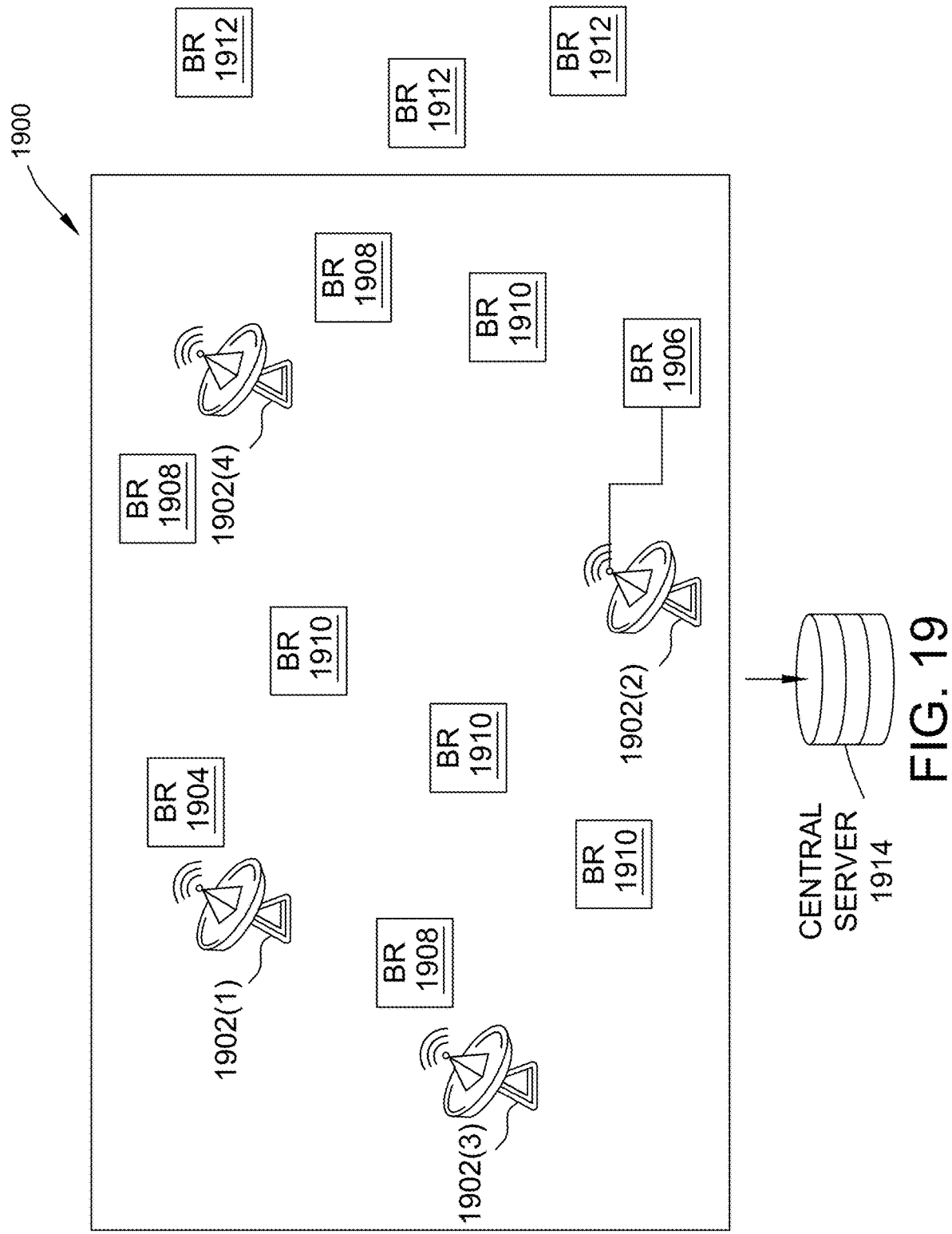
FIG. 19 is a schematic illustration of a fixed satellite service site configured to implement the protection scheme depicted in FIG. 4, according to an embodiment.

FIG. 19 is a schematic illustration of an FSS site 1900 configured to implement protection scheme 400, FIG. 4. In the exemplary embodiment, FSS site 1900 includes one or more earth stations 1902, and one or more of a platform-mounted beacon receiver 1904, a station-integrated beacon receiver 1906, a co-located beacon receiver 1908, and an auxiliary beacon receiver 1910. Earth stations 1902 are, for example, similar to earth stations 504, FIG. 5, and the several beacon receivers 1904, 1906, 1908, 1910 (sometimes referred to as "BR" or "BRs"), may be each configured to perform the functionality of beacon detector 528 at FSS site 502.

In exemplary operation of FSS site 1900, each of beacon receivers 1904, 1906, 1908, 1910 are further configured to receive beacon transmissions from one or more beacon transmitters 1912, such as may be disposed at or near an AP (not shown) or a UE (also not shown). In this example, beacon transmitters 1912 are similar in form and function to beacon transmitters 518, FIG. 5. In further operation, FSS site is configured to communicate with a central server 1914. Central server 1914 is thus similar to central server/SAS 510, FIG. 5, and may communicate with FSS site 1900 according to any one or more of the communication links described with respect to central server/SAS 510.

In the exemplary embodiment, beacon receivers 1904, 1906, 1908, 1910 are located within, or in near proximity to, FSS site 1900 (i.e., a cable operator plant). Alternatively, one or more of beacon receivers 1904, 1906, 1908, 1910 are located outside of FSS site 1900, but function in a similar manner (e.g., in communication with central server 1914 from a remote location). Additionally, the present embodiments are described with respect to the 4 GHz portion of the C-band, as well as the 6 Ghz spectrum; however, the systems and methods described herein are further advantageously adaptable to provide similar functionality for other spectral ranges that are utilized in communication systems that utilize the same, or similar, conventional system components (e.g., earth stations, satellite dishes, transmitters, receivers, APs, UEs, etc.), and/or are capable of being equipped with some or all of the beacon transmission/detection infrastructure described throughout this application.

In an embodiment, FSS site includes one or more of each of platform-mounted beacon receiver 1904, station-integrated beacon receiver 1906, co-located beacon receiver 1908, and auxiliary beacon receiver 1910. In the exemplary embodiment depicted in FIG. 19, earth station 1902(1) includes platform-mounted beacon receiver 1904, earth station 1902(2) includes station-integrated beacon receiver 1906, earth station 1902(3) includes a single co-located beacon receiver 1908, and earth station 1902(4) includes a plurality of co-located beacon receivers 1908. In this example, FSS site 1900 further includes a plurality of auxiliary beacon receivers 1910, which may be similar to distributed detector 548, FIG. 5.

FSS site 1900 thus represents a distributed beacon receiver system, where the several beacon receivers 1904, 1906, 1908, 1910 are distributed at or among earth stations 1902 to capture beacon transmission signals from remote beacon transmitters 1912 and report information, such as the beacon power, beacon ID, and the status of the respective beacon receiver to central server 1914 to enable central server 1914 to estimate the potential interference. According to this advantageous embodiment, the potential interference may be estimated both at the single FSS site 1900, and also at all FSS sites within range of a beacon-transmitting AP. Through implementation of this advantageous infrastructure, central server 1914 is further capable of coordinating interference-free FSS operation across all of the FSS sites within range. In exemplary implementation, a particular beacon receiver may be disposed with respect to earth station 1902 of FSS site 1900 by (i) mounting (e.g., platform-mounted beacon receiver 1904), (ii) integrating (e.g., station-integrated beacon receiver 1906), (iii) co-locating (e.g., co-located beacon receivers 1908), and/or (iv) auxiliary placement (e.g., auxiliary beacon receivers 1910).

Figure 20:
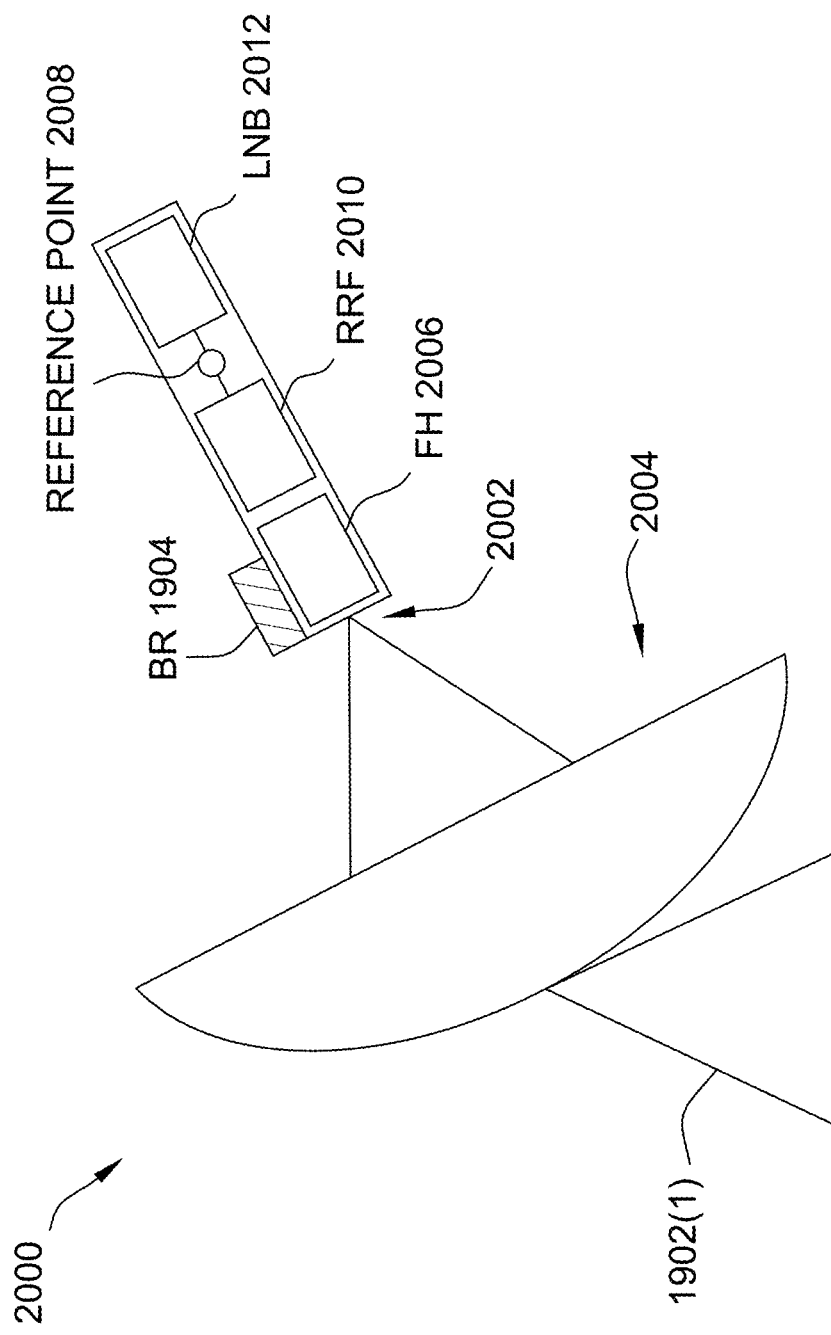
FIG. 20 is a schematic illustration of a beacon detection system implementing the earth station and the platform-mounted beacon receiver depicted in FIG. 19, according to an embodiment.

FIG. 20 is a schematic illustration of a beacon detection system 2000 that implements earth station 1902(1) and platform-mounted beacon receiver 1904, FIG. 19. Platform-mounted beacon receiver 1904 is an optional, or supplemental, configuration to the several beacon receiver configurations described herein (e.g., beacon receivers 1906, 1908, 1910). According to beacon detection system 2000, platform-mounted beacon receiver 1904 may be directly mounted to a fixed component of earth station 1902(1). In the exemplary embodiment, platform-mounted beacon receiver 1904 is fixed to earth station 1902(1) at a position proximate an antenna feed socket 2002 (i.e., near the focal point of a reflector 2004). From this exemplary location, platform-mounted beacon receiver 1904 is able to share the antenna gain, and thus also the received power, similar to the respective gain and power that will be observed at a feed horn 2006. Feed horn 2006 may be, in this example, similar to feed horn 208, FIG. 2. In this example, platform-mounted beacon receiver 1904 is similar to integral beacon detector 528(1), FIG. 5.

According to one or more of the calibration techniques described above, platform-mounted beacon receiver 1904 is able to measure the beacon and associated potential interference level approximate to a level at a reference point 2008 between an RRF 2010 and an LNB 2012.

In exemplary operation of beacon detection system 2000, the power level $P_{ref}$ (in dB) may be calculated at reference point 2008 according to:

$$P_{ref} = P_{BR} + P_{cal} \qquad (Eq.\ 1)$$

where $P_{BR}$ represents the measured power at platform-mounted beacon receiver 1904 with an equivalent isotropic antenna and a 0-dB gain, and $P_{cal}$ represents a calibration factor. In exemplary operation, each platform-mounted beacon receiver 1904 is configured to submit the measured data, including, for example, $P_{ref}$ and/or $P_{BR}$, satellite antenna gain (or dish parameters), and/or the FH or RRF losses to the central server (e.g., central server 1914, FIG. 19), that is, in some cases, $P_{ref}$ represents a sum of $P_{BR} + P_{BR\text{-}measured}$, where $P_{BR\text{-}measured} = P_{BR} + Gain_{reflector}$.

Figure 21:
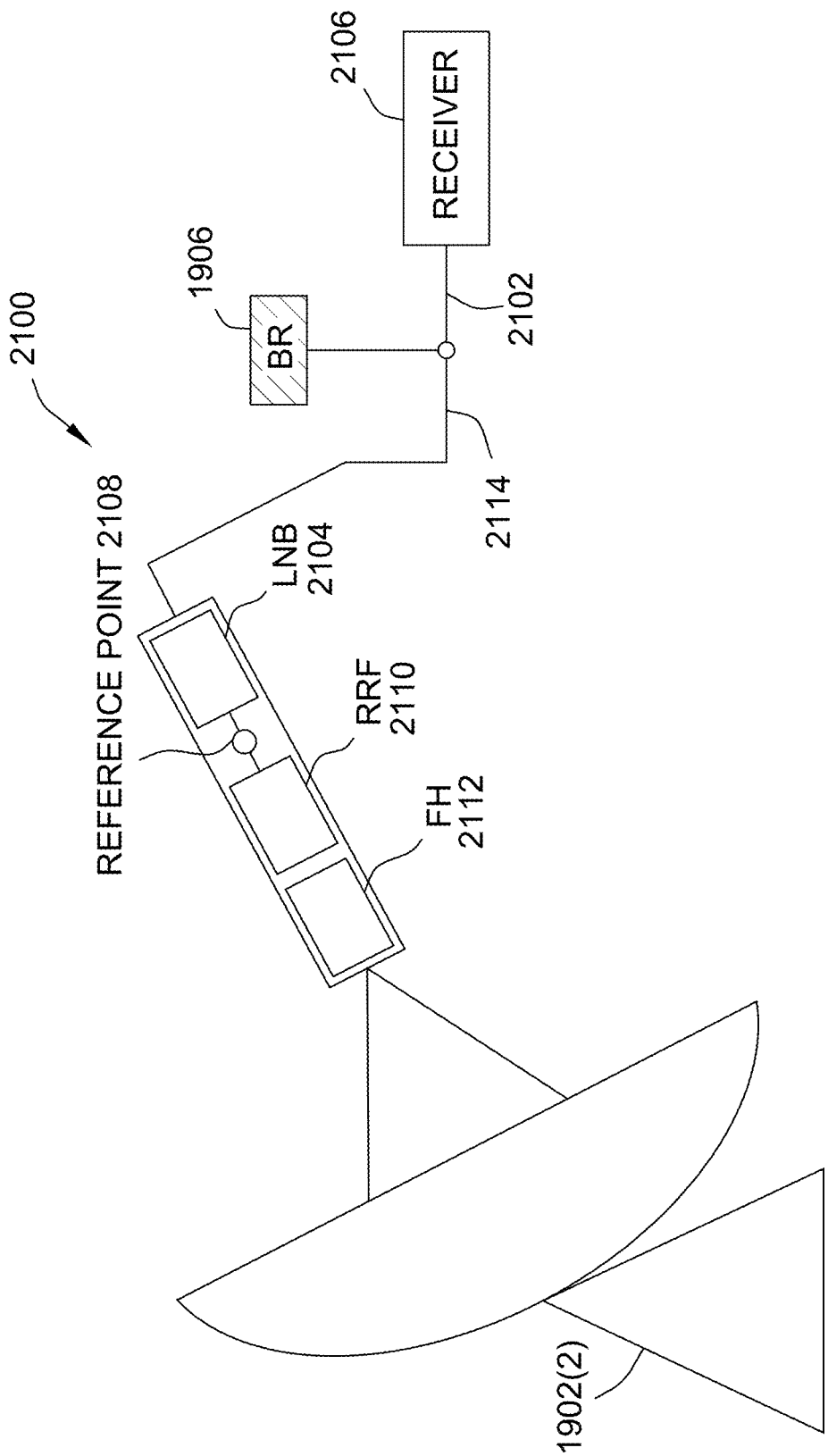
FIG. 21 is a schematic illustration of a beacon detection system implementing the earth station and the integrated beacon receiver depicted in FIG. 19, according to an embodiment.

FIG. 21 is a schematic illustration of a beacon detection system 2100 that implements earth station 1902(2) and station-integrated beacon receiver 1906, FIG. 19. In this example, station-integrated beacon receiver 1906 represents an alternative embodiment of integral beacon detector 528(1), FIG. 5. In an embodiment, implementation of station-integrated beacon receiver 1906 at a particular earth station 1902 (e.g., earth station 1902(2)) advantageously enables protection of the particular FSS site without additionally requiring implementation of platform-mounted beacon receiver 1904, co-located beacon receiver 1908, or auxiliary beacon receiver 1910.

According to beacon detection system 2100, station-integrated beacon receiver 1906 is tapped into a link 2102 between an LNB 2104 and a satellite signal receiver 2106. Through this integration of station-integrated beacon receiver 1906 into link 2102, a measurement may be obtained which includes the exact antenna gain and the link attenuation before a reference point 2108. According to this exemplary architecture, the hardware design of station-integrated beacon receiver 1906 may be greatly simplified in comparison with directly-mounted designs, because the sensitivity requirements of the receiver were significantly relieved due to the ability to share components, such as LNB 2104. In an embodiment, beacon detection system 2100 further includes an RRF 2110 and a feed horn 2112. In at least one embodiment, this configuration is realized through utilization of a spare LNB that is not presently in use by system 2100, or alternatively, through installation of a large LNB array.

In exemplary operation of beacon detection system 2100, the power level $P_{ref}$ may be calculated at reference point 2108 according to:

$$P_{ref} = P_{BR} - G_{LNB} + A \quad \text{(Eq. 2)}$$

where $G_{LNB}$ represents the gain of LNB 2104, and A represents the attenuation and insertion loss of a portion 2114 of link 2102 between LNB 2104 and station-integrated beacon receiver 1906. In exemplary operation, each station-integrated beacon receiver 1906 is configured to submit the measured data, including, for example, $P_{ref}$, $P_{BR}$, the satellite antenna gain (or dish parameters), and/or FH and RRF losses to the central server (e.g., central server 1914, FIG. 19).

In the exemplary embodiment depicted in FIG. 21, station-integrated beacon receiver 1906 is illustrated to be disposed after LNB 2104 (i.e., with respect to each particular dish utilizing beacon receiver 1906), but before satellite signal receiver 2106, and tapped at link 2102. Through this advantageous configuration, station-integrated beacon receiver 1906 is capable of directly measuring the interference at the particular dish (or each utilizing dish). The received beacon signal will thus directly experience the same satellite antenna gain as will the signal for any direction. This advantageous configuration would require little or no calibration, and may be simply installed with respect to existing conventional infrastructures through use of a tap after LNB 2104, and would therefore involve no significant interruption to the service by this type of installation. Other types of beacon receiver configurations may individually vary with respect to the accuracy of measurements, the cost of installation, and the required calibration, but may nevertheless provide particular advantages depending on the actual considerations experience that an individual FSS site.

In some embodiments, at least one steerable beacon detector is disposed externally to an FSS site, and may operate as a single beacon receiver for several dishes at the particular site, aunt/or for other sites within the operational range. In this example, the steerable beacon detector may be configured to have a higher antenna gain than the FSS site itself, particularly in the case of small diameter dishes being used at the FSS site. In practice, conventional 2-m dishes have high gains of approximately 37 dBi, which is generally higher than the gain of such an external steerable antenna. Nevertheless, the present embodiments contemplate utilizing higher-gain narrow-beam antennas to increase the link budget for beacon detection, which may be steerable, for example, using MIMO.

Although use of such external beacon receivers might increase the cost or complexity of the overall system in some other respects, the external beacon receivers may simultaneously also increase the size of the overall sensor network for interference measurements for calculations to build and improved the MBP models of the central server. Nevertheless, other APs may also include their own beacon detectors, thereby providing an alternative (or supplemental) technique to increase the size of this same sensor network.

Referring back to FIG. 19, co-located beacon receivers 1908 represents an alternative, or supplemental in some embodiments, configuration into either or both of beacon detection system 2000, FIG. 20, and beacon detection system 2100, FIG. 21. As illustrated in FIG. 19, co-located beacon receivers 1908 are disposed adjacent to, but not connected directly with, and antenna system (not separately shown) of the respective earth station (e.g., earth stations 1902(3), 1902(4)). In at least one embodiment, one or more of beacon receivers 1908 are installed outside of the boundaries of the particular the FSS site, to obtain additional information for the MBP-based propagation model. According to this exemplary configuration, co-located beacon receivers 1908 may be individually steered toward a direction and position similar to the antenna of the earth station, such that an individual co-located beacon receiver 1908 may emulate a spatial response similar to that of the antenna.

In some embodiments, steerable antennas having narrow-beam and high-gain functionality are utilized to detect beacons instead of (or in addition to) the radar system infrastructures described herein. For example, the respective satellite dishes of such steerable antennas may enable increases to the link budget for the beacon detection system, due to the higher gains thereof. In one example, each FSS site may include at least one steerable antenna per site, and the central server thereof may be further configured to build and dynamically update a model based on the inter-detected beacon interference to each FSS at the particular FSS site.

In exemplary operation, co-located beacon receivers 1908 are configured such that the power level $P_{ref}$ at reference point (not shown with respect to co-located beacon receiver 1908) of the respective earth station 1902(3), 1902(4) may be calculated or estimated according to:

$$P_{ref} = P_{BR} + G_{ant}(\theta) - 0.5 \quad \text{(Eq. 3)}$$

where $G_{ant}(\theta)$ represents the measured antenna gain (in dB) of the antenna of the respective earth station 1902(3), 1902(4) in the corresponding direction $\theta$ of the detected beacon transmitter (e.g., beacon transmitter 1912, FIG. 19), and where $P_{BR}$ is expressed in dBm and the 0.5 value represents an RRF loss of 0.5 dB. In the exemplary embodiment, the direction $\theta$ is determined from the respective locations of the beacon transmitters and earth station 1902(3) or 1902(4). In some embodiments, the direction $\theta$ may be affected by the elevation and azimuth angles of earth station 1902(3) or 1902(4). In an embodiment, a nominal value for antenna gain $G_{ant}(\theta)$ may also be calculated, e.g., according to FCC § 25.209(a), if the actual measured data of the antenna is unavailable. In at least one embodiment, the measured value $P_{BR}$ is, for example, an average value, or may represent a combination of measured values from multiple co-located beacon receivers 1908 where a plurality are disposed proximate an individual earth station, such as earth station 1902(4). In at least one embodiment, the measured value $P_{BR}$ is obtained using a high-gain antenna.

Similar to the embodiments described above with respect to beacon detection systems 2000, 2100, each co-located beacon receiver 1908 may be configured to submit the measured data, including, for example, the single or combination value for $P_{ref}$ and/or $P_{BR}$, to the central server (e.g., central server 1914, FIG. 19).

With reference to Eq. 3, above, the calculated power level might deviate from the true level at the respective reference point. In such cases, this deviation may not be possible to correct through calibration techniques, due to the physical separation between co-located beacon receiver 1908 and the respective earth station 1902(3) or 1902(4), and the associated variation and uncertainty of the power level over space. Such variation and uncertainty might be particularly severe at earth station sites that include metallic facilities sufficient to cause strong multi-path effects and/or power fading. Where such difficulties are encountered, the systems and methods described herein may be further advantageously configured to deploy one or more auxiliary beacon receivers 1910 throughout FSS site 1900, or to implement a simplified configuration at each individual dish according to system 2100.

Therefore, according to this exemplary auxiliary configuration, a plurality of auxiliary beacon receivers 1910 may be distributed throughout FSS site 1900 and function to advantageously provide additional, but separate, measured samples for estimating the power levels at earth stations 1902 equipped with a mounted, an integrated, and/or a co-located detector. In the exemplary embodiment, auxiliary beacon receivers 1910 further serve to function to provide a power level estimate for an earth station that does not include its own beacon detector, or at least one of the mounted, integrated, or co-located embodiments described above.

In at least one embodiment, a plurality of auxiliary beacon receivers 1910 are disposed such that they surround earth stations 1902 at various and/or random locations where power and/or an Internet connection is available, but which may not be readily available or easily accessed by a particular earth station 1902. Through this advantageous configuration, earth stations 1902 may located and positioned to receive optimal satellite transmission signals, even if such locations are not optimal to measure potential interference or communicate with the central server.

In exemplary operation of auxiliary beacon receivers 1910, the power level $P_{ref}$ at reference points of respective earth stations 1902 may be calculated in several ways. In a first example, a maximal value $\max\{P_{BR,i}\}$ is selected from data obtained from co-located beacon receivers 1908 and a subset of the surrounding auxiliary beacon receivers 1910 within a predetermined range, according to:

$$P_{ref}=\max\{P_{BR,i}\}+G_{ant}(\theta)-0.5 \quad \text{(Eq. 4)}$$

In a second example, the power level $P_{ref}$ is obtained using the mean of the power collected from these co-located beacon receivers 1908 and auxiliary beacon receivers 1910, with a total number of N, according to:

$$P_{ref} = \frac{1}{N}\sum_{i}^{N} c_i P_{BR,i} + G_{ant}(\theta) - 0.5 \quad \text{(Eq. 5)}$$

where $c_i$ represents a coefficient for the i-th beacon receiver, in the case where different beacon receivers have different weights. In an embodiment, the coefficient $c_i$ may be derived from a previous calibration and/or training techniques during operation.

In a third example, the power level $P_{ref}$ is obtained using interpolation, e.g. Kriging interpolation, based on the location and elevation of the earth station antenna, as well as the respective power levels, locations, and elevations of a subset of the surrounding auxiliary beacon receivers 1910 within the predetermined range. Similar to the embodiments described above, each auxiliary beacon receiver 1910 may also be configured to submit the measured data, including, for example, its own $P_{BR}$, to the central server (e.g., central server 1914, FIG. 19). Alternatively, an individual auxiliary beacon receivers 1910 is configured to submit data to a different auxiliary beacon receiver 1910 belonging to the same subset, and this different auxiliary beacon receiver 1910 may then submit the combined result $P_{ref}$ to the central server.

Figure 22:
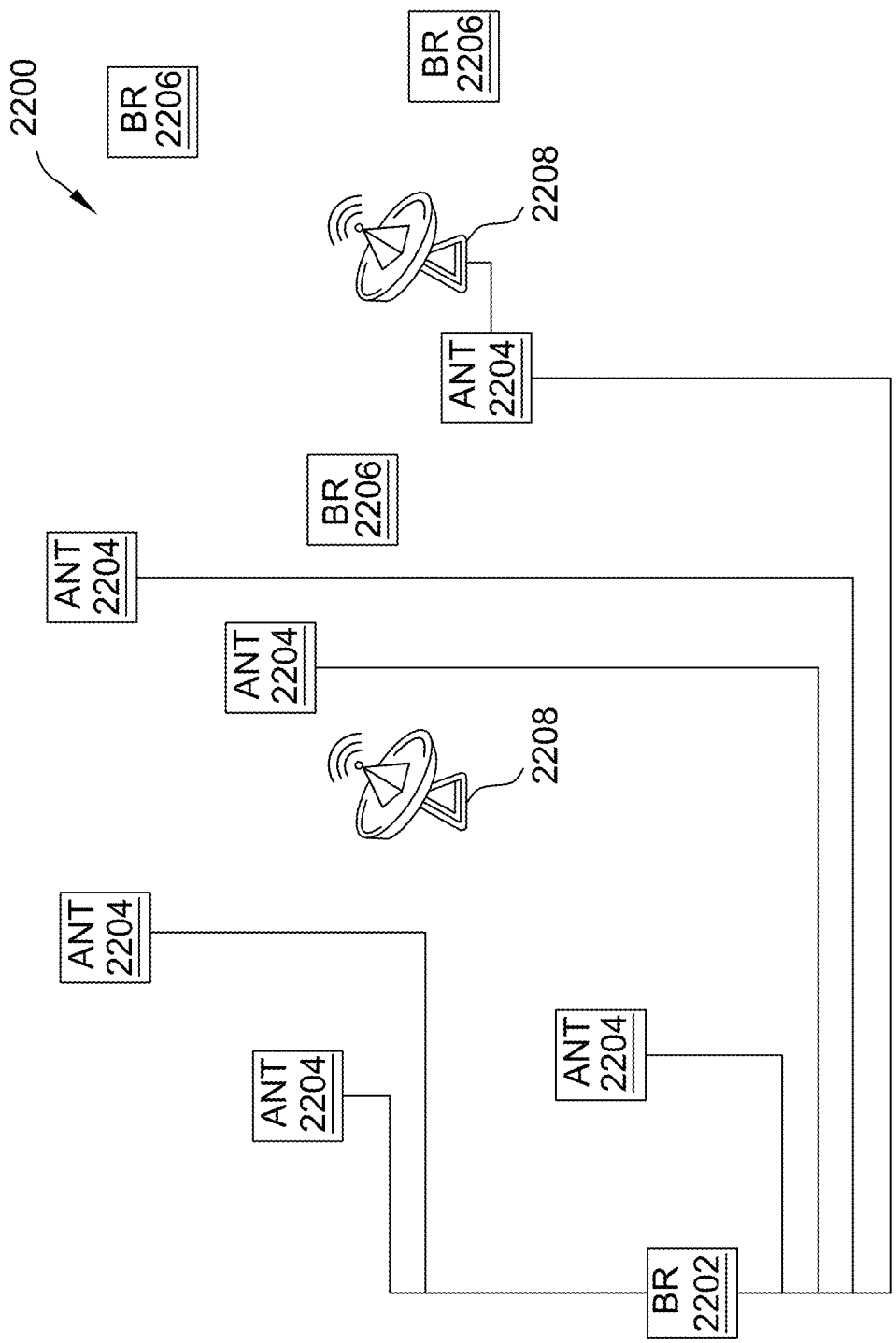
FIG. 22 is a schematic illustration of a distributed antenna system configured to implement the protection scheme depicted in FIG. 4, according to an embodiment.

FIG. 22 is a schematic illustration of a distributed antenna system (DAS) 2200 configured to implement protection scheme 400, FIG. 4. In the exemplary embodiment, DAS 2200 may be deployed in addition, or as an alternative, to each of the four embodiments of beacon receivers 1904, 1906, 1908, 1910 described above. That is, the at least one embodiment, DAS 2200 is deployed as a substitute for the distributed beacon detection architectures described above.

In an exemplary embodiment, DAS 2200 includes a central beacon receiver 2202 and a plurality of remote antennas 2204 distributed throughout an FSS site (e.g., FSS site 502, FIG. 5), with each remote antenna 2204 having at least one operable communication connection with central beacon receiver 2202. In some embodiments, DAS 2200 further includes one or more remote beacon receivers 2206, according to the embodiments described above. In exemplary operation, central beacon receiver 2202 collects received signals from remote antennas 2204, and may be further configured to derive the power level $P_{BR}$ that applied onto the respective reference point of an earth station 2208.

In a first example, the power level $P_{BR}$ is obtained by selecting the maximal value $\max\{P_{ant,i}\}$ from the plurality of remote antennas 2204, according to:

$$P_{BR}=\max\{P_{ant,i}\} \quad \text{(Eq. 6)}$$

where $P_{ant,i}$ represents the measured power at the i-th remote antenna 2204 with an equivalent isotropic antenna and a 0-dB gain over the link of DAS 2200.

In a second example, the power level $P_{BR}$ is obtained using the mean of the power collected from a total number M of remote antennas 2204, according to:

$$P_{BR} = \frac{1}{M}\sum_{i}^{M} d_i P_{ant,i} \quad \text{(Eq. 7)}$$

where $d_i$ represents a coefficient for the i remote antenna 2204. Similar to coefficient $c_i$, described above, the coefficient $d_i$ may also be derived from a previous calibration and/or training techniques during operation. In further operation of DAS 2200, the results obtained from Eq. 6 or Eq. 7 are applied to the calculation represented by Eq. 3 to derive the power level at the respective reference point.

The advantageous configuration of DAS 2200 realizes further benefits of being able to implement conventional DAS schemes with respect to the innovative beacon detection and decoding embodiments described herein. In an exemplary operation, a maximal ratio combining (MRC) mechanism is used upon signals from remote antennas 2204 before correlating a subject beacon ID from a particular beacon transmitter j (e.g., beacon transmitter 1912, FIG. 19), according to:

$$x_{BR,j} = \frac{\sum_{i}^{N} h_{i,j} * x_i}{\sum_{i}^{N} |h_{i,j}|^2} \quad \text{(Eq. 8)}$$

where $x_i$ represents a signal vector collected at the i remote antenna 2204, $h_{i,j}$ represents a channel response from the j beacon transmitter to the i remote antenna 2204, and estimated using a priori information, or from a previous measurement. The derivation value $x_{BR,j}$ may then be used for succeeding receiver processing, such as correlation with the reference beacon signal from the j beacon transmitter. In the exemplary configuration of DAS 2200, each of remote antennas 2204, as well as RF filters or related components (not shown) are implemented to follow the relevant descriptions in FCC part 25 and part 96. In each of the foregoing embodiments, the individual techniques and configurations of the several different beacon detection alternatives (i.e., mounted, integrated, co-located, auxiliary, DAS) may be advantageously implemented alone, or in any combination with each of the other alternatives.

Directional and Multi-Antenna Systems for in-band Protection

The present embodiments are further of particular advantageous use with respect to the operation of directional-antenna and multiple antenna (also referred to herein as "multi-antenna") mobile communication systems, and specifically for minimizing the interference to and from satellite systems that operate in the same or adjacent frequency band. The following embodiments may be employed with one or more of the beacon transmission systems and methods described above, whether in whole or in part.

As described above, mobile communication systems presently coexist with satellite communication systems in the same CBRS band. Some recent mobile communication proposals seek to liberate spectrum for flexible use within the 3.7-4.2 GHz, 5.925-6.425 GHz, and 6.425-7.125 GHz bands. The 3.7-4.2 GHz band, for example, includes 12 channels on each polarization, which are primarily used for the downlink (i.e., from space to earth) of satellite communication systems. There are thousands of earth stations operating in this band in the US, and these earth stations require interference protection. At present, the FCC regulates the interference levels from services sharing the same band. Interference considerations may not be the same in the 6 GHz bands though, since the satellite uplink does not have the sensitivity of the downlink. Nevertheless, very close proximity that is typically seen between satellite transmitters may still give rise to particular protection needs.

Macro-cellular deployment for mobile use within these spectra will generally create interference to FSS sites that use the C-band downlink, due to the lower propagation loss above clutter (i.e., relative to below clutter), as well as from the use of significantly higher transmitter powers in comparison with that of small cell use. At present, the protection distances between a macrocell and an FSS site tend to be considerably large, and exacerbated by MIMO antenna implementations, which effectively enhance the gain of the base station and increase the spectral density thereof. The present systems and methods mitigate these obstacles considerably in mobile use cases, as described herein. Nevertheless, some of these embodiments may be of even further advantageous use with respect to fixed wireless access (FWA) implementations in light of the speed of beam-forming across a mobile network. In some countries, the use of the 3.7-4.2 GHz spectrum is confined to limited geographical regions without widespread distribution of FSS. In such cases, it may be more desirable to allow use of the C-band for mobile implementations, and fixed radio use elsewhere. In some of these cases, however, interference may still occur in boundary regions between these geographical areas, in which case a buffer region may be created between the two usage systems (e.g., minimized to enhance microcellular mobile coverage).

Multi-antenna technologies, such as MIMO and massive MIMO, are known to increase spectral efficiency by providing multiplexing gain, and to improve SNR by providing diversity gain. Multi-antenna and technology is therefore of particular utility with respect to emerging communication technologies, such as 5G. Multi-antenna systems support multiple users/multi-user, as well as high-resolution beam-forming (sometimes labeled as "BF"). Beamforming is conventionally implemented in existing communication standards, such as coordinated multipoint (CoMP) in LTE for interference mitigation. Multi-antenna transmission is considered to be capable of maximizing the power level at a particular location by beamforming techniques, or minimizing the power level by the related null forming (sometimes labeled as "NF") techniques.

With respect to FWA implementations using the 3.7-4.2 GHz C-band, such as in 5G, MIMO-based systems may be particularly useful in rural areas, where the density of surrounding FSS sites would be expected to be considerably lower than it would be in higher populated areas. With FWA specifically, the number of connected locations is expected to be significantly lower than with a mobile use case.

As also described above, conventional coexistence techniques do not use the beacon infrastructure described herein, and are primarily based on propagation modeling, priority tiers, protection zones, and radio sensing. As described further below, the present systems and methods may be advantageously configured to implement an innovative auxiliary beacon infrastructure onto even conventional mobile communication systems. The present embodiments are thus further capable of being configured to use directional and multi-antenna technology, and also implement advantageous techniques that enable greater control of the signal pattern radiated from (or received at) the particular mobile communication system. This radiated signal pattern may then be managed to cause minimal interference at the satellite system/mobile communication system, thereby reducing the protection distance between the system and the FSS site. This consideration could be particularly useful, for example, where it is desirable to reduce the size of the buffer area or where there is a low density of FSS sites surrounding a macrocell size.

Figure 23:
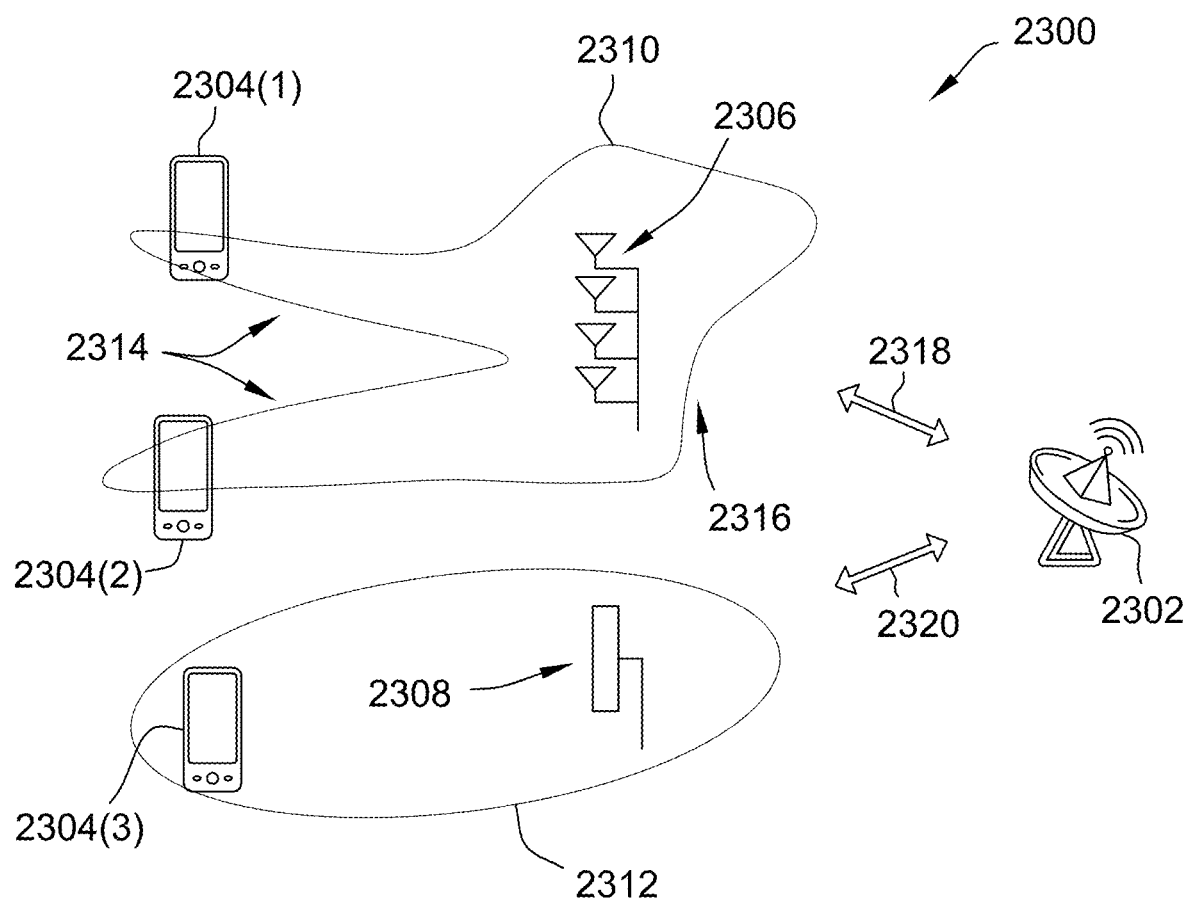
FIG. 23 is a schematic illustration of a multiple-antenna shared-use system, according to an embodiment.

FIG. 23 is a schematic illustration of a multiple-antenna shared-use system 2300. Shared-use system 2300 may include, or be utilized in a complementary fashion with, one or more of the several embodiments described above. In an exemplary embodiment, shared-use system 2300 includes an earth station 2302 and a plurality of UEs 2304 (e.g., or fixed transceivers, as in the case of FWA) in proximity one or both of a first antenna system 2306 and a second antenna system 2308. In the example depicted in FIG. 23, first antenna system 2306 represents a communication system AP (e.g., mobile, FWA, etc.) equipped with a multi-antenna wireless transceiver, and second antenna system 2308 represents a communication system AP equipped with a directional antenna.

In one embodiment, such as an FWA use case where an FSS site is located behind a receiving home direction, use of a null might disconnect this location. In such cases, a MESH network interconnecting homes, may be implemented in a cooperative manner with the present embodiments, thus lowering the number of communication links.

In exemplary operation of system 2300, first antenna system 2306 generates a first beam pattern 2310, and second antenna system 2308 generates a second beam pattern 2312. As depicted in FIG. 23, first beam pattern 2310 from the multi-antenna transceiver of first antenna system 2306 radiates one or more spatial radio beams (also referred to herein as beamforming, or BF, herein) 2314 for spatial high-gain UE or FWA coverage (e.g., UEs 2304(1), 2304(2)), while forming a null 2316 (also referred to as null forming, or NF, herein) to mitigate radiation in a first direction 2318 toward earth station 2302. In contrast, second beam pattern 2312 from the directional antenna of second antenna system 2308 is more uniform and generates minimal radiation in a second direction 2320 toward earth station 2302.

Figure 24:
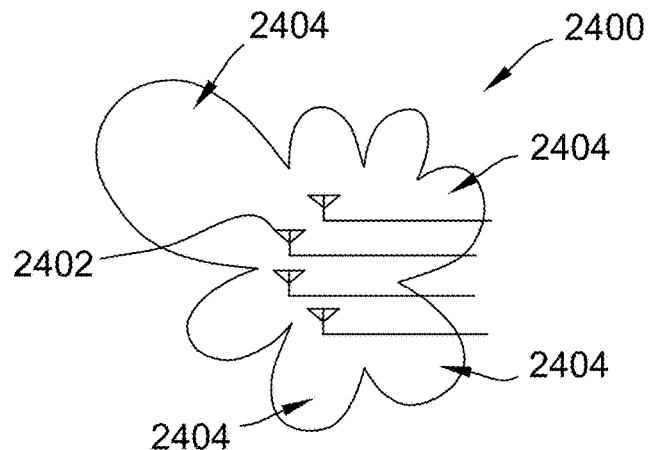
FIG. 24 illustrates a far field beam pattern for a multiple antenna system, according to an embodiment.

FIG. 24 illustrates a far field beam pattern 2400 for a multiple antenna system 2402. Far field beam pattern 2400 is similar to first beam pattern 2310, FIG. 23, of first antenna system 2306, except that multi-antenna system 2402 is configured to utilize beamforming to radiate a plurality of radio beams (BFs) 2404 in multiple directions about multiple antenna system 2402, such that beam pattern 2400 results in the far field shape depicted in FIG. 24.

Figures 25, 26:
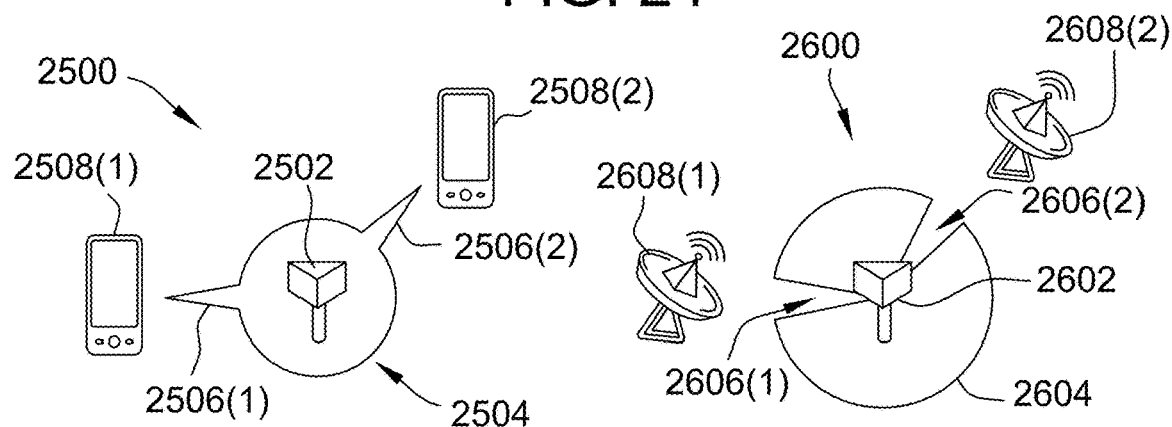
FIG. 25 is a schematic illustration of a multiple antenna system, according to an embodiment.
FIG. 26 is a schematic illustration of a multiple antenna system, according to an embodiment.

FIG. 25 is a schematic illustration of a multiple antenna system 2500. System 2500 includes at least one multi-antenna transceiver array 2502 and a field beam pattern 2504 radiating a plurality of high-gain radio beams 2506 toward respective UEs 2508 or FWA transceivers. FIG. 26 is a schematic illustration of a multiple antenna system 2600. System 2600 includes at least one multi-antenna transceiver array 2602 and a field beam pattern 2604 which forms a plurality of nulls 2606 directed toward respective earth stations 2608. Earth stations 2608 may be similar to earth station 2302, FIG. 23. Multi-antenna transceiver 2602 may be similar in structure to multi-antenna 2502, FIG. 5.

Conventional coexistence technology utilizes BF to provide better coverage for UE sets (e.g., FIG. 25), or to minimize the interference inside the mobile network of system 2500. The innovative systems and methods described herein though, are additionally configured and programmed to further operate the respective antenna arrays to provide the plurality of nulls 2606 toward and/or from respective earth stations 2608 (e.g., FIG. 26), and also to extend the use case to FWA. The underlying structures and operations of systems 2500 and 2600 are described further below with respect to various combinations thereof in the following multiple antenna systems. In the following embodiments, the various UEs are depicted for illustration purposes to represent respective mobile communication subsystems or FWA transceivers, and various earth stations are depicted for similar purposes, namely, to represent respective satellite subsystems.

Figure 27:
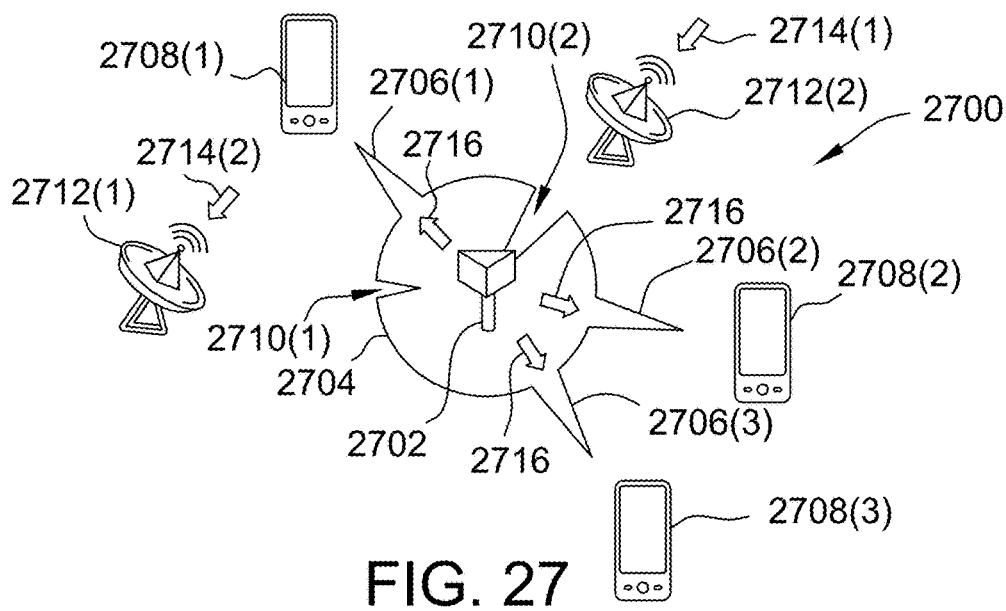
FIG. 27 is a schematic illustration of a multiple antenna system, according to an embodiment.

FIG. 27 is a schematic illustration of a multiple antenna system 2700. Similar to FIGS. 25 and 26, above, system 2700 also includes at least one multi-antenna transceiver array 2702 configured to generate a beam pattern 2704. Unlike conventional systems, multi-antenna transceiver array 2702 may be advantageously configured to generate a far field beam pattern 2706, and also to implement both BF and NF. In some cases, array 2702 implements BF and NF simultaneously. In the exemplary embodiment, beam pattern 2704 includes a plurality of high-gain radio beams 2706 directed toward a plurality of mobile subsystems 2708 (e.g., including UEs), respectively. In a similar, but complementary, manner, beam pattern 2704 further includes a plurality of nulls 2710 directed toward respective satellite subsystems 2712 (e.g., including earth stations).

In exemplary operation of system 2700, array 2702 is configured to implement both BF and NF to protect a satellite downlink 2714 to satellite subsystems 2712 from a mobile downlink 2716 of mobile subsystems 2708. That is, in order to protect satellite downlink 2714 from mobile downlink 2716, operation of array 2702 is configured to establish both BF and NF at substantially the same time for transmission of mobile downlink 2716 in a cell (e.g., beam pattern 2704) covered by multiple antenna system 2700. In the exemplary embodiment, beams 2706 and nulls 2710 are generated from the same mechanism (e.g., a central processor (not shown) cooperating with array 2702). According to this example, using the MBP techniques described above, the respective beams 2706 and nulls 2710 may be further optimized for both improved UE/FWA coverage and satellite protection. In a case where transmission of a beacon from a base station is problematic, one contemplated remedy would be a change in the frequency of operation.

In at least one embodiment of system 2700, the BF and NF operations may each further consider the channel status and system information. For example, as illustrated in FIG. 27, the satellite subsystem farthest from array 2702 (satellite subsystem 2712(1) in this example) may require less NF attenuation than a satellite subsystem farther away (satellite subsystem 2712(2) in this example), as indicated by null 2710(1) being substantially smaller than null 2710(2). This use case may be particularly advantageous, for example, in FWA and 5G implementations.

In one example of system 2700, the base station may be on the same frequency as the satellite ground station. In such cases, system 2700 may be implemented in a complementary fashion with a stoplight system, e.g., stoplight system 3800, FIG. 38 (described further below) to more reliably eliminate significant interference at the ground stations with a means of identification. A stoplight system may further serve to improve the successful implementation of the MBP techniques described above. Nevertheless, according to the BF and NF principles of system 2700, the base station location may be significantly closer than conventionally seen, thus enabling better coverage and capacity within the cellular network.

Figure 28:
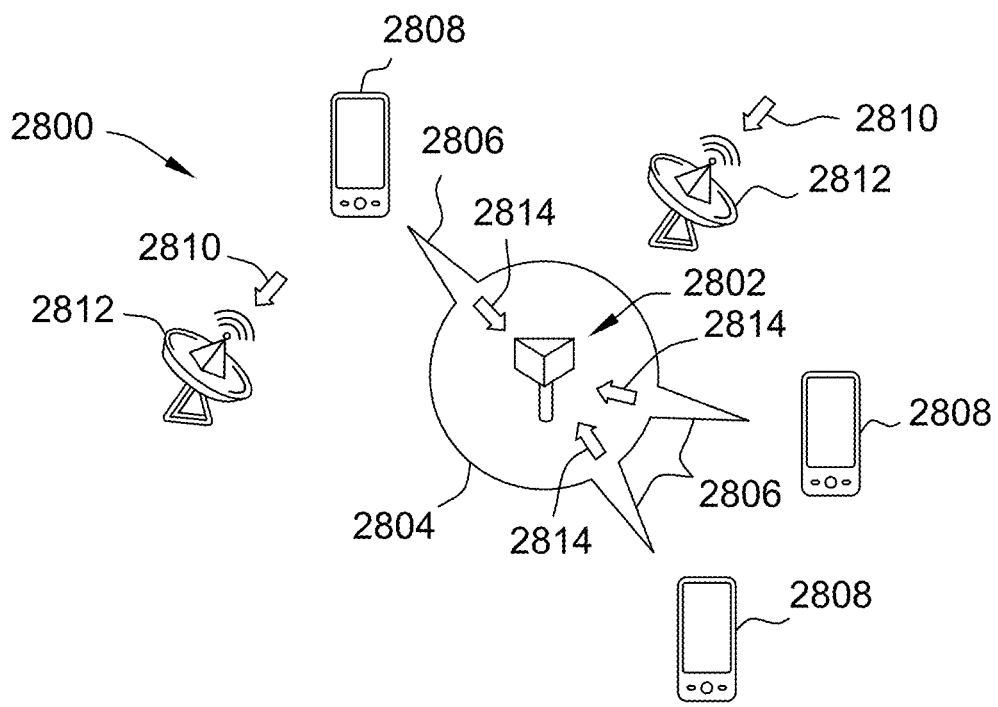
FIG. 28 is a schematic illustration of a multiple antenna system, according to an embodiment.

FIG. 28 is a schematic illustration of a multiple antenna system 2800. System 2800 may be similar to system 2700, FIG. 27, in overall architecture and general functionality. That is, system 2800 may include at least one multi-antenna transceiver array 2802 configured to generate a beam pattern 2804 implementing at least BF, and including a plurality of beams 2806 respectively directed toward a plurality of mobile subsystems 2808. System 2800 differs from system 2700 though, in that system 2800 illustrates a case for protecting a respective satellite downlink 2810 of a satellite subsystem 2812 from a mobile uplink transmission 2814 from one or more of mobile subsystems 2808. In this exemplary embodiment, as well as the several following embodiments, "mobile" may be considered to refer to both mobile and FWA transceivers.

More particularly, in exemplary operation of system 2800, beamforming is established for mobile/FWA uplink transmission 2814 within the cell covered by beam pattern 2804, such that the SNR in the uplink from respective UEs or FWA transceivers of mobile subsystem(s) 2808 may be adjusted and/or optimized at a receiver portion (not separately shown) of multi-antenna transceiver array 2802 using a minimal transmitted power from the respective UEs. It may be noted in this particular example, that because protection is only sought for satellite downlink 2810 from mobile uplink transmission 2814, it is not necessary to consider NF techniques for forming nulls in this particular embodiment.

Figure 29:
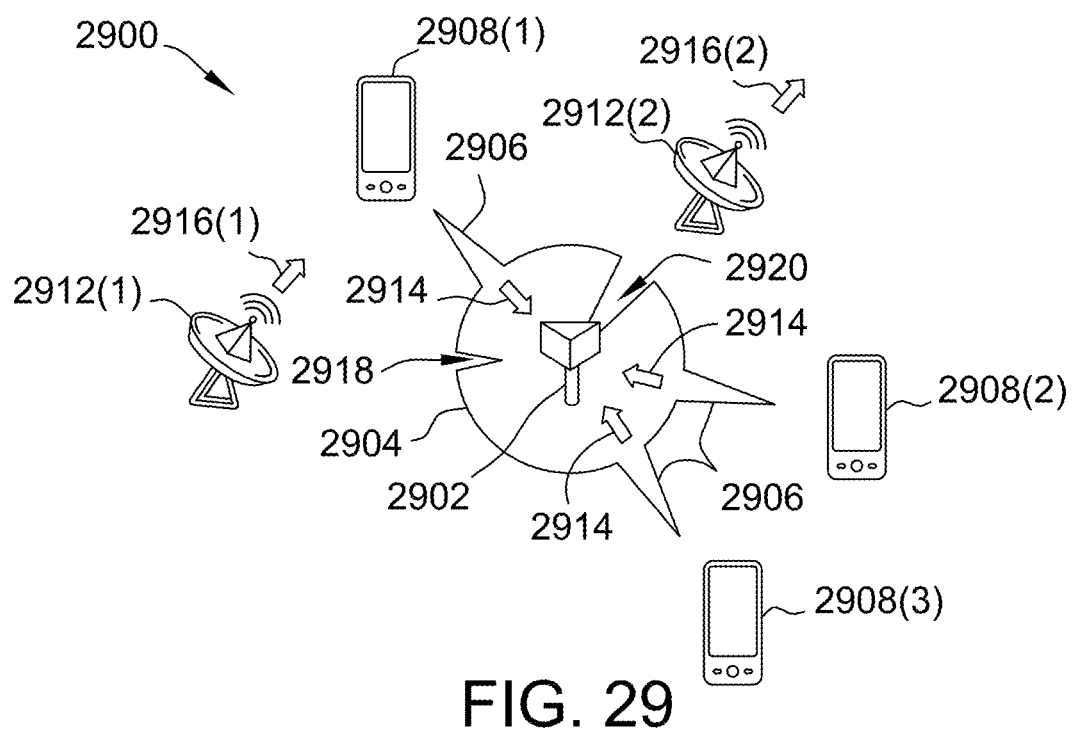
FIG. 29 is a schematic illustration of multiple antenna system, according to an embodiment.

FIG. 29 is a schematic illustration of multiple antenna system 2900. In the exemplary embodiment, system 2900 is similar to system 2700, FIG. 27, in architecture and functionality, and may include at least one multi-antenna transceiver array 2902 configured to generate a beam pattern 2904 implementing both BF and NF, which includes a plurality of beams 2906 respectively directed toward a plurality of mobile subsystems 2908, as well as a plurality of nulls 2910 directed toward respective satellite subsystems 2912. System 2900 differs from system 2700 though, in that system 2900 illustrates a case for minimizing interference to a mobile uplink transmission 2914 of mobile subsystems 2908 from a respective satellite uplink 2916 of one or more satellite subsystems 2912.

More particularly, in exemplary operation of system 2900, both BF and NF are established in the cell covered by multi-antenna transceiver array 2902 for mobile uplink transmission(s) 2914 within the cell. In at least one embodiment of system 2900, the BF and NF operations may each further consider the channel status and system information, similar to system 2700, FIG. 27. Also similar to system 2700, as illustrated in the example depicted in FIG. 29, the satellite subsystem farthest from array 2902 (satellite subsystem 2912(1) in this example) may require less NF attenuation than a satellite subsystem farther away (satellite subsystem 2912(2) in this example), as indicated by a first null 2918 being substantially smaller than a second null 2920.

Figure 30:
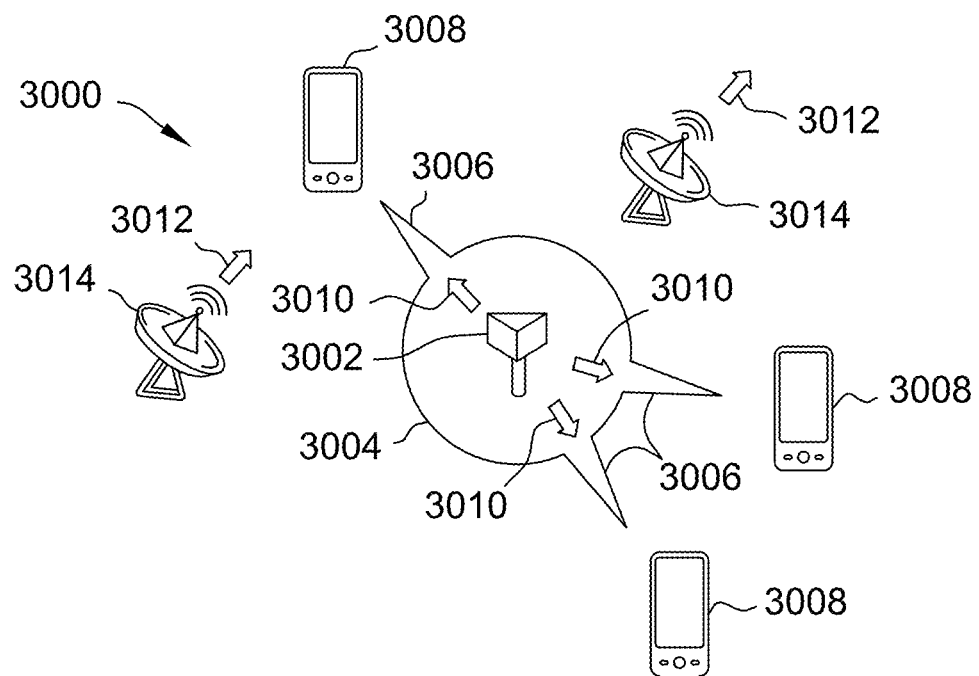
FIG. 30 is a schematic illustration of a multiple antenna system, according to an embodiment.

FIG. 30 is a schematic illustration of a multiple antenna system 3000. System 3000 may be similar to system 2800, FIG. 28, in architecture and functionality. That is, system 3000 may include at least one multi-antenna transceiver array 3002 configured to generate a beam pattern 3004 implementing at least BF, which includes a plurality of beams 3006 respectively directed toward a plurality of mobile subsystems 3008. System 3000 differs from system 2800 though, in that system 3000 illustrates a case for minimizing interference to a mobile downlink transmission 3010 to mobile subsystems 3008 from a respective satellite uplink 3012 of one or more satellite subsystems 3014.

More particularly, in exemplary operation of system 3000, beamforming is established for mobile downlink transmission 3010 within the cell covered by beam pattern 3004, such that the downlink SNR from multi-antenna transceiver array 3002 may be maximized at the respective UEs of mobile subsystems 3008. It may be noted in this particular example, that because protection is only sought for mobile downlink 3010 from satellite uplink transmission 3012, it is not necessary to consider NF techniques for forming nulls in this particular embodiment.

Figure 31:
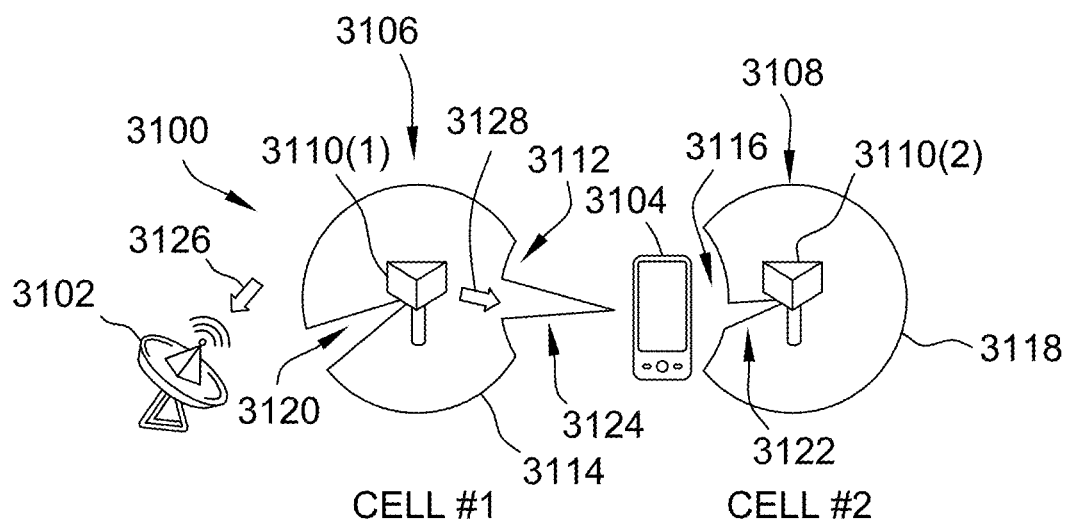
FIG. 31 is a schematic illustration of a mobile network implementing joint beamforming and null forming, according to an embodiment.

FIG. 31 is a schematic illustration of a mobile network 3100 implementing joint beamforming and null forming. In an exemplary embodiment, mobile network 3100 includes at least one satellite subsystem 3102, at least one mobile subsystem 3104, a first multiple antenna communication cell 3106 (CELL #1), and a second multiple antenna communication cell 3108 (CELL #2). Each of first and second communication cells 3106, 3108 may be similar to the cells described in the embodiments above, and include at least one respective multi-antenna transceiver array 3110, each of which may be configured to implement both BF and NF.

In an exemplary operation of mobile network 3100, BF and NF are established based on the global condition of mobile network 3100, and jointly managed according to the innovative techniques described herein. That is, in practice, a plurality of multi-antenna communication systems (e.g., first and second communication cells 3106, 3108) may jointly provide desired coverage for one or more UEs or FWA transceivers of mobile subsystem 3104, while also providing protection to (and from) satellite subsystem(s) 3102. In this embodiment though, the joint operation of cells 3106, 3108 is configured to manage the operation of each cell in consideration of the other cell.

For example, as depicted in FIG. 31, joint operation of cells 3106, 3108 may initially establish NF for each cell in regard to the other. In this example, in a direction of second cell 3108, first cell 3106 forms a first null 3112 in a first beam pattern 3114 of first cell 3106. Similarly, in a direction of first cell 3106, second cell 3108 forms a second null 3116 in a second beam pattern 3118 of second cell 3108. A joint effect of first and second nulls 3112, 3116 between the respective cells 3106, 3108 serves to minimize inter-cell interference therebetween. In further operation of system 3100, first cell 3106 is configured to additionally form a third null 3120 in first beam pattern 3114 in the direction of satellite subsystem 3102, and second cell 3108 is configured to additionally form a fourth null 3122 in second beam pattern 3118, also in the direction of satellite subsystem 3102.

In this example, because the second cell 3108 is depicted to be farther away from satellite subsystem 3102 than is first cell 3106, fourth null 3122 is illustrated to be somewhat smaller than third null 3120, signifying a lower need for attenuation due to increased distance from potential interference. In still further operation of system 3100, first cell 3106 is additionally configured to establish BF toward mobile subsystem 3104, despite the existence of mobile subsystem 3104 (e.g., a UE thereof) between first cell 3106 and second cell 3108. That is, in the direction of mobile subsystem 3104, first cell 3106 generates a radio beam 3124. In at least one embodiment, first cell 3106 generates radio beam 3124 toward mobile subsystem 3104 even in the case where a UE of mobile subsystem 3104 is physically located within the transmission boundaries of second cell 3108.

Accordingly, in the example depicted in FIG. 31, it can be seen that first null 3112 and radio beam 3124 in beam pattern 3114 distorted shape to beam pattern 3114 where null 3112 is superimposed with beam 3124. Similarly, it can be seen that second null 3116 and fourth null 3122 also form a distorted shape in beam pattern 3118 from the superimposition thereof. As described above, this effect may be different for mobile UEs (e.g., in a fast-moving vehicle), as compared with a fixed transceiver of an FWA subsystem. System 3100 is depicted, for ease of illustration, with respect to a satellite downlink 3126 of satellite subsystem 3102 and a mobile downlink transmission 3128 from array 3110(1) of first cell 3106 to mobile subsystem 3104. However, the person of ordinary skill in the art will understand that the principles system 3100 fully apply also in the case of a satellite uplink and/or mobile uplink, as described above in the preceding embodiments.

Through the innovative BF and NF techniques of system 3100 described herein, the respective superimposed pattern shapes of the cells may be optimized to achieve particular benefits over conventional systems, including without limitation: (1) maximal SNR, from the respective UEs, at the receiver (not shown in FIG. 31) of multi-antenna transceiver array(s) 3110; (2) maximal SNR, at the UEs/FWA transceivers, from multi-antenna transceiver array(s) 3110; (3) minimal power, from multi-antenna transceiver array(s) 3110 and the UEs of mobile subsystem(s) 3104, at nearby satellite subsystems 3102; and (4) minimal power, at multi-antenna transceiver array(s) 3110 and the UEs of mobile subsystem(s) 3104, from nearby satellite subsystems 3102. In an exemplary embodiment, operation of system 3100 is configured to optimize one or more of the preceding benefits according to predetermined criteria of the particular system, and may prioritize realization of one such benefit over another.

Figure 32:
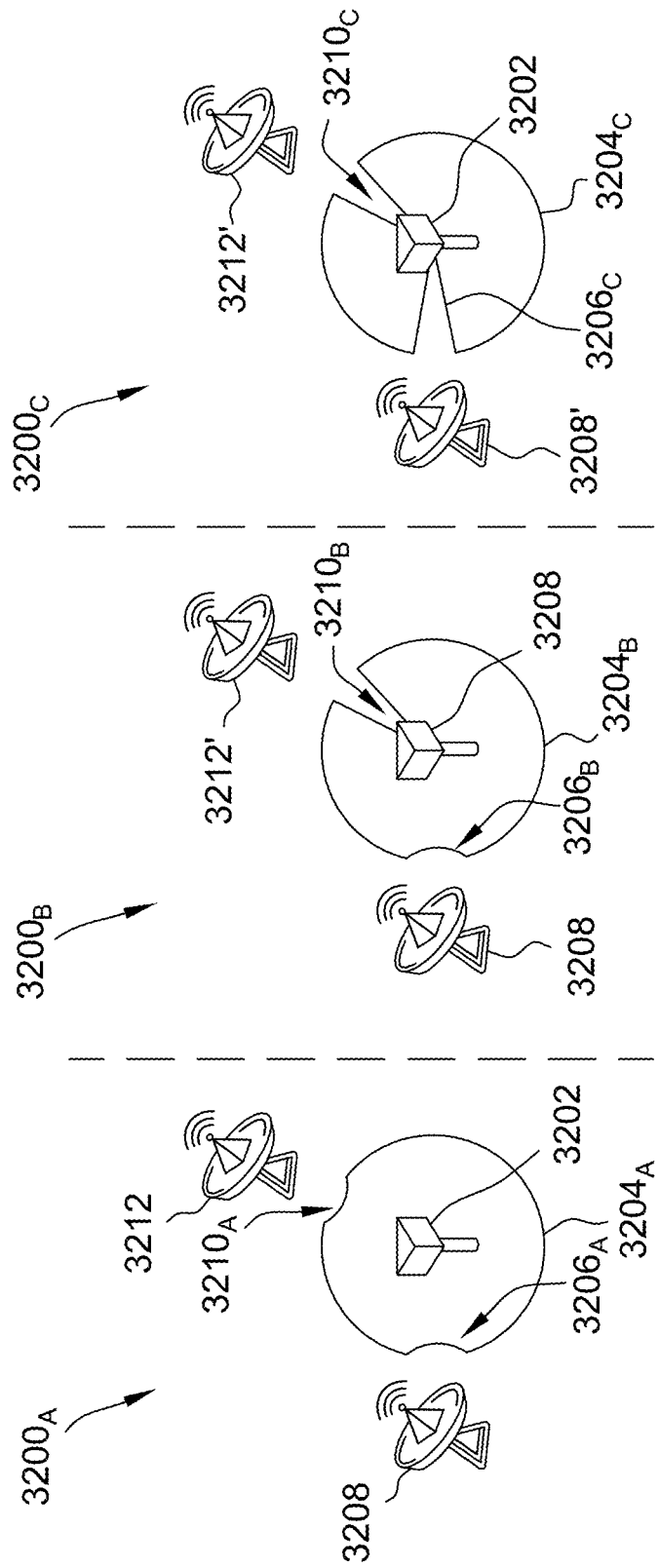
FIGS. 32A-C are schematic illustrations of a mobile network configured to implement dynamic null forming for different respective frequencies, according to an embodiment.

FIGS. 32A-C are schematic illustrations of a mobile network 3200 configured to implement dynamic null forming for different respective frequencies. In an exemplary embodiment, mobile network 3200 includes at least one multi-antenna transceiver array 3202 generating a beam pattern 3204. Beam pattern 3204 includes a first null 3206 in a direction of a first satellite subsystem 3208 and a second null 3210 in a direction of a second satellite subsystem 3212. In exemplary operation of mobile network 3200, array 3202 is configured to implement dynamic NF in accordance with changing frequency channels transmitted by first and second satellite subsystems 3208, 3212. According to this dynamic NF technique, mobile network 3200 is configured to optimally change the shape of beam pattern 3204 to provide a dynamic protection pattern. In some embodiments, network coordination and signaling are optimized to address latency concerns, and also with respect to the beacon transmissions described above.

More particularly, according to the present embodiments, BF and NF may both be established subject to the actual status of the respective UEs or mobile/FWA transceiver subsystems, satellite subsystems (e.g., subsystems 3208, 3212), and the respective channels operated thereby. As illustrated above, that is, through a comparison of FIGS. 32A, 32B, and 32C, the NF shape of beam pattern 3204 changes over time as the frequency channels of the respective satellite subsystems 3208, 3212 change. In at least one embodiment, in the case of a fast-moving UE (e.g., a mobile phone in a moving automobile), the system may be configured to move the particular device to a different band.

Specifically, in this example, first and second nulls $3206_A$ and $3210_A$ have an initial shape when first and second satellite subsystems 3208, 3212, respectively, are at initial frequency channels, as depicted in FIG. 32A. As depicted in FIG. 32B, when the frequency channel changes for second satellite subsystem 3212', the shape of second null $3210_E$ also changes in time in accordance with the respective frequency change. In this example, the frequency channel of first satellite subsystem 3208 has not changed, and therefore there is no corresponding change to the shape of first null 3206 (i.e., the shape of first null $3206_B$ is substantially the same as the shape of first null $3206_A$). As depicted in FIG. 32C, when the frequency channel changes for first satellite subsystem 3208', the shape of first null $3206_C$ also changes in time (from the shape of null $3206_B$). In this example though, the frequency channel of second satellite subsystem 3212' has not changed from the example of FIG. 32B, and therefore there is no further corresponding change to the shape of second null 3210 based only on the change in the shape of first null 3206 (i.e., the shape of second null $3210_C$ is substantially the same as the shape of second null $3210_B$).

Figure 33:
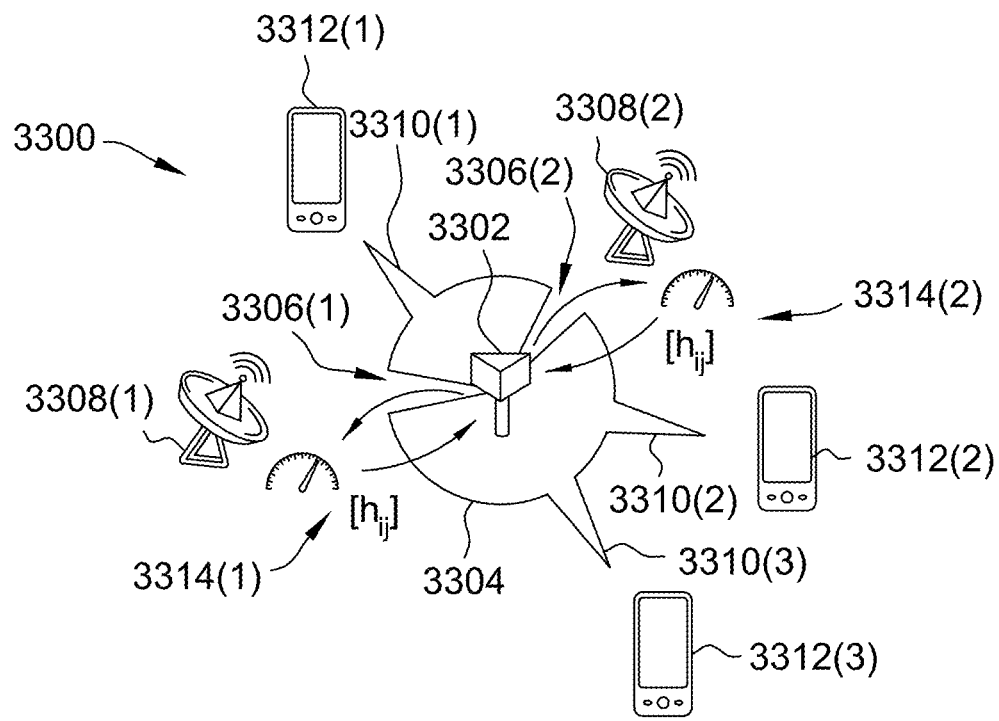
FIG. 33 is a schematic illustration of a mobile network implementing channel estimation, according to an embodiment.

FIG. 33 is a schematic illustration of a mobile or FWA network 3300 implementing channel estimation. In an exemplary embodiment, mobile network 3300 includes at least one multi-antenna transceiver array 3302 generating a beam pattern 3304. Beam pattern 3304 includes a plurality of nulls 3306 respectively formed in directions of a plurality of satellite subsystems 3308. In this example, beam pattern 3304 further includes a plurality of radio beams 3310 respectively formed in directions of a mobile or FWA subsystems 3312. In the exemplary embodiment, each of satellite subsystems 3308 is equipped with a radio sensor 3314 (e.g., a beacon detector, as described above) within an FSS site of the respective subsystem 3308, or in operable communication therewith, in accordance with one or more of the embodiments described above (e.g., co-located, integrated, etc.).

In exemplary operation of mobile network 3300, a transmitter (not separately shown) of multi-antenna transceiver array 3302 is configured to transmit a training symbol or beacon. In some embodiments, these transmitted symbols/beacons are sent at a relatively low power level, as described with respect to the beacon infrastructure systems and methods above, and optionally may or may not include information pertaining to the location of the respective satellite subsystem 3308, and/or nulls 3306 formed using NF. Respective sensors 3314 are configured to be capable of detecting the transmitted training symbol(s)/beacon(s), thereby enabling mobile network 3300 (e.g., by a processor therein, or a central server in operable communication therewith) to derive channel state information (CSI) and feed the CSI back to array 3302 (e.g., a receiver thereof, not separately shown). In at least one embodiment, feedback to array 3302 is performed through backhaul facilities, such as a relay server (described further below with respect to FIG. 34) and/or over Ethernet.

After receiving the CSI feedback, multi-antenna transceiver array 3302 may be further configured to implement BF- and NF-encoding based on the received CSI. In the case where array 3302 includes a phase array multi-antenna system, to realize BF (e.g., for beams 3310), antenna phases $\varphi_1, \varphi_2, \ldots \varphi_N$ may be determined according to:

$$\mathrm{argmax}_{\varphi_1,\varphi_2 \ldots \varphi_N} |\Sigma_{1 \leq i \leq N} h_i e^{j\varphi_i}| \qquad \text{(Eq. 9)}$$

where N represents the total number of antennas included in array 3302 (e.g., of an AP), and $h_i$ represents the channel response from an individual antenna i to the respective UE/mobile subsystem 3312.

Similarly, to realize NF (e.g., for nulls 3306), the antenna phases $\varphi_1, \varphi_2, \ldots \varphi_N$ may be similarly determined according to:

$$\mathrm{argmin}_{\varphi_1,\varphi_2 \ldots \varphi_N} |\Sigma_{1 \leq i \leq N} h_i e^{j\varphi_i}| \qquad \text{(Eq. 10)}$$

where $h_i$ represents the channel response from the individual antenna i to the respective satellite subsystem 3308.

Figure 34:
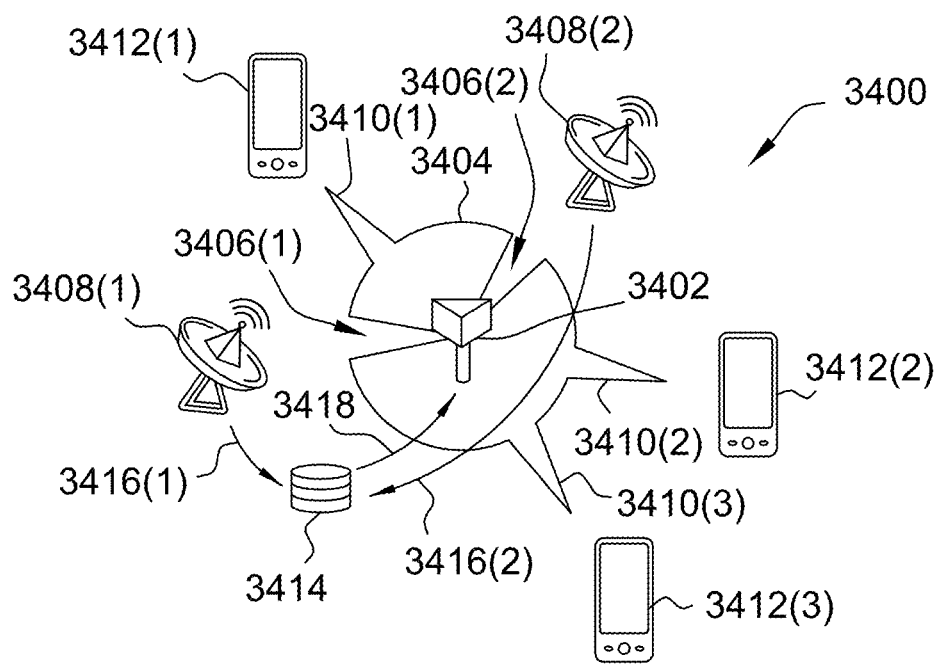
FIG. 34 is a schematic illustration of a mobile network implementing satellite system information relay, according to an embodiment.

FIG. 34 is a schematic illustration of a mobile network 3400 implementing satellite system information relay. In an exemplary embodiment, mobile network 3400 is similar to mobile network 3300, FIG. 33, and includes at least one multi-antenna transceiver 3402 generating a beam pattern 3404, which includes a plurality of nulls 3406 respectively formed in directions of a plurality of satellite subsystems 3408. In this example, beam pattern 3404 further includes a plurality of radio beams 3410 respectively formed in directions of a plurality of mobile subsystems 3412. In the exemplary embodiment, mobile network 3400 is in operable communication with a server 3314 (e.g., a central server or SAS, described above) configured to collect information from satellite subsystems 3408 and sensors thereof (e.g., sensor 3314, FIG. 33), which may include without limitation the respective locations, frequency channels, angles, antenna gains, site conditions, CSI, etc.

In exemplary operation of multiple network 3400, server 3314 executes a collection operation 3416 of some or all of the information from respective satellite subsystems 3408, and then executes a relay operation 3418 of the collected information to a receiving portion (not separately shown) of multi-antenna transceiver 3402. In some embodiments, the relayed information may be further relayed (not shown in FIG. 34) from transceiver 3402 to respective mobile subsystems 3412 (e.g., UEs including thereof). In at least one embodiment, server 3414 is further configured to provide additional information, including without limitation, geographic information and/or building layouts, to mobile network 3400 to further facilitate BF and NF operation.

Figure 35:
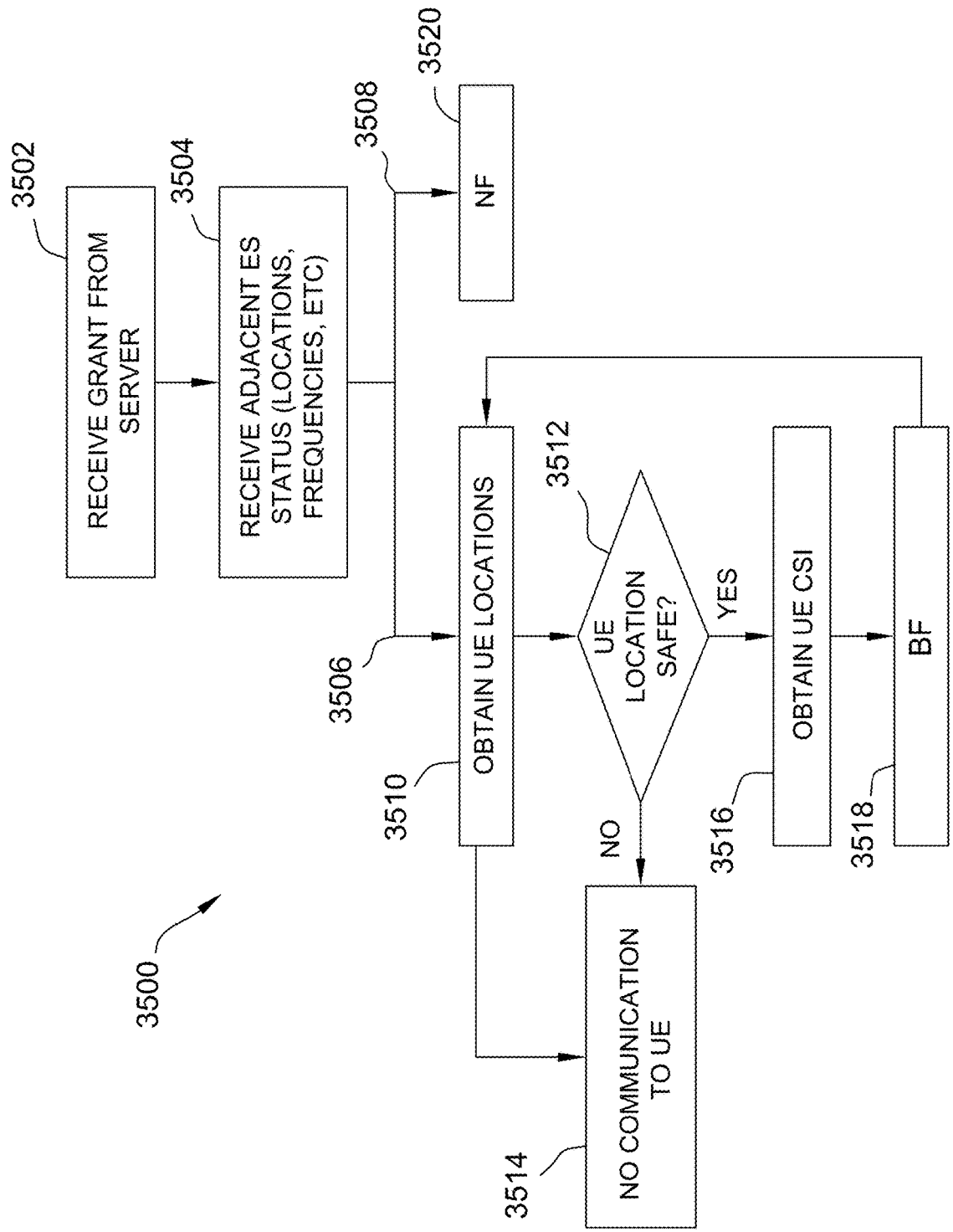
FIG. 35 is a flow diagram of an exemplary process for operating a multiple antenna system, according to an embodiment.

FIG. 35 is a flow diagram of an exemplary process 3500 for operating a multiple antenna system. In an exemplary embodiment, process 3500 may be implemented with respect to one or more of the embodiments depicted in FIGS. 23-34. In operation, process 3500 begins at step 3502, in which a grant is received from a server for an AP to transmit (e.g., step 620, FIG. 6). In an exemplary embodiment of step 3502, the grant is received after management by a stoplight system (e.g., FIG. 38, below). In step 3504, a multi-antenna receiver receives status information of one or more satellite subsystems/earth stations adjacent or approximate to the respective AP. Upon completion of step 3504, process 3500 proceeds to execute one or both of beamforming subprocess 3506 and null forming subprocess 3508.

Beamforming subprocess 3506 begins at step 3510, in which the multiple antenna system obtains location information for one or more UEs operating within the range of a cell of the system. In an exemplary embodiment of step 3510, collection of UE locations is facilitated utilizing one or more other communication systems belonging to the same heterogeneous network. Step 3512 is a decision step. In step 3512, process 3500 determines if transmission to/from a particular UE or FWA location is "safe," that is, may be performed without unreasonable interference from/to a particular FSS site. If, in step 3512, process 3500 determines that a particular UE or FA location is not safe, process 3500 proceeds to step 3514, in which communication with the particular UE at that location is disabled, and process 3500 then returns to step 3510. If, however, in step 3512, process 3500 determines that the UE a location is safe, process 3500 proceeds to step 3516.

In step 3516, the server and/or the multi-antenna receiver obtains CSI for at least one UE at location determined to be safe. In step 3518, process 3500 implements beamforming from the multi-antenna transmitter in the direction of the UE for which CSI was obtained in step 3516. Null forming subprocess includes a step 3520, in which process 3500 implements null forming in the direction of the location(s) of one or more earth stations obtained in the status information received in step 3504. The exemplary embodiment described with respect to FIG. 35 is provided for illustration purposes, and is not intended to be limiting. For example, symmetric and/or similar operations, steps, subprocesses, etc. may be alternatively, or additionally, implemented for UEs in the case of UEs being equipped with multi-antenna transceivers. In such instances, BF and NF may, for example, be jointly processed with multiplexing mode.

Figure 36:
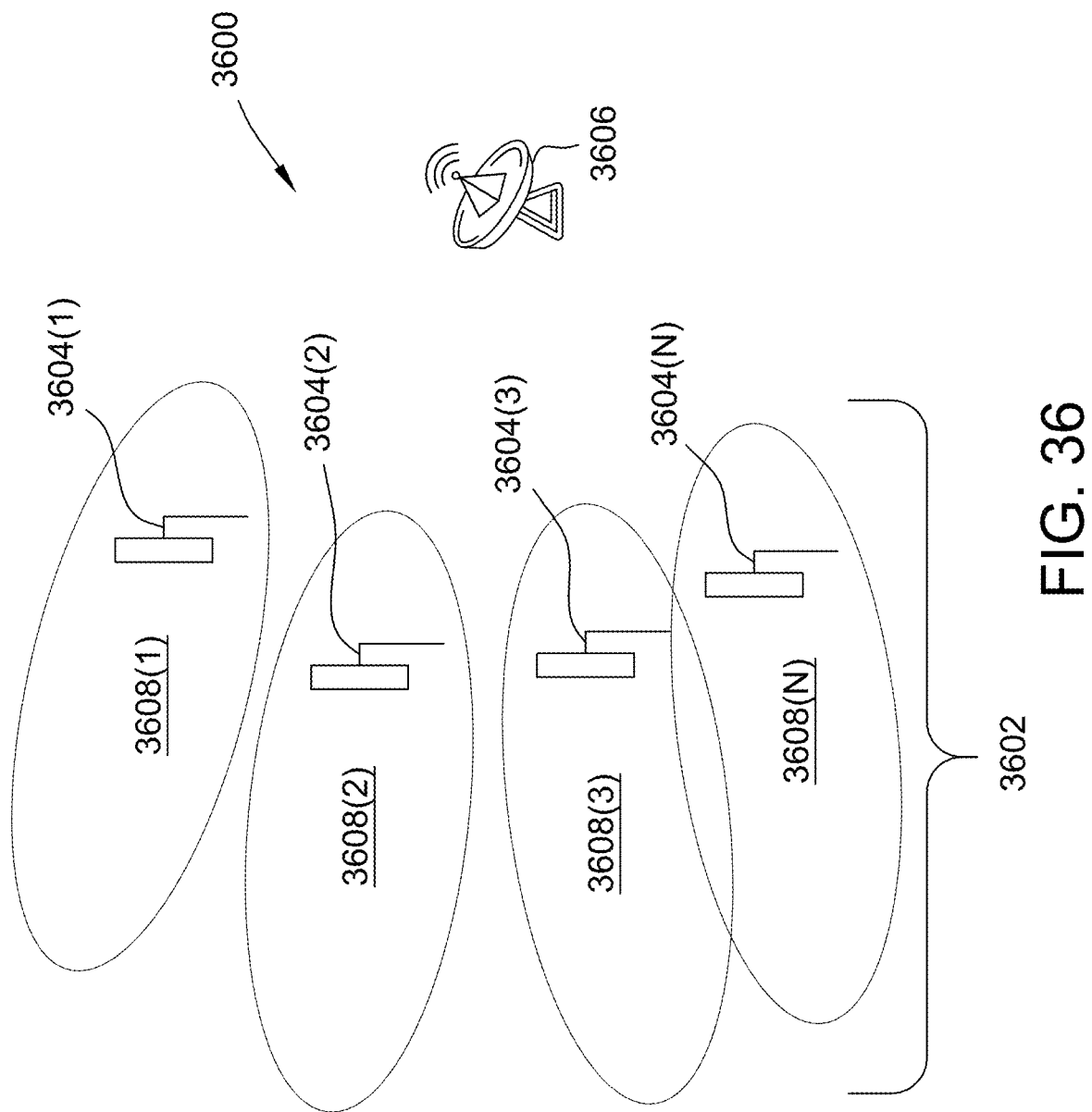
FIG. 36 is a schematic illustration of a multiple antenna system implementing a directional antenna subsystem for satellite downlink protection, according to an embodiment.

FIG. 36 is a schematic illustration of a multiple antenna system 3600 implementing a directional antenna subsystem 3602 for satellite downlink protection. In an exemplary embodiment, multiple antenna system 3600 represents a wireless communication system, and directional antenna subsystem 3602 includes a plurality of directional antennas 3604 of an AP (also referred to herein as a directional AP) located proximate to an operational range of an earth station/satellite subsystem 3606. In some embodiments, directional antenna subsystem 3602 is implemented as an alternative to a multi-antenna system (e.g., similar to the embodiments described above). In other embodiments, directional antenna subsystem 3602 is implemented in a complementary manner with a multi-antenna system.

In exemplary operation of system 3600, each directional AP/antenna 3604 is configured to provide coverage within a respective coverage area 3608 substantially disposed in a direction extending away from earth station/satellite subsystem 3606. In some embodiments, respective coverage areas 3608 may be configured such that collectively, coverage areas 3608 are substantially equivalent to a coverage area provided by a conventional omni-directional AP (not shown in FIG. 36). However, irrespective of similarity of coverage areas, the embodiment illustrated in FIG. 36 realizes substantial benefits over a conventional omni-directional AP because, unlike in the case of the conventional omni-directional AP, implementation of directional antenna subsystem 3602 advantageously enables system 3600 to minimize interference from/to earth station/satellite subsystem 3606, as described further below with respect to the comparative examples depicted in FIGS. 37A-B and described with respect to Table 13.

Figure 37A:
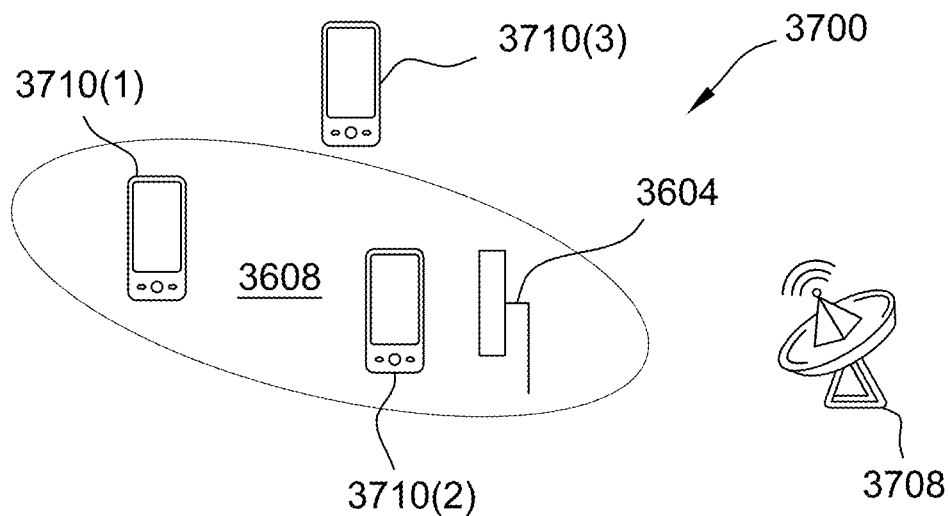
FIG. 37A is a schematic illustration of a mobile network implementing directional coverage implementing the directional antenna depicted in FIG. 36.
Figure 37B:
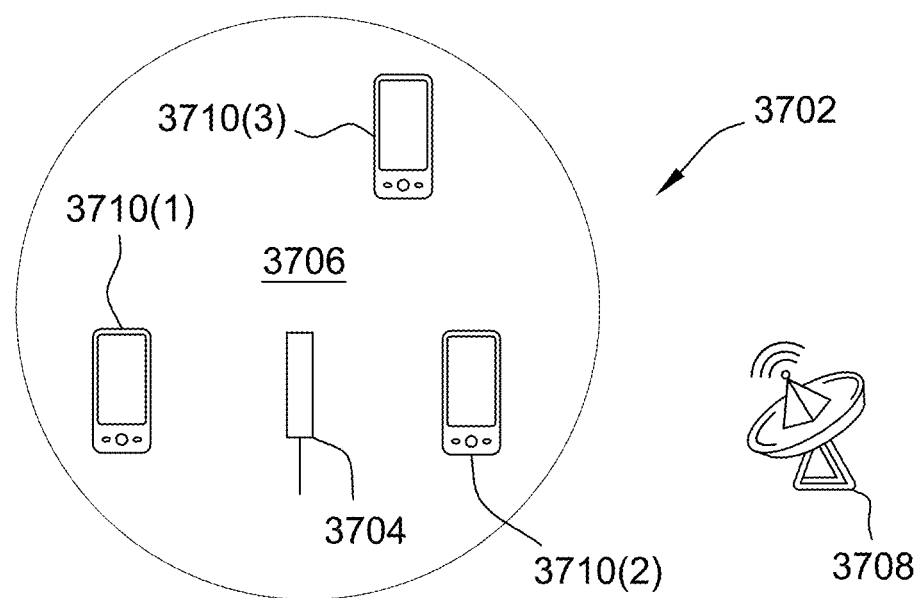
FIG. 37B is a schematic illustration of a mobile network implementing a conventional omni-directional antenna.

FIG. 37A is a schematic illustration of a mobile network 3700 implementing directional coverage implementing directional antenna 3604, FIG. 36, and FIG. 37B is a schematic illustration of a mobile network 3702 implementing a conventional omni-directional antenna 3704. In the exemplary embodiment, directional antenna 3604 and omni-directional antenna 3704 each represent a respective AP (not separately numbered), and may be considered in this example to provide substantially similar coverage areas (e.g., coverage areas 3608, 3706, respectively) at approximately the same distance to an earth station (ES) 3708, and with respect to a relative disposition of a plurality of UEs or FWA transceivers 3710.

In comparative operation of mobile networks 3700, 3702, the downlink interference generated by the respective APs 3604, 3704 may be expected to be somewhat similar. However, as can be seen from a comparison between FIGS. 37A and 37B, the uplink power levels from the same distribution of UEs 3710 may be significantly different between the two mobile networks. That is, in the case of omni-directional AP 3704, all of UEs 3710 are contained within coverage area 3706. In contrast, in the case of directional AP 3604, at least one of UEs 3710 (e.g., UE 3710(3) in this example) is outside of coverage area 3608, and the relative distribution of UEs 3710 leads to significantly different uplink power levels, and therefore also significantly different potential uplink interference possibilities, as demonstrated below with respect to Table 13.

TABLE 13

| UE | UE-ES LOCATION | DIRECTIONAL ANTENNA 3710 | OMNI-DIRECTIONAL ANTENNA 3704 |
| --- | --- | --- | --- |
| 3710(1) | UE far from ES | Medium uplink power/ No interference | Medium uplink power/ No interference |
| 3710(2) | UE close to ES | Low uplink power/ No interference | High uplink power/ Potential interference |
| 3710(3) | UE on boresight of ES | Outside coverage area/ No communication/ No interference | High uplink power/ Potential interference |

According to the exemplary data provided in Table 13, it can be seen how implementation of directional antennas according to the embodiments herein may advantageously substitute for the coverage area of a conventional omni-directional antenna, but while obtaining significant advantages over such conventional antennas with respect to uplink power and the avoidance of potential interference of UEs.

Stoplight System for in-band Protection

As described above, the coexistence of mobile or wireless communication systems with satellite systems has proven conventionally difficult to model with respect to the relatively recent promotion of CBRS in the 3.5 GHz band spectrum. Conventional coexistence mechanisms that rely primarily on only priority tiers, protection zones, and radio sensing have proven insufficient for the C-band. According to the innovative systems and methods described herein though, a network of satellite beacon transmitters and detectors (i.e., BRs) enable the generation of a global map (e.g., within an individual country, or around the world) of potential radio interference. According to the present systems and methods, a dynamic interference map may be created in real time using the MBP techniques coordinated by one or more central servers.

In an exemplary embodiment of the innovative infrastructures described herein, individual beacon transmitters may be configured to utilize the same transmitters used at small cell base stations, thereby significantly reducing the need for installation of additional equipment. In other embodiments, the beacon transmitters may be co-located with base stations at the particular FSS sites. Optimally, a plurality of BRs are geographically distributed across a wide area, but need not to be of uniform architecture, as described above. In some cases, one or more BRs may implement multi-antenna technologies, such as MIMO, to improve the diversity and sensitivity capabilities of the respective receivers. Different BR categories are described below with respect to FIG. 38.

Figure 38:
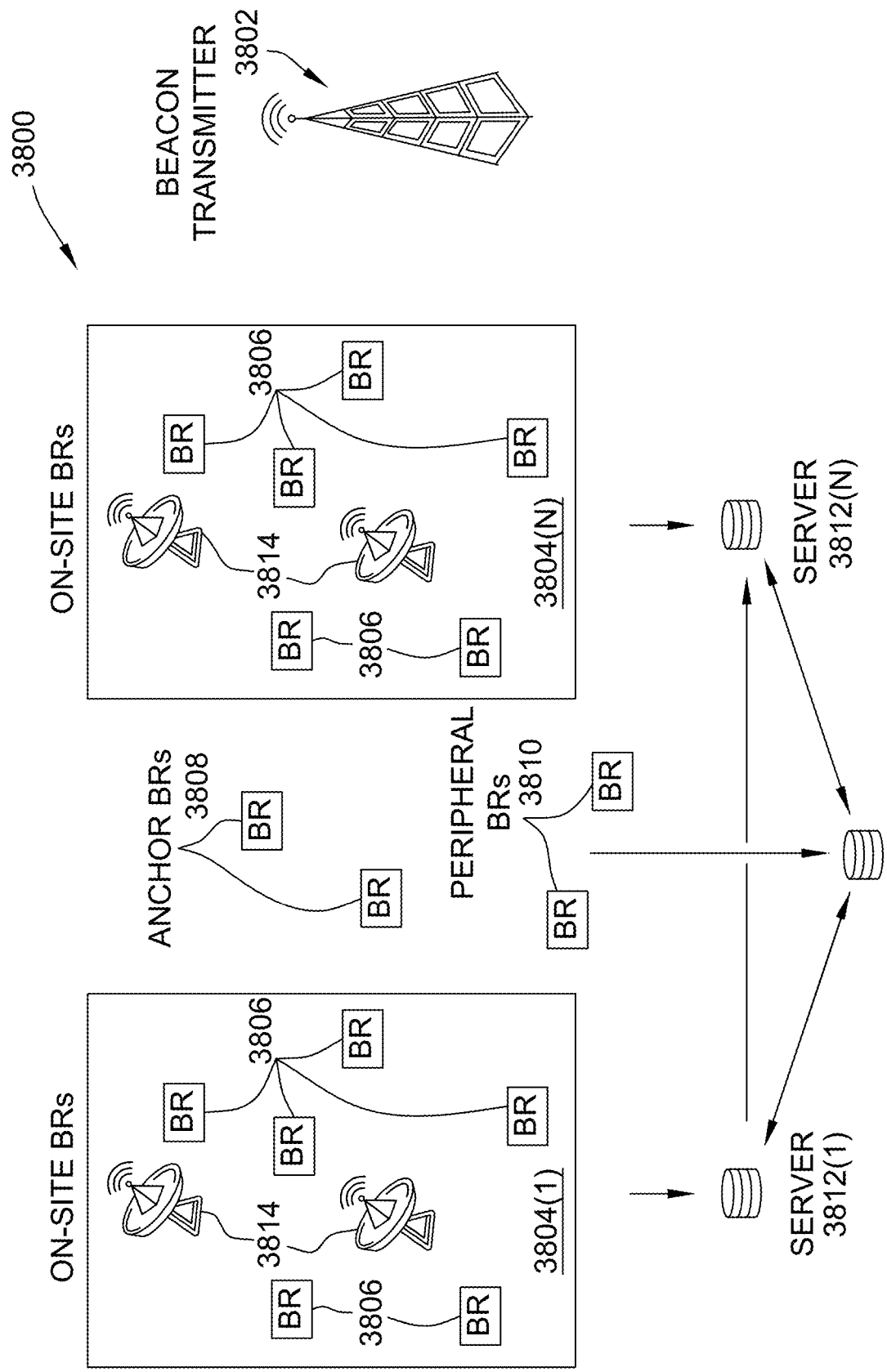
FIG. 38 is a schematic illustration of a communication system, according to an embodiment.

FIG. 38 is a schematic illustration of a communication system 3800. In an exemplary embodiment, communication system 3800 is configured to manage beacon transmission from a beacon transmitter 3802 to one or more of a variety of beacon detector categories distributed in or among a plurality of FSS sites 3804. The variety of beacon detector categories include on-site BRs 3806, anchor BRs 3808, and peripheral BRs 3810 each of which may be configured to directly or indirectly operably communicate with one or more servers 3812 (i.e., 1-N servers 3812). According to the exemplary embodiment depicted in FIG. 38, the distributed network of beacon transmitter(s) 3802, detectors/BRs 3806, 3808, 3810, and servers 3812 may be collectively configured (also referred to herein as a "stoplight" system) to operate according to the real-time and dynamic conditions of system 3800, such that the capability to detect, measure, and mitigate interference within system 3800 is significantly improved for more effective satellite system protection, as well as more efficient spectrum use.

In an exemplary embodiment, on-site BRs 3806 include detectors or receivers that are embedded in, co-located with, and or integral to respective the satellite earth stations 3814 of the FSS sites 3804. In some embodiments, the various receivers of on-site BRs 3806 are configured to form an array at or approximate to a respective earth station 3814 for a more accurate close-field estimate in particular instances. As described above with respect to FIG. 15, considering deployment of on-site BRs 3806 in approximately all 4700 U.S. FFS sites 3804, stoplight system 3800 may be reasonably considered to cover approximately 98% of the population utilizing only on-site BRs 3806. Nevertheless, it may be desirable to utilize one or more other BR categories to achieve 100% coverage, and/or in the case where deployment of on-site BRs 3806 is not, or cannot be, achieved.

Anchor BRs 3808, for example, may include detectors or receivers deployed near satellite FSS sites 3804 that prohibit or do not implement on-site BRs 3806, and/or to extend the effective beacon coverage range beyond 200 dB in hops. Peripheral BRs 3810, on the other hand, function to supplement the overall beacon infrastructure of stoplight system 3800 through the deployment of additional, peripheral detectors/receivers at non-site facilities, such as cable strands, for example. In some instances, this deployment of peripheral BRs 3810 advantageously functions according to principles similar to those of environmental sensing capability (ESC) for radar systems.

In exemplary operation of stoplight system 3800, a local server (e.g., server 3812(1)) is configured to collect information from one or more of the distributed BRs 3806, 3808, 3810, and provides the local view obtained thereby to a global server (e.g., server 3812(2) in this example). Alternatively, a plurality of servers 3812 are configured to interchange their respective data such that each so-configured server 3812 is enabled to build its own global interference map. In the exemplary embodiment, each such generated global interference map should be substantially identical to the global interference maps generated at other servers 3812. In at least one embodiment of stoplight system 3800, N is a substantially large number such that many server providers 3812 are integrated among system 3800 to more reliably prevent fragmentation or gaps of coverage.

In an exemplary embodiment, system 3800 utilizes information provided to servers 3812 to dynamically generate and/or regenerate a radio map of potential interference over the entire area covered by system 3800. Stoplight system 3800 is therefore further advantageously enabled to establish still further protection mechanisms, including without limitation, channel selective transmission, power restriction, and zoning, based on the mapping information generated/regenerated by servers 3812.

Interference Detection in Shared Spectrum Channels

A number of systems and methods for protecting satellite receivers from interference from adjacent mobile cells are described above. Several of the embodiments herein implement beacons and/or a specialized beacon infrastructure to measure the potential interference between a mobile cell and the satellite receiver.

The following embodiments further describe innovative systems and methods that utilize the LTE signal itself for the satellite receiver to detect interference, and thereby avoid the need for dedicated beacon transmitters at the mobile cells/cellular devices. The present embodiments therefore further achieve significant cost reduction by enabling the use of an expensive and readily available hardware to detect and/or measure the LTE signal at the satellite receiver. More particularly, the following embodiments advantageously detect the presence of nearby mobile cells that can potentially interfere with a receiver in a nearby area, and enable control of local node operation according to the detected presence.

FIG. 39 illustrates an exemplary interference detection system 3900. System 3900 includes a cell tower 3902 broadcasting to one or more mobile cellular devices (e.g., UEs) 3904 operating within a vicinity of a satellite receiver 3906. In the exemplary embodiment depicted in FIG. 39, satellite receiver 3906 is equipped with at least one beacon detector 3908. Both of satellite receiver 3906 and beacon detector 3908 may be in operable communication with a system operator 3910 in a manner similar to the embodiments described above. In this example, cell tower 3902 and cellular devices 3904 are configured to transmit and receive LTE signals 3912.

An LTE signal (e.g., LTE signal 3912) may include many associated components. One such component is the PSS (Primary Synchronization Signal) which is fundamental to LTE signals 3912, and is used by cellular devices 3904 to detect the presence of and identify a mobile cell or mobile cell tower 3902, and then to synchronize the particular cellular mobile device 3904 with cell tower 3902. The PSS may, for example, be sent periodically once every 5 ms, for a duration of 71 μs.

As described above, the PSS is based on a frequency-domain Zadoff-Chu (ZC) sequence, which is itself a construction of Frank-Zadoff sequences. ZC codes have a useful property of having zero cyclic autocorrelation at all nonzero lags. When used as a synchronization code, the correlation between the ideal sequence and a received sequence is greatest when the lag is zero. When there is any lag between the two sequences, the correlation is zero. Utilization of the ZC-based PSS for interference detection is described further below with respect to FIGS. 40-42.

Figure 40:
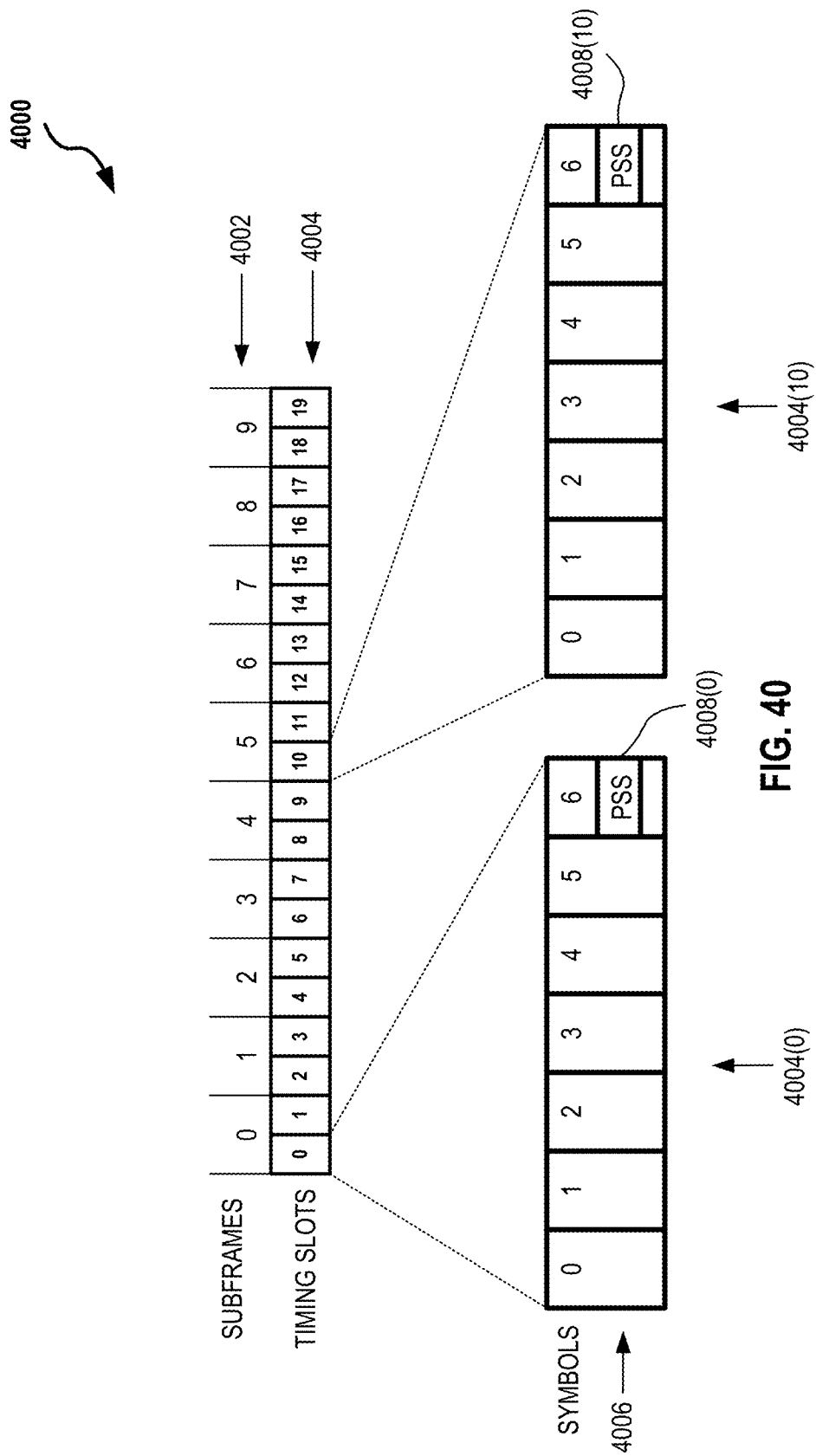
FIG. 40 is a schematic illustration of a signal frame architecture, according to an embodiment.

FIG. 40 is a schematic illustration of a signal frame architecture 4000. In an exemplary embodiment, frame architecture 4000 represents an LTE signal and includes a plurality of subframes 4002, and a corresponding plurality of timing slots 4004. In this example, architecture 4000 is depicted to include two timing slots 4004 for each subframe 4002. Each timing slot 4004 includes a plurality of symbols 4006 (six symbols 4006 for each timing slot 4004, in this example), and at least one PSS 4008. In the exemplary embodiment depicted in FIG. 40, PSS 4008 is repeated once every six symbols 4006, that is, one per timing slot 4004. Accordingly, interference detection may be reliably performed by detecting the presence of PSS 4008 within architecture 4000.

More particularly, the detection of PSS 4008 is enabled through use of an autocorrelation function (e.g., a ZC sequence) between a reference sequence stored at the receiver (e.g., satellite receiver 3906, FIG. 39), on the one hand, and the signal seen at the receiver, on the other hand. Since the PSS is expected to be sent from the cell on a periodic basis, the autocorrelation between the reference sequence and the signal may be performed repeatedly over time, and the various received signals and results of the autocorrelation results may be dynamically accumulated over time for increasing accuracy during operation. According to the present embodiments, as the number of autocorrelation iterations increase, the PSS may increasingly be detected at lower and lower SNR values. For example, if the SNR is 0 dB, then the number of iterations may be 6, whereas, if the number of iterations are increased to 15, then PSS 4008 may be detected at an SNR value as low as −12 dB. The person of ordinary skill in the art will understand that these exemplary numerical values are provided solely for purposes of illustration, and not in a limiting manner.

Figure 41:
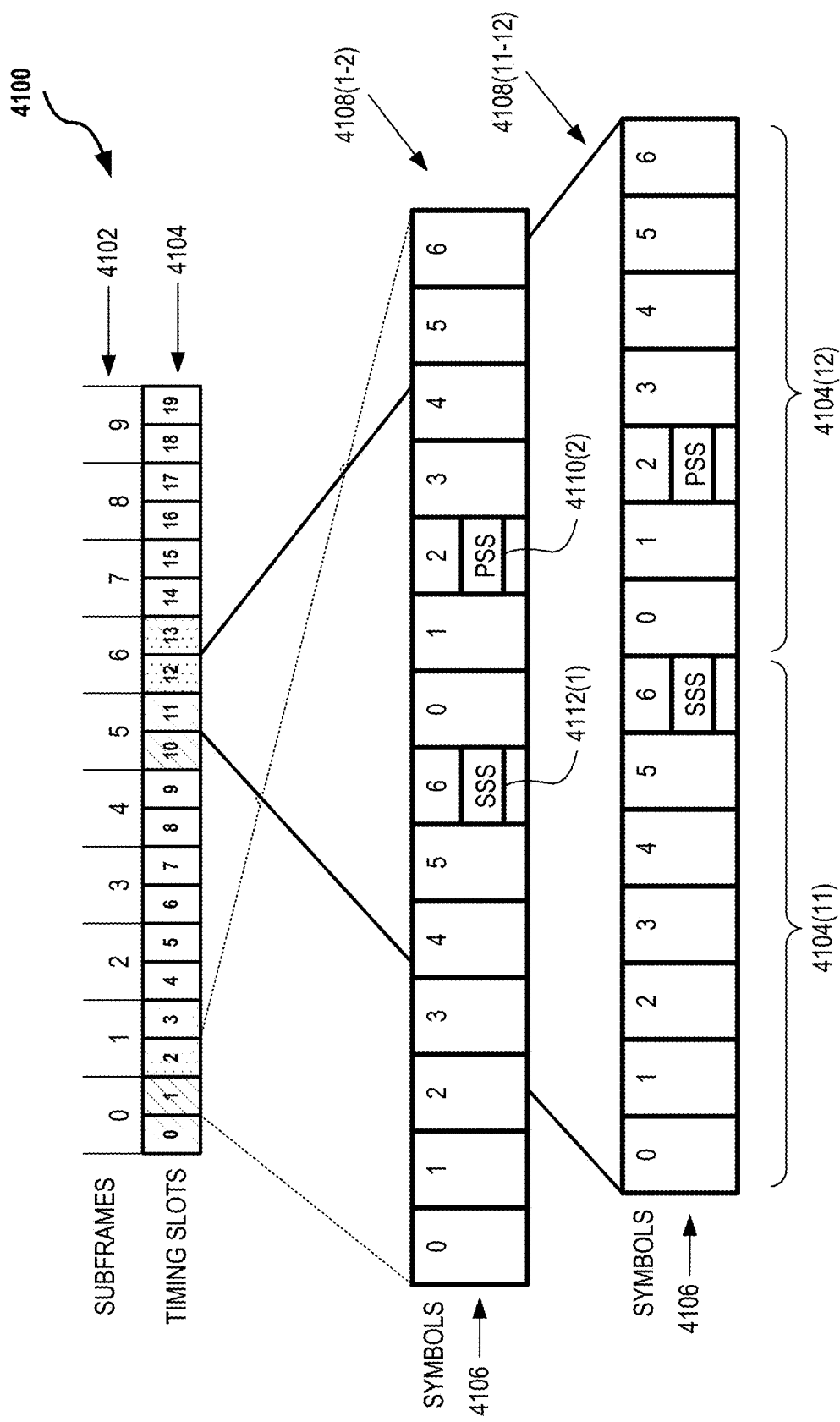
FIG. 41 is a schematic illustration of a signal frame architecture, according to an embodiment.

FIG. 41 is a schematic illustration of a signal frame architecture 4100. Architecture 4100 is similar to architecture 4000, FIG. 40, in several respects, and includes a plurality of subframes 4102, a corresponding plurality of timing slots 4104 (e.g., two timing slots 4104 for each subframe 4102, in this example), and a plurality of symbols 4106 for each timing slot 4104 (six symbols 4106 for each timing slot 4104, in this example as well). Different from architecture 4000 though, architecture 4100 groups into timing slot pairs 4108 adjacent timing slots 4104 that bridge the architectural boundary between adjacent subframes 4102. Similar to architecture 4000, architecture 4100 also represents an LTE signal.

As can be seen from the exemplary embodiment depicted in FIG. 41, each timing slot pair 4108 includes only a single PSS 4110, as opposed to a PSS for each timing slot 4106. Nevertheless, in this example, each timing slot pair 4108 further includes at least one Secondary Synchronization Signal (SSS) per pair. Accordingly, interference detection may also be reliably performed using different LTE signal architectures.

Figure 42:
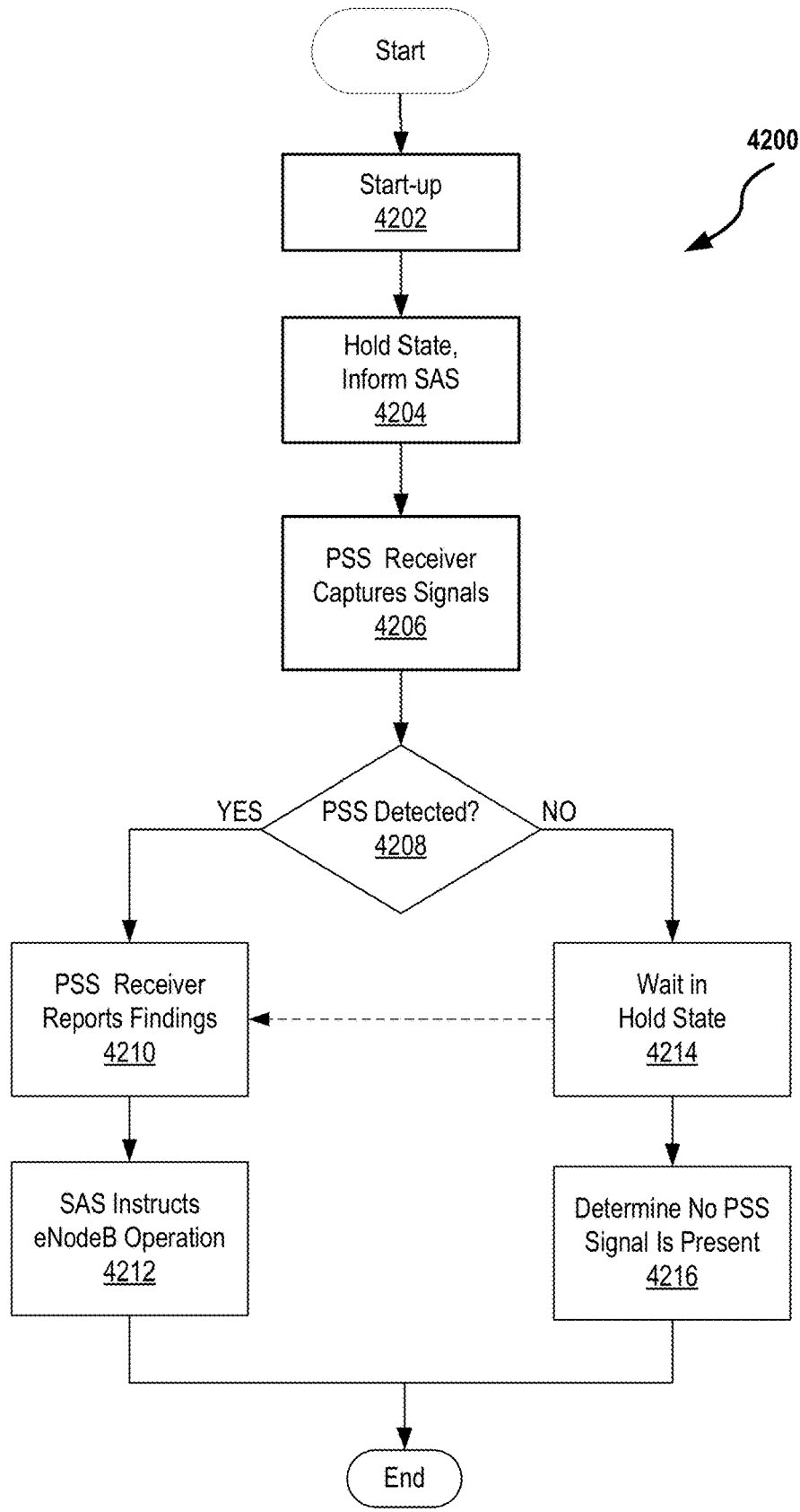
FIG. 42 is a flow diagram for an exemplary interference detection process, according to an embodiment.

FIG. 42 is a flow diagram for an exemplary interference detection process 4200. In an exemplary embodiment, interference detection process 4200 is executed by a processor (not shown) of a central server or SAS (e.g., operator 3910, FIG. 39) in some embodiments, process 4200 is executed by a processor disposed at, or in operable communication with, one or both of satellite receiver 3906 and an eNodeB (not shown) stationed at tower 3902. Process 4200 may be executed with respect to the simplified system 3900 depicted in FIG. 39, or may represent a subprocess of the more complex MBP schemes described above, to enable interference detection at the satellite receiver.

Process 4200 begins at step 4902, in which the eNodeB of the system is started up (e.g., powered on, becomes active after an idle period, etc.). At step 4204, process executes a Hold State, in which the eNodeB sends a PSS at a nominal operational power level. In an exemplary embodiment of step 4204, no other data (either uplink or downlink) is sent by the eNodeB during the Hold State. In some embodiments of step 4204, the eNodeB informs the central server/SAS (or a system processor configured to coordinate spectrum sharing) of entry into the Hold State, and the eNodeB maintains the Hold State this mode for a predetermined number (k) of minutes.

At step 4206, the PSS receiver (e.g., satellite receiver 3906, beacon detector 3908, etc.) is configured to continuously capture signals across the various bands of interest and perform autocorrelation to enable PSS detection. In an exemplary embodiment of step 4206, a PSS detection algorithm at the receiver may be limited to N iterations, where N is defined according to a value (predetermined or dynamically obtained through MBP) for maximum allowable interference.

Step 4208 is a decision step. In step 4208, process 4200 determines if the PSS is detected based on the results of step 4206. If the PSS receiver detects a presence of the PSS, then process 4200 proceeds to step 4210, in which the PSS receiver reports the detected measurements (e.g., PSS SNR detection level, mobile cell ID, etc.) to the central server/SAS. In step 4212, based on the report from the PSS receiver in step 4210, the central server transmits operational instructions to the eNodeB. In an exemplary embodiment of step 4212, the operational instructions include instructions for the eNodeB to (i) fully operate, (ii) operate at a lower power, or (iii) cease operation (e.g., complete denial).

Returning back to step 4208, if no PSS was detected from step 4206, process 4200 proceeds to step 4214, in which the eNodeB maintains the Hold State (e.g., from step 4204) for k minutes. If, after k minutes of the eNodeB reporting the Hold State to the central server, and optionally, if the central server receives no reports of a detected PSS from a PSS receiver, process 4200 determines that no PSS is present, that is, that a PSS is not observed by any receiver reporting to the central server (e.g., within the vicinity of satellite receiver). Upon this determination, the central server may calculate that the eNodeB will not interfere with the satellite receiver.

The systems and methods described above thus provide an alternative, or supplemental, technique for detecting potential interference from a nearby LTE signal (e.g., from a UE) to a satellite receiver. These innovative interference detection techniques though, by utilizing information that is already present in the LTE signals themselves, require no substantive changes to the hardware or software at the eNodeB. Additionally, the present embodiments efficiently utilize existing resources that are already available in commercial PSS detectors, which are used in essentially LTE mobile handsets (billions of such handsets being actively deployed throughout the world at present).

The present systems and methods thus realize a significantly more accurate measurement of the PSS and its characteristics based on reliable digital signal processing techniques. Moreover, the present PSS-based interference detection scheme advantageously provides the central server/SAS specific information (e.g., cell ID, etc.) to identify the mobile cell, but without the need to send additional information from the mobile cell, which would create additional signal traffic.

Exemplary embodiments of spectrum sharing management and interference detection systems and methods are described above in detail, and more particularly, embodiments relating to beacon detection system configuration and operation. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A communication system, comprising:
a satellite receiver in operable communication with a central server;
a cellular node configured to operate within a proximity of the satellite receiver; and
at least one mobile communication device configured to communicate (i) with the cellular node, (ii) within the proximity of the satellite receiver, and (iii) using a transmission signal capable of causing interference to the satellite receiver,
wherein the satellite receiver is configured to detect a repeating portion of the transmission signal and determine a potential for interference from the at least one mobile communication device based on the detected repeating portion.

2. The communication system of claim 1, wherein the at least one mobile communication device is an LTE device and the transmission signal is a long term evolution (LTE) signal.

3. The communication system of claim 2, further comprising a beacon detector (i) in operable communication with at least one of the central server and the satellite receiver, and (ii) configured to measure the repeating portion of the LTE signal.

4. The communication system of claim 2, wherein the LTE signal comprises a plurality of broadcast frames.

5. The communication system of claim 4, wherein each frame of the plurality of broadcast frames comprises a plurality of subframes and a plurality of timing slots.

6. The communication system of claim 5, wherein each timing slot of the plurality of timing slots includes a plurality of symbols.

7. The communication system of claim 6, wherein each frame comprises two timing slots for each subframe.

8. The communication system of claim 6, wherein each timing slot includes one primary synchronization signal (PSS) in one symbol of the plurality of symbols.

9. The communication system of claim 8, wherein the repeating portion of the LTE signal is the PSS.

10. The communication system of claim 6, wherein every other timing slot includes one PSS in one symbol of the plurality of symbols.

11. The communication system of claim 10, wherein each alternating timing slot located between the every other timing slots includes one secondary synchronization signal (SSS) in one symbol of the plurality of symbols.

12. The communication system of claim 1, wherein the central server comprises a spectrum access system.

13. The communication system of claim 1, wherein the at least one mobile communications device is a user equipment device.

14. The communication system of claim 1, wherein the cellular node is an eNodeB of a cellular tower.

* * * * *